(12) United States Patent
Kittaka et al.

(10) Patent No.: US 7,310,468 B2
(45) Date of Patent: Dec. 18, 2007

(54) PHOTONIC CRYSTAL WAVEGUIDE, HOMOGENEOUS MEDIUM WAVEGUIDE, AND OPTICAL DEVICE

(75) Inventors: Shigeo Kittaka, Tokyo (JP); Kazuaki Oya, Tokyo (JP); Keiji Tsunetomo, Tokyo (JP)

(73) Assignee: Nippon Sheet Glass Company Limited, Tokyo (JP)

( * ) Notice: Subject to any disclaimer, the term of this patent is extended or adjusted under 35 U.S.C. 154(b) by 0 days.

(21) Appl. No.: 10/565,012

(22) PCT Filed: Jul. 16, 2004

(86) PCT No.: PCT/JP2004/010232

§ 371 (c)(1),
(2), (4) Date: Jul. 5, 2006

(87) PCT Pub. No.: WO2005/008305

PCT Pub. Date: Jan. 27, 2005

(65) Prior Publication Data

US 2006/0251368 A1 Nov. 9, 2006

(30) Foreign Application Priority Data

Jul. 18, 2003 (JP) ............................. 2003-199538
Mar. 5, 2004 (JP) ............................. 2004-063260

(51) Int. Cl.
*G02B 6/10* (2006.01)
*G02B 6/12* (2006.01)
*G02B 6/26* (2006.01)

(52) U.S. Cl. ......................... 385/131; 385/14; 385/31

(58) Field of Classification Search .................. 385/4, 385/10, 15–16, 24, 31, 37, 39, 125–132; 359/237, 245, 279, 342

See application file for complete search history.

(56) References Cited

U.S. PATENT DOCUMENTS

2003/0142385 A1 7/2003 Kittaka et al.

FOREIGN PATENT DOCUMENTS

JP 61-249004 11/1986

(Continued)

OTHER PUBLICATIONS

Tajima et al., "Symmetric Mach Zender all-optical switches and ultrafast all-optical signal processing," *Optronics*, vol. 4, pp. 132-138 (2002).

(Continued)

*Primary Examiner*—Quyen P Leung
(74) *Attorney, Agent, or Firm*—Patterson, Thuente, Skaar & Christensen, P.A.

(57) ABSTRACT

A photonic crystal waveguide and a homogeneous medium waveguide for enabling a steep bend and arrangement at an arbitrary angle with low propagation loss. A photonic crystal waveguide has a core formed by a photonic crystal having periodicity in the Y-direction. Electromagnetic wave is propagated by a band on the Brillouin zone boundary of the photonic band structure of the core. A side face of the core parallel to the Y-direction is in contact with a homogeneous medium having a refractive index of $n_s$, and the condition of $\lambda_0/n_s > a\lambda/(\lambda^2/4+a^2)^{0.5}$ is satisfied when the wavelength in vacuum of the electromagnetic wave is represented by $\lambda_0$, the period of the photonic crystal is represented by a, and the period in the XZ-plane direction of the wave propagated through the core is represented by $\lambda$.

36 Claims, 77 Drawing Sheets

FOREIGN PATENT DOCUMENTS

| | | |
|---|---|---|
| JP | 2001-108611 | 4/2001 |
| JP | 2001-174652 | 6/2001 |
| JP | 2001-272555 | 10/2001 |
| JP | 2001-281480 | 10/2001 |
| JP | 2001-305367 | 10/2001 |
| JP | 2001-343539 | 12/2001 |
| JP | 2002-169002 | 6/2002 |
| JP | 2002-182026 | 6/2002 |
| JP | 2002-236206 | 8/2002 |
| JP | 2002-267845 | 9/2002 |
| JP | 2002-303836 | 10/2002 |
| JP | 2003-161971 | 6/2003 |
| JP | 2003-215362 | 7/2003 |
| JP | 2003-240934 | 8/2003 |
| JP | 2003-287633 | 10/2003 |

OTHER PUBLICATIONS

"Photonic Crystal: Technology Applications," *CMC Publishing*, pp. 244-245 (2002).

Directions of diffracted light depends on position of end facet in zigzag propagation pattern.

Example of delay line by defect waveguide in two-dimensional photonic crystal

410

(a)

(b)

(c)

(d)

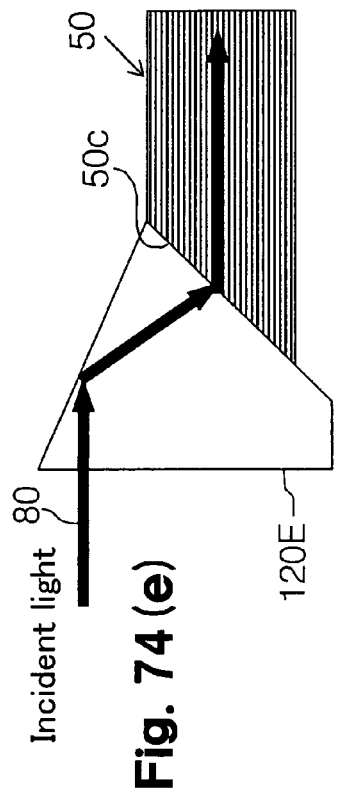
Fig. 74(e)
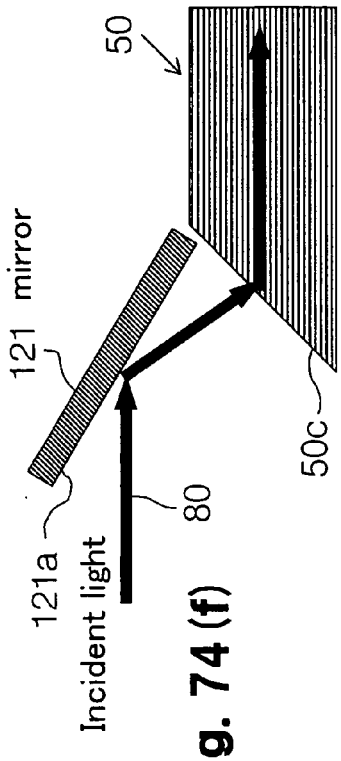
Fig. 74(f)
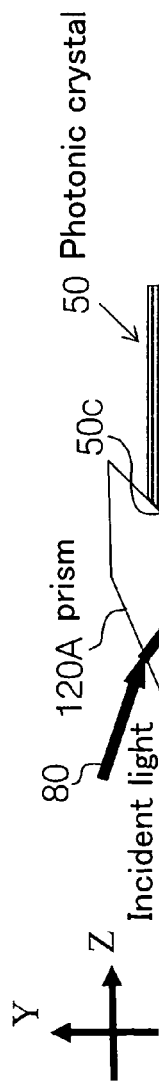
Fig. 74(a)
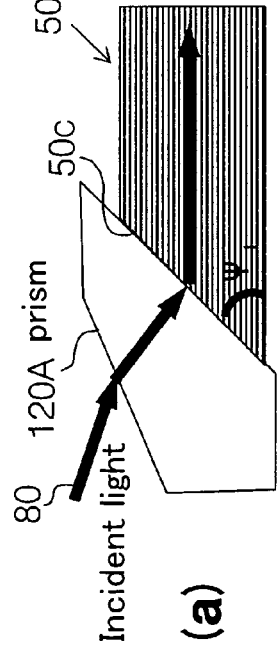
Fig. 74(b)
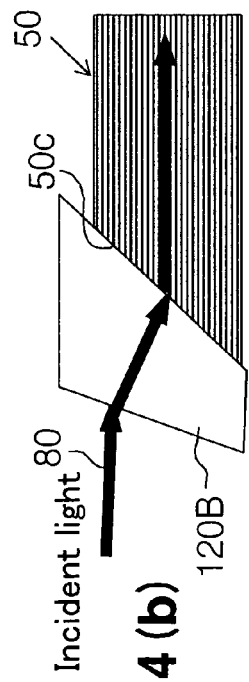
Fig. 74(c)
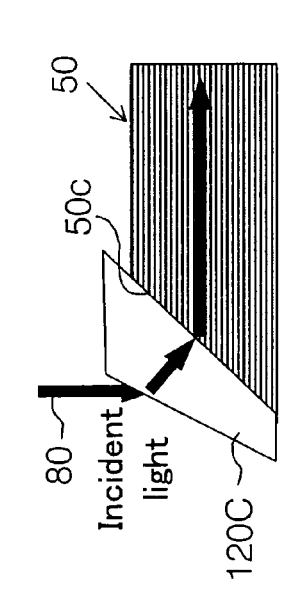
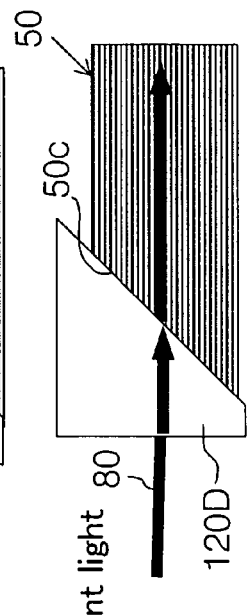
Fig. 74(d)

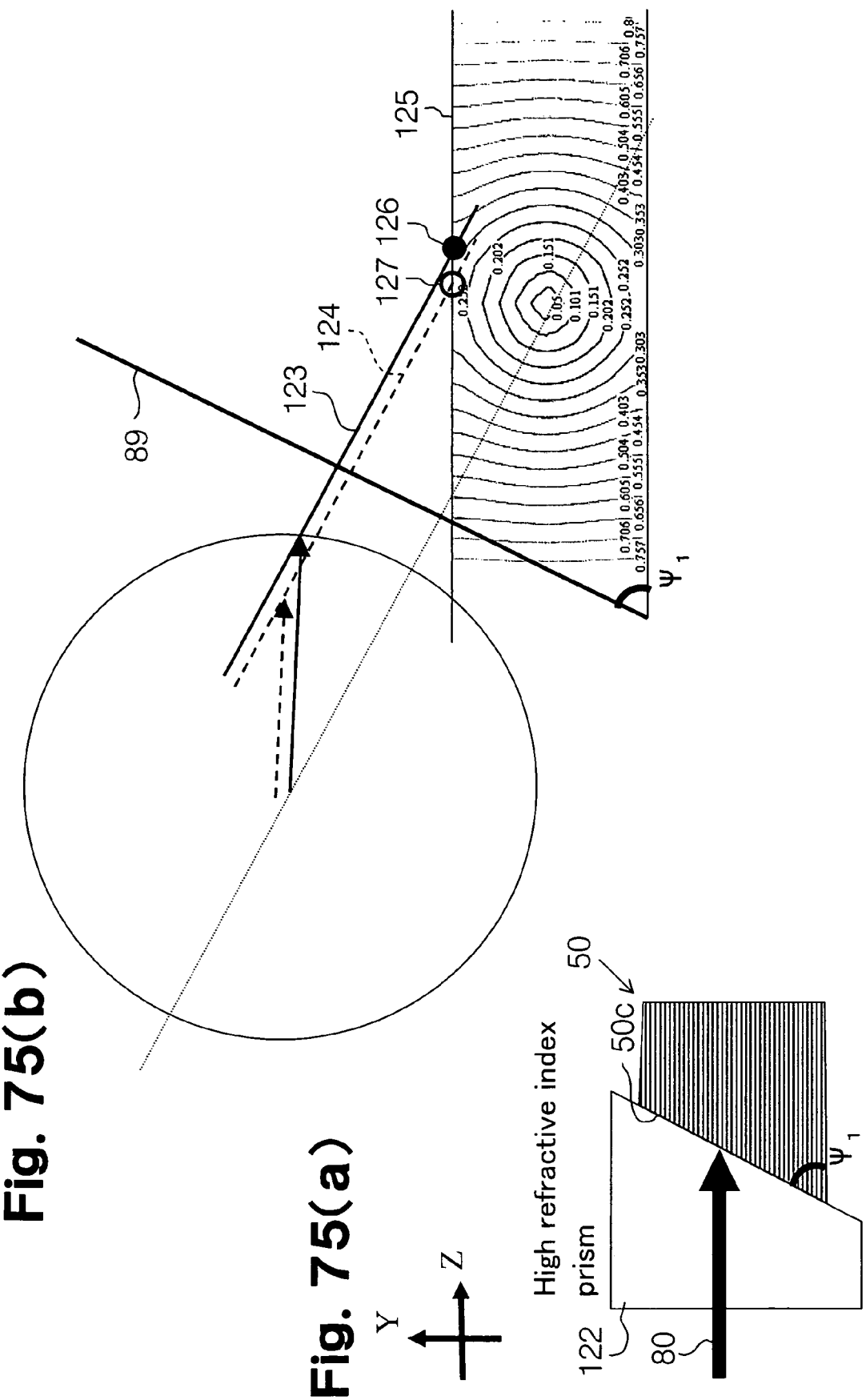

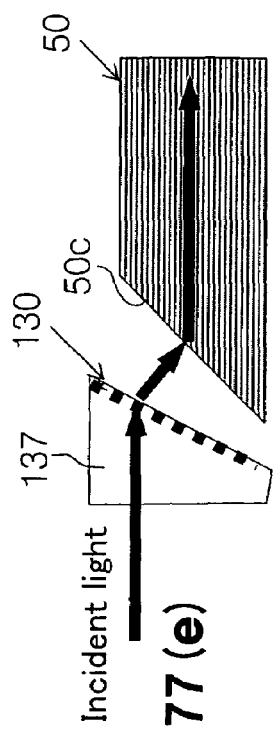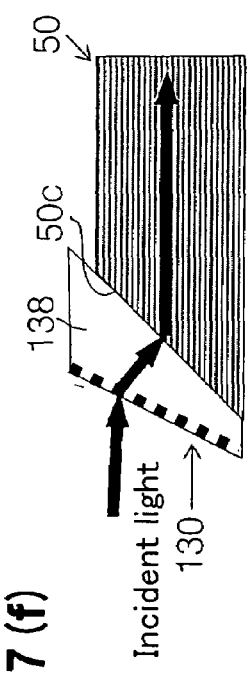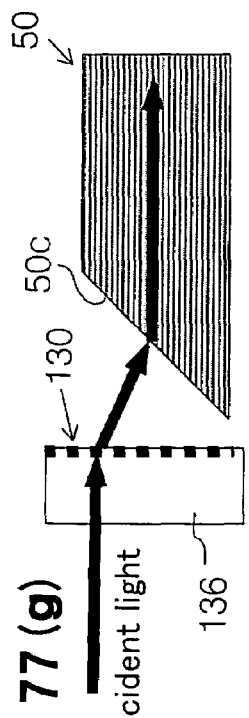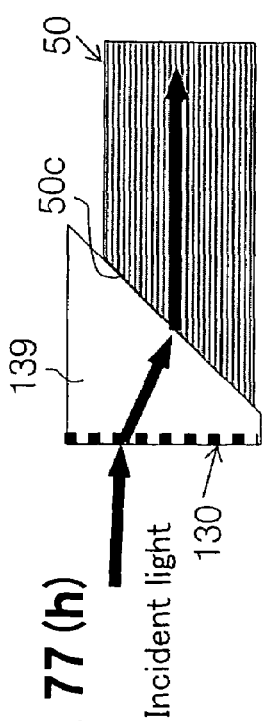
Fig. 77 (e)
Fig. 77 (f)
Fig. 77 (g)
Fig. 77 (h)
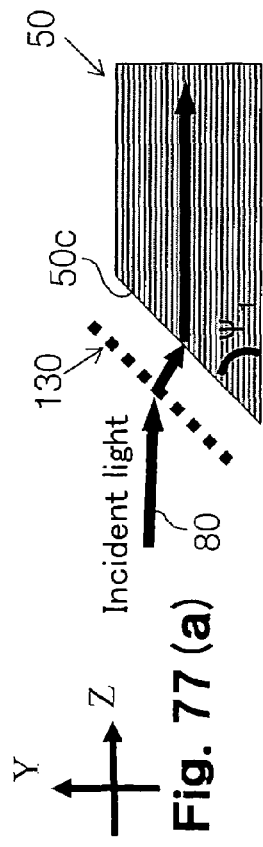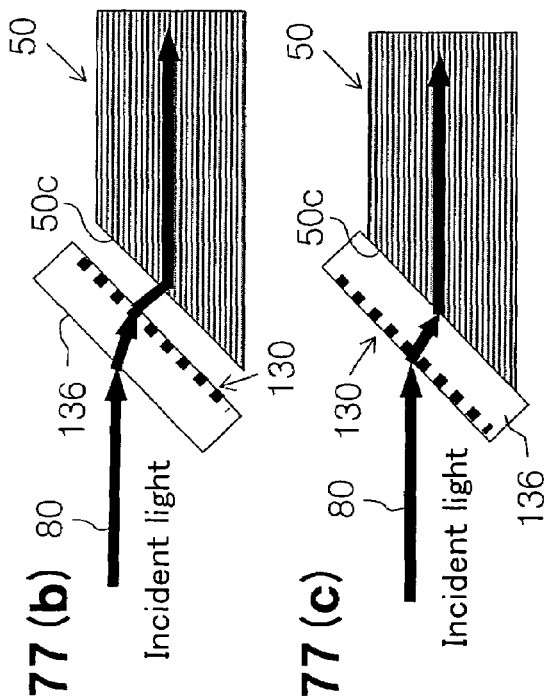
Fig. 77 (a)
Fig. 77 (b)
Fig. 77 (c)
Fig. 77 (d)

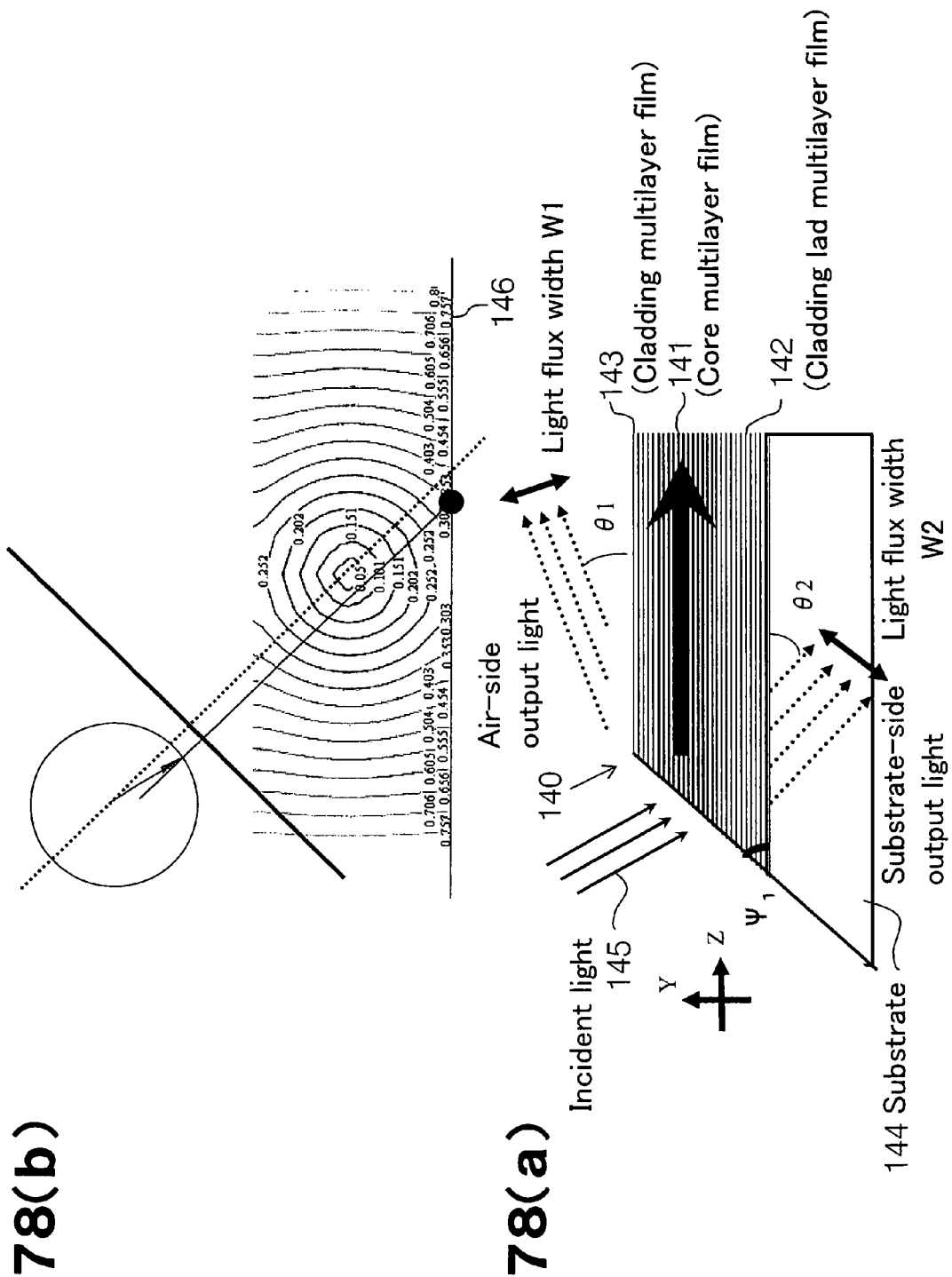

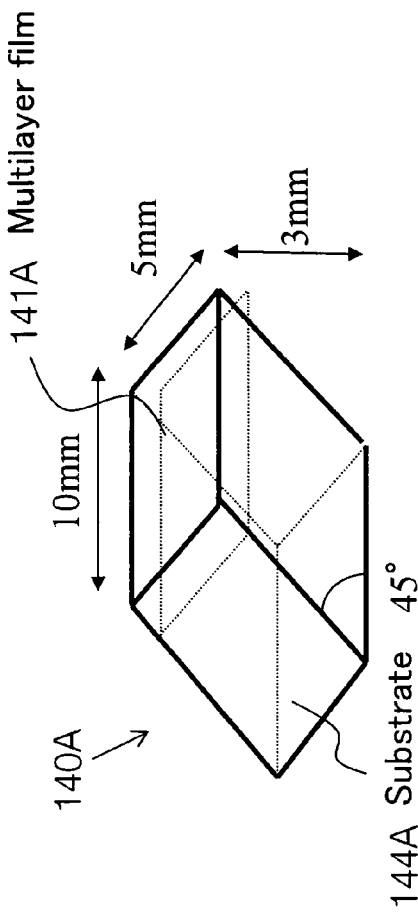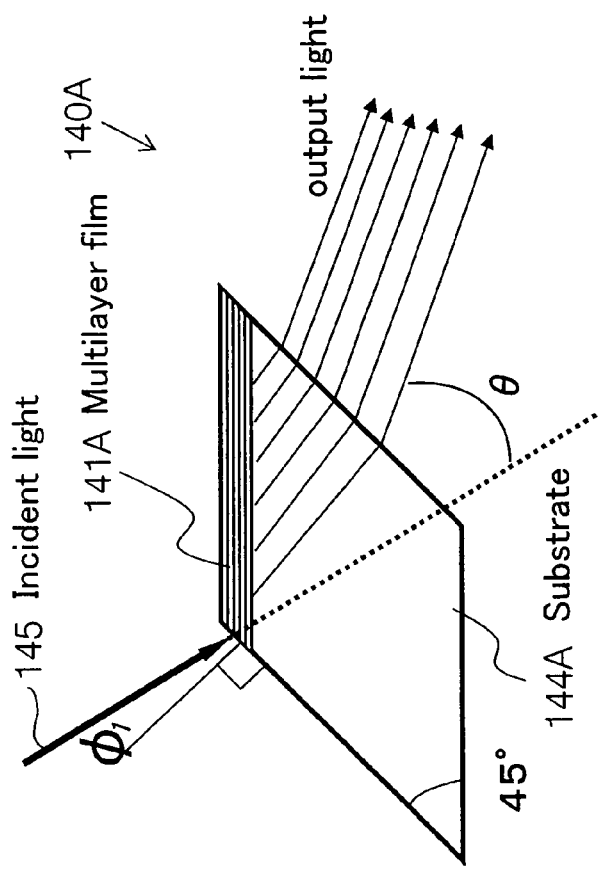
Fig. 79(a)
Fig. 79(b)

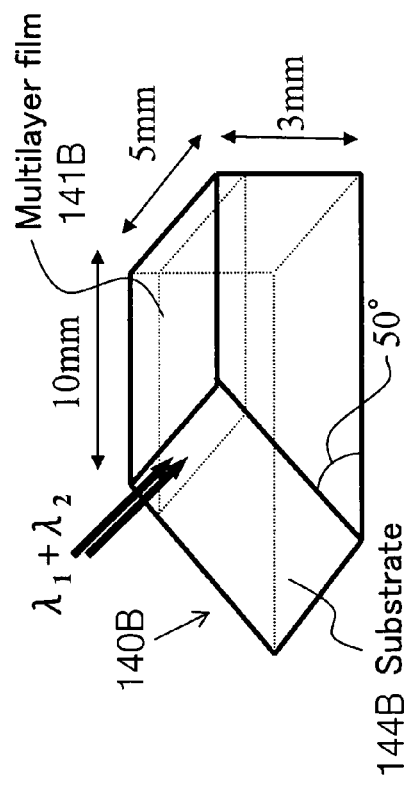
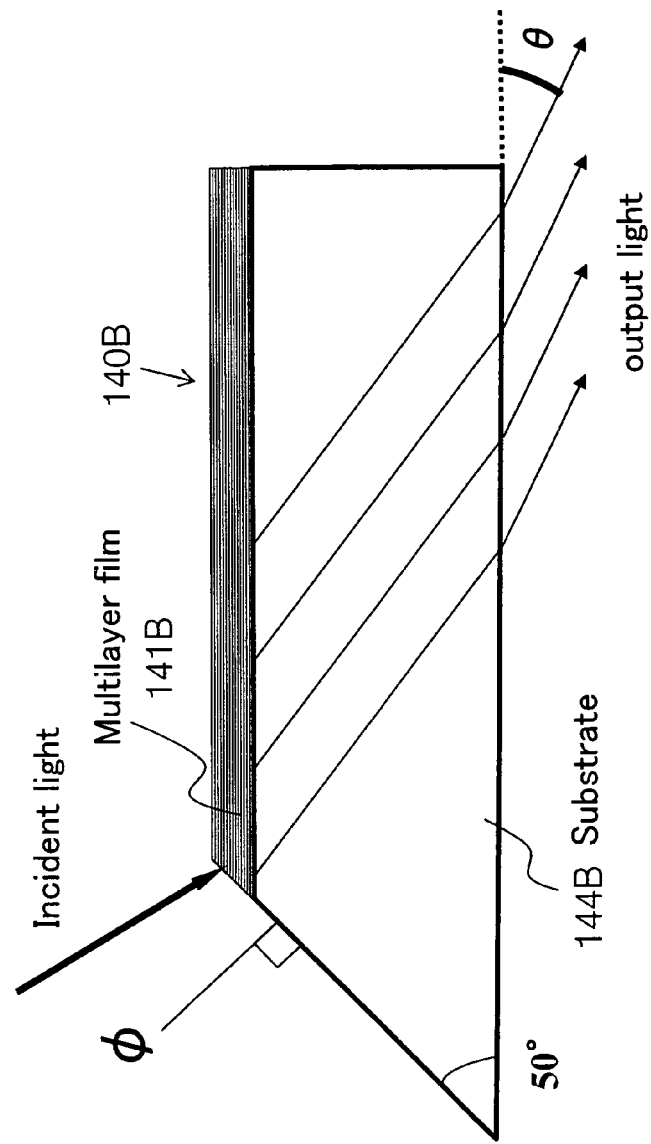
Fig. 81(a)
Fig. 81(b)

PHOTONIC CRYSTAL WAVEGUIDE, HOMOGENEOUS MEDIUM WAVEGUIDE, AND OPTICAL DEVICE

FIELD OF THE INVENTION

The present invention relates to a photonic crystal waveguide, and more particularly to a photonic crystal waveguide employing a waveguide—shaped one—dimensional photonic crystal, which propagates electromagnetic waves along a direction with no periodicity, a homogeneous medium waveguide having a homogeneous medium core, and an optical device such as a directional coupler and optical switch.

BACKGROUND OF THE INVENTION

Photonic devices having a waveguide provided on a substrate have been put in practical use. Recently, defect waveguide in two-dimensional photonic crystal (2D-PhC) have been attracting much attention, and much research and development efforts have been carried out. Specifically, a two-dimensional photonic crystal is formed by arranging regular pores in a thin film layer with a high refractive index (of Si or the like) to obtain a full photonic bandgap in the working frequency range in the planar direction (XZ-direction). When the 2D-PhC includes a linear defect, light entering the defective part is not able to exit to a photonic crystal portion and is confined therein. Therefore, the 2D-PhC can be used as a waveguide (see Patent Publication 1).

A waveguide employing a 2D-PhC has the characteristics described below.
  Steep bending (by 60 or 90 degrees) is possible in the waveguide. Therefore, the individual photonic devices and the waveguide connecting the photonic devices can be made very compact.
  A "group velocity anomaly" can be caused in electromagnetic waves propagated in the waveguide. This makes it possible to enhance the nonlinear effect to improve the characteristics and reduce the size of the device.

The following are examples of optical devices employing a two-dimensional or three-dimensional photonic crystal waveguides or an ordinary waveguide without photonic crystal.
  A directional coupler serving as optical multiplexer/demultiplexer (see Patent Publication 2)
  An optical switch performing on-off operation in response to external electric current injection or light irradiation (see Patent Publication 3).
  A symmetric Mach Zehnder all-optical switch (see Non-Patent Publication 1).
  An optical delay line (See Non-Patent Publication 2)
  A point-defect resonator (see Patent Publications 4 and 5)
  Propagated light of high-order photonic bands or high-order modes significantly varies its effective refractive index according to change in frequency. Therefore, confinement in the periodic direction of multilayer film core can be intentionally made weak to emit refracted light from the surface of the multilayer film which shows extremely large difference in refraction angle according to wavelength. This allows the optical device to function as a spectroscope. The present inventors have proposed a spectroscope utilizing such refracted light, some of which are released as spectroscope utilizing "high-order band propagation on the center of the Brillouin zone" (see Patent Publications 6 to 11, for example).

Patent Publication 1: Japanese Laid-Open Patent Publication No. 2001-281480
Patent Publication 2: Japanese Laid-Open Patent Publication No. 2001-174652
Patent Publication 3: Japanese Laid-Open Patent Publication No. 2002-303836
Patent Publication 4: Japanese Laid-Open Patent Publication No. 2001-272555
Patent Publication 5: Japanese Laid-Open Patent Publication No. 2003-161971
Patent Publication 6: Japanese Laid-Open Patent Publication No. 2002-236206
Patent Publication 7: Japanese Laid-Open Patent Publication No. 2002-169022
Patent Publication 8: Japanese Laid-Open Patent Publication No. 2002-182026
Patent Publication 9: Japanese Laid-Open Patent Publication No. 2002-267845
Patent Publication 10: Japanese Laid-Open Patent Publication No. 2003-240934
Patent Publication 11: Japanese Laid-Open Patent Publication No. 2003-287633
Non-Patent Publication 1: "Optronics", April, 2002 edition, p. 132
Non-Patent Publication 2: "Photonic Crystal: Technology and Applications" CMC Publishing, 2002, p. 244

However, the conventional waveguides described above have problems as follows.

When the photonic crystal structure forming the waveguide is arranged in a square array, the angle of steep bending is limited to 90 degrees in most cases. Similarly, in the case of a triangular array, the angle is limited to 60 or 120 degrees. Accordingly, the waveguide, or various optical devices utilizing the waveguide cannot be arranged at a desired angle. This poses a design restriction.

SUMMARY OF THE INVENTION

It is an object of the present invention to provide a photonic crystal waveguide and a homogeneous medium waveguide capable of being bent steeply and being arranged at any desired angle, while having low propagation loss, and an optical device utilizing such a waveguide.

In order to achieve the object above, the present invention provides a photonic crystal waveguide including a core that is formed of a photonic crystal having periodicity in one direction and propagating electromagnetic waves in a direction perpendicular to the one direction. The electromagnetic waves are propagated by a propagation mode of photonic bands present on the Brillouin zone boundary in the photonic band structure of the core; and a side face of the core parallel to the one direction is in contact with a homogeneous medium cladding with refractive index $n_s$, the side face satisfying the condition:

$$\lambda_0/n_s > a\lambda/(\lambda^2/4+a^2)^{0.5}$$

where $\lambda_0$ denotes the wavelength of the electromagnetic waves in a vacuum, a denotes the period of the photonic crystal, and $\lambda$ denotes the period of the waves propagated through the core in a direction perpendicular to the one direction.

Optical devices unitizing light propagated by a high-order band of a photonic crystal (high-order band propagated light) are very useful. The high-order band propagated light that is propagated in a direction perpendicular to the one direction can be obtained by utilizing a photonic band present on the Brillouin zone boundary.

On the Brillouin zone boundary, all the photonic bands behave in the same way as the high-order band. Accordingly, "significant change in the effective refractive index according to wavelength" and a "group velocity anomaly" may occur in all the bands. These characteristics can be utilized to produce optical devices such as an optical delay device and dispersion control device without deteriorating the efficiency or S/N ratio of incident light energy.

A checkered electric field pattern is exposed in a side face of the photonic crystal waveguide (parallel to the one direction). If the side face is in contact with a homogeneous medium with refractive index $n_s$, wavefront corresponding to several types of periods may exist on the homogeneous medium side to cause leakage of light. A minimum requirement for avoiding the leakage of light is $$\lambda_0/n_s > a\lambda/(\lambda^2/4+a^2)^{0.5}.$$

According to the present invention, by satisfying the above condition, the waves propagated through the core in the direction perpendicular to the one direction by the photonic band on the Brillouin zone boundary can be confined within the side face of the core when the propagation angle $\phi$ is zero degrees.

As used herein, the term "a direction perpendicular to the one direction" means any direction that is parallel to a plane perpendicular to the one direction. For example, when the one direction is the Y-direction, "a direction perpendicular to the one direction" means any direction that is parallel to a XZ-plane perpendicular to the Y-axis (XZ-plane direction).

Cladding for confinement, which is formed of a homogeneous material or a photonic crystal having periodicity at least in the one direction, may be arranged on a surface of the core perpendicular to the one direction, for preventing electromagnetic waves propagated through the core from leaking out of the surface. According to this configuration, the electromagnetic waves propagated through the core can be effectively prevented, by the cladding for confinement clad, from leaking outside from the surface perpendicular to the one direction.

In the photonic crystal waveguide, the width 2L of the core in a direction perpendicular to the longitudinal direction of the waveguide is in the range:

$$s\lambda/2 \cos \phi_0 \leq 2L < (s+1)\lambda/2 \cos \phi_0$$

with the propagation angle $\phi$ of the electromagnetic waves satisfying:

$\lambda_0/n_s - a(\lambda/\cos \phi)/\{(\lambda/2 \cos \phi)^2 + a^2\}^{0.5} = 0$, and being in the range $0 < \phi < 90°$, with a value in this range defined as a maximum value $\phi_0$ of propagation angles at which the electromagnetic waves are confined by the side face; and the phase shift amount is $s\pi$ when waves propagated through the core are reflected by the side face at the maximum value $\phi_0$ of the propagation angle, with s being in a range of $0 \leq s \leq 1$.

As used herein the term "the propagation angle $\phi$ of the electromagnetic waves" refers to an angle that is formed between the travel direction of the electromagnetic waves propagated through the core in the direction perpendicular to the one direction (e.g., the XZ-plane direction) and the longitudinal direction of the waveguide of the core.

Generally, when propagated light travels in the core of a photonic crystal, the light travels inclined at a propagation angle $\phi$ with respect to the direction perpendicular to the one direction, and there is a possibility that wavefronts corresponding to several types of periods will occur in the side face of the core on the homogeneous medium side and cause leakage of light. However, the leakage of light occurs only when the wavefront corresponding to the period $a(\lambda/\cos \phi)/\{(\lambda/2 \cos \phi)^2 + a^2\}^{0.5}$ satisfies the condition:

$$\lambda_0/n_s < a(\lambda/\cos \phi)/\{(\lambda/2 \cos \phi)^2 + a^2\}^{0.5}.$$

Therefore, the photonic crystal waveguide can be an "imperfect confinement single-mode waveguide" by satisfying the above-mentioned condition. In this waveguide, certain propagation angles $\phi$ form a condition for causing leakage of light. Since the waveguide width 2L is set sufficiently small, the waveguide satisfies the single-mode condition.

Leakage of light occurs when the propagation angle $\phi$ exceeds the maximum value $\phi_0 (0 < \phi_0 < 90°)$ for the propagation angle. Therefore, a steep bend is possible in the range where the propagation angle $\phi$ does not exceed the maximum value $\phi_0$.

The photonic crystal waveguide is suitable for a simple waveguide in which characteristics such as dispersion and group velocity anomaly are desirably small.

In the photonic crystal waveguide, when the phase shift amount is $s\pi$ when waves propagated through the core in a direction perpendicular to the one direction are perpendicularly incident on the side face and reflected, with s being in a range of $0 \leq s \leq 1$, the conditions:

$$\lambda_0/n_s - 2a > 0 \text{ and}$$

$$s\lambda/2 \leq 2L$$

are satisfied. By satisfying these conditions, effects as described below can be obtained.

Waves propagated at an angle other than the propagation angle $\phi$ are confined in the core. Therefore, the waveguide is suitable for a resonator and the like.

The waveguide width need not be fixed and has no upper limit. Therefore, the resonator can be designed in any desirable shape.

The nonlinear effect will be enhanced in a range where the group velocity is low (dispersion is large). Therefore, the photonic device utilizing the nonlinear effect is allowed to have enhanced characteristics. Such a photonic device is able to perform laser oscillation or the like in combination with a resonator.

In the photonic crystal waveguide, the width 2L of the core in a direction perpendicular to the longitudinal direction of the waveguide may be in the range:

$$s\lambda/2 \leq 2L < (s+1)\lambda/2.$$

The photonic crystal waveguide may be a "perfect confinement single-mode waveguide" by satisfying this requirement. The waveguide width 2L is in the range where only a zero-order mode is present in the phase matching conditions regardless of the value of the propagation angle $\phi$. Such a "perfect confinement single-mode waveguide" provides effects as follows.

A steep bend is possible without changing the single-mode propagation, and additionally the waveguide width is small. Therefore, the device can be formed in a very compact size.

Perfect confinement occurs in the range where $a/\lambda_0$ is a small value of 0.5 or less, the effective refractive index ($n_{eff}$) is relatively small, and the dispersion and group velocity anomaly are large. Therefore, the waveguide is suitable for a functional waveguide whose characteristics such as dispersion and group velocity anomaly are preferably large. The nonlinear effect is enhanced in the region where the group velocity is slow (dispersion is large). This makes it possible to enhance the characteristics of the optical device utilizing the nonlinear effect, or to shorten the optical path length.

In the photonic crystal waveguide, a cladding layer for confinement, that is formed of a photonic crystal having periodicity in at least the one direction and formed of the same material as the core, may be provided on a surface of the core and the photonic bandgap formed by the cladding layer in the one direction confines the propagation mode in the one direction of the core, while using the mode close to the propagation mode as a radiation mode. The photonic bandgap of the cladding layer in the one direction confines the propagation mode in the one direction of the core, and the mode close to the propagation mode may be a radiation mode.

When the effective refractive index of light propagated through the waveguide in a direction perpendicular to the one direction (XZ-plane direction) becomes less than one, the leakage of electromagnetic waves in the one direction will not be able to be prevented even if the medium is air. However, according to this configuration, the photonic bandgap of the photonic crystal provided on the surface of the core is able to confine the electromagnetic waves in the one direction even if the effective refractive index in the direction perpendicular to the one direction (XZ-plane direction) is less than one. Accordingly, it is possible to realize a photonic crystal waveguide with low propagation loss at a low cost.

The photonic crystal waveguide may be provided with a phase modulating device at the end face where the periodic structure of the core is exposed, so that the phase modulating device couple the waves propagated through the core to the external plane wave. According to this configuration, it is possible to obtain only the propagated light belonging to a specific high-order band that exists on the Brillouin zone boundary. Further, viewing the optical path from the opposite perspective, the high-order band propagated light can be returned to the plane waves.

In the photonic crystal waveguide, when n denotes the refractive index of an external medium, and $\lambda_0$ denotes the wavelength of an external plane wave in a vacuum, one of the phase modulating devices uses the end facet of the core parallel to the one direction as an external coupling face. In the coupling face, a plane wave having an incident angle θ in the one direction that is represented by the formula, $n \cdot \sin \theta \cdot (a/\lambda_0) = 0.5$, couples to the end facet. This configuration makes it possible to couple waves propagated in the Z-direction through the core by the photonic band on the Brillouin zone boundary, to plane waves.

In the photonic crystal waveguide, when n denotes the refractive index of an external medium, and $\lambda_0$ denotes the wavelength of an external plane wave in a vacuum, one of the phase modulating devices uses the end facet of the core parallel to the one direction as an external coupling face. In the coupling face, two plane waves having the same phase and having incident angles ±θ in the one direction that is represented by the formula, $n \cdot \sin \theta \cdot (a/\lambda_0) = 0.5$, interfere with each other and couple to the end facet. In the equation above, n denotes the refractive index of the external medium and $\lambda_0$ denotes the wavelength of the external plane wave in vacuum. According to this configuration, when the two-directional plane waves may be intersected with each other to generate interference wave and the end facet is arranged thereon, incident light can be coupled to light propagated by a single photonic band on the Brillouin zone boundary.

In the photonic crystal waveguide, the phase modulating device may be a phase grating arranged close to, in contact with, or integrally with an incident surface, which is an end facet of the core parallel to the one direction, and has a period in the same direction as the photonic crystal forming the core that is twice the period of the photonic crystal, so that the phase grating couples the an external plane wave to waves propagated through the core. According to this configuration, it is possible to produce an electric field pattern which is similar to antinodes (peaks and valleys in an electric field) and nodes pattern observed in the "interference by plane waves" of +1 order diffraction and −1 order diffraction, when incident light of a plane wave is directed perpendicularly to the phase grating having a period twice as large as that of the photonic crystal forming the core in the same direction. When the photonic crystal is arranged so that the peaks and valleys of the electric field are present in high refractive index layers of the photonic crystal that is a periodic multilayer structure forming the core, and the nodes are present in its low refractive index layers, it is possible to obtain light propagated only by the first photonic band. When the photonic crystal is arranged such that the peaks and valleys of the electric field are present in its low refractive index layers, and the nodes are present in its high refractive index layers, it is possible to obtain light propagated only by the second photonic band.

In the photonic crystal waveguide, the phase modulating device may be a phase grating arranged close to, in contact with, or integrally with an end face of the core parallel to the one direction, and has the same period in the same direction as the photonic crystal forming the core; and the incident angle or exit angle θ of an external plane wave coupled to the waves propagated through the core by the phase grating satisfies the formula:

$n \cdot \sin \theta \cdot (a/\lambda_0) = 0.5$ where n denotes a refractive index of an external medium, and $\lambda_0$ denotes wavelength of the external plane wave in a vacuum. According to this configuration, it is possible to obtain light propagated by a specific band.

In the photonic crystal waveguide, the phase modulating device may be a phase grating arranged close to, in contact with, or integrally with an end face of the core parallel to the one direction, and has a period in the same direction as the photonic crystal forming the core that is twice the period of the photonic crystal; and the incident angle or exit angle θ of an external plane wave coupled to the waves propagated through the core by the phase grating satisfies the formula:

$n \cdot \sin \theta \cdot (a/\lambda_0) = 0.5$ where n denotes a refractive index of an external medium, and $\lambda_0$ denotes wavelength of the external plane wave in a vacuum. According to this configuration, it is possible to obtain light propagated in a specific photonic band. Further, it is possible to obtain light propagated in a specific photonic band even if the value of $a/\lambda_0$ is small.

In the photonic crystal waveguide, the phase modulating device may directly couple the external plane wave with a slant end face of the core that is inclined with respect to the one direction. According to this configuration, it is possible to obtain only propagated light belonging to a specific high-order band present on the Brillouin zone boundary.

Further, viewing the optical path from the opposite perspective, the high-order band propagated light can be returned to the plane waves.

In the photonic crystal waveguide, a prism or mirror may be provided in contact with or close to the slant end face of the core to change the incoming direction or outgoing direction of the external plane wave. According to this configuration, when the external plane wave is incident on the slant end face of the core, the orientation of the incident light can be changed by the prism or mirror.

In the photonic crystal waveguide, the incoming direction or outgoing direction of the external plane wave may be matched with the propagation direction in the core formed by the photonic crystal. According to this configuration, since the incoming direction or outgoing direction of the external plane wave is matched with the propagation direction in the core, the waveguide can be easily coupled to other waveguide devices or optical fibers.

In the photonic crystal waveguide, the incoming direction or outgoing direction of the external plane wave may be perpendicular to the propagation direction in the core formed by the photonic crystal. According to this configuration, the external plane wave can be incident from or emitted to the direction perpendicular to the top face of the substrate where the photonic crystal is formed.

In the photonic crystal waveguide, the prism may have a refractive index of 3 or more. According to this configuration, even if the frequency of the external plane wave is different from the design frequency, the deviation of the coupling position on the photonic band from the Brillouin zone boundary can be reduced, and the frequency range in which the propagation occurs at the boundary can be set large.

The photonic crystal waveguide may include a slant end face of the core that is inclined with respect to the one direction, and a diffraction grating that is arranged close to, in contact with, or integrally with the slant end face. According to this configuration, the frequency range in which propagation occurs on the Brillouin zone boundary can be set large. The diffraction grating is desirably designed to have a blaze shape or like so that diffraction of a specific order becomes intense.

In the photonic crystal waveguide, the incoming direction or outgoing direction of the external plane wave coupled to waves propagated through the core via the diffraction grating may be matched with the propagation direction in the core formed of the photonic crystal. According to this configuration, since the incoming direction or outgoing direction of the external plane wave is matched with the propagation direction in the core, the waveguide can easily be coupled to other waveguide devices or optical fibers.

In the photonic crystal waveguide, the width of the core in a direction perpendicular to the longitudinal direction of the waveguide may be varied in a tapered manner. According to this configuration, the waveguide can be a "tapered waveguide" by changing the width of the core (waveguide width 2L) such that the waveguide width in the incident part is set to such an amplitude as to establish a multimode propagation condition, and the waveguide width is then reduced in a tapered shape to convert the waveguide into a single-mode waveguide. When the width of the core satisfying the single-mode condition is thus enlarged in a tapered shape near the incident surface of the core, the external connection efficiency may be improved.

In contrast, according to the conventional technique described above (the defect waveguide utilizing a two-dimensional photonic crystal), it is required to increase the refractive index difference of the photonic crystal in order to produce full photonic bandgap in the XZ-direction. Therefore, a combination of, for example, a high refractive index material (e.g., Si with n=3.48) and air is selected. However, this significantly increases the refractive index of the defect part that forms the core of the waveguide, and hence the cross-section of the waveguide core becomes very small in order to satisfy the single-mode condition (typically less than 1×1 μm). According to the method described in Patent Publication 1, the cross-section of the waveguide is increased up to about 2×2 μm. However, the difference with an external single-mode optical fiber (core diameter of about 10 μm) is still so large that efficient coupling is difficult.

The present invention provides a photonic crystal waveguide including a core formed of a photonic crystal having periodicity in one direction and propagating electromagnetic waves in a direction perpendicular to the one direction. The electromagnetic waves are propagated by a propagation mode of a high-order photonic band present on the Brillouin zone center line in the photonic band structure of the core, and a side face of the core parallel to the one direction is in contact with a homogeneous medium clad with refractive index $n_s$, the side face satisfying the condition:

$$\lambda_0/n_s - \lambda > 0$$

where $\lambda_0$ denotes the wavelength of the electromagnetic waves in a vacuum, a denotes the cycle of the photonic crystal, and $\lambda$ denotes the cycle of waves propagated through the core in a direction perpendicular to the one direction.

In order to obtain light propagated by a specific high-order photonic band present on a center line of the Brillouin zone, phase-modulated waves having period a in the same direction may be incident on the photonic crystal forming the core.

According to the present invention, waves propagated in the Z-direction through the core in a specific high-order photonic band present on the center line of the Brillouin zone, that is, waves with a propagation angle φ of zero degrees can be confined at the side face of the core. This is a minimum requirement for realizing the confinement in a direction perpendicular to the one direction. As used herein, the term "high-order photonic band" means every photonic band other than the lowest order photonic band.

In the photonic crystal waveguide, a confinement cladding, that is formed of a homogeneous material or a photonic crystal having periodicity in at least the one direction, may be provided on a surface of the core perpendicular to the one direction for preventing electromagnetic waves propagated through the core from leaking out of the surface. According to this configuration, the confinement cladding makes it possible to prevent the electromagnetic waves propagated through the core from leaking outside through the surface of the core perpendicular to the one direction.

In the photonic crystal waveguide, the width 2L of the core in a direction perpendicular to the longitudinal direction of the waveguide may be in a range of:

$$s\lambda/2 \cos \phi_0 \leq 2L < (s+1)\lambda/2 \cos \phi_0$$

with the propagation angle φ of the electromagnetic waves satisfying $\lambda_0/n_s - \lambda/\cos\phi = 0$, and being in a range of $0 < \phi < 90°$, a value in this range is defined as a maximum value $\phi_0$ of propagation angles at which the electromagnetic waves are confined within the side face.

The phase shift amount is sπ when waves propagated through the core are reflected by the side face at the maximum value $\phi_0$ of the propagation angle, with s being in the range $0 \leq s \leq 1$. The photonic crystal waveguide can be an "imperfect confinement single-mode waveguide" by satisfying this condition. In other words, a single-mode condition can be established by setting the core width 2L sufficiently small when the maximum value of the propagation angle of the waves propagated through the core is $\phi_0$.

Such an "imperfect confinement single-mode waveguide" has advantages as described below.

Although leakage of light is possible depending on the propagation angle $\phi$, the single-mode condition can be established since the core width 2L is set sufficiently small.

If the propagation angle $\phi$ exceeds the maximum value $\phi_0$ of the propagation angle ($0<\phi_0<90°$), a steep bend is not possible since this will cause leakage of light. The waveguide structure desirably should be designed by carefully studying the minimum bend radius through electromagnetic waves simulations or the like.

When $a/\lambda_0$ is set small, the dispersion and group velocity anomaly are increased. Accordingly, the waveguide is suitable for a functional device.

In the photonic crystal waveguide, a confinement cladding layer, formed of a photonic crystal which has periodicity at least in the one direction and is formed of the same material as the core, may be provided on the surface of the core, and the photonic bandgap formed by the cladding layer confines the propagation mode in the one direction of the core, while using the mode close to the propagation mode as a radiation mode. If the effective refractive index of the light propagated in the waveguide in a direction perpendicular to the one direction is less than one, the leakage of electromagnetic waves in the one direction cannot be prevented even if air is used as the medium. According to this configuration, however, even if the effective refractive index in a direction perpendicular to the one direction is less than one, the photonic bandgap of the photonic crystal provided on the surface of the core is able to confine the electromagnetic waves in the one direction.

In the photonic crystal waveguide, a phase modulating device may be provided on an end face of the core where the periodic structure thereof is exposed, the phase modulating device couples the waves propagated through the core to an external plane wave. According to this configuration, it is possible to obtain only propagated light belonging to a specific high-order photonic band present on the center line of the Brillouin zone. Further, viewing the optical path from the opposite perspective, the high-order band propagated light can be returned to the plane wave.

In the photonic crystal waveguide, the phase modulating device may be designed such that an end face of the core parallel to the one direction is used as a coupling face to the outside, and, at this coupling face, two plane waves with the same phase and having an incidence angle $\pm\theta$ in the one direction that is represented by the equation:

$$n \cdot \sin \theta \cdot (a/\lambda_0) = 1.0$$

where n denotes the refractive index of the external medium and $\lambda_0$ denotes the wavelength of the external plane wave in vacuum, and are coupled to the end face by causing them to interfere with each other. According to this configuration, the majority of the incident light can be made high-order band propagated light by mutually intersecting plane waves in two directions to produce interference waves and arranging the end face there.

In the photonic crystal waveguide, the phase modulating device may be designed such that an end face of the core parallel to the one direction is used as a coupling face to the outside, and, at this coupling face, two plane waves with the same phase and having an incidence angle $\pm\theta$ in the one direction that is represented by the equation:

$$n \cdot \sin \theta \cdot (a/\lambda_0) = 1.0$$

where n denotes the refractive index of the external medium and $\lambda_0$ denotes the wavelength of the external plane wave in vacuum, and are coupled to the end face by causing them to interfere with each other and simultaneously with plane waves having $\theta$ of zero degrees. According to this configuration, the percentage of the high-order band propagated light can be increased further than in the case where plane waves in two directions are mutually intersected to produce interference waves and the end face is arranged there.

In the photonic crystal waveguide, the phase modulating device may be a phase grating arranged close to, in contact with, or integrally with an incident surface, which is an end face of the core parallel to the one direction, and has the same period in the same direction as the photonic crystal forming the core; and the phase grating may be designed to couple the external plane wave to waves propagated through the core. According to this configuration, it is possible to obtain specific high-order band propagated light.

In the photonic crystal waveguide, the width of the core in a direction perpendicular to the longitudinal direction of the waveguide may be varied in a tapered manner. According to this configuration, the waveguide can be made a "tapered waveguide" in which, for example, the width of the core (waveguide width 2L) is set, at the incident part thereof, to such a multitude as to establish a multimode propagation condition, and then is reduced in a tapered shape to covert the waveguide into a single-mode waveguide. Thus, the connection efficiency with the outside can be improved by increasing the width of the core satisfying the single-mode condition in a tapered shape near the incident surface of the core.

The present invention provides a homogeneous medium waveguide including a core which is formed of a homogeneous medium having refractive index $n_0$ and a limited thickness in one direction, and propagates electromagnetic waves in a direction perpendicular to the one direction. The electromagnetic waves are propagated by a first-order or higher-order propagation mode in the one direction of the core, and a side face of the core parallel to the one direction is in contact with a homogeneous medium cladding having refractive index $n_s$, the side face satisfying the condition $n_s<n_0$. According to this configuration, it is possible to confine waves propagated through the core in a direction perpendicular to the one direction, that is, waves having a propagation angle $\phi$ of zero degree at the side face. In other words, this is the minimal requirement for realizing confinement in a direction perpendicular to the one direction.

In the homogeneous medium waveguide, a confinement cladding, that is formed of a homogeneous material or a photonic crystal having periodicity at least in the one direction, may be provided on a surface of the core perpendicular to the one direction to prevent electromagnetic waves propagated through the core from leaking out of the surface.

If the effective refractive index in a direction perpendicular to the one direction of high-order mode propagated light is less than one, leakage of electromagnetic waves in the one direction cannot be prevented even if air is used as the medium. According to this configuration, however, the photonic bandgap of the photonic crystal provided on the surface of the core makes it possible to confine the electromagnetic waves in the one direction even if the effective refractive index in a direction perpendicular to the one direction is less than one. Thus, photonic crystal waveguide with small propagation loss can be realized at a low cost.

In the homogeneous medium waveguide, the width 2L of the core in a direction perpendicular to the longitudinal direction of the waveguide may be in a range of:

$$s\lambda_0 \cos \psi/2 \sin \phi_0 \leq 2L < (s+1)\lambda_0 \cos \psi/2 \sin \phi_0$$

with the propagation angle $\phi$ of the electromagnetic waves satisfying, $n_s - n_0\{\sin^2 \psi + \cos^2 \psi \cos^2 \phi\}^{0.5} = 0$, and being in a range $0 < \phi < 90°$, a value in this range is defined as a maximum value $\phi_0$ of propagation angles at which the electromagnetic waves are confined within the side face.

The phase shift amount is $s\pi$ when waves propagated through the core are reflected by the side face at the maximum value $\phi_0$ of the propagation angle, with s being in the range $0 \leq s \leq 1$. Such an "imperfect confinement single-mode waveguide" can provide effects as described below.

Although this is a condition in which leakage of light may occur depending on a propagation angle $\phi$, a single-mode condition is established since the width 2L is set sufficiently small.

Leakage of light occurs if the propagation angle $\phi$ exceeds $\phi_0 (0 < \phi_0 < 90°)$. Therefore, a steep bend is enabled in the range where the propagation angle $\phi$ does not exceed its maximum value $\phi_0$.

The homogeneous medium waveguide may be designed such that, when the phase shift amount is $s\pi$ when waves propagated through the core in a direction perpendicular to the one direction are perpendicularly incident on the side face and reflected thereby, with s being in the range $0 \leq s \leq 1$, these conditions are satisfied:

$$n_s - n_0 \sin \psi < 0 \text{ and}$$

$s\lambda_0 \cos \psi/2 \leq 2L$. By satisfying the requirements, the homogeneous medium waveguide can be a "perfect confinement multimode waveguide" and effects as described below can be obtained.

Light can be confined regardless of the propagation angle $\phi$. Thus, the waveguide is suitable for a resonator or the like. The waveguide width need not be fixed and has no upper limit. Therefore, the resonator can be formed in any desirable shape.

In the homogeneous medium waveguide, the width 2L of the core may be in the range $s\lambda_0 \cos \psi/2 \leq 2L < (s+1)\lambda_0 \cos \psi/2$. According to this configuration, the waveguide width 2L is in the range where only the zero-order mode in the phase matching conditions is present, regardless of the value of the propagation angle $\phi$ in a direction perpendicular to the one direction (XZ-plane direction). Such "perfect confinement single-mode waveguide" provides the effects as described below.

Since a steep bend is possible without changing the single-mode propagation, and the waveguide width is small, the device can be formed in an extremely small size.

In the homogeneous medium waveguide, an external plane wave having an incident angle $\theta$ in the one direction that is represented by the formula:

$$\sin \theta = (n_0/n_m) \sin \psi$$

where $n_0$ denotes a refractive index of the core, $n_m$ denotes a refractive index of the incident light side, and $\psi$ denotes a propagation angle of high-order mode light propagated through the core, may be coupled to an end face of the core parallel to the one direction, so that the external plane wave is used as incident light or outgoing light. According to this configuration, the incident light can be coupled to specific high-order mode propagated light (propagation angle $\psi$).

In the homogeneous medium waveguide, external plane wave having an incident angle that is coupled to the propagation angle $\psi$ of the high-order mode light in the one direction propagated through the core may be coupled to an slant end face of the core that is inclined with respect to the one direction, so that the external plane wave is used as incident light or outgoing light. According to this configuration, the incident light can be coupled to specific high-order mode propagated light having a propagation angle $\psi$ of a large value.

In the homogeneous medium waveguide, a prism or mirror may be provided in contact with or close to the slant end face of the core that is inclined with respect to the one direction to couple the high-order mode light in the one direction propagated through the core to an external plane wave, so that the external plane wave is used as incident light or outgoing light. According to this configuration, external plane wave can be incident on the slant end face the core while changing the orientation of the incident light by means of the prism or mirror.

In the homogeneous medium waveguide, the incoming direction or outgoing direction of the external plane wave may be matched with the propagation direction in the waveguide. According to this configuration, since the incoming direction or outgoing direction of the external plane wave is matched with the propagation direction in the core, coupling to another waveguide device or optical fiber becomes easy.

In the homogeneous medium waveguide, the incoming direction or outgoing direction of the external plane wave may be perpendicular to the propagation direction in the waveguide. According to this configuration, an external plane wave can be input or output in a direction perpendicular to the upper surface of the substrate where the homogeneous medium waveguide is formed.

In the homogeneous medium waveguide, the prism may have a refractive index of 3 or more. According to this configuration, even if the frequency of an external plane wave is different far from the design frequency, the deviation of the position on the coupling band from the Brillouin zone boundary can be minimized, and hence the frequency range in which propagation on the boundary occurs can be set broad.

In the homogeneous medium waveguide, a diffraction grating may be provided close to, in contact with, or integrally with the slant end face of the core that is inclined with respect to the one direction. According to this configuration, the frequency range in which propagation on the Brillouin zone boundary occurs can be set broad. The diffraction grating is desirably formed in a blaze shape such that a specific diffraction order is enhanced.

In the homogeneous medium waveguide, the incoming direction or outgoing direction of the external plane wave may be matched with the propagation direction in the waveguide. According to this configuration, since the incoming direction or outgoing direction of an external plane wave is matched with the propagation direction in the core, coupling to the waveguide device or optical fiber becomes easy.

In the homogeneous medium waveguide, a phase grating may be provided close to, in contact with, or integrally with an end face of the core that is parallel to the one direction, and an external plane wave and diffracted light by the phase grating are coupled with high-order mode light in the one direction propagated through the core, so that the plane waves are used as incident light or outgoing light. According to this configuration, the incident light perpendicularly incident on the end face can be coupled to specific high-order mode propagated light.

In the homogeneous medium waveguide, the width of the core in a direction perpendicular to the longitudinal direction of the waveguide may be varied in a tapered manner. According to this configuration, the width of the core (waveguide width 2L) may be designed as a "tapered waveguide", for example, by setting the width to a magnitude to establish a multimode propagation mode at the incident part, and reducing the same midway in a tapered manner to convert into the single-mode waveguide. The external connection efficiency can be improved by enlarging the width of the core satisfying the single-mode condition in a tapered manner near the incident surface.

The present invention provides an optical device used as a directional coupler, including two waveguides which are formed to be bent so as to be close to each other in a coupling region having a predetermined coupling length. Each of the two waveguides is formed by either the photonic crystal waveguide or the homogeneous medium waveguide. According to this configuration, effects as described below can be obtained.

Each of the two waveguides of the directional coupler is formed by either the photonic crystal waveguide or the homogeneous medium waveguide. Therefore, a steep bend is possible in the waveguides, increasing the degree of freedom in arranging the waveguides on the substrate. This makes it possible to reduce the size of the directional coupler itself and makes it easy to integrate the same.

A steep bend is possible at the bent portion upstream and downstream of the coupling region of the waveguides. Therefore, the length of the entire waveguide can be made substantially shorter than that of the conventional technique as described in Patent Publication 2.

It is possible to realize a directional coupler with small propagation loss at a low cost by producing the waveguides to satisfy the perfect confinement condition described above.

It is possible to efficiently couple to an external single-mode optical fiber by producing the waveguides to satisfy the single-mode condition as described above.

Propagated light with large dispersion or with a slow group velocity can be obtained in the waveguides. Therefore, the coupling length of the coupling region of the two waveguides can be far shorter than that of the waveguide of the conventional directional coupler. Thus, the directional coupler can be miniaturized and the function thereof can be improved.

When the waveguides are formed by a photonic crystal waveguide, the waveguides each have a basic structure of a one-dimensional photonic crystal having a simple structure of a periodic multilayer film, and the refractive index difference of the photonic crystal need not be large. Thus, the directional coupler can be manufactured at a low cost.

The present invention provides an optical device, which is used as a Mach Zehnder optical switch, and includes a single linear waveguide, two waveguides branched from the waveguide, and a single linear waveguide formed by merging the two waveguides. Each of the waveguides is formed by either the photonic crystal waveguide or the homogeneous medium waveguide. This configuration can provide effects as described below.

The waveguides of a Mach Zehnder optical switch are each formed by the photonic crystal waveguide or the homogeneous medium waveguide. Therefore, steep bend is possible in the waveguides, which increases the degree of freedom in arranging the waveguides on the substrate. Accordingly, in comparison with an optical switch having a two-dimensional photonic crystal as described in Patent Publication 3, the optical switch itself can be miniaturized, and can be easily integrated with other devices on the substrate to produce an optical module.

In an optical switch as described in Patent Publication 3, confinement in the plane direction (XZ-direction) is carried out by the PBG. By this method, however, confinement in the vertical direction (Y-direction) is difficult, and propagation loss becomes large. As the defective waveguide therefore, a so-called "air-bridge structure" or the like is known, but poses a problem that both the structure and the process are complicated and the production cost is increased. Therefore, when a Mach Zehnder optical switch is produced with such conventional defect waveguide, the propagation loss will become large and the production cost will be increased. In contrast, by producing the photonic crystal waveguides or homogeneous medium waveguides forming the waveguides to satisfy the above-described perfect confinement condition, a directional coupler with small propagation loss can be realized at a low cost.

By producing the photonic crystal waveguide or the homogeneous medium waveguide forming each of the waveguides to satisfy the above-mentioned single-mode condition, efficient coupling to an external single-mode optical fiber is made possible. Thus, an optical system using a single-mode optical fiber can be realized.

When the waveguides are each formed by a photonic crystal waveguide having a basic structure of a one-dimensional photonic crystal of a periodic laminated structure, the refractive index difference of the photonic crystal needs not to be large. Therefore, the Mach Zehnder optical switch can be manufactured at a low cost.

The present invention provides an optical device which is used as an optical delay line. The delay line includes a linear waveguide and a single waveguide with a delay portion. The waveguide and the delay portion are formed by the photonic crystal waveguide or the homogeneous medium waveguide. This configuration can provide effects as described below.

Either a photonic crystal waveguide or homogeneous medium waveguide capable of strong confinement is used for the single waveguide including the waveguide and the delay portion. This makes it possible to design the waveguide in any desirable shape. Therefore, the bending loss can be improved by providing the waveguide with a small radius of curvature instead of a steep bend. This makes it possible to design an optical delay line which realizes the miniaturization and the loss reduction at the same time.

An optical delay line can be provided at a low cost by using a photonic crystal waveguide or homogeneous medium waveguide formed of a one-dimensional photonic crystal.

A steep bend is possible in the delay portion, which increases the degree of freedom in arranging the optical delay line on the substrate. This makes it possible to miniaturize the optical delay line itself, and makes it easy to integrate the same with other devices on the substrate to produce an optical module.

By producing the photonic crystal waveguide or homogeneous medium waveguide forming the single waveguide to satisfy the above-described single-mode condition, it is possible to efficiently couple the waveguide to an external single-mode optical fiber, and an optical system using a single-mode optical fiber can be realized.

When the single waveguide is formed by a photonic crystal waveguide, the waveguide has the basic structure of a one-dimensional photonic crystal having a simple structure of a periodic multilayer film, and the refractive index difference of the photonic crystal need not be large. Thus, the optical delay line can be manufactured at a low cost.

A delay portion with a long path can be arranged in a small area on the substrate. Thus, further miniaturization and integration can be realized.

The present invention provides a dispersion control device including a waveguide. The waveguide is formed by the photonic crystal waveguide or the homogeneous medium waveguide accordingly, and propagated light having a large dispersion is used as propagated light through the waveguide. According to this configuration, the use of propagated light with large dispersion makes it possible to provide opposite dispersion to a signal that has been dispersed in the optical communication system, and to compensate the wavelength dispersion caused by a long-distance optical fiber.

The present invention provides an optical device including a waveguide. The waveguide is formed by the photonic crystal waveguide or the homogeneous medium waveguide. The core of the waveguide contains a material having nonlinear characteristics. Two electrodes are provided on the opposite surfaces in the one direction of the waveguide. According to this configuration, it is possible to control the nonlinear effect of the nonlinear material contained in the core of the waveguide that is formed by the photonic crystal waveguide or the homogeneous medium waveguide, by controlling the voltage or electric current applied to the electrodes. Thus, the nonlinear effect by the group velocity anomaly can be made variable, and a nonlinear device having a large nonlinear effect can be obtained.

The present invention provides an optical device including a waveguide. The waveguide is formed by the photonic crystal waveguide or the homogeneous medium waveguide. The core of the waveguide contains a material having nonlinear characteristics. Two electrodes are provided on the opposite surfaces in the one direction of the waveguide. The optical device further includes a modulator for changing the voltage or electric current applied to the two electrodes. According to this configuration, signal light can be emitting after modulating the phase, amplitude, polarization plane, frequency and the like of the incident light, by using the modulator to change the voltage or electric current applied to the two electrodes provided on the opposite surfaces in the one direction of the waveguide.

The present invention provides an optical device including either the photonic crystal waveguide or the homogeneous medium waveguide. The optical device generates refracted light from the core by making the confinement of the cladding imperfect. According to this configuration, part of the propagated light is refracted to the air side or the substrate side, by making the confinement of the cladding imperfect. The direction of the refracted light is fixed with respect to the wavelength in vacuum of the external plane wave, and hence is a light flux with excellent directivity. By the use of the mode on the Brillouin zone boundary, the effective refractive index is largely changed in response to the change in frequency of the external plane wave, and thus the optical device can be used as a high-resolution demultiplexing device.

The present invention provides an optical device that can be used as a symmetric Mach Zehnder optical switch. The optical device includes a single linear waveguide, two waveguides branched from the waveguide, two linear waveguide branched from the merging portion of these two waveguides, and a waveguide for control light. Each of the waveguides is formed by either the photonic crystal waveguide or the homogeneous medium waveguide, and each of the two waveguides is provided with a non-linear portion containing a component having nonlinear optical activity. According to this configuration, advantages as described below are obtained.

A symmetric Mach Zehnder optical switch, which is similar to the conventional one in Non-Patent Publication 1 using a defect waveguide of two-dimensional photonic crystal, can be realized at a low cost by using one-dimensional photonic crystal waveguide or homogeneous medium waveguide. Since the waveguides (371 to 377) are each formed by a photonic crystal waveguide or homogeneous medium waveguide, a steep bend is possible in the waveguides, increasing the degree of freedom in arranging the waveguides on the substrate. This makes it possible to reduce the size of the optical switch itself further than that of Non-Patent Publication 1 above, and makes it easy to integrate the optical switch with other devices on the substrate to produce an optical module.

In an optical switch using a defect waveguide of two-dimensional photonic crystal as described in Non-Patent Publication 1, confinement in the plane direction (XZ-direction) is carried out by the PBG. However, in this case, confinement in the vertical direction (Y-direction) is more difficult, and the propagation loss is increased. As the defect waveguide, a so-called "air-bridge structure" or the like is known, but poses a problem in that both the structure and the process are complicated and production cost is increased. In contrast, a directional coupler with small propagation loss can be realized at a low cost by producing each photonic crystal waveguide forming the waveguides so as to satisfy the above-described perfect confinement condition.

By producing each photonic crystal waveguide forming the waveguides so as to satisfy the above-described single-mode condition, it is possible to efficiently couple the waveguide to an external single-mode optical fiber. In contrast, in the case of the conventional defect waveguide of two-dimensional photonic crystal as described above, the refractive index difference of the photonic crystal need be increased in order to render the PBG in the XZ-direction perfect. Thus, a combination of a high refractive index material (e.g., Si with n=3.48) and air is selected. In this case, the refractive index of the defect portion forming the core of the waveguide becomes very large, and hence the cross-section of the waveguide core need be very small (typically, 1×1 µm or less) in order to satisfy the single-mode condition. According to the method of Patent Publication 1, the cross-section of the waveguide is increased to about 2×2 µm, but this causes a large difference with an single-mode fiber (having a core diameter φ of about 10 µm), and makes efficient coupling difficult.

When the waveguides each are formed by a photonic crystal waveguide, the waveguide has a basic structure of a one-dimensional photonic crystal having a simple structure of a periodic multilayer film, and the refractive index difference of the photonic crystal need not be large. Thus, a symmetric Mach Zehnder optical switch including the waveguides can be manufactured at a low cost.

The present invention provides an optical device used as a point-defect resonator (wavelength filter). The optical device includes a linear waveguide, and at least one point defect provided in the vicinity of the linear waveguide. The linear waveguide is formed by either the photonic crystal waveguide or the homogeneous medium waveguide. According to this configuration, advantages as described below are obtained.

By providing a point defect in the vicinity of the linear waveguide formed by the photonic crystal waveguide or the homogeneous medium waveguide, propagated light of a specific frequency can be obtained by causing the point defect to capture the same by means of resonance. By reversing the optical path, it is also possible to introduce a wavelength signal irradiated to the point defect into the waveguide side. Accordingly, the photonic crystal waveguide can be used to produce a wavelength selection filter and an optical switch.

The present invention provides an optical device used as a point-defect resonator. The optical device includes a single linear waveguide, two waveguides branched from the waveguide, two linear waveguides branched from the merging portion of these two waveguides, and at least one point defect provided in the vicinity of at least one of the two waveguides. Each of the waveguides is formed by either the photonic crystal waveguide or the homogeneous medium waveguide. According to this configuration, advantages as described below can be obtained.

By changing the dielectric constant of the point defect portion provided in the vicinity of at least one of the two waveguide (452 and 453) formed by the photonic crystal waveguide described above with an electrical or optical means, the resonance frequency with the waveguide is varied to alter the phase of the propagated light in the waveguide, and thus the output position (port) of the emitted light can be switched. Accordingly, the optical device may be used for switching by generating a phase difference by means of resonance with waves propagated through the waveguide.

It is possible to freely select a distance between the waveguide and the point defect, and a size and shape of the point defect. Therefore, the designing and manufacturing are easy. In contrast, in the case of the defect waveguide using two-dimensional photonic crystal as described in Patent Publications 4 and 5, the above-mentioned condition is limited to an integral multiple of the two-dimensional period. Therefore, for producing a demultiplexing filter, it is required to take a measure, for example, to change the two-dimensional period in a stepped manner.

The present invention provides an optical waveguide device. The waveguide is formed by either the photonic crystal waveguide or the homogeneous medium waveguide. The core of the waveguide contains a light-emitting material, and the light-emitting material is an optical amplifying device excited by pump light. According to this configuration, advantages as described below can be obtained.

By irradiating the waveguide, formed by either a photonic crystal waveguide or a homogeneous medium waveguide and having a core containing a light-emitting material, with pump light to excite the light-emitting material, signal light can be obtained by amplifying the incident signal light. The light-emitting material may be, for example, erbium or bismuth.

By producing the waveguide so as to satisfy the perfect confinement condition described above, it is possible to efficiently couple the same to an external single-mode optical fiber.

The present invention provides an optical device having a waveguide. The waveguide is formed by either the photonic crystal waveguide or the homogeneous medium waveguide. The core of the waveguide contains a material having nonlinear characteristics. Two electrodes are provided on the opposite surface in the one direction of the waveguide. The optical device is subjected to processing in which the device is placed in a high-temperature state, and then returned to a normal temperature with a DC voltage being applied to the two electrodes. According to this configuration, the process (poling) has an effect of enhancing the characteristics of the nonlinear material contained in the core of the waveguide formed by either the photonic crystal waveguide or the homogeneous medium waveguide. When incident light such as laser light is incident on the poled waveguide of the waveguide device with electrodes, emitted light of, for example, the strong second higher harmonic waves (SHG) or third higher harmonic waves (THG) can be generated. Accordingly, the optical device is able to convert the wavelength of laser light.

The present invention provides an optical device having a waveguide. The waveguide is formed by either the photonic crystal waveguide or the homogeneous medium waveguide. The core of the waveguide contains a light-emitting material. Two electrodes, at least one of which is transparent, are provided on the opposite surfaces in the one direction of the waveguide. According to this configuration, light obtained by amplifying incident light by the light-emitting material can be emitted upwards via the transparent one of the two electrodes, by applying voltage or electric current to the electrodes with the incident light being incident on the photonic crystal waveguide. Accordingly, the waveguide device with electrodes can be designed as a light-emitting device.

BRIEF DESCRIPTION OF THE DRAWINGS

FIGS. 74($a$) to ($f$) are schematic diagrams illustrating examples of configuration in which a prism and a mirror are combined with an slant end face;

FIG. 75($a$) is a schematic diagram showing an example of a configuration in which a high refractive index prism is combined with an slant end face, and FIG. 75($b$) is an explanatory diagram thereof in terms of bands;

FIGS. 77($a$) to ($h$) are schematic diagrams illustrating various examples of a configuration in which a diffraction grating is combined with an slant end face;

FIG. 78($a$) is a schematic diagram illustrating principles of an optical device according to a twenty-first embodiment of the present invention, and FIG. 78($b$) is an explanatory diagram showing the position of the coupling band;

FIG. 79($a$) is a perspective view illustrating an optical device as sample 1 according to the twenty-first embodiment, and FIG. 79($b$) is a side view thereof;

FIG. 81($a$) is a perspective view illustrating an optical device as sample 2 according to the twenty-first embodiment, and FIG. 81($b$) is a side view thereof;

DETAILED DESCRIPTION OF THE PREFERRED EMBODIMENTS

A one-dimensional photonic crystal used in embodiments of the present invention will be described before describing a photonic crystal waveguide, a homogeneous medium waveguide, and an optical device utilizing such a waveguide according to the embodiments of the invention.

One-Dimensional Photonic Crystal

Figure 1:
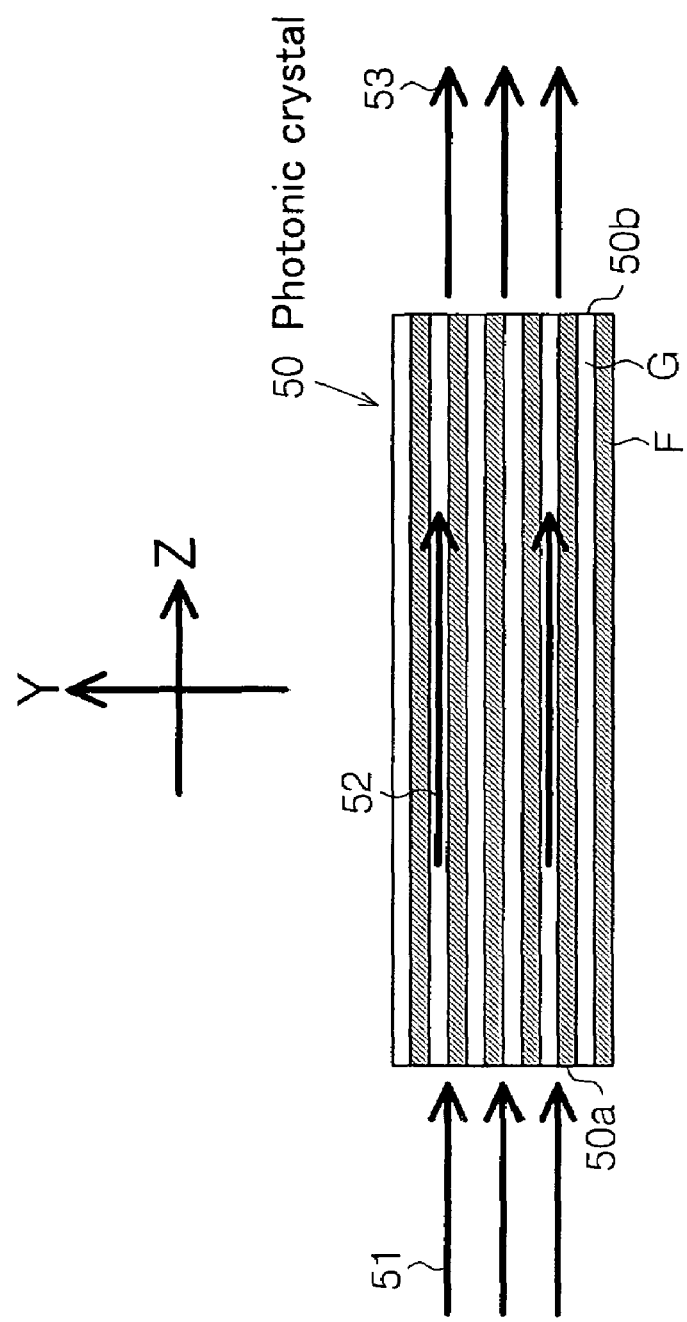
FIG. 1 is a schematic diagram illustrating propagation of light through a photonic crystal.

FIG. 1 schematically illustrates propagation of electromagnetic waves in a direction with no periodicity (Z-direction) in a one-dimensional photonic crystal 50 having periodicity only in one direction (Y-direction).

The one-dimensional photonic crystal 50 is, for example, a periodic multilayer film with period a of $(t_A + t_B)$ in which a medium A with a thickness $t_A$ (refractive index $n_A$) and a medium B with a thickness $t_B$ (refractive index $n_B$) are laminated alternately.

Referring to FIG. 1, when incident light 51, which are plane waves (electromagnetic waves) with a wavelength in vacuum of $\lambda_0$, is incident on an end face 50$a$ of the one-dimensional photonic crystal 50, the incident light 51 is propagated through the photonic crystal 50 as propagated light 52 and emitted from the other end face 50b as emitted light 53. It can be known how the incident light 51 is propagated through the one-dimensional photonic crystal 50 by calculating a photonic band to prepare a band diagram. In the one-dimensional photonic crystal 50, the end faces 50a and 50b, both of which define "coupling faces" to the outside, are end faces where the periodically is exposed and are parallel to the Y-direction as the periodic direction (the one direction). These end faces 50a and 50b define an incidence surface and output surface, respectively.

A method for band calculation is described in detail, for example, in "Photonic Crystal", Princeton University Press (1955) and "Physical Review B", Vol. 44, No. 16, p. 8565, 1991.

The band calculation is performed on the assumption that the one-dimensional photonic crystal 50 shown in FIG. 1 has a periodic structure infinitely extending in the Y-direction (lamination direction), and extends in the X-direction perpendicular to the plane of the drawing in the Z-direction (direction parallel to the surfaces of the layers in the periodic multilayer film).

Figure 2:
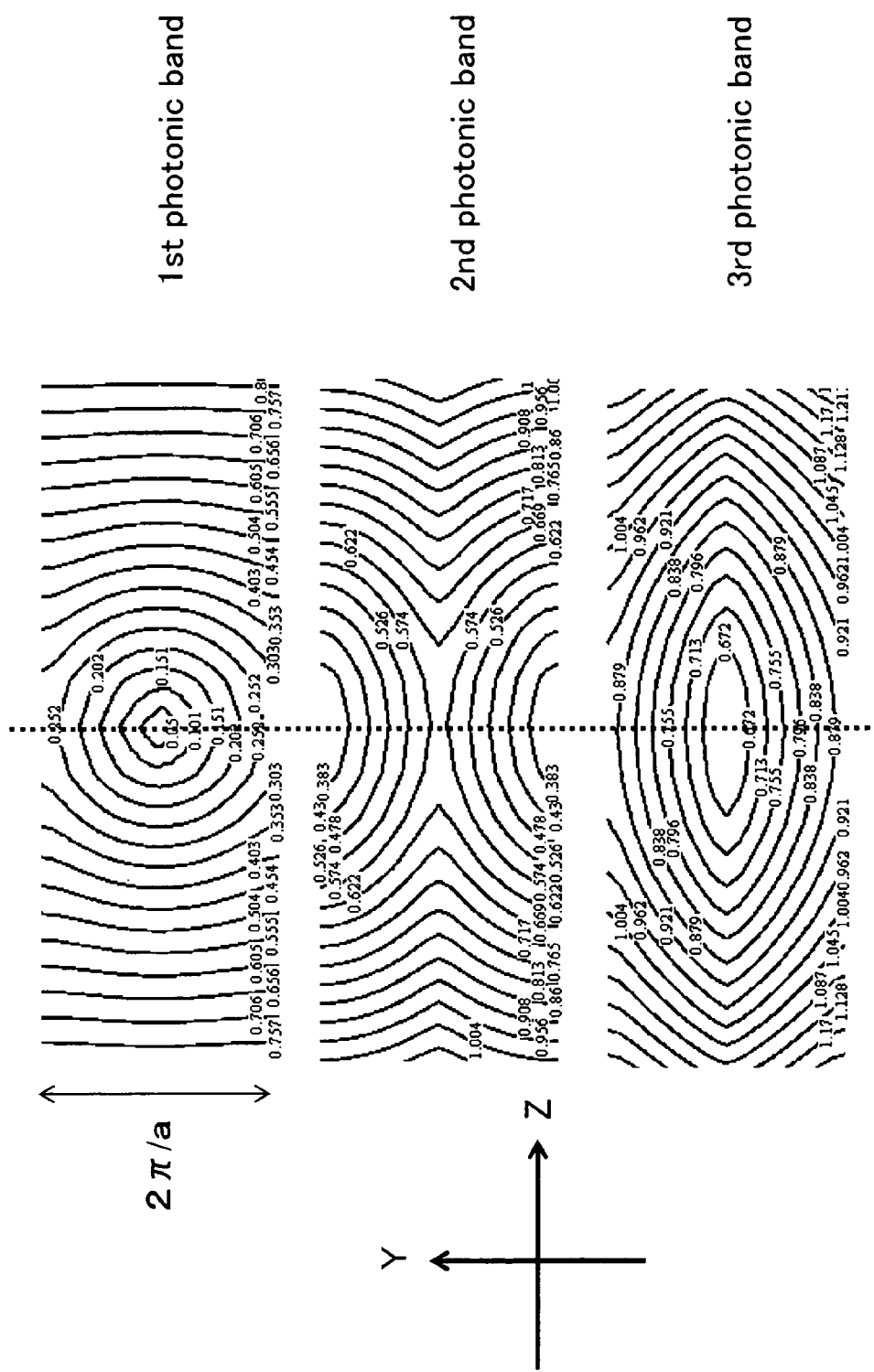
FIG. 2 is a diagram illustrating an example of a photonic band structure of a photonic crystal.

FIG. 2 illustrates results of band calculation in the Y-direction and Z-direction for a multilayer structure (one-dimensional photonic crystal 50) with period a in which layers with a refractive index $n_F$ of 2.1011 ($t_F$=0.3a) and layers with a refractive index $n_G$ of 1.4578 ($t_G$=0.7a) are laminated alternately, in terms of the first photonic band, second photonic band, and third photonic band of TE polarization in the range of the first Brillouin zone. In the band diagrams of FIG. 2, the points at which a normalized frequency $\omega a/2\pi c$ assumes the same value are connected to form a contour line. The subscripts in the diagrams refer to respective values of $\omega a/2\pi c$, where $\omega$ denotes the angular frequency of the incident light 51, a denotes the period of the multilayer structure (one-dimensional photonic crystal 50), and c denotes the velocity of light in vacuum.

The normalized frequency $\omega a/2\pi c$ can be represented also as $a/\lambda_0$, using the wavelength in vacuum $\lambda_0$ of the incident light. Therefore, in the following description, the standardized frequency will be simply represented as $a/\lambda_0$.

The Brillouin zone shown in FIG. 2 has a width $2\pi/a$ in the Y-direction. Since the photonic crystal 50 has no periodicity in the Z-direction, there is no boundary of the Brillouin zone in the lateral directions including the X-directions (direction perpendicular to the plane of the drawing) and the Z-direction in FIG. 1, and the Brillouin zone extend infinitely in these directions. The TE polarization means polarization in which the electric field is oriented in the X-direction. Band diagrams (not shown) of the TM polarization (polarization in which the magnetic field is oriented in the X-direction) will be similar to those of the TE polarization with a slight difference in shape.

Propagated light 52 in the photonic crystal 50 will now be considered in terms of incident light 51, which is plane waves incident on the one end face 50a of the one-dimensional photonic crystal 50 shown in FIG. 1.

Figure 3:
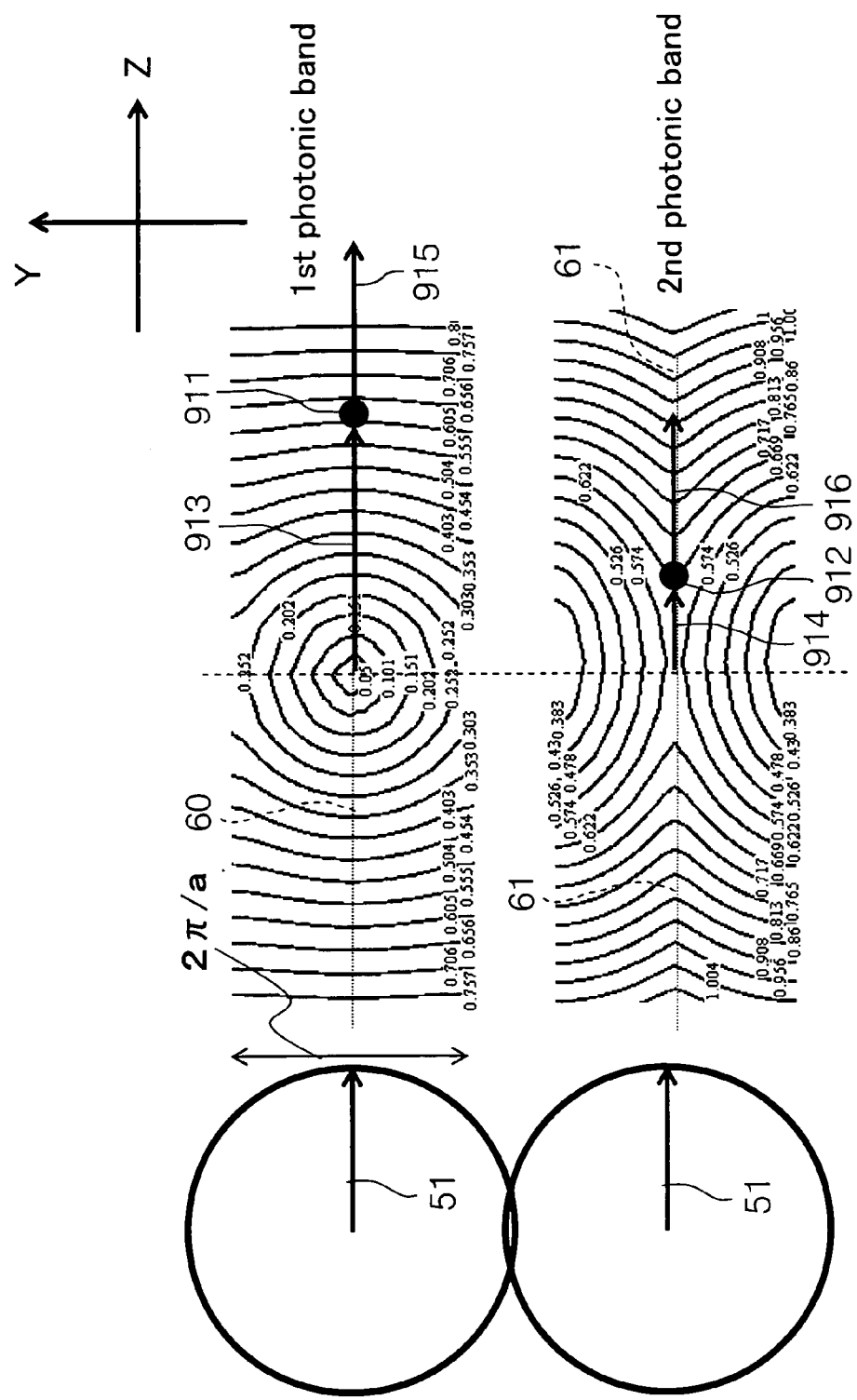
FIG. 3 is an explanatory diagram illustrating coupling of incident light, which is perpendicularly incident on an end face of a photonic crystal, with the photonic crystal in terms of photonic bands.

FIG. 3 schematically illustrates propagation when plane waves with a specific normalized frequency $a/\lambda_0$ (TE polarization) are introduced from the one end face 50a of the one-dimensional photonic crystal 50 perpendicularly on the end face. This means that FIG. 2 illustrates the coupling of the incident light (plane waves) 51 perpendicularly incident on the one end face 50a of the one-dimensional photonic crystal 50 to the photonic crystal 50 in photonic bands.

When the refractive index of an incidence-side homogeneous material is represented by n, the band diagram of the homogeneous material will be a circle with a radius of $n \cdot (a/\lambda_0)$ (the unit is $2\pi/a$). Therefore, the coupling band on the side of the photonic crystal 50 can be found by drawing the band diagram. In FIG. 3, corresponding points 911 and 912 are present on the first band and the second band, respectively. This means that waves corresponding to the first band and the second band are propagated in the photonic crystal 50. Wave vectors of the respective propagated light are indicated by reference numerals 913 and 914. Traveling directions of wave energy in the photonic crystal 50 are represented by normal directions 915 and 916 of the contour line, and propagated light by either band travels in the Z-direction.

Figure 4:
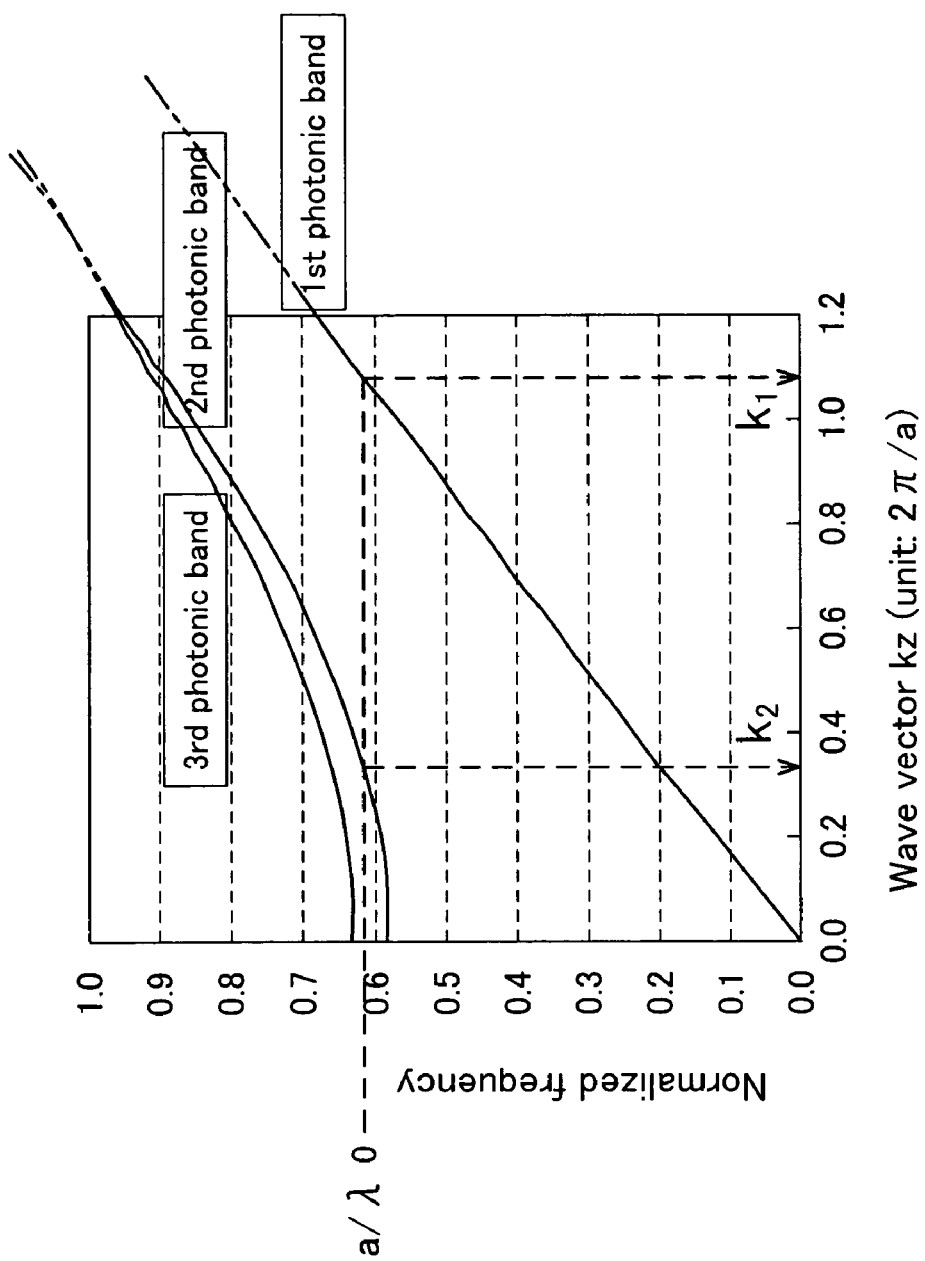
FIG. 4 is a diagram illustrating coupling of incident light, which is perpendicularly incident on an end face of a photonic crystal, to the photonic crystal in terms of only the Z-direction of the Brillouin zone.

FIG. 4 is a diagram illustrating the coupling shown in FIG. 3, while limiting the band diagram only to the Z-direction.

As shown in FIG. 4, when the wavelength in vacuum of the incident light 51 shown in FIG. 1 is represented by $\lambda_0$, there are wave vectors $k_1$ and $k_2$ in the photonic crystal 50, corresponding to the first band and the second band. In other words, the incident light (plane waves) 51 with a normalized frequency $a/\lambda_0$ is propagated through the photonic crystal 50 in the Z-direction, as two waves with $\lambda_1 = 2\pi/k_1$ and $\lambda_2 = 2\pi/k_2$, respectively.

A value obtained by dividing the wavelength in vacuum $\lambda_0$ by a corresponding wavelength ($\lambda_1$, $\lambda_2$ or the like) in the photonic crystal 50 is defined as "effective refractive index". As apparent from FIG. 4, the normalized frequency $a/\lambda_0$ of the first band is substantially proportional to the wave vector kz. Therefore, in the first band, the effective refractive index will not be substantially changed according to the change in wavelength $\lambda_0$ of the incident light 51. However, in higher-order bands than the first band, the effective refractive index is changed substantially according to the change in $\lambda_0$. As is obvious from FIG. 4, the effective refractive index can become less than one.

It is well known that a value obtained by differentiating a band curve as shown in FIG. 4 by kz (tangential gradient) is equal to the group velocity of propagated light. In the case of FIG. 4, in the second or higher-order bands, the tangential gradient drops rapidly as the value of kz becomes smaller, and becomes zero when kz is zero. This group velocity anomaly is peculiar to photonic crystals. The group velocity anomaly in the photonic crystal is extremely large, and moreover exhibits opposite characteristics to the case of dispersion of an ordinary homogeneous material (i.e., the group velocity becomes slower as the wavelength of incident light is increased). Accordingly, it is possible to utilize the group velocity anomaly of the high-order band propagated light to produce an optical device such as an optical delay device or dispersion control device.

As described above, an optical device utilizing propagated light by high-order bands (high-order band propagated light) is very useful. However, when light is propagated by a higher-order band than the first band at the normalized frequency $a/\lambda_0$, the first band propagated light (light propagated by the first band) is also always propagated. This is obvious from the fact that in FIG. 4 the straight curved lines indicating the respective bands extend further to the right hand side of the drawing.

The first band propagated light has almost none of the effects, such as the above-mentioned "very large wavelength dispersion" (meaning that the change in wavelength ($2\pi/kz$) of the propagated light according to the change in frequency becomes large), and "group velocity anomaly". Therefore, when both the high-order band propagated light and the first band propagated light are present, the first band propagated light is nothing but a loss when utilizing the high-order band propagated light. The first band propagated light not only deteriorates the use efficiency of incident light significantly but also deteriorates the S/N ratio of the optical device as stray light.

However, research by the present inventors has revealed that it is possible to propagate only the high-order band propagated light through the one-dimensional photonic crystal that is a periodic multilayer film by applying phase modulation to the incident light. Also, it has been found that the high-order band propagated light traveling in the Z-direction through the photonic crystal can be obtained also by utilizing a band on the Brillouin zone boundary.

Figure 5:
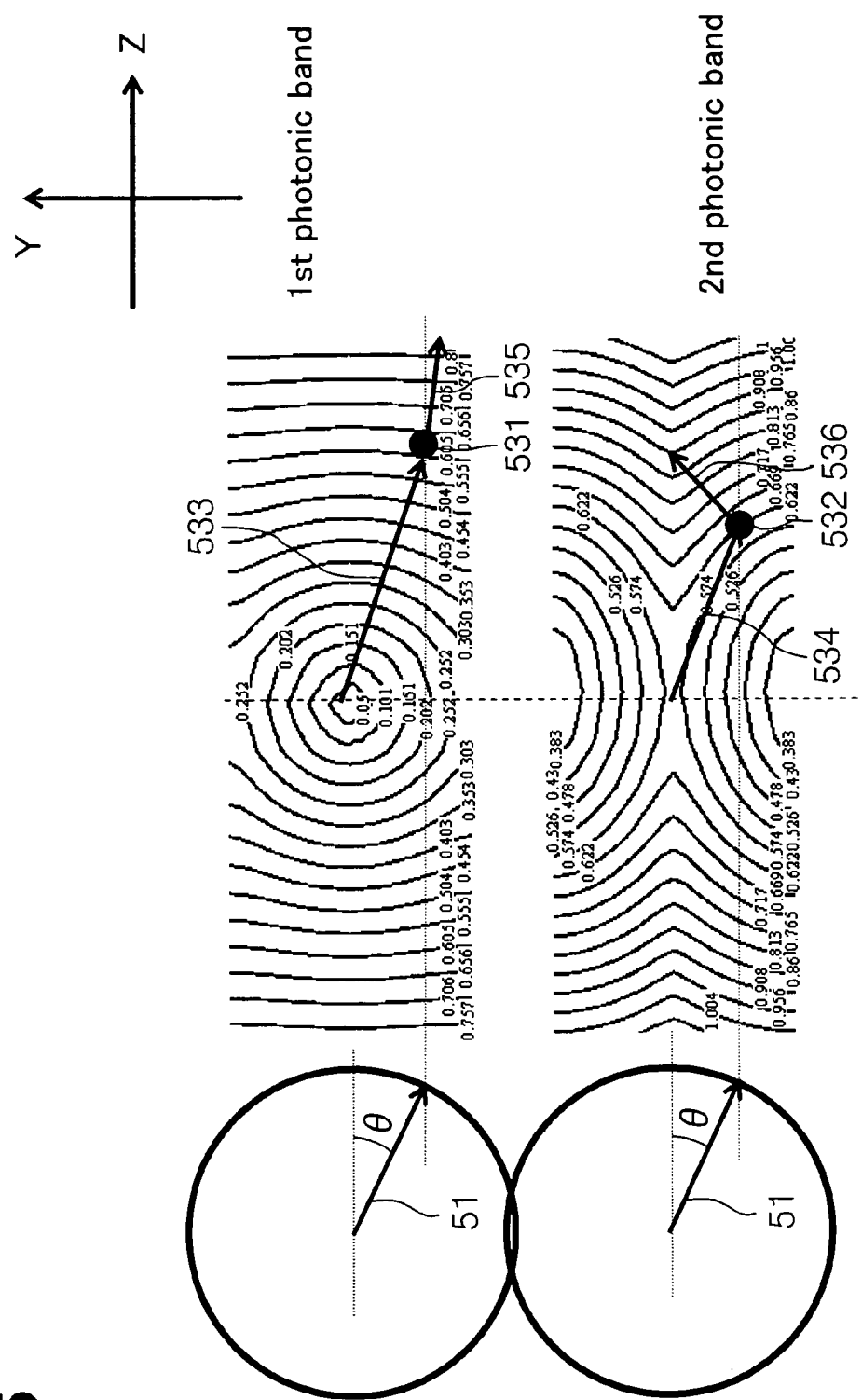
FIG. 5 is an explanatory diagram illustrating coupling of incident light, which is obliquely incident on an end face of a photonic crystal, to the photonic crystal in terms of photonic bands.
Figure 6:
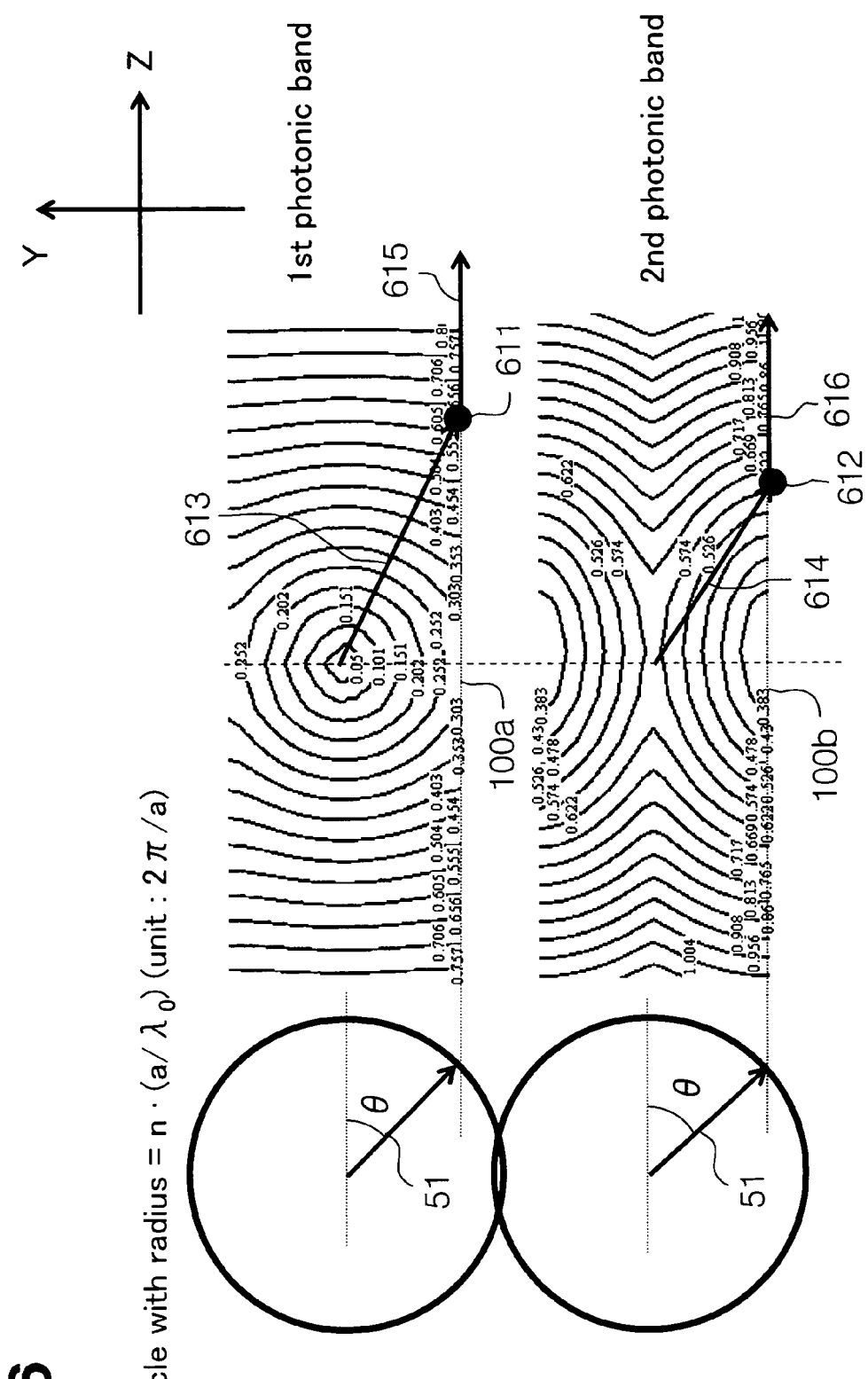
FIG. 6 is an explanatory diagram illustrating coupling of incident light, which is incident obliquely to cause propagation on a Brillouin zone boundary, to the photonic crystal in terms of photonic bands.

FIG. 5 illustrates coupling bands (photonic bands) on the side of the photonic crystal 50 when incident light 51 is incident obliquely at an angle θ to the one end face 50a of the photonic crystal 50 shown in FIG. 1. In FIG. 5, corresponding points 531 and 532 are present on the first band and the second band, respectively. This means that waves corresponding to the first band and the second band are propagated in the photonic crystal 50. Wave vectors of the respective propagated light are indicated by reference numerals 533 and 534. In the case of such slant incidence, waves propagated through the photonic crystal 50 travels in two directions represented by normal directions 535 and 536 of the contour line, and neither of these directions is the Z-direction When the incident angle θ to the one end face 50a is set to satisfy, n·sin θ·(a/λ$_0$)=0.5, first band propagated light and second band propagated light (high-order band propagated light) will be present on the Brillouin zone boundaries 100a and 100b, respectively (see FIG. 6). In FIG. 6, corresponding points 611 and 612 are present on the first band and the second band, respectively. This means that waves corresponding to the first band and the second band are propagated in the photonic crystal 50. Wave vectors of respective propagated light are indicated by reference numerals 613 and 614. The traveling directions 615 and 616 of wave energy of the two propagated light coincides with the Z-direction due to the symmetry of the Brillouin zone boundaries 100a and 100b. Therefore, the propagated light travels in the Z-direction.

In order to realize propagation in the Z-direction, the condition may be set as n·sin θ·(a/λ$_0$)=1.0, 1.5, 2.0, . . . , based on the periodicity in the Y-direction of the Brillouin zone. However, in this case, the realization becomes difficult, since n and θ need be set to a greater value as the value is increased.

Figure 7:
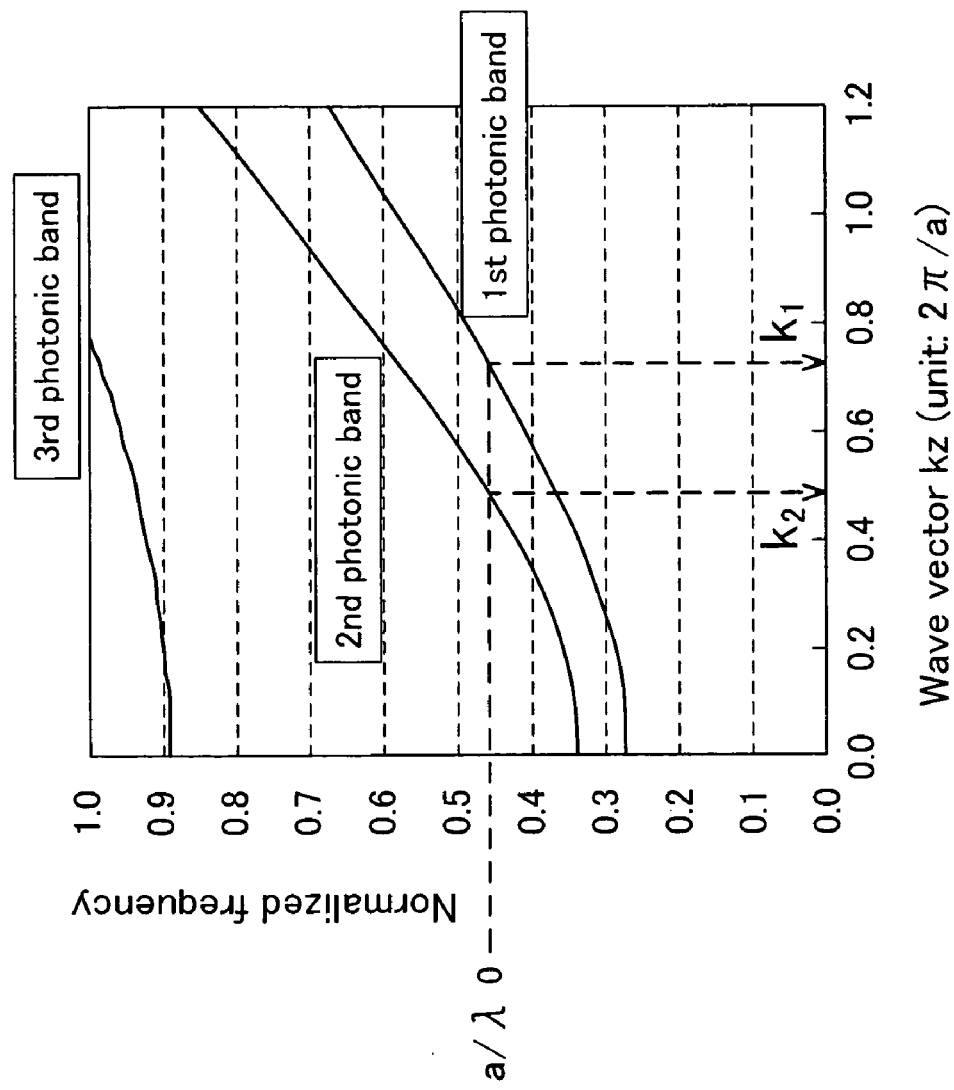
FIG. 7 is a diagram illustrating coupling of incident light, which is incident obliquely to cause propagation on a Brillouin zone boundary, to the photonic crystal in terms of the Z-direction of the Brillouin zone only.

FIG. 7 is a diagram illustrating the coupling shown in FIG. 6, while limiting the band diagram on the Brillouin zone boundary only to the Z-direction. As shown in FIG. 7, all the bands including the first band vary in the same way as the high-order bands shown in FIG. 4 on the Brillouin zone boundaries 100a and 100b shown in FIG. 6. Accordingly, since the characteristics such as "large change in effective refractive index according to wavelength" and "group velocity anomaly" occur in all the bands, it is possible to utilize these characteristics to produce an optical device such as an optical delay device and a dispersion control device without deteriorating the use efficiency of incident light energy or the S/N ratio.

The research by the present inventors has found several methods to couple plane waves outside of the photonic crystal, for example plane waves (incident light 51) incident on the photonic crystal 50 (see FIG. 1) with high-order propagated light traveling in the Z-direction through the photonic crystal 50. A description will now be made on these methods.

(1) <When Utilizing Photonic Bands on the Brillouin Zone Center Line>

As used herein, the term "band on the Brillouin zone centerline" refers to a photonic band that exists on the Brillouin zone center line in the photonic band structure. For example, the first band on the Brillouin zone center line 60 and the second band present on the Brillouin zone center line 61 in the photonic band structure shown in FIG. 3 correspond to such photonic bands exist on the center line.

When appropriate phase-modulated waves having period a are incident on a photonic crystal having the period a in the same direction (e.g., the photonic crystal 50 shown in FIG. 1), it is possible to obtain only propagated light belonging to a specific high-order band. Viewing the optical path from the opposite perspective, the propagated light can be returned to the plane waves by arranging appropriate phase modulating device for modulating the light after the high-order band propagated light is emitted from the other end face 50b of the photonic crystal 50.

Figure 8:
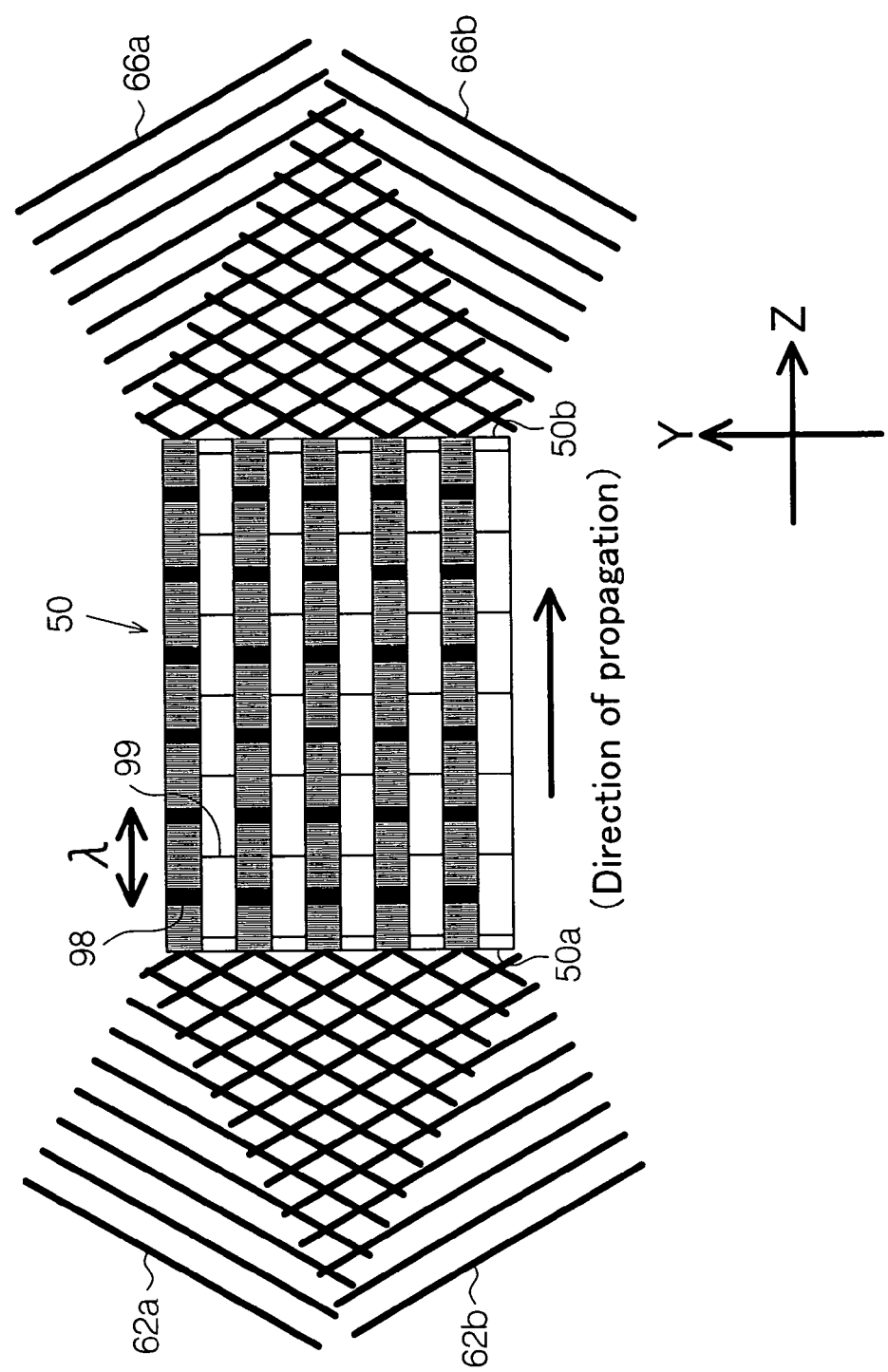
FIG. 8 is a diagram illustrating phase-modulated incident light produced by plane waves intersecting in two directions.

For example, as shown in FIG. 8, plane waves 62a and 62b traveling in two directions are intersected with each other to produce interference waves having period a in the Y-direction, and the one end face 50a of the photonic crystal 50 as shown in FIG. 1 is arranged in the interference waves. Most of the incident light energy can be converted to high-order band propagated light. As shown in FIG. 8, the "electric field pattern" is exposed on the left and right side surfaces of the waveguide (cross-sections perpendicular to the X-direction) formed by the photonic crystal 50 through which the high-order band propagated light is propagated. FIG. 8 also shows that peaks 98 of the electric field represented by the bold solid lines have greater amplitude than peaks 99 of the electric field represented by the thin solid lines. FIG. 8 also shows that the electric field peak 98 deviates from the electric field peak 99 by "a half wavelength" between the layers having different refractive indices in the periodic multilayer film forming the photonic crystal 50.

Figure 9:
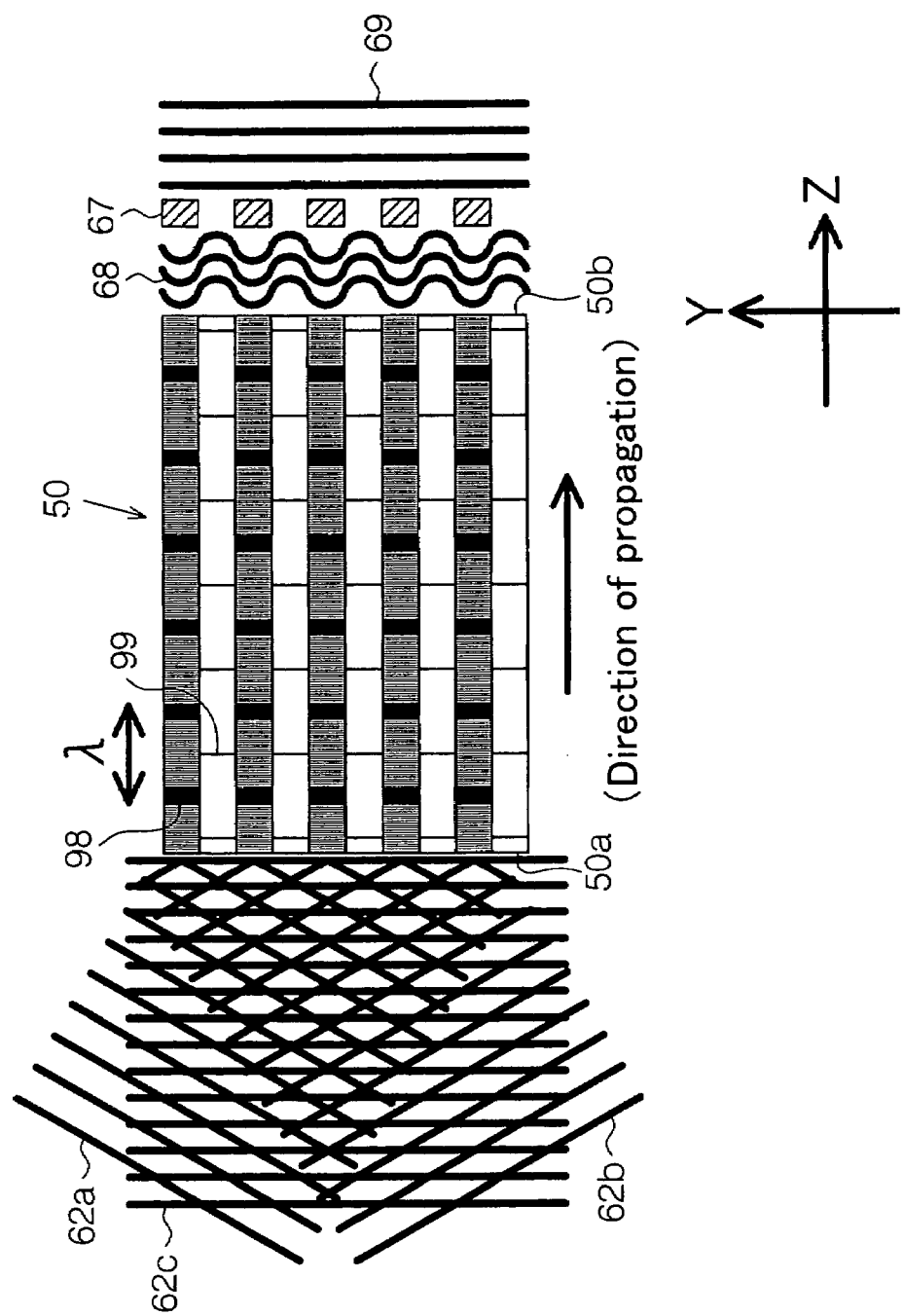
FIG. 9 is a diagram illustrating phase-modulated incident light produced by plane waves intersecting in three directions.
Figure 10:
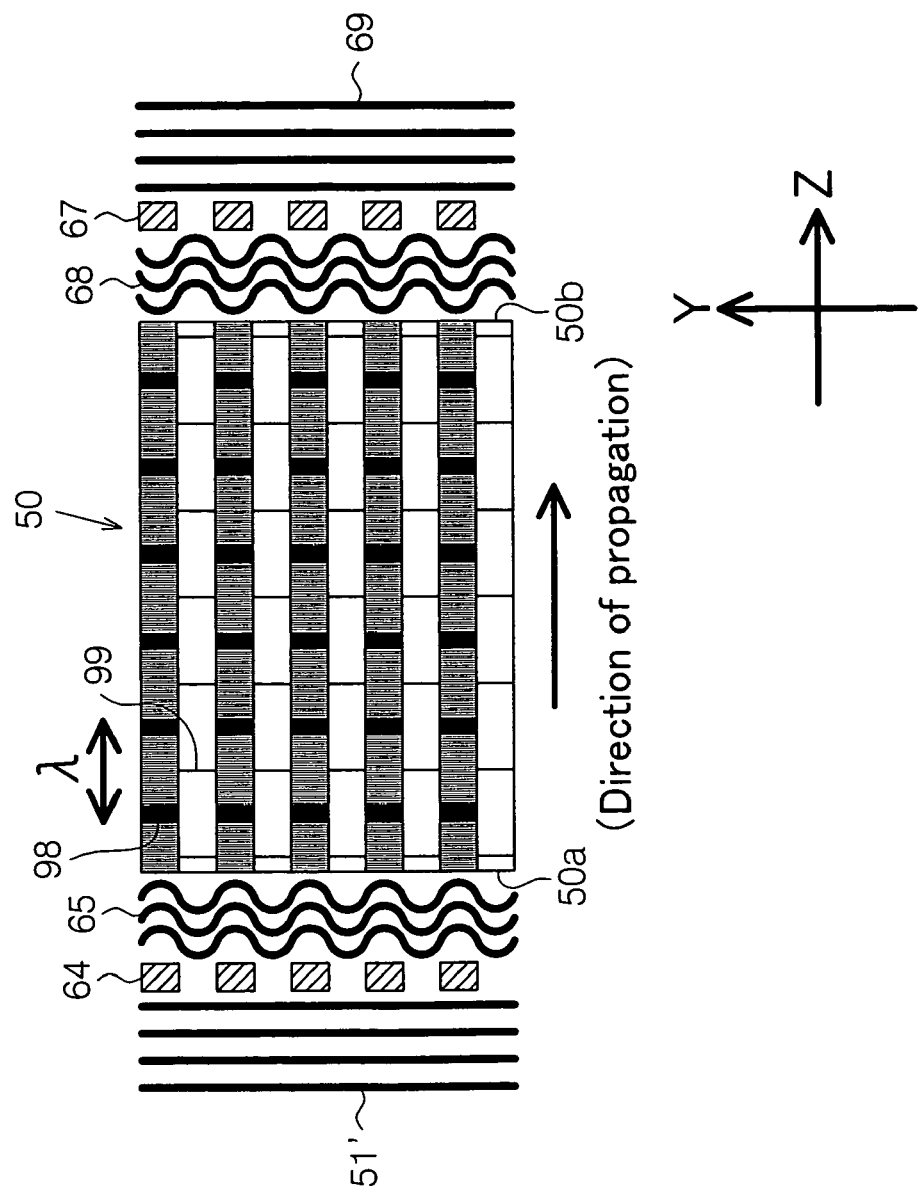
FIG. 10 is a schematic diagram illustrating phase modulation by phase gratings with period a and arranged at the incoming and outgoing sides of a photonic crystal.

In order to increase the percentage of the high-order band propagated light further from the case of FIG. 8, incident plane waves may be increased to more than in FIG. 8, as shown in FIG. 9. For example, plane waves 62a, 62b and 62c traveling in three directions may be incident on one end face 50a of the photonic crystal 50. Alternatively, as shown in FIG. 10, a phase grating 64 with period a is arranged immediately in front of one end face 50a of the photonic crystal 50 so that incident light 51' of plane waves are phase modulated by the phase grating 64 to produce phase-modulated waves 65 with period a, and the phase-modulated waves 65 are introduced into the photonic crystal 50. This makes it possible, like the case shown in FIG. 8, for most of the incident light energy to be converted into high-order band propagated light. The phase grating 64 may also be produced by a simple way, for example, by forming a groove in the vicinity of the one end face 50a of the photonic crystal 50.

Light outgoing from the other end face 50b of the photonic crystal 50 is diffracted by the periodic structure of the other end face 50b if outgoing directly from the other end face 50b. For example, as shown in FIG. 8, the emitted light will be caused to be diffracted light 66a and 66b by the periodic structure of the other end face 50b. However, a phase grating 67 that is similar to the phase grating 64 with period a and arranged immediately upstream of the one end face 50a of the photonic crystal 50 can be arranged immediately downstream of the other end face 50b of the photonic crystal 50, as shown in FIGS. 9 and 10. The emitted light 68 can be returned to plane waves 69 as shown in FIG. 10.

(2) <When Using Photonic Bands on Brillouin Zone Boundary>

The "propagation on the Brillouin zone boundaries 100a and 100b" as shown in FIGS. 6 and 7 may be realized by methods as described below.

(2a) Propagation in Several Bands by Slant Incident Wave

As shown in FIGS. 6 and 7, in a frequency range where both the first band and the second band are present, it is possible to obtain waves in which propagation in the first band is superposed with propagation in the second band by setting the incident angle θ of light (incident light 51) obliquely on an end face of a photonic crystal, for example, on one end face 50a of the photonic crystal 50 shown in FIG. 1, to satisfy the condition:

$n \cdot \sin \theta \cdot (a/\lambda_0) = 0.5$.

In this case, propagation as described below can be obtained.

Figure 11:
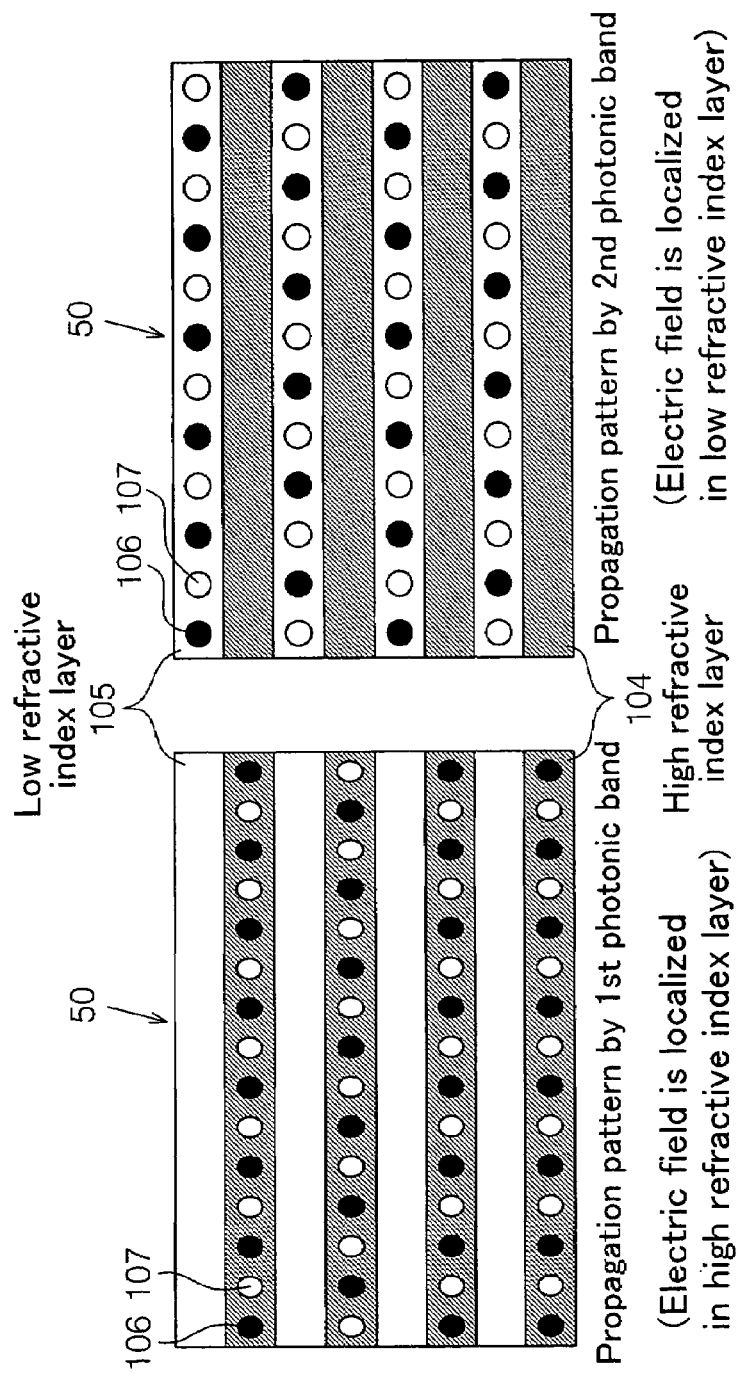
FIG. 11 is a diagram schematically illustrating light propagated in the first and second bands on the Brillouin zone boundary.

As shown on the left side of FIG. 11, the first band propagated light has antinodes in the high refractive index layers and nodes in the low refractive index layers. This means that the peaks 106 and valleys 107 of the electric field are present in the high refractive index layers 104 of the photonic crystal 50, and the nodes of the electric field are present in the low refractive index layers 105 thereof.

As shown in the right side of FIG. 11, the second band propagated light has antinodes in the low refractive index layers and nodes in the high refractive index layers, and the period thereof is longer than the propagated light in the first band. This means that the peaks 106 and valleys 107 of the electric field are present in the low refractive index layers 105 of the photonic crystal 50, and the nodes of the electric field are present in the high refractive index layers 104. The period of the peaks 106 and valleys 107 of the electric field is longer than that of the propagated light in the first band.

Figure 12:
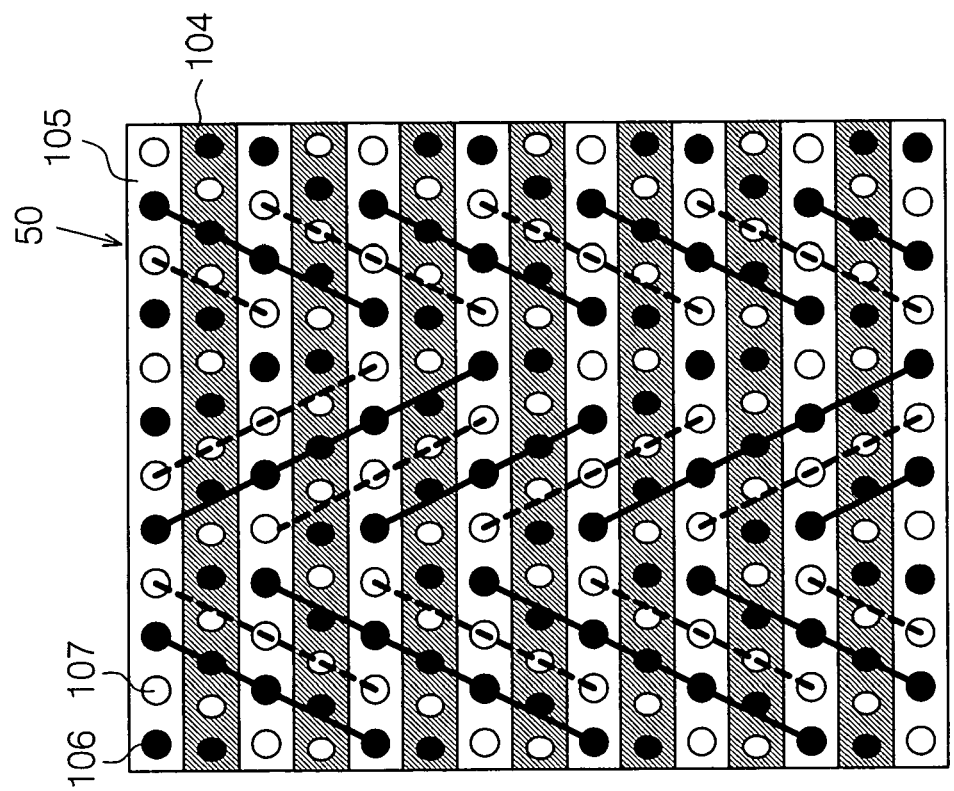
FIG. 12 is a diagram schematically illustrating an electric field pattern produced by synthesis of light propagated light in the first and second bands on the Brillouin zone boundary.

When the first band propagated light is superposed with the second band propagated light, as shown in FIG. 12, "apparent wavefronts" which appear to travel obliquely are produced, and the orientations of these wavefronts are periodically switched.

Thus, the method of obtaining waves in which propagations in the first band and the second band are superposed can be performed most simply by just inclining the incident light (plane wave). Further, propagated light in higher-order bands than the third band also can be obtained by increasing the value of $a/\lambda_0$.

According to this method, however, light waves propagated by two or more bands are mixed up. These propagated light waves have different wavelengths and different group velocities in a photonic crystal, which poses a major obstacle when forming an optical device that requires these characteristics to be identical. Accordingly, this method is particularly suitable for use in which it is only required to "slow down the group velocity of the propagated light and to increase the nonlinear effect".

(2b) Propagation in the First Photonic Band by Slant Incident Wave

Figure 13:
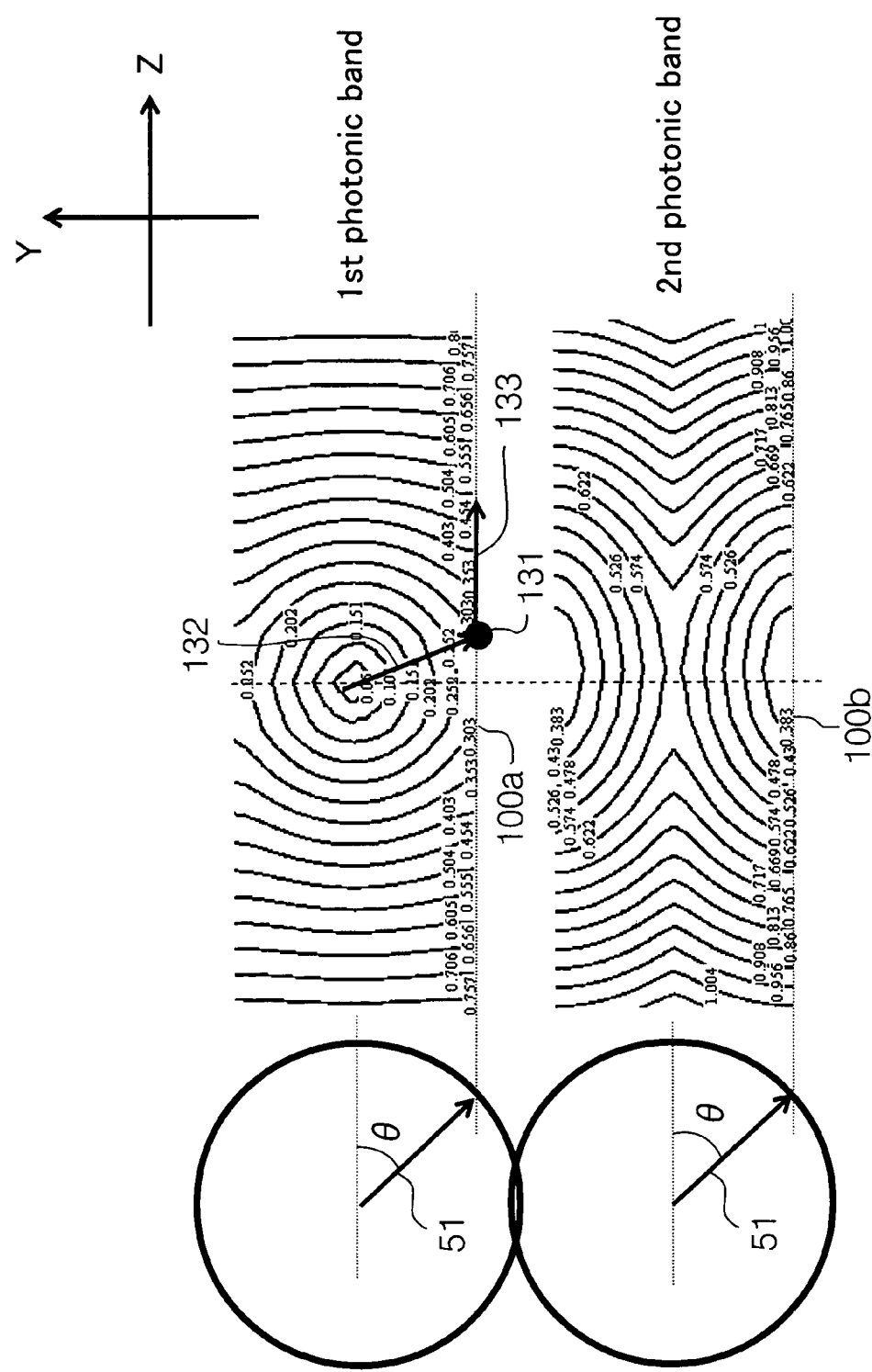
FIG. 13 is an explanatory diagram illustrating coupling of incident light, which is incident obliquely on an end face of a photonic crystal, to the photonic crystal in terms of photonic bands.

As shown in FIG. 13, in a frequency range where only the first band is present (there is no second band corresponding to the frequency), the incident angle θ of light (incident light 51) is incident obliquely on an end face of a photonic crystal, for example, on one end face 50a of the photonic crystal 50 shown in FIG. 1 and is set to satisfy the condition:

$n \cdot \sin \theta \cdot (a/\lambda_0) = 0.5$

This makes it possible to obtain propagation in a single band (first band) (wave vector 132). In FIG. 13, the reference numeral 131 indicates a coupling point on the first band, and the reference numeral 133 indicates the traveling direction of the waves in the first band. There is no propagation in the second band since there is no coupling point on the second band.

This method also can be performed simply like the method (2a) above, by just inclining the incident light (plane waves). However, "the frequency range in which only the first band is present" has a small value of $a/\lambda_0$, and hence both the incident angle θ and the refractive index n need to be set large. This poses a problem that the reflectance at the one end face 50a of the photonic crystal 50 becomes significantly large and the loss is increased.

(2c) Phase Modulation of Incident Light by Interference of Plane Waves

Figure 14:
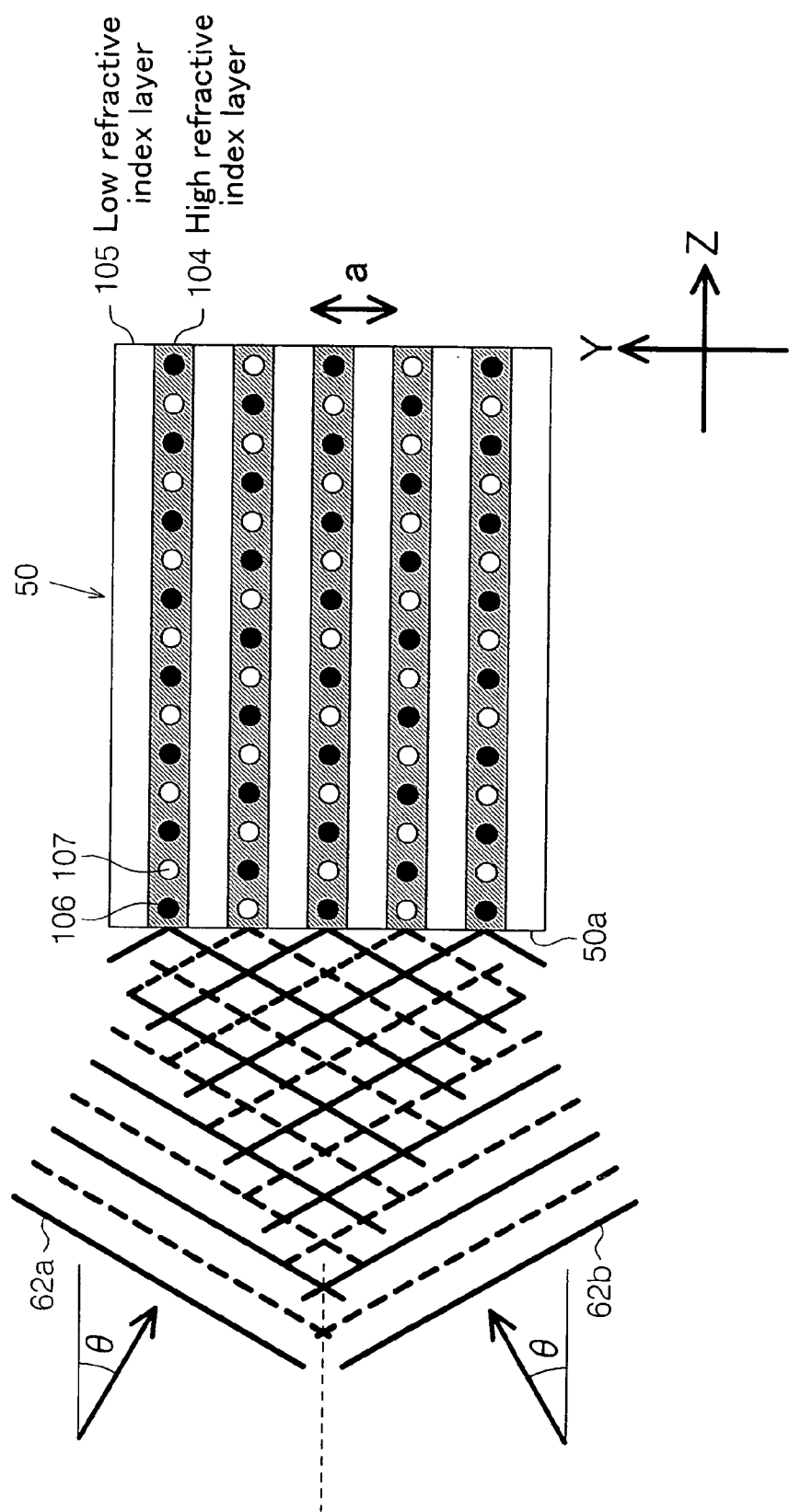
FIG. 14 is a diagram illustrating phase modulation of incident light by interference between plane waves intersecting in two directions.

As shown in FIG. 14, when plane waves 62a and 62b having a same wavelength are intersected with each other at incident angles ±θ and are incident on an end face of a photonic crystal, an electric field pattern having antinodes and nodes is produced by interference. If the photonic crystal 50 is arranged such that the peaks 106 and valleys 107 of the electric field exist at a high refractive index layer 104, and the nodes exist at a low refractive index layer 105, propagation by the first band only is produced like the propagation by the first band shown in FIG. 11. If the photonic crystal 50 is arranged such that the peaks 106 and valleys 107 of the electric field exist at the low refractive index layer 105, and the nodes exist at the high refractive index layer 104, propagation by the second band only is produced like the propagation by the second band as shown in FIG. 11.

It is obvious from FIG. 14 that the value of the incident angle θ should satisfy the relation:

$n \cdot \sin \theta \cdot (a/\lambda_0) = 0.5$ where n denotes a refractive index of the incident light side.

(2d) Phase Modulation of Incident Light by Placing of Phase Grating

Figure 15:
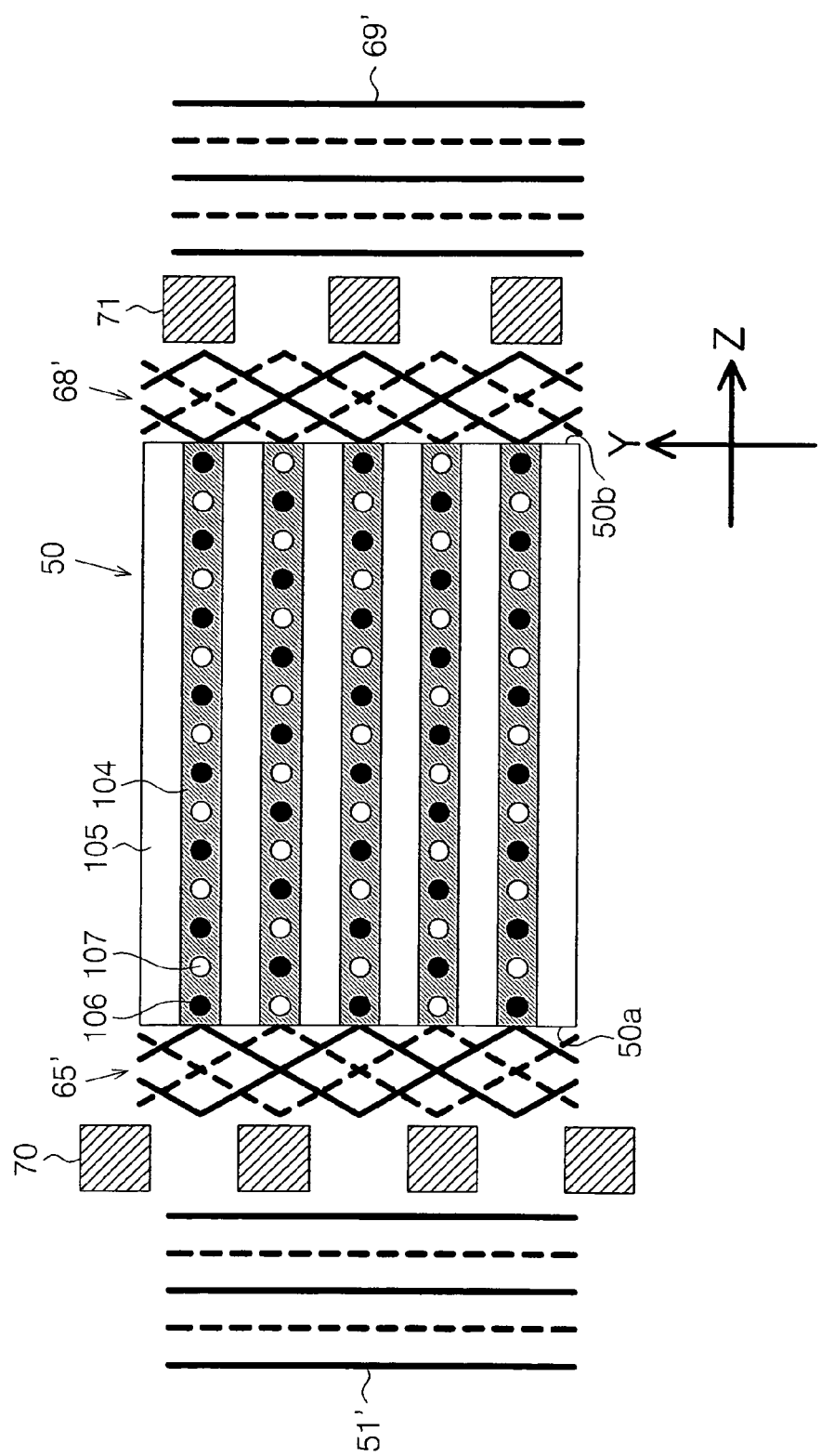
FIG. 15 is a schematic diagram illustrating phase modulation by phase gratings with a period 2a and arranged at the incoming and outgoing sides of the photonic crystal.

As shown in FIG. 15, when incident light 51' of plane waves are incident perpendicularly on a phase grating 70 having period 2a that is twice the period a of the photonic crystal 50, an electric field pattern, that has similar antinodes (peaks and valleys of the electric field) and nodes to those of the "interference by the plane waves" obtained by the method (2c) above illustrated in FIG. 14, can be produced by the interference between +1 order diffracted light and −1 order diffracted light. When the photonic crystal 50 is arranged such that the peaks 106 and valleys 107 of the electric field exist at the high refractive index layer 104, and the nodes exist at the low refractive index layer 105, propagated light by the first band only is obtained. On the other hand, when the photonic crystal 50 is arranged such that the peaks 106 and valleys 107 of the electric field exist at the low refractive index layer 105, and the nodes exist at the high refractive index layer, propagated light by the second band is obtained.

If zero-, +2, −2 or higher-order diffractions are produced by the phase grating 70, they will not couple to a specific band of the photonic crystal 50. Therefore, it is ideal that both the +1 order diffracted light and −1 order diffracted light have a diffraction efficiency of 50%. The phase grating 70 desirably has a shape that is optimized so that +1 order diffraction and −1 order diffraction are as intense as possible.

When the phase grating 70 is optimized at a specific wavelength, the efficiency of the first order diffraction will not drop rapidly and remains at a high level even if the wavelength is varied slightly. Therefore, according to this method, the usable frequency range can be set wider than other methods.

In FIG. 15, the reference numeral 65' denotes phase-modulated waves by the phase grating 70. Further, a phase grating 71 having period $2a$ like the phase grating 70 can be placed immediately downstream of the other end face 50b of the photonic crystal 50 to return the emitted light 68' to a plane wave 69'.

Figure 16:
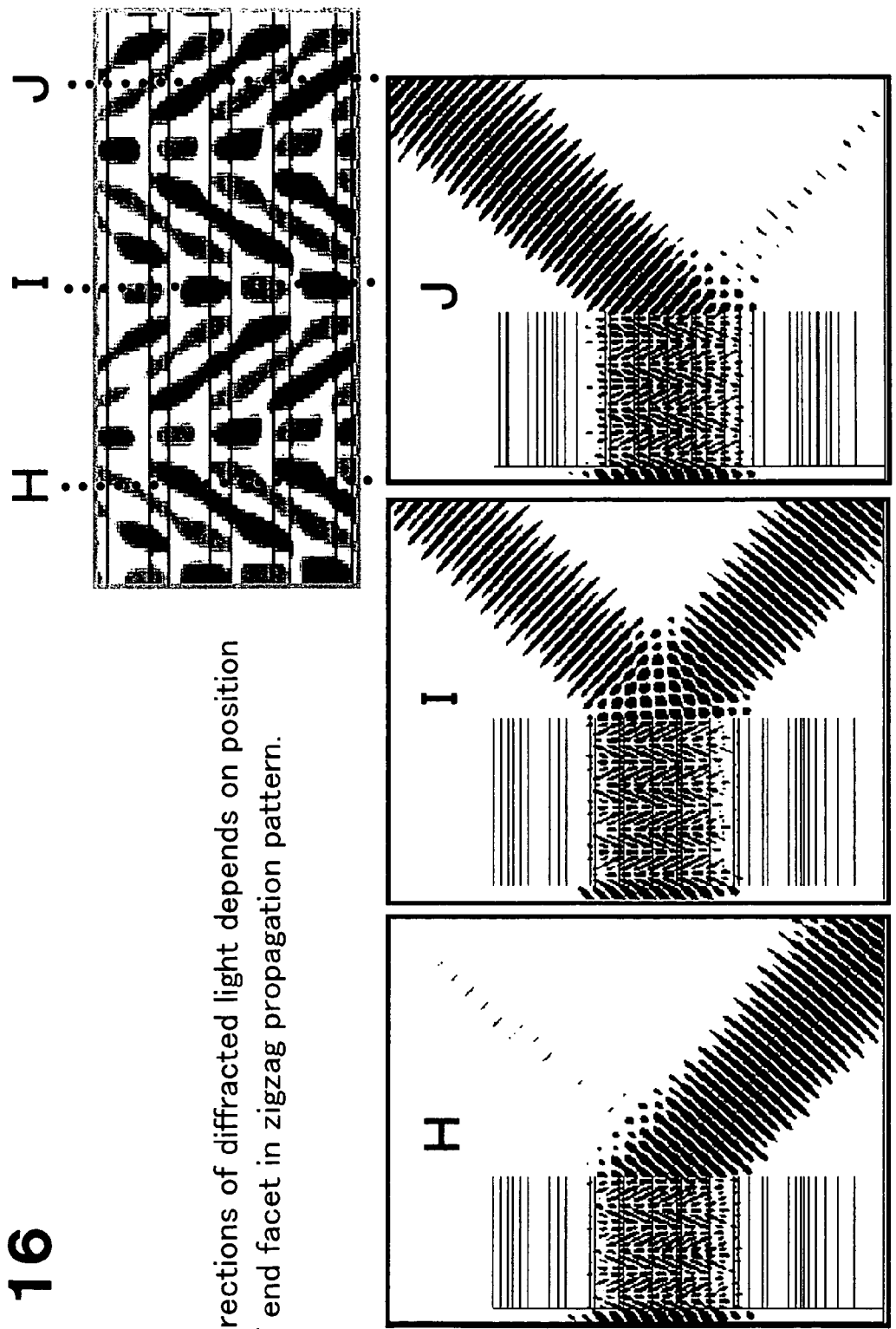
FIG. 16 is a diagram illustrating diffracted light from a phase grating in an calculation example in which a phase grating with a period 2a and interference waves produced by slant incidence are utilized.

(2e) Utilization of Interference Waves Produced by Phase Grating with Period a and Slant Incident Light The propagated light in the photonic crystal 50 obtained by the method (2a) described above, in which the first band propagated light and the second band propagated light exist together (are superposed with each other), is able to change the intensity of diffracted waves emitted from the exit-side end face (the other end face 50b) of the phase grating, depending on a position thereof. More specifically, as shown by positions H and J in FIG. 16, when the exit-side end face of the phase grating is on the slope of the peak-and-valley pattern, diffracted wave on one side is stronger than on the other. As shown by the position I in FIG. 16, when the exit-side end face of the phase grating is present at the top or the bottom of the peak-and-valley pattern, diffracted waves are substantially equal on the both sides. The interference pattern produced by the emitted waves that have substantially equal intensities is similar to that of the interference waves produced by the phase grating according to the method (2d) above. Therefore, high-order propagated light by a specific band can be obtained by arranging a photonic crystal having the same period a as that of the phase grating, immediately downstream of the exit-side end face of the phase grating.

According to this method, periodic multilayer films having the same structure (having the same period a) can be used as the phase grating and photonic crystal. However, adjustment is required to align the positions of the antinodes (peaks and valleys) and nodes of the electric field produced by interference waves with those on the side of the photonic crystal. It is of course desirable that the condition n·sin θ·(a/λ$_0$)=0.5 be satisfied.

(2f) Utilization of Phase Grating with Period $2a$ and Interference Waves Produced by Slant Incident Light According to the method (2d), it becomes difficult to increase the intensity of +1 and −1 order diffracted waves by using a phase grating formed of materials with low refractive indices such as quartz/air, if the value of a/λ$_0$ is less than 0.5. The intensity of +1 and −1 order diffracted waves will be able to be increased by forming the phase grating of high refractive index materials such as silicon. However, this will pose a problem that surface reflection is increased, or the phase grating is difficult to manufacture.

Figure 17:
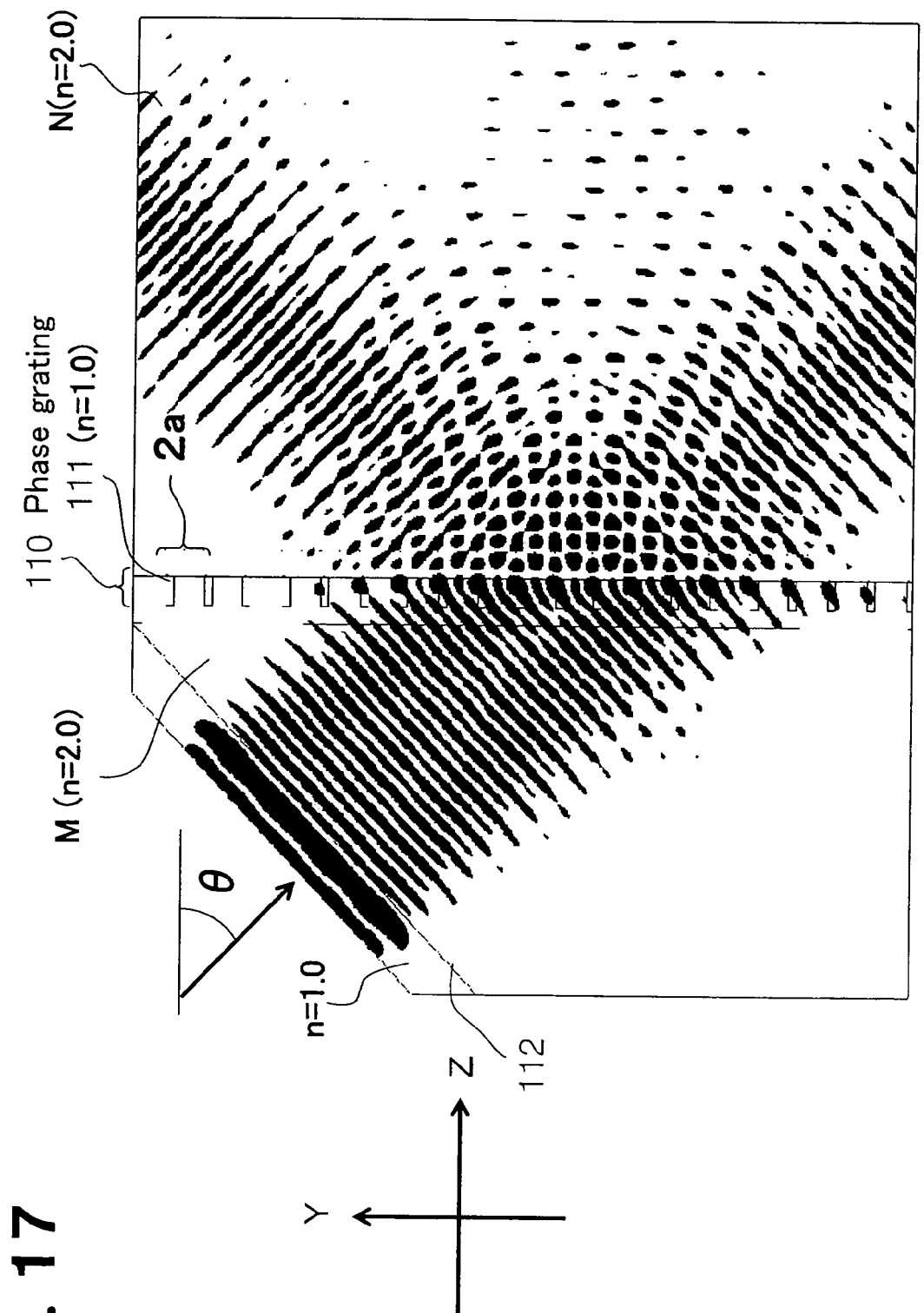
FIG. 17 is a diagram illustrating an electric field pattern in an calculation example in which a phase grating with a period 2a and interference waves produced by slant incidence are utilized.

However, the intensity of diffracted wave pair producing interference pattern as shown in FIG. 17 can be enhanced, even if the value of a/λ$_0$ is as small as less than 0.5, by using a phase grating having period 2a that is twice the period of the photonic crystal, while using slant incident light that has an incident angle θ close to the condition:

$$n \cdot \sin \theta \cdot (a/\lambda_0) = 0.5$$

Accordingly, it is possible to obtain high-order propagated light by a specific high-order band, by arranging a photonic crystal with period a immediately downstream thereof. This method is similar to the method (2e) but is significantly different from the method (2e) in that the period of the phase grating is $2a$ (twice the period of the photonic crystal).

Electromagnetic wave simulation was conducted by the finite element method on the method utilizing the phase grating with period $2a$ and interference waves produced by slant incidence, and the results are shown below.

(Structure of Periodic Multilayer Film Forming Photonic Crystal)

Alternate stack of medium K and medium L, the medium K having a thickness $t_K$ of 0.30a and a refractive index $n_K$ of 2.1011; and the medium L having a thickness $t_L$ of 0.70a, and a refractive index $n_L$=1.4578.

The photonic band diagram of the photonic crystal is similar to that shown in FIG. 2.

(Structure of Phase Grating)

The phase grating 110 shown in FIG. 17 has a structure in which rectangular grooves 111 are formed with period $2a$ on the surface of a medium M with a refractive index n of 2.00, and each of the grooves 111 contains air with a refractive index n of 1.00. The medium M is provided with an slant end face 112 conforming to the incident angle θ of 47.332°, which will be described later, for example, so that the end face 112 functions as an slant incident surface. The end face of the phase grating 110 is in contact with a surface of a medium N having a refractive index n of 2.00.

The medium M has a thickness $t_M$ of 1.6a in the Y-direction of the rectangular portion, and a refractive index $n_M$ of 2.00;

the medium N has a thickness $t_N$ of 0.4a in the Y-direction of the rectangular portion of the air layer, and a refractive index $n_N$ of 1.00;

the Y-direction period of the phase grating 110 is $2a$; and the thickness in the Z-direction of the phase grating 110 is 1.5642a.

The shape of the phase grating is optimized so as to enhance the intensity of specific diffracted waves.

(Incident Light)

Wavelength in vacuum λ$_0$: TE polarization (the electric field is oriented in the X-direction) with λ$_0$ of 2.941a (a/λ$_0$=0.340)

Incident angle θ: θ=47.332°

The condition n·sin θ·(a/λ$_0$)=0.5 is satisfied.

(Arrangement of Phase Grating)

Interference waves produced by the phase grating 110 are shown in FIG. 17. It is apparent that an alternate interference pattern is formed by the intense interference waves extending to both sides and the weak interference waves traveling perpendicularly to the phase grating 110.

Figure 18:
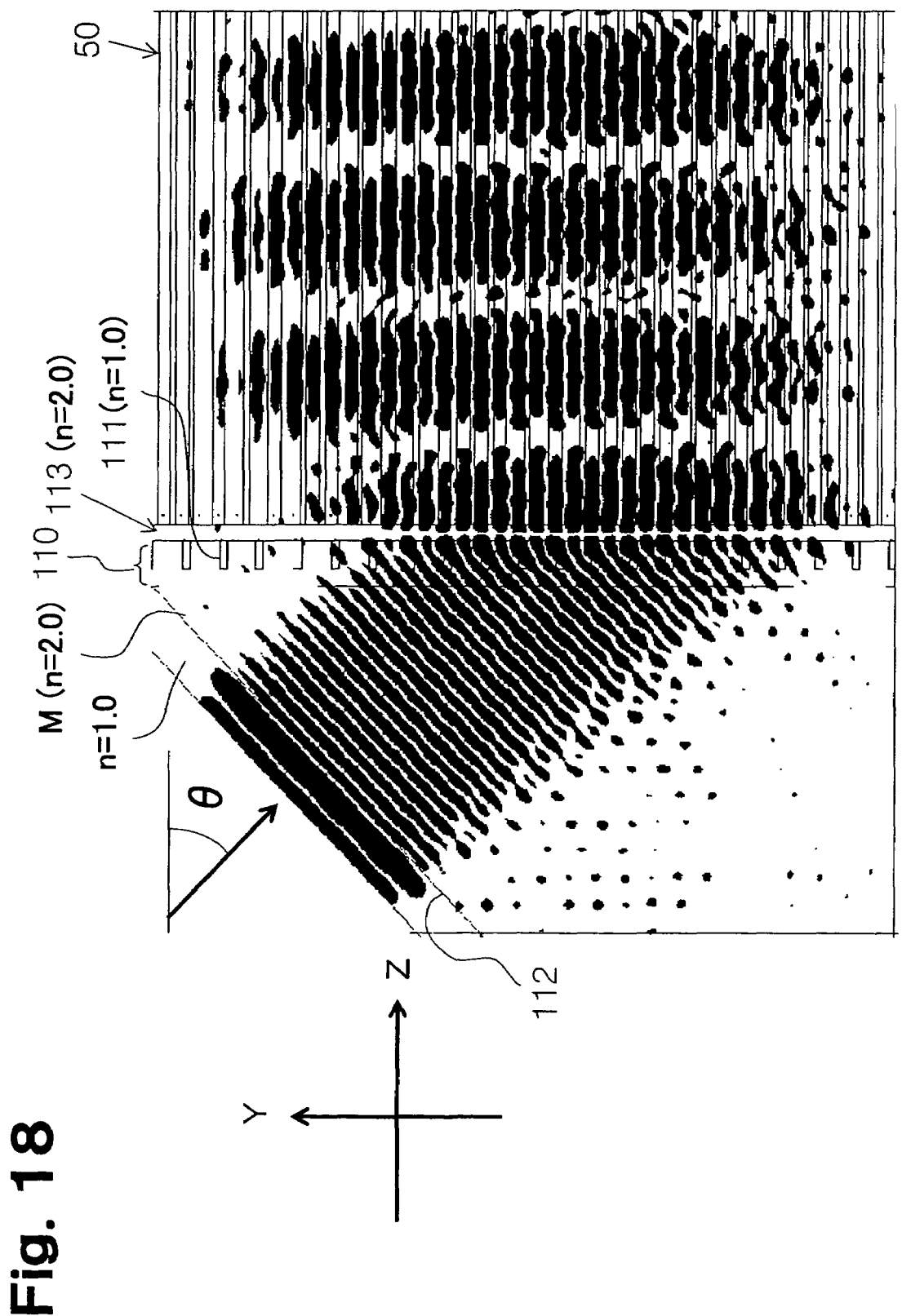
FIG. 18 is a diagram illustrating an electric field pattern in an calculation example in which a phase grating with a period 2a and interference waves produced by slant incidence are utilized, and the phase grating is arranged under a specific condition.

In another configuration example shown in FIG. 18, a photonic crystal 50 is used in place of the medium in FIG. 17. A phase grating 110 and the photonic crystal 50 are arranged with a space of 0.90909a, and the gap is filled with a medium 113 having a refractive index n of 2.0. The position of the phase grating 110 in the Y-direction is adjusted so that the antinodes of interference waves (peaks and valleys of electromagnetic waves) exist at the center of the high refractive index layers of the photonic crystal 50. The width of an incident portion of one end face of the photonic crystal 50 is set to about 24 periods. The result of simulation conducted on this configuration example is shown in FIG. 18.

Since the value of $a/\lambda_0$ is small in this simulation, the wavelength of electromagnetic waves propagated through the photonic crystal is very long.

(2g) Utilization of Slant End Face

It is also possible to obtain propagated light on the Brillouin zone boundary by inclining the incidence-side end face of the photonic crystal as an oblique end face, and plane waves are incident on the oblique end face.

Figure 19A:
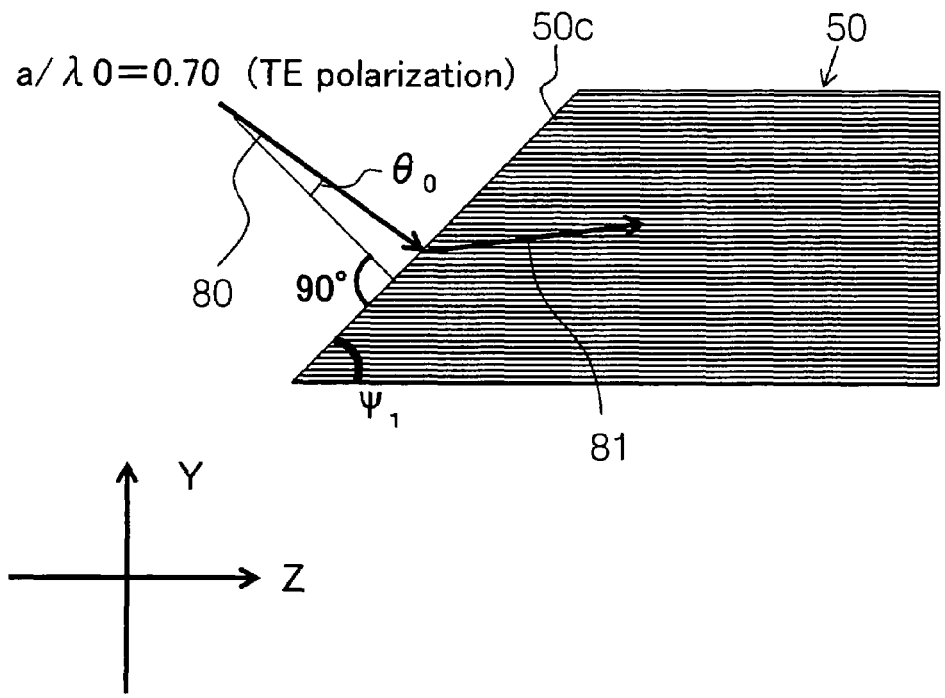
FIG. 19(a) is a diagram illustrating incidence of plane waves on an slant end face for obtaining propagated light on the Brillouin zone boundary.
Figure 19B:
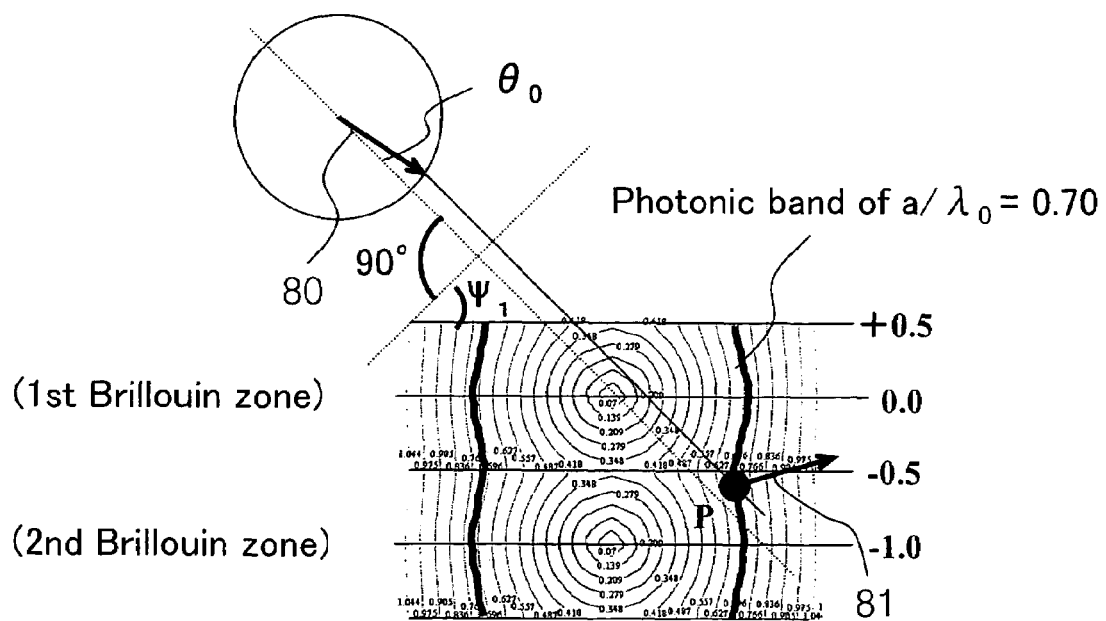
FIG. 19(b) is an explanatory diagram illustrating coupling of incident light, which is incident on the slant end face at an incidence angle $\theta_0$, to a photonic crystal in terms of photonic bands.

As shown in FIG. 19(*a*), when incident light (plane waves) 80 is incident, at an incident angle $\theta_0$, on the slant end face (angle $\psi_1$) 50*c* of the photonic crystal 50, the coupling position P on the photonic band (see FIG. 19(*b*)) can be obtained through plotting. It is thus possible to obtain high-order propagated light 81 traveling in the Z-direction by adjusting $\psi_1$ and $\theta_0$ so that the position P is on the Brillouin zone boundary.

Figure 73A:
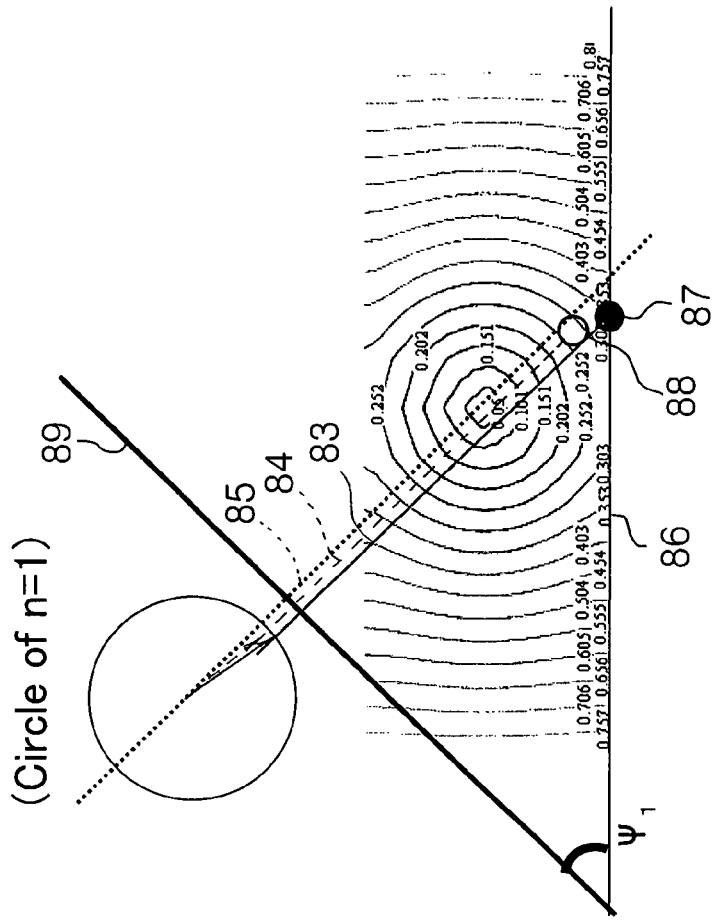
FIG. 73($a$) is a schematic diagram illustrating the incidence of light on an slant end face, and FIG. 73($b$) is an explanatory diagram illustrating the position of a coupling band.
Figure 73B:
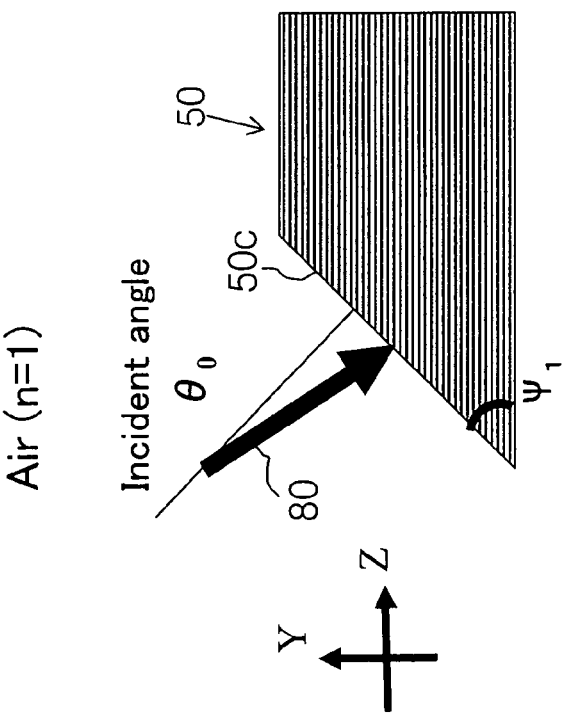

FIG. 73(*a*) is an explanatory diagram illustrating a configuration example in which, like the photonic crystal waveguide shown in FIG. 19(*a*), incident light (plane wave) 80 is incident, at an incident angle $\theta_0$ on an slant end face (angle $\psi_1$) 50*c* of the photonic crystal 50. FIG. 73(*b*) is a band diagram in which the position of the coupling band in the configuration example shown in FIG. 73(*a*) is obtained. In FIG. 73(*b*), a solid line 83 indicates the coupling state with the photonic band when the incident light 80 incident on the slant end face 50*c* has a design frequency, while a broken line 84 indicates the coupling state when the incident light 80 has a frequency lower than the design frequency. A broken line 85 is a line connecting the center of the band diagram of the photonic crystal and the center of the circle representing the incident light, and intersecting perpendicularly with a boundary 89 having the same tilt angle $\psi_1$ as that of the slant end face 50*c*.

As apparent from FIG. 73(*b*), in the case of the incident light (incident light with the design frequency) represented by the solid line 83, $\psi_1$ and $\theta_0$ are adjusted so that the position of the coupling band (coupling point on the band) 87 indicated by a black circle is on the Brillouin zone boundary 86. In this case, it is possible to obtain high-order propagated light traveling through the photonic crystal 50 in the Z-direction. In contrast, in the case of the incident light (incident light with a frequency lower than the design frequency) represented by the broken line 84, it is apparent that the position of the coupling band 88 indicated by a white circle is deviated from the Brillouin zone boundary 86.

Thus, according to the configurations shown in FIG. 19(*a*) and FIG. 73(*a*), in which the incident light 80 is incident on the slant end face 50*c* at the incident angle $\theta_0$, the frequency range in which propagation occurs on the Brillouin zone boundary 86 is limited to the side of the photonic crystal 50. Therefore, the configurations as shown in FIG. 19(*a*) and FIG. 73(*a*) are suitable for use in which the used frequency range is limited.

(Combination of Slant End Face and Prism)

When using an slant end face, the angle of the incident light 80 is determined based on the tilt angle $\psi_1$ of the slant end face 50*c*, and the orientation thereof (the angle of the incident light 80) is not always convenient in practical use. Therefore, a prism or mirror can be combined with the slant end face 50*c* to adjust the orientation of the incident light.

Some examples of a configuration in which a prism or mirror is combined with the photonic crystal waveguide will be described with reference to FIGS. 74(*a*) to 74(*f*).

In the photonic crystal waveguide shown in FIG. 74(*a*), a pentagonal prism 120A is arranged in contact with the slant end face 50*c* of the photonic crystal 50. This prism 120A can be used to change the incoming direction (or the outgoing direction) of the incident light 80 which is an external plane wave incident on the prism at an arbitrary angle (incident angle $\theta_0$) to obtain high-order propagated light traveling through the photonic crystal 50 in the Z-direction. As used herein, the term "incoming direction" refers to an angle at which the incident light 80 is incident, and the term "outgoing direction" refers to an angle at which the incident light propagated through the photonic crystal 50 is emitted from a prism or mirror on the exit side.

According to this configuration example, when the incident light (plane wave) 80 is incident on the slant end face 50*c* of the photonic crystal 50 at an incident angle $\theta_0$, the orientation of the incident light 80 can be changed by the prism 120A.

In the photonic crystal waveguide shown in FIG. 74(*b*), a tetragonal prism 120B is arranged in contact with the slant end face 50*c* of the photonic crystal 50. This prism 120B matches the incoming direction (or the outgoing direction) of the incident light 80 incident to the prism 120B with the propagation direction (Z-direction) of the incident light 80 in the photonic crystal 50. According to this configuration example, the coupling to other waveguide devices or optical fibers is easy since the incoming direction (or the outgoing direction) of incident light 80 is in the Z-direction.

In the photonic crystal waveguide shown in FIG. 74(*c*), a tetragonal prism 120C is arranged in contact with the slant end face 50*c* of the photonic crystal 50. The prism 120C serves to render the incoming direction (or the outgoing direction) of the incident light 80 perpendicular to the propagation direction (Z-direction) of the incident light 80 in the photonic crystal 50. According to this configuration example, the incident light 80 can be introduced from a direction perpendicular to the top face of a substrate on which the photonic crystal 50 is formed.

In the photonic crystal waveguide shown in FIG. 74(*d*), a triangular prism 120D is arranged in contact with the slant end face 50*c*. This prism 120D matches the incoming direction (or the outgoing direction) of the incident light 80 incident to the prism 120D with the propagation direction of the incident light 80 in the photonic crystal 50, similarly to the photonic crystal waveguide shown in FIG. 74(*b*). According to this configuration example, the coupling to other waveguide devices or optical fibers becomes easy.

In the photonic crystal waveguide shown in FIG. 74(*e*), a pentagonal prism 120E is arranged in contact with the slant end face 50*c*. The total reflection of this prism 120E can be used to match the incoming direction (or the outgoing direction) of the incident light 80 incident to the prism 120E with the propagation direction of the incident light 80 in the photonic crystal 50, similarly to the photonic crystal waveguide shown in FIG. 74(*b*). According to this configuration example, the coupling to other waveguide devices or optical fibers becomes easy.

In the photonic crystal waveguide shown in FIG. 74(*f*), a mirror 121 is arranged close to the slant end face 50*c* of the photonic crystal 50. The mirror 121*a* of this mirror 121 can be used to match the incoming direction (or the outgoing direction) of the incident light 80 incident to the mirror 121 with the propagation direction of the incident light 80 in the photonic crystal 50. The surface 121*a* of the mirror 121 is formed by a metal surface or a multilayer film. According to this configuration example, the coupling to other waveguide devices or optical fibers becomes easy.

In the configuration examples shown in FIGS. 74(*a*) to 7(*f*), the frequency range is restricted since the direction of the incident light 80 is changed by refraction or reflection.

However, the restriction of the frequency range can be alleviated by using a prism with a particularly high refractive index.

FIG. 75(a) shows an alternative configuration example of the photonic crystal waveguide shown in FIG. 74(d), in which a prism with a particularly high refractive index 122 is used in place of the triangular prism 120D. FIG. 75(b) is a band diagram like FIG. 73(b), for the configuration example shown in FIG. 75(a). In FIG. 75(b), a solid line 123 indicates the coupling state with the photonic band when the incident light 80 incident on the slant end face 50c has a frequency corresponding to the design frequency, while a broken line 124 indicates the coupling state when the incident light 80 has a frequency lower than the design frequency.

As apparent from FIG. 75(b), in the case of the incident light (incident light with the design frequency) represented by the solid line 123, $\psi_1$ and $\theta_0$ are adjusted so that the position of the coupling band (coupling point on the band) 126 indicated by a black circle is on the upper Brillouin zone boundary 125. In this case, it is possible to obtain high-order propagated light traveling through the photonic crystal 50 in the Z-direction. In the case of the incident light (incident light with a frequency lower than the design frequency) represented by the broken line 124 as well, it is apparent that the position of the coupling band 127 indicted by a white circle is on the upper Brillouin zone boundary 125. The prism 122 is preferably formed of a material having a refractive index of 3 or more, for example, silicon (having a refractive index of 3.47).

According to this configuration example, the coupling band position 126 is coupled to the band on the upper Brillouin zone boundary 125 by increasing the refractive index of the prism 122. This makes it possible to reduce the deviation of the coupling band position (coupling point) from the upper Brillouin zone boundary 125, even if the frequency of the incident light 80 is different from the design frequency, and hence to widen the frequency range where propagation on the boundary occurs.

(Combination of Slant End Face and Diffraction Grating)

Figures 76A, 76B:
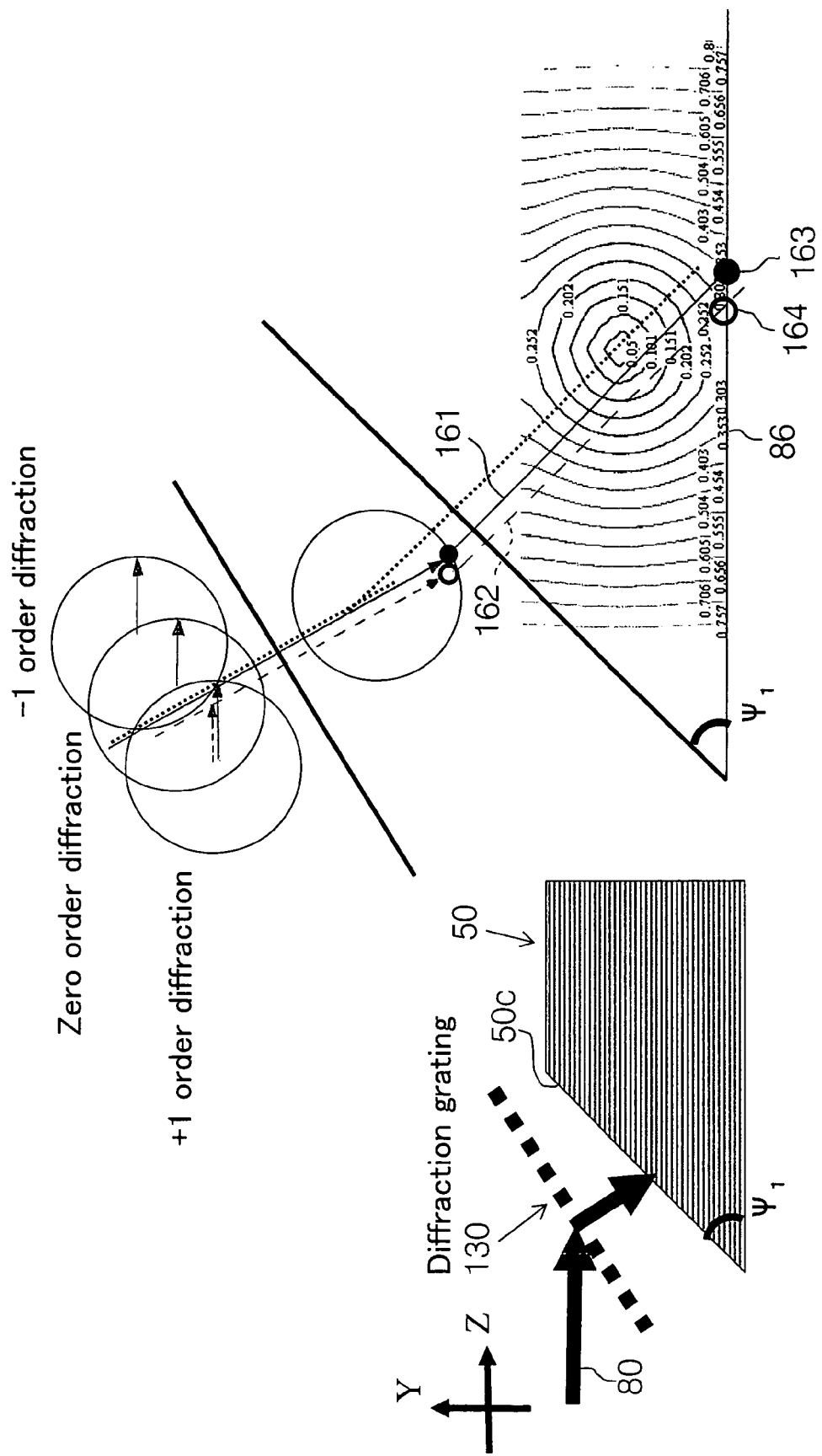
FIG. 76($a$) is a schematic diagram showing an example of a configuration in which a diffraction grating is combined with an slant end face, and FIG. 76($b$) is an explanatory diagram showing the position of the coupling band.

A diffraction grating is also useful as means for changing the direction of incident light. FIG. 76(a) shows a configuration example of a photonic crystal waveguide in which a diffraction grating 130 is interposed between the slant end face 50c of the photonic crystal 50 and the incident light 80, in the vicinity of the slant end face 50c. FIG. 76(b) is, like FIG. 73(a), a band diagram for the configuration example shown in FIG. 76(a). In FIG. 76(b), a solid line 161 indicates the coupling state with the photonic band when the incident light 80 incident on the slant end face 50c has a frequency corresponding to the design frequency, while a broken line 162 indicates the coupling state when the incident light 80 has a frequency lower than the design frequency.

As apparent from FIG. 76(b), when +1 order diffracted light of the incident light 80 represented by the solid line 161 is coupled with the photonic crystal, $\psi_1$ and $\theta_0$ are adjusted so that the coupling band position 163 indicated by a black circle is on the Brillouin zone boundary 86. As for the incident light having a frequency lower than the design frequency indicated by the broken line 132, it is apparent that the coupling band position 164 is not substantially deviated from the Brillouin zone boundary 86 even if the frequency is varied.

According to the configuration example shown in FIG. 76(a), it is possible to widen the frequency range where propagation on the boundary 86 occurs. It is desirable, of course, to design the diffraction grating 130 in a blaze shape or the like so as to increase the intensity of diffraction of a specific order.

Some examples of configuration in which a diffraction grating is combined with a photonic crystal waveguide will be described with reference to FIGS. 77(a) to 77(h).

FIG. 77(a) schematically illustrates a configuration example of a photonic crystal waveguide in which a diffraction grating 130 is arranged parallel with the slant end face 50c of the photonic crystal 50.

FIGS. 77(b) to 77(d) show specific configuration examples in which the diffraction grating 130 is held parallel with the slant end face 50c.

In the configuration example of FIG. 77(b), a plane-parallel substrate 136 having the diffraction grating 130 formed on one face thereof is arranged in parallel with to the slant end face 50c such that the one face is close to the slant end face 50c. The plane-parallel substrate 136 may be arranged such that the one face is closely attached to the slant end face 50c.

In the configuration example of FIG. 77(c), the plane-parallel substrate 136 is arranged such that one face of the plane-parallel substrate 136 having no diffraction grating 130 formed is closely attached to the slant end face 50c. The plane-parallel substrate 136 may be arranged such that the other face of the plane-parallel substrate 136 having the diffraction grating 130 formed is closely attached to the slant end face 50c.

In the configuration example of FIG. 77(d), a diffraction grating 130 is directly formed on the slant end face 50c of the photonic crystal 50.

FIGS. 77(e) to 77(h) show configuration examples in which the diffraction grating 130 is not parallel with the slant end face 50c.

In the configuration example in FIG. 77(e), a triangular prism 137 having the diffraction grating 130 formed on one face thereof is arranged non-parallel with the oblique end face 50c of the diffraction grating 130 such that the one face is close to the slant end face 50c.

In the configuration example of FIG. 77(f), a triangular prism 138 having the diffraction grating 130 formed on one face thereof is arranged such that the one face having the diffraction grating 130 formed is not in parallel with the slant end face 50c and the other face is in close contact with the slant end face 50c. A thin film having a certain thickness may be formed on the surface of the slant end face 50c, the diffraction grating 130 may be formed on the surface of the thin film after shaping the thin film into a prism.

In the configuration example of FIG. 77(g), a plane-parallel substrate 136 having a diffraction grating 130 formed thereon is arranged vertically so that one face thereof is close to and non-parallel with the slant end face 50c. According to this configuration example, the diffraction plane of the diffraction grating 130 is perpendicular to the Z axis, which makes it easy to arrange and adjust the diffraction grating 130.

In the configuration example of FIG. 77(h), a right-angled triangular prism 139 having a diffraction grating 130 formed on one face thereof is arranged such that the diffraction grating 130 is not in parallel with the slant end face 50c, and another face of the prism is closely attached to the slant end face 50c. A thin film having a certain thickness may be formed on the surface of the slant end face 50c, the diffraction grating 130 may be formed on the surface of the thin film after shaping the thin film into a prism.

By the methods (2a) to (2g) described above, high-order band propagated light using a band on the Brillouin zone boundary can be produced efficiently within a one-dimensional photonic crystal. If the propagated light is emitted from the perpendicular end face of the photonic crystal into a homogeneous material, the light will be diffracted so significantly that it becomes difficult to handle. However, the emitted light can be returned to plane waves by arranging the incident side phase grating used in the methods (2d) to (2g) on the exit-side end face with the direction reversed, or inclining the exit-side end face in the opposite direction from the incidence-side slant end face. This facilitates the coupling to optical fibers or the like.

Preferred embodiments of the present invention will now be described.

FIRST EMBODIMENT

Figure 20:
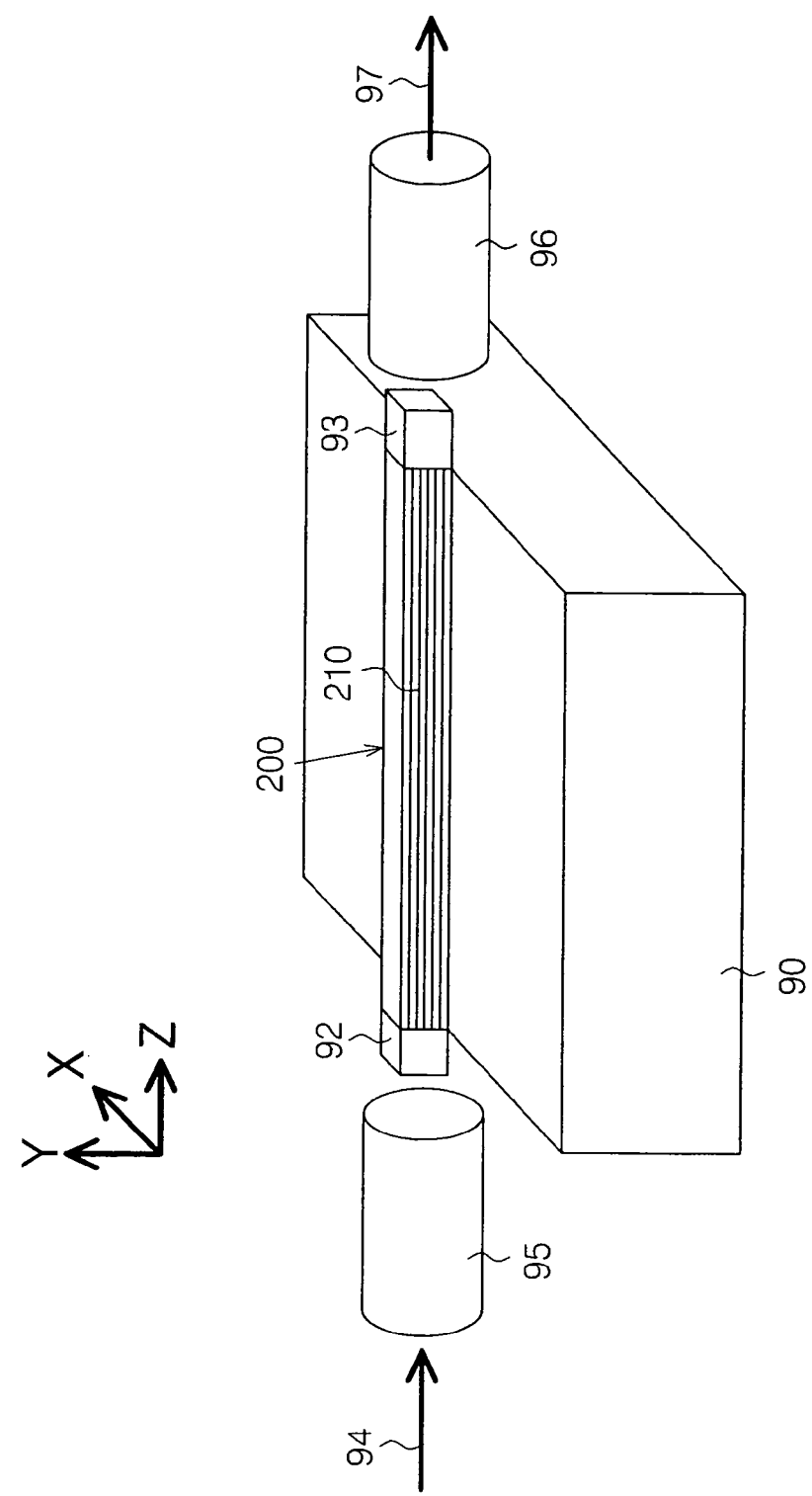
FIG. 20 is a perspective view illustrating an optical device utilizing a photonic crystal waveguide according to a first embodiment of the present invention.

When the one-dimensional photonic crystal described above is used to design, for example, an optical device as shown FIG. 20, it is preferable to form the photonic crystal in a waveguide shape because it facilitates connection with an optical fiber and facilitates arrangement of electrodes for controlling the characteristics described above ("very large wavelength dispersion" and "group velocity anomaly").

Figure 21:
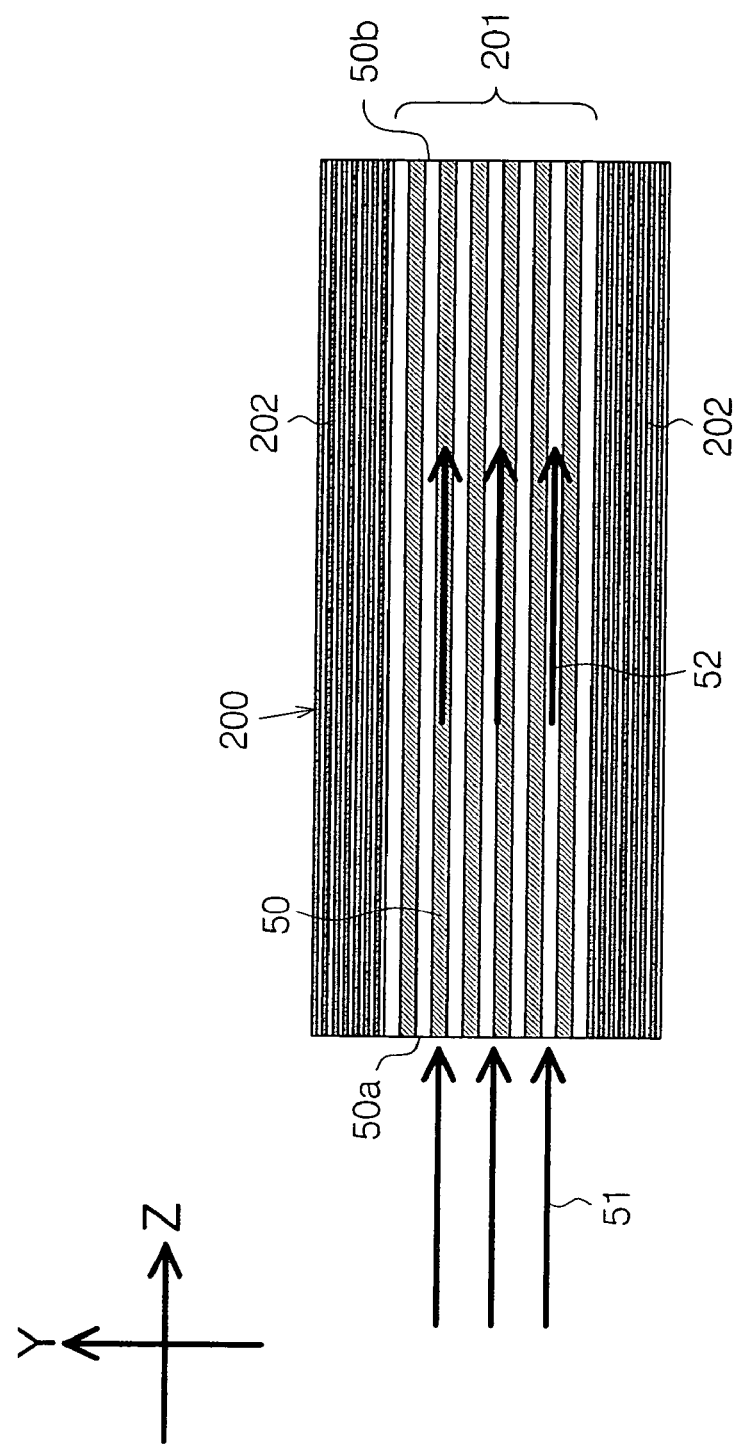
FIG. 21 is a schematic diagram illustrating propagation of light in a photonic crystal waveguide in the first embodiment.

The optical device shown in FIG. 20 is formed by using a photonic crystal waveguide 200 according to the first embodiment shown in FIG. 21. The photonic crystal waveguide 200 is formed in a waveguide shape on an appropriate substrate 90, with a one-dimensional photonic crystal used as the core. The photonic crystal forming the core of the photonic crystal waveguide 200 is designated with the same reference numeral as the photonic crystal 50 of FIG. 1 and repeated description thereof will be omitted.

The optical device shown in FIG. 20 receives incident light 94 of a plane wave at an end face of a phase grating 92 after converting the same into parallel beam flux by a lens group such as a rod lens 95, and couples the light to the core formed by the photonic crystal 50. This light is propagated through the photonic crystal 50 of the photonic crystal waveguide 200, and emitted as emitted light 97 through a phase grating 93 and a lens group such as a rod lens 96. The phase gratings 92 and 93 are similar to the phase gratings 64 and 67 shown in FIG. 10. In the following description, the term "one-dimensional photonic crystal 50" will be simply referred to as the "photonic crystal 50".

The photonic crystal waveguide 200 is formed by the one-dimensional photonic crystal 50 that has periodicity only in one direction (in the Y-direction that is a periodic direction), and is provided with a core 201 which propagates electromagnetic waves (propagated light 52) in a direction perpendicular to the one direction (in this embodiment, in the XZ-plane direction perpendicular to the Y-direction), and a cladding 202 that is a cladding layer. As used in the description of this embodiment, the term "direction perpendicular to the one direction" refers to every direction that is parallel with the XZ-plane perpendicular to the Y-direction that is the periodic direction (XZ-plane direction).

Figure 22:
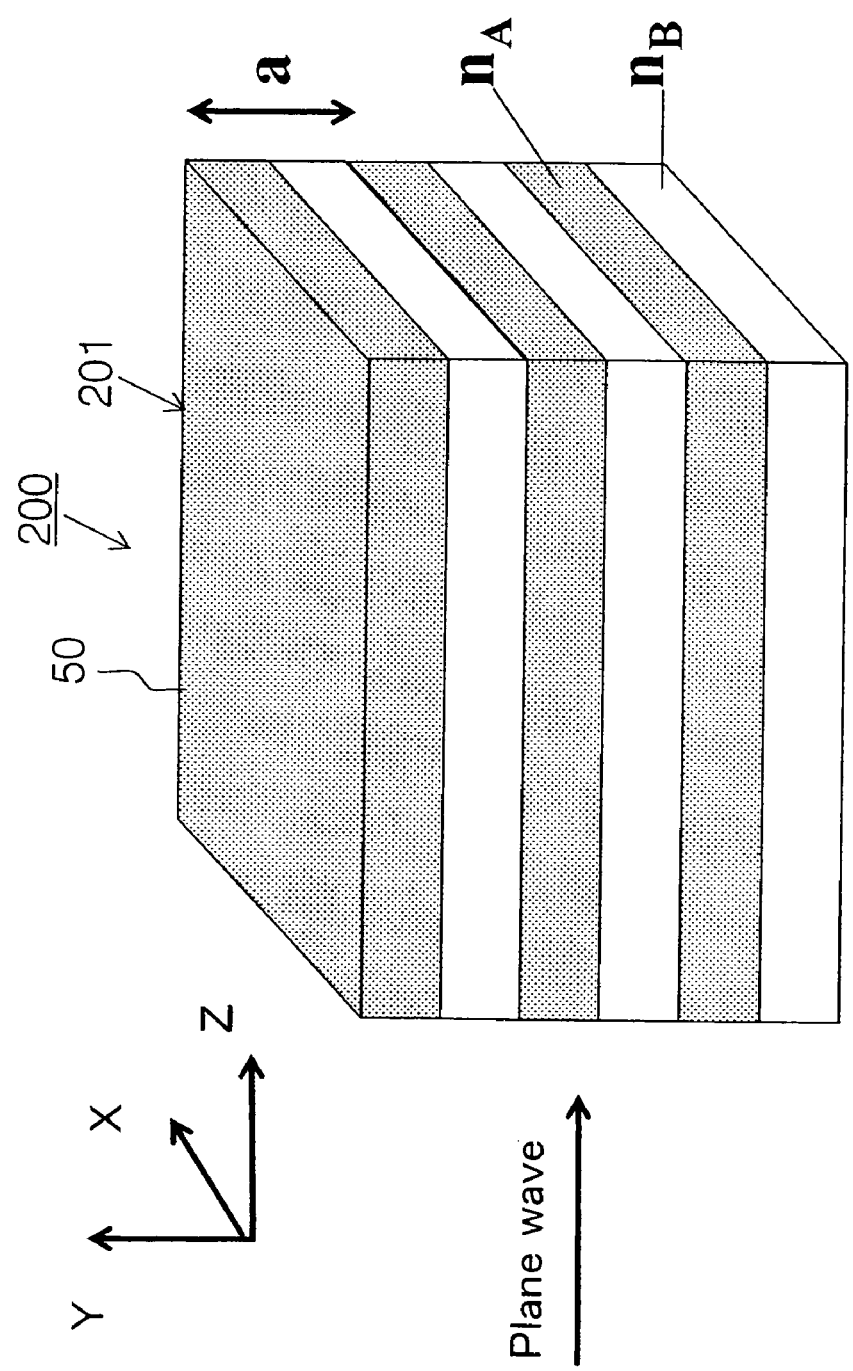
FIG. 22 is a perspective view illustrating the core of the photonic crystal waveguide of FIG. 21.

The one-dimensional photonic crystal 50 forming the core 201 is a periodic multilayer film, as shown in FIGS. 21 and 22, which is formed by alternately stacking a medium A with a thickness $t_A$ (refractive index $n_A$) and a medium B with a thickness $t_B$ (refractive index $n_B$), and has a period a of $(t_A+t_B)$.

The cladding 202 is formed of a photonic crystal having periodicity in the same direction as the photonic crystal 50, on the opposite surfaces of the core 201 perpendicular to the periodic direction (the one direction), and serves as a confinement cladding which prevents electromagnetic waves propagated through the core 201 from leaking out from the surfaces perpendicular to the periodic direction (top and bottom surfaces).

In order to configure the photonic crystal waveguide 200 as described above, light should be confined in the vertical direction (Y-direction) and in the lateral direction (X-direction). The confinement conditions in these directions according to the first embodiment will be described below, in terms of propagated light that is propagated by using a photonic band on the Brillouin zone boundary of the photonic crystal 50.

(Y-Direction Mode)

A description will now be made on light propagated in the Z-direction by the first band corresponding to the normalized frequency $a/\lambda_0$ (in the YZ-plane, X coordinate being zero) in the photonic crystal 50 shown in FIGS. 21 and 22 (see FIG. 23).

Figure 23:
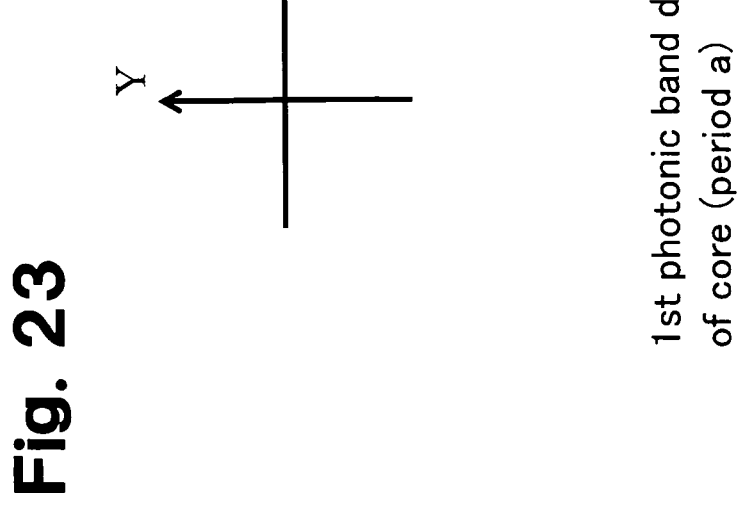
FIG. 23 is a diagram illustrating a wave vector of propagated light with dots on the first band in the Brillouin zone.

The wave vector of the propagated light based on the points (0, ky, and kz) on the first band in FIG. 23 is represented by:

$$k=(0,ky,kz)$$

The wavefront formed in the photonic crystal 50 is perpendicular to k, and the wavelength λ and the propagation angle ψ are represented by:

$$\lambda=2\pi/|k|=2\pi/(ky^2+kz^2)^{0.5} \quad \text{(Formula 1)}$$

$$\tan \phi=ky/kz \quad \text{(Formula 2)}$$

Figure 24:
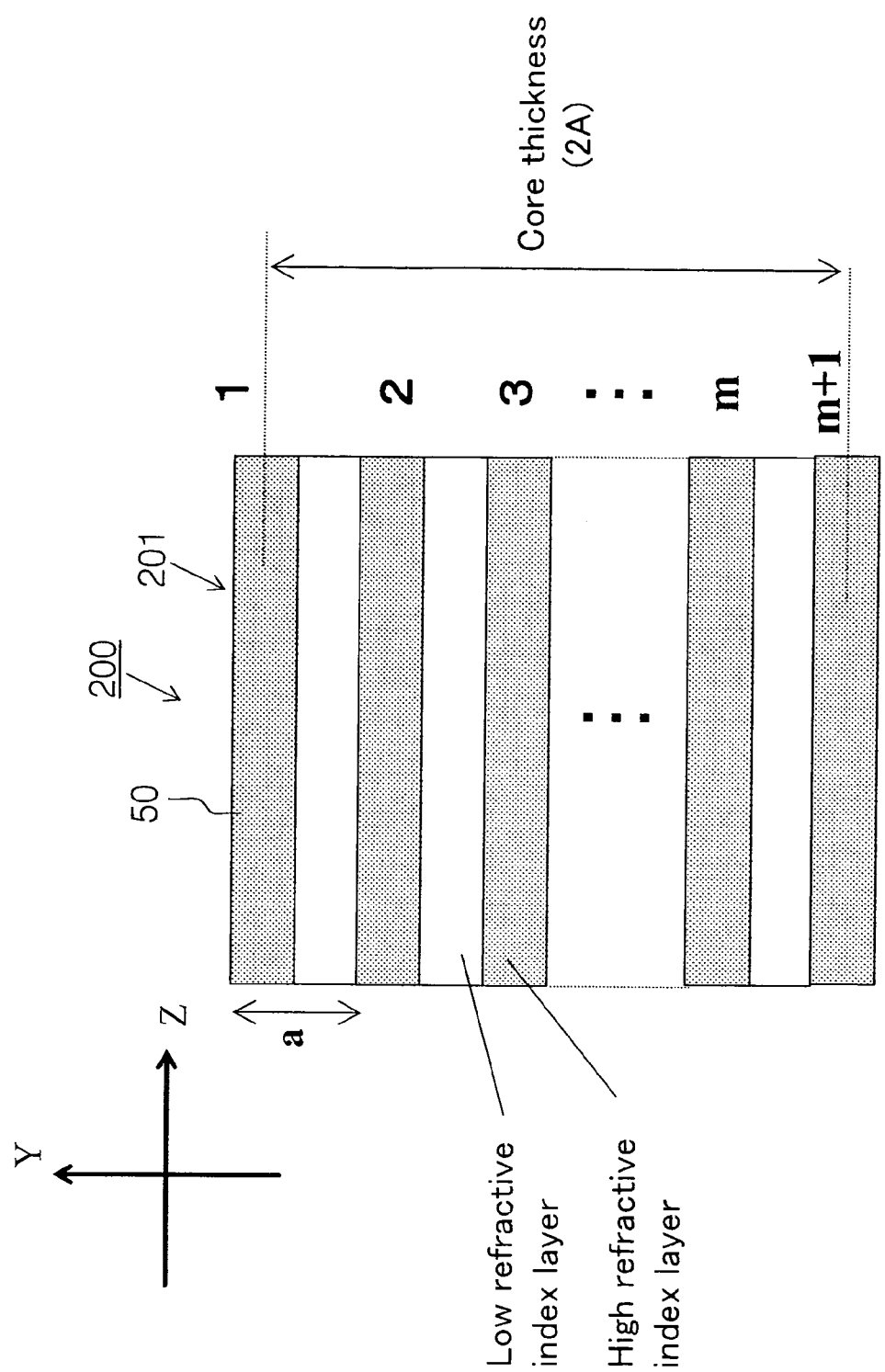
FIG. 24 is an explanatory diagram illustrating the core thickness 2A of the photonic crystal.

In Formula 2, a denotes the period of the photonic crystal 50 forming the core 201, and (m+1) denotes the number of high refractive index layers (see FIG. 24).

A phase matching condition of the waves propagated in the core 201 is represented by:

$$2A|k|\sin \psi=\phi+\pi N(N=0, 1, 2, 3. . .) \quad \text{(Formula 3)}$$

where 2A denotes the thickness of the core 201 (core thickness) (refer to "Light Wave Engineering" by KOKUBUN Yasuo, Kyoritsu Publishing, p. 48)

The symbol φ denotes the amount of phase shift at the interface between the core 201 and the cladding 202. In the case of the light propagated by the first band on the Brillouin zone boundary to be noted here, an antinode of the electric field is present at the center of a high refractive index layer. Therefore, the equation $$\phi=0 \quad \text{(Formula 4)},$$

is established. The core thickness 2A can be simplified as:

$$2A=am \quad \text{(Formula 5)}.$$

Figure 25:
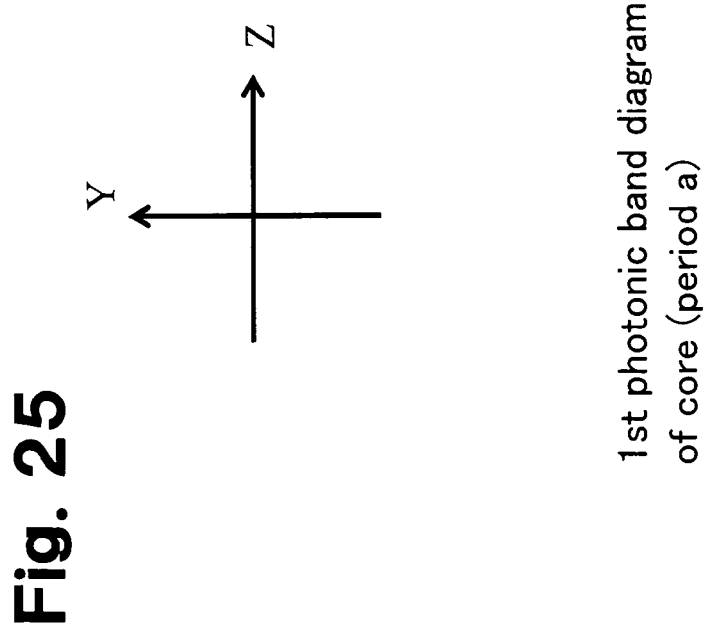
FIG. 25 is an explanatory diagram illustrating propagated light satisfying phase matching conditions, or a mode.

When Formulas 1, 2, 4, and 5 are substituted into Formula 3, the equation $$ky=N\pi/ma \quad \text{(Formula 6)},$$

is obtained. Therefore, points on the band satisfying Formula 6 represent propagated light satisfying the phase matching condition, or modes. As shown in FIG. 25, there are modes from the zero-order mode of N=0 to the m-order mode of N=m. The propagated light on the Brillouin zone center line is of the zero-order mode, and the propagated light on the Brillouin zone boundary is of the m-order mode. It may be true that, in a low-order mode with ψ being close to zero, the assumption of Formula 4 is not correct. However, the assumption of Formula 4 is sufficient for high-order modes near the m-order, in the vicinity of the Brillouin zone boundary.

Figure 26:
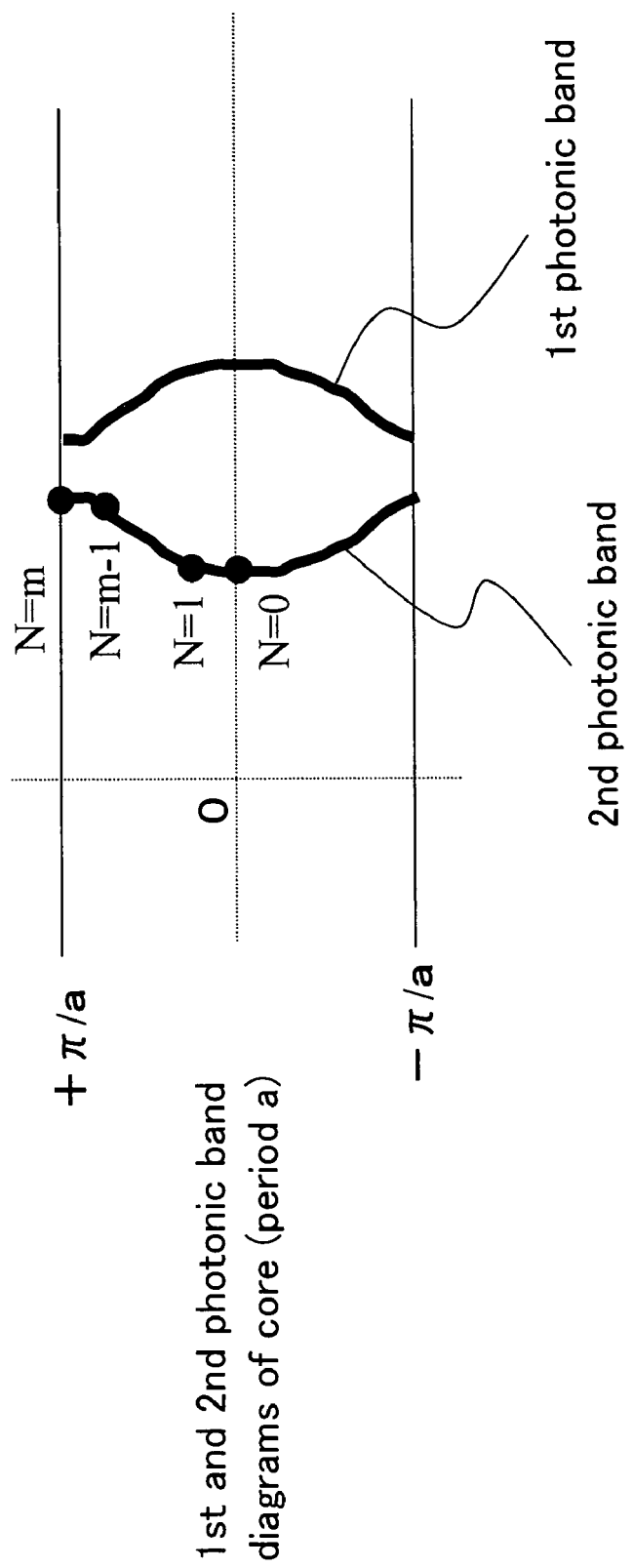
FIG. 26 is an explanatory diagram illustrating a mode in the second band.

When there is a second band corresponding to the standardized frequency $a/\lambda_0$ as well, there are m modes when the number of low refractive index layers forming the core 201 is represented by (m+1) (see FIG. 26).

(Y-Direction Confinement and Single-Mode Condition)

An ordinary single-mode waveguide propagates only a zero-order mode of N=0 in the first band, whereas the waveguide according to the present invention propagates an m-order mode on the Brillouin zone boundary. If the effective refractive index in the Z-direction of the propagation mode is greater than the refractive index of the medium present on the top and bottom thereof, the light also can be confined by utilizing the difference in refractive index. However, if the effective refractive index is small, the propagated light will leak by refraction into the medium. In particular, when the effective refractive index in the Z-direction of high-order mode propagation is less than one, the leakage cannot be prevented even if air is used as the medium. In such cases, according to the first embodiment as shown in FIG. 21, the upper and lower claddings 202 are also formed of a photonic crystal to carry out confinement by a photonic bandgap (hereafter, to be abbreviated as the "PBG").

Figure 27:
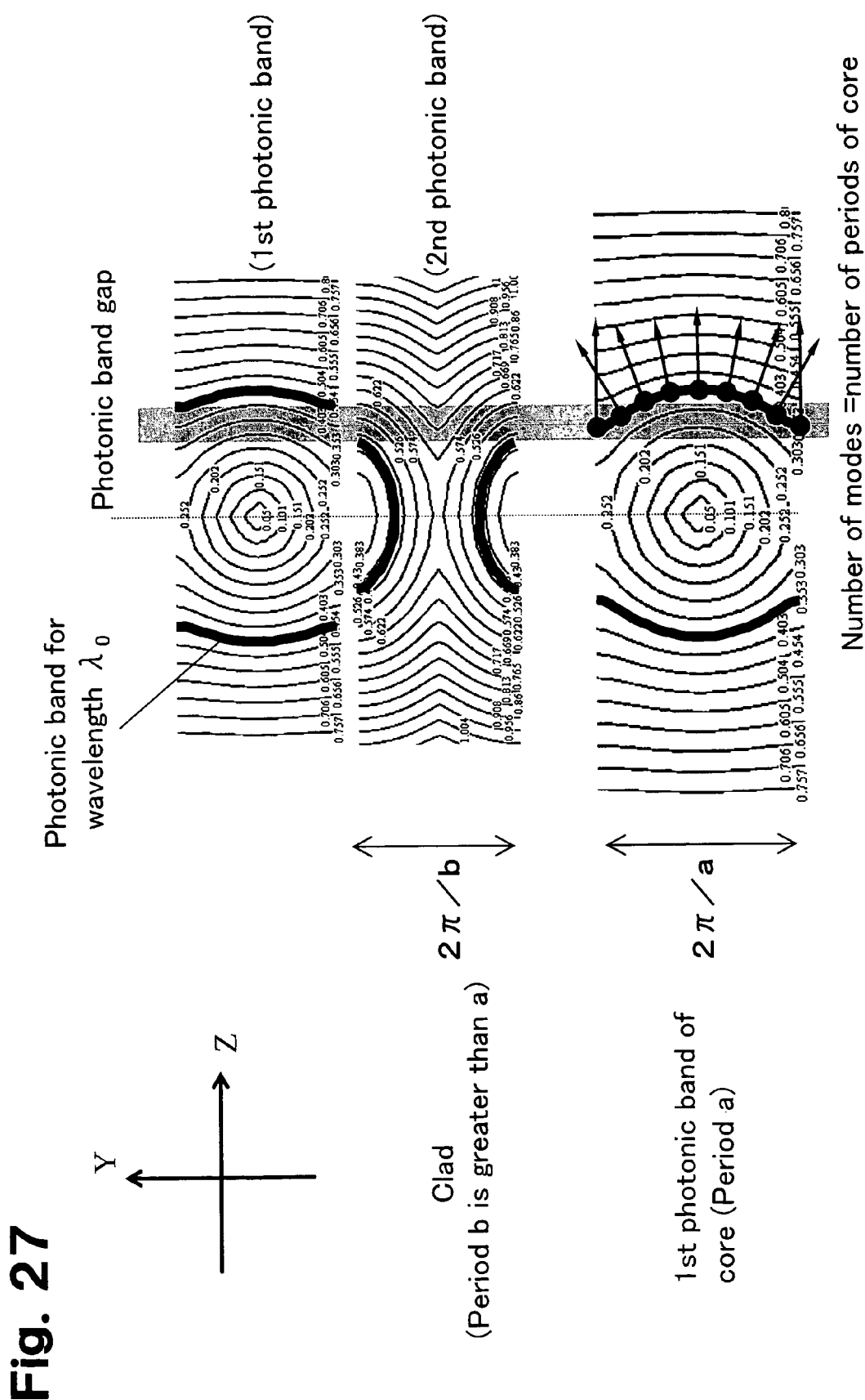
FIG. 27 is a band diagram when a core having period a is provided with a clad having period b (a<b)

FIG. 27 shows a photonic band diagram in which a cladding 202 having period b (a<b) and the same structure as the core 201 is provided adjacent to the core 201 having period a. It is apparent that, since the cladding 202 has a period slightly larger than that of the core 201, the PBG of the cladding 202 corresponding to a same normalized frequency overlaps with the modes N=m and N=(m−1) on the first band of the core 201, and only these two modes are confined. As the difference between the periods a and b is decreased, the PBG will further shift to the left side. Thus, it is possible to establish the single-mode condition for the m-order mode only. In theory, the single-mode condition can be established by reducing the difference between a and b, no matter how closely the m-order mode and the (m−1)-order mode approach to each other along with the increase of the number of modes of the core 201. However, according to the simulation conducted by the inventors, the confinement effect is deteriorated if a and b are too close, and the number of periods of the cladding 202 required for obtaining sufficient confinement will exceed 10, which is not practical at all. Accordingly, in actually designing a waveguide, various conditions to consider include:

the practical upper limit of the number of periods of the cladding 202;
the difference between a and b which enables sufficient confinement; and
the number of periods of the core 201 should be balanced. When a mode on the Brillouin zone boundary of the second band as shown in FIG. 26 is used, the period of the cladding 202 may be made slightly smaller than that of the core 201 to shift the PBG to the left side.

In order to realize the single-mode condition by adjusting the position of the PBG of the cladding 202, in addition to the method of:

forming the cladding 202 of a multilayer film having the same structure but a different period from the core 201, the following methods may be used singly or in combination:

the core 201 and the cladding 202 have the same period, while two types of media forming the multilayer films have different thicknesses;
the combination of media in the cladding 202 is differed from that in the core 201; and
the photonic crystal 50 is such that one period is formed by three or more layers.

Determination of confinement by means of a band diagram is based on an infinite periodic structure. Therefore, if the number of periods of a confinement photonic crystal of the cladding 202 is three or so, the confinement will be insufficient and let the propagated light leak out. It is of course not desirable to unnecessarily increase the number of periods in terms of the cost as well as durability and accuracy of the multilayer film. Desirably, the number of periods actually required should be determined based on experiments and electromagnetic waves simulations.

(XZ-Direction Mode)

Figure 28:
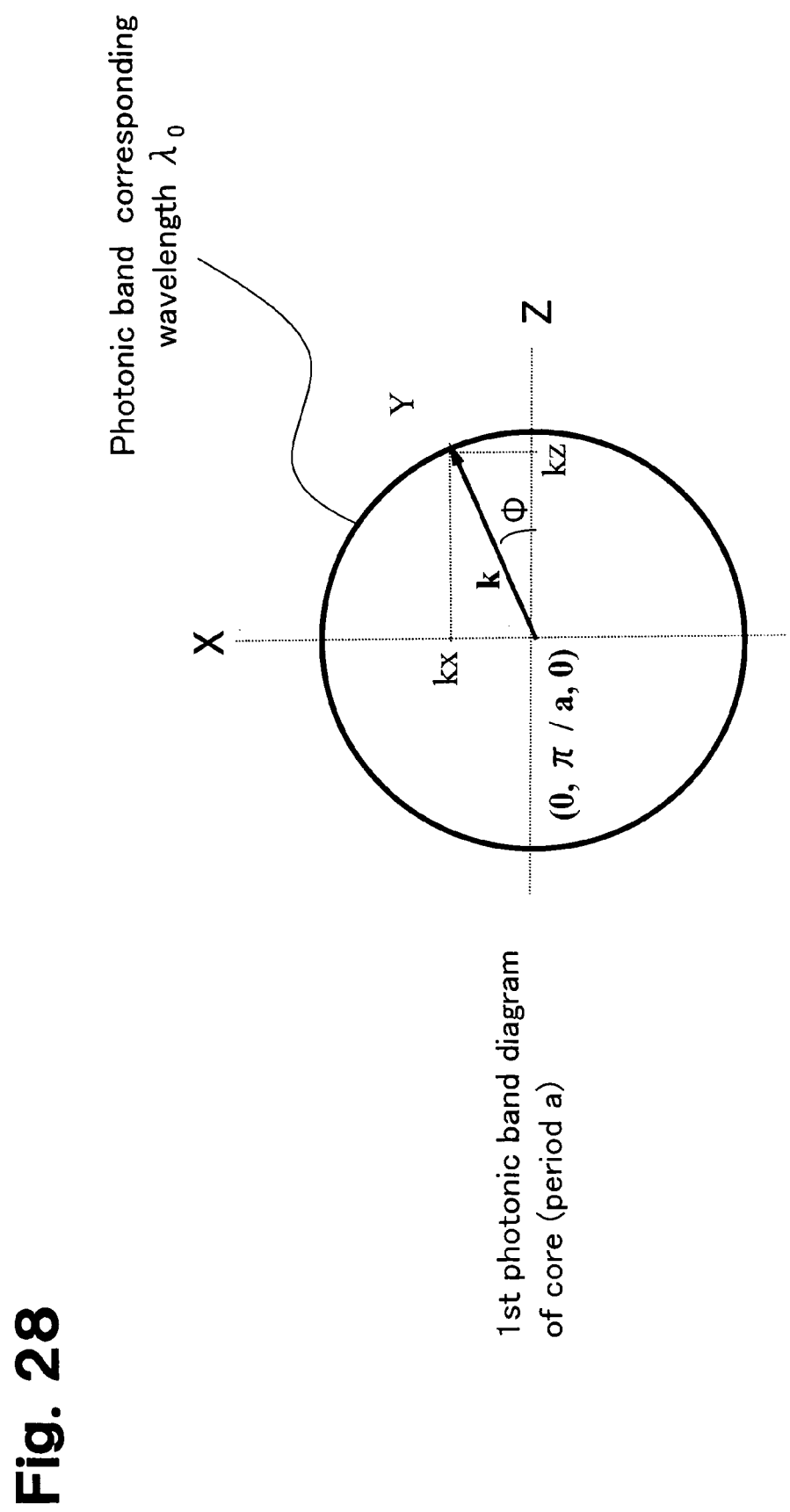
FIG. 28 is an explanatory diagram illustrating a Y-direction m-order mode band in the XZ-direction in reverse space.

In terms of the Y-direction, confinement in the XZ-plane of the propagated light is considered based on the single-mode condition in which only the m-order mode present on the Brillouin zone boundary exists in the one-dimensional photonic crystal. FIG. 28 shows the band of the Y-direction m-order mode in the XZ-direction in reverse space. Since there is no structure in the XZ-direction, the photonic band forms a circle. The wave vector is represented by:

$$k=(kx,\pi/a,kz)$$

where the radius $(kx^2+kz^2)^{0.5}$ of the circle in FIG. 28 is a fixed value.

Figure 29:
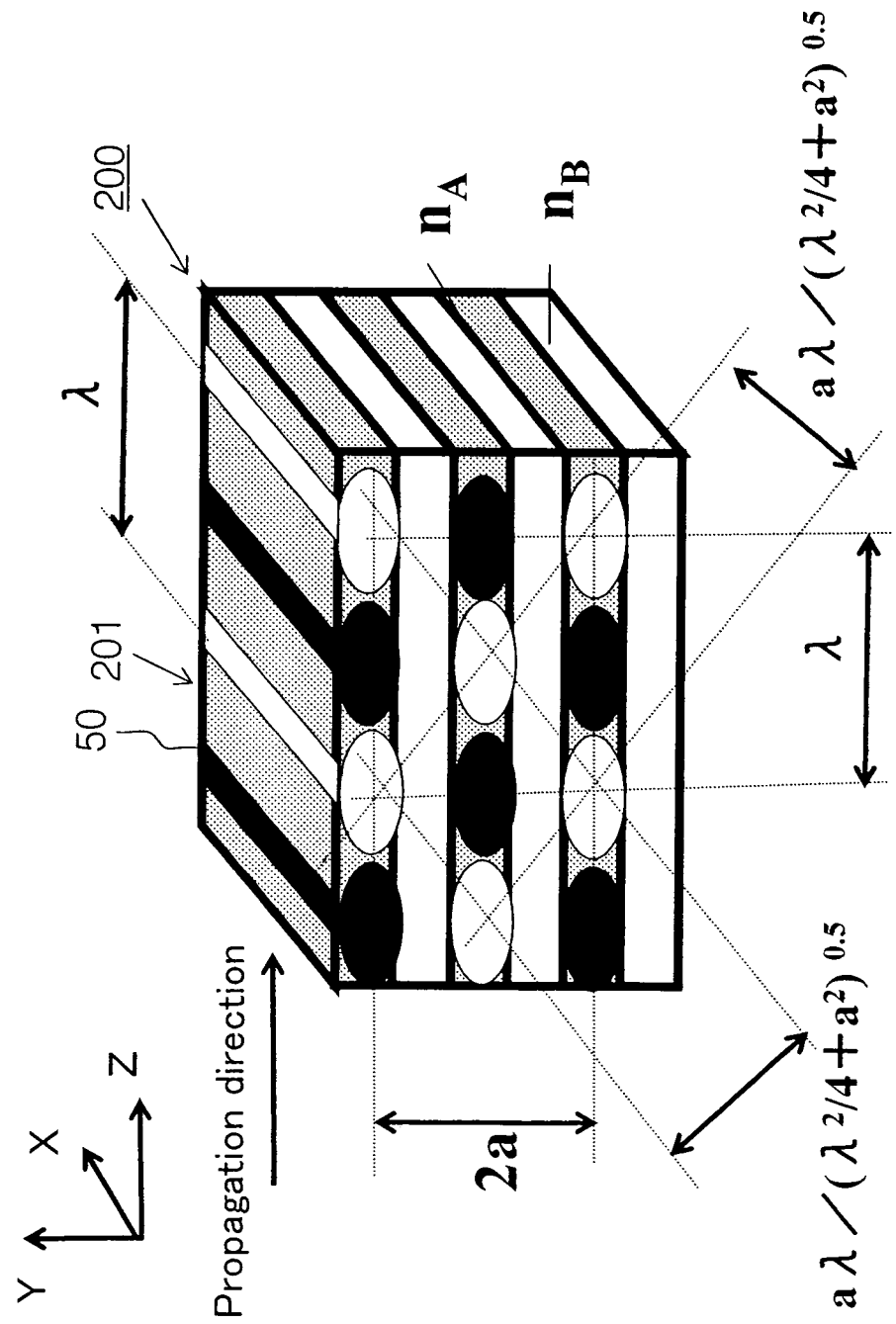
FIG. 29 is a diagram illustrating an electric field pattern that is exposed on a side face of the photonic crystal waveguide in the case of perpendicular incidence in Brillouin zone boundary propagation.

Here, consideration is given to a case in which "Y-direction m-order" waves travel in the Z-direction through the photonic crystal waveguide 200 that is a one-dimensional rectangular photonic crystal waveguide (see FIG. 29). A checked pattern of the electric field is exposed on the side face (parallel with the YZ-plane) of the photonic crystal waveguide 200, and the side face is in contact with a homogeneous medium (external medium) having a refractive index $n_s$. It is apparent from FIG. 29 that wavefronts corresponding to:

(a) period 2a
(b) period $\lambda$
(c) period $a\lambda/(\lambda^2/4+a^2)^{0.5}$ can be generated on the side face on the homogeneous medium side to cause leakage of light. However, in the case of the wavefront of (a) or (b), peaks and valleys with same intensity are arranged alternately on the wavefront to cancel each other, and thus the wavefront disappears. In other words, no leakage of light occurs. Accordingly, the leakage of light occurs only when the wavefront of (c) satisfy the condition of $$\lambda_0/n_s<a\lambda/(\lambda^2/4+a^2)^{0.5}.$$

Figure 30:
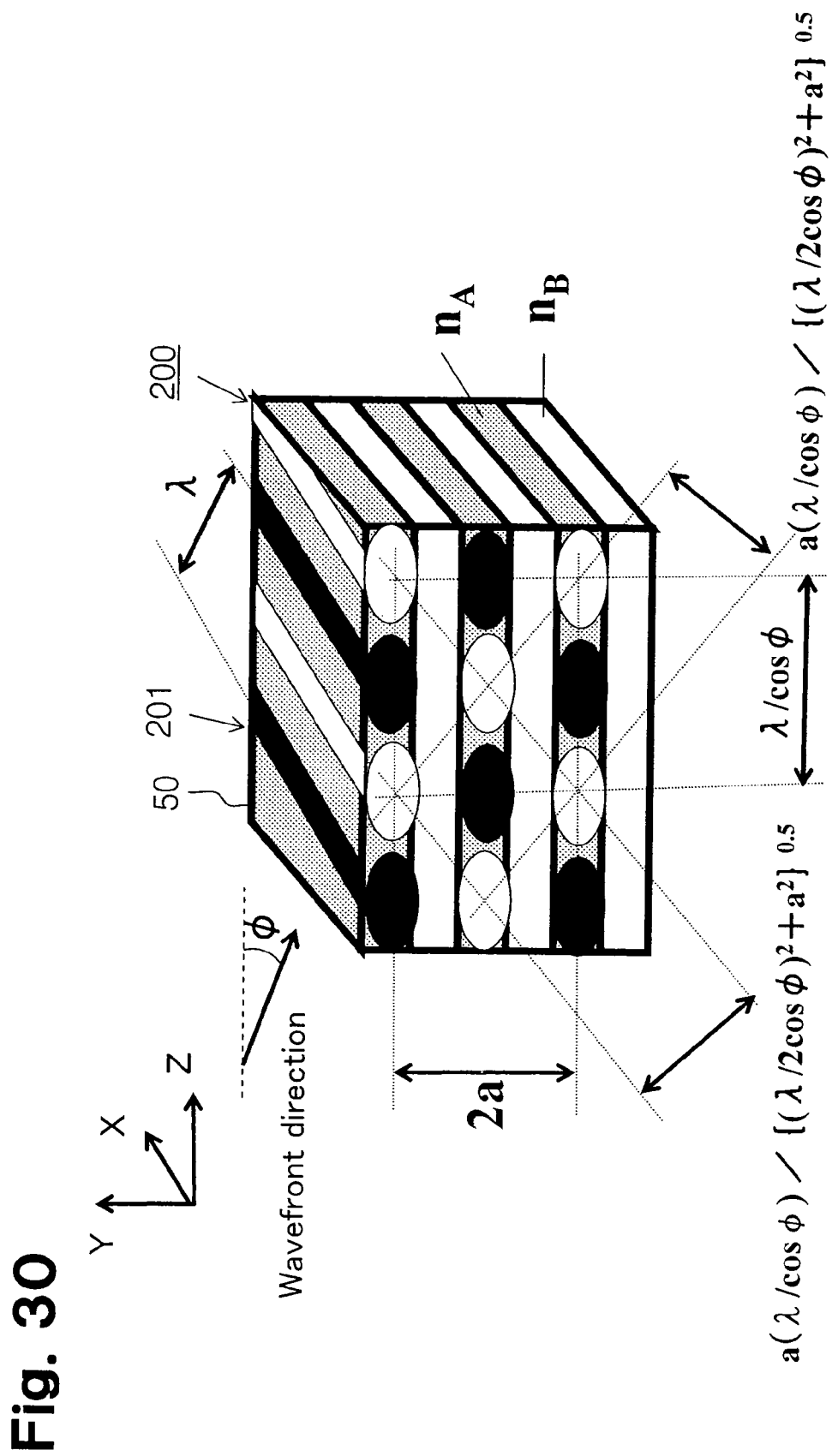
FIG. 30 is a diagram illustrating an electric field pattern that is exposed on a side face of the photonic crystal waveguide in the case of slant incidence in Brillouin zone boundary propagation.

FIG. 30 shows a more typical case in which propagated light travels inclined at a propagation angle φ relative to the Z-direction. Also in this case, wavefronts corresponding to:

(a) period 2a
(b) period $\lambda/\cos\phi$
(c) period $a(\lambda/\cos\phi)/\{(\lambda/2\cos\phi)^2+a^2\}^{0.5}$ can be generated on the side face on the homogeneous medium side to cause leakage of light. However, the leakage of light occurs only when the wavefront of (c) satisfies the condition of:

$$\lambda_0/n_s<a(\lambda/\cos\phi)/\{(\lambda/2\cos\phi)^2+a^2\}^{0.5} \quad \text{(Formula 7)}$$

Figure 31:
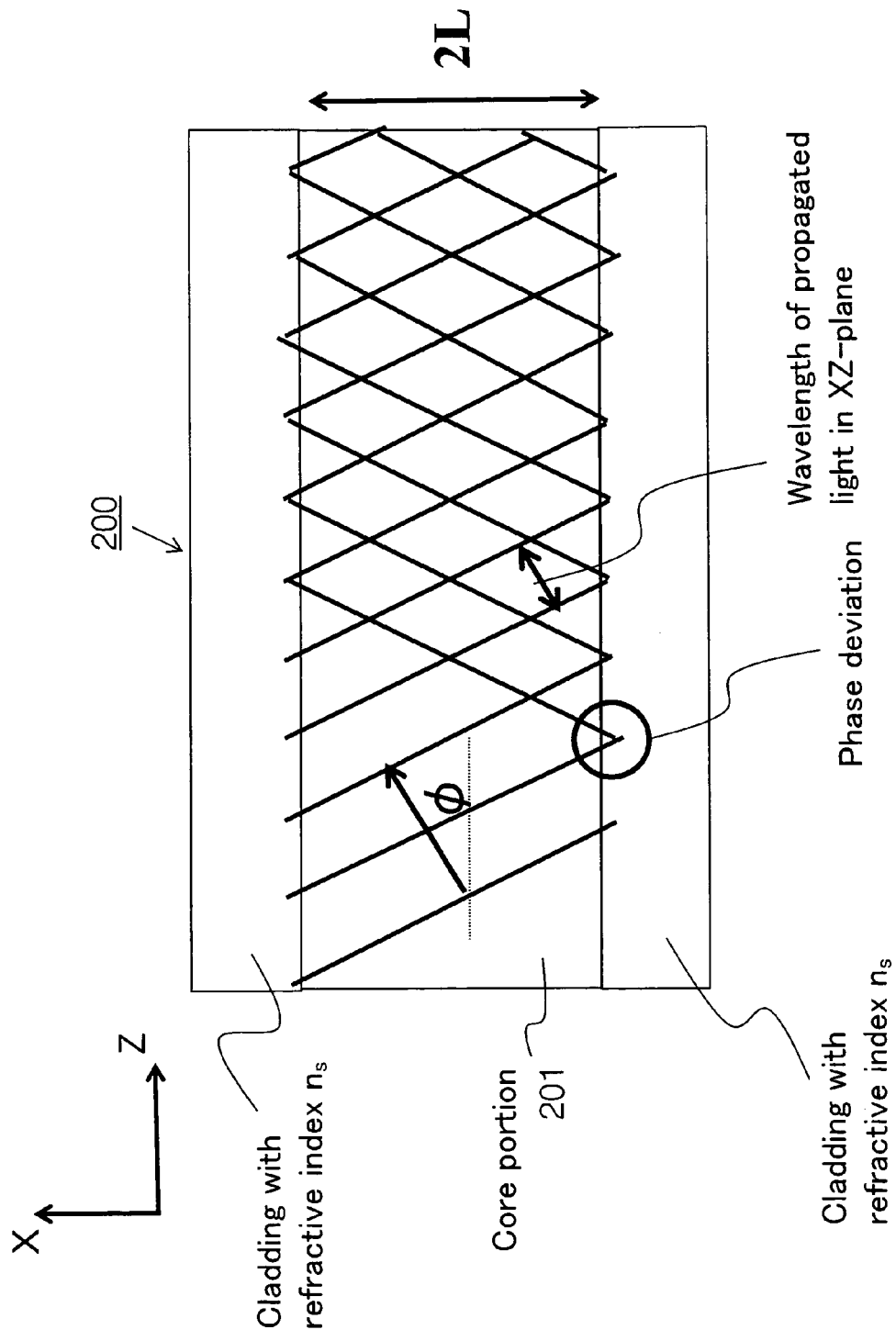
FIG. 31 is an explanatory diagram of phase matching conditions when light propagated in Brillouin zone boundary propagation travels inclined at a propagation angle $\phi$ relative to the Z-direction in the XZ-plane.

Consideration will now be given to the modes in the XZ-plane. When the waveguide width in the X-direction of the core 201 is represented by 2 L, the phase matching condition is represented by the equation based on FIG. 31:

$$2L(2\pi/\lambda)\sin\phi=\phi+\pi N (N=0, 1, 2, 3 \ldots) \quad \text{(Formula 8)}$$

Since the phase shift amount φ is between zero and π, Formula 8 can be rewritten as $$2L = (s+N)\lambda/(2\sin\phi)$$

assuming that φ=πs, and 0≦s≦1.

When a maximum value of the propagation angle φ causing confinement is represented by $\phi_0$, the range of 2 L required for presence of the zero-order and 1-order modes are:

$2L \geq s\lambda/2 \sin\phi_0$ for the presence of the zero-order mode; and $2L \geq (1+s)\lambda/2 \sin\phi_0$ for the presence of the 1-order mode.

Figure 32:
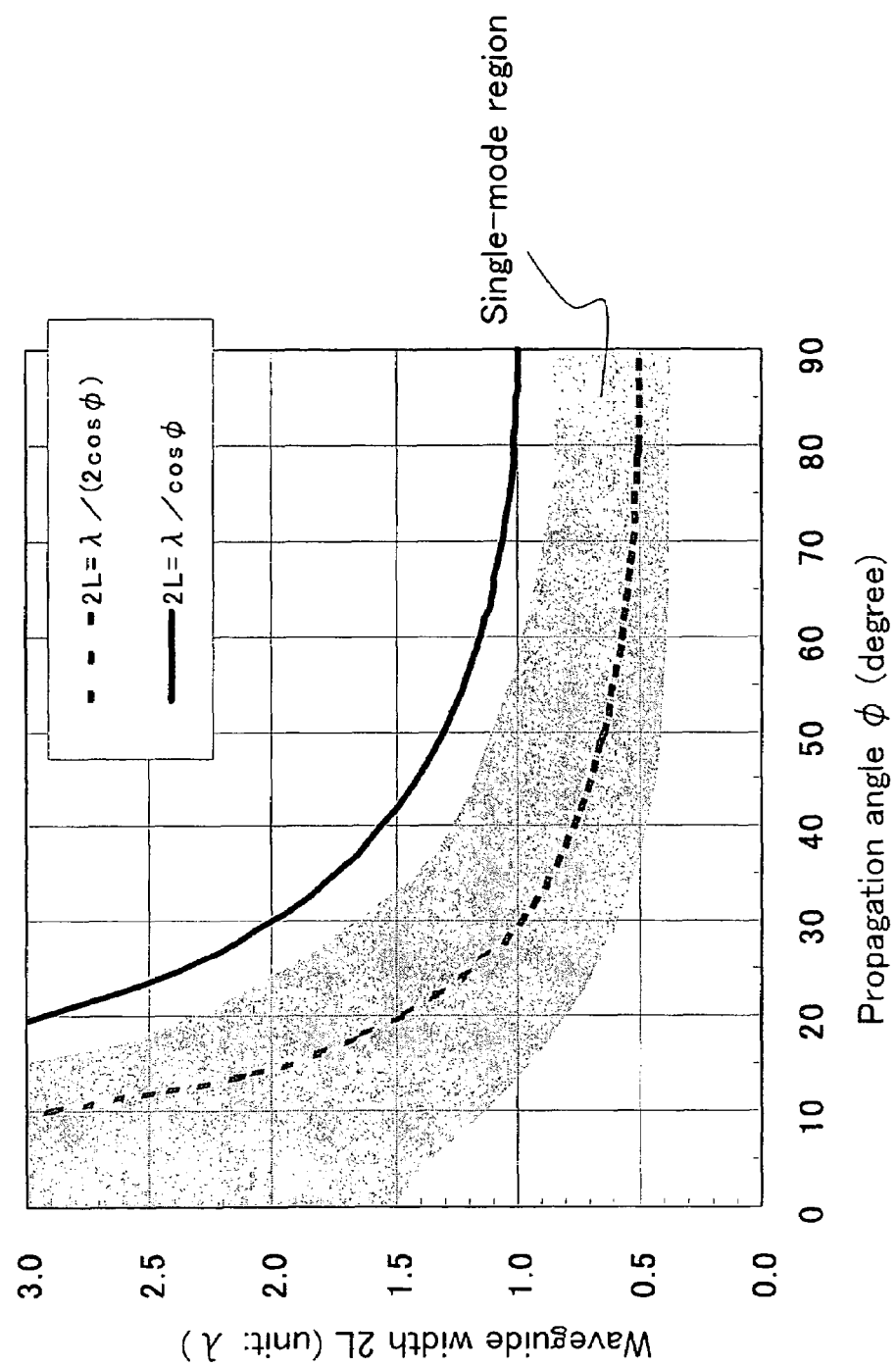
FIG. 32 is a graph schematically illustrating the range of 2 L satisfying the single-mode condition with respect to the propagation angle $\phi$ in the Brillouin zone boundary propagation.

The range of 2 L can be obtained based on the formulas above if the relation between the propagation angle φ and the phase shift amount φ is known. However, although the relation between φ and φ is known for a simple slab waveguide, it is not known yet for the light propagated in the photonic crystal such as in the present invention. However, according to the results of simulation described later, the electric field of propagated light is weakened rapidly outside of the boundary of the waveguide. Therefore, it can be assumed that φ is a value close to π in a relatively low-order mode such as zero-order or primary mode where φ is relatively small. The region where only the zero-order mode exits, or the range of 2 L satisfying the single-mode condition (single mode region) for a specific $\phi_0$ is schematically represented in FIG. 32. It is apparent from FIG. 32 that the requirement for the waveguide width 2L to satisfy the single-mode condition is represented by $$0 \leq 2L < \lambda/\cos\phi_0, \text{ and}$$

$$2L = \lambda/2 \cos\phi_0$$

is the sufficient condition.

Based on Formula 7, the confinement of waves with a propagation angle φ can be determined using the function:

$$f(\phi) = a(\lambda/\cos\phi)/\{(\lambda/2 \cos\phi)^2 + a^2\}^{0.5} - (\lambda_0/n_s) \quad \text{(Formula 8)}$$

If f(φ) is negative, the propagated waves will be confined in the core 201 of the photonic crystal waveguide 200, and if f(φ) is positive, the propagated waves will leak from the side face of the core 201.

Figure 33:
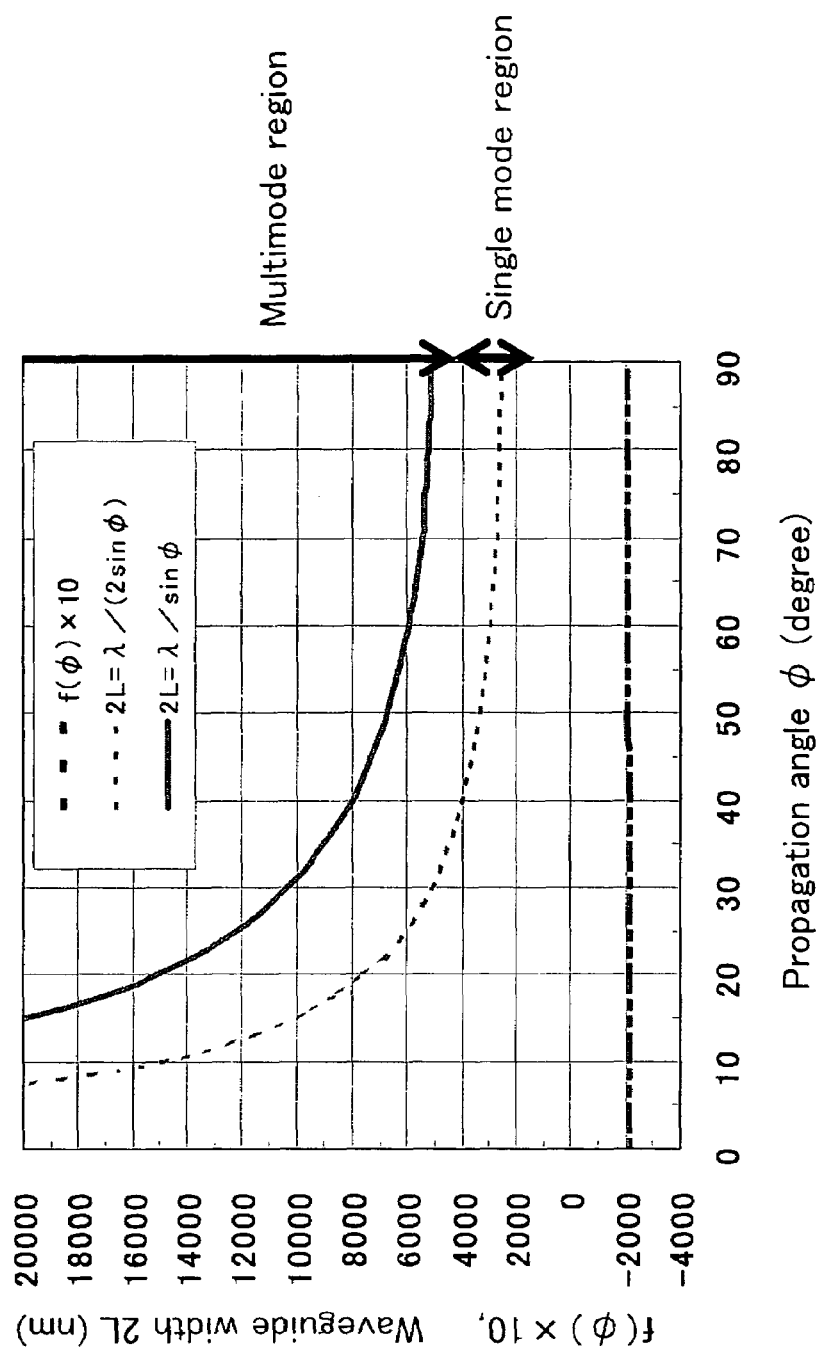
FIG. 33 is a graph schematically illustrating the range of 2 L satisfying the confinement condition and single-mode condition in the Brillouin zone boundary propagation.

FIG. 33 is a graph in which the propagation angle φ is plotted on the horizontal axis and f(φ), 2 L=λ/(2 sin φ), and 2 L=λ/sin φ are plotted on the vertical axis under the following conditions:

$\lambda_0 = 1550$ nm $a/\lambda_0 = 0.28$ $\lambda_0/\lambda = n_{\text{eff}} = 0.30$ $n_s = 1.45$.

As for f(φ), it only matters whether it is positive or negative. Therefore, f(φ) is magnified 10 times in the graph.

In FIG. 33, since f(φ) is always negative, the propagated light will never be able to exit from the side face of the core 201 regardless of the value of φ, and a perfect confinement state is established. In this case, the maximum value $\phi_0$ of φ causing the confinement is 90 degrees. Therefore, the range of 2 L satisfying the single-mode condition (single mode region) is present on the line of φ=90 degrees (see FIG. 32). When 2 L is greater than the range of the single-mode condition, the number of propagation modes is increased, but no leakage of light from the side face occurs.

Figure 34:
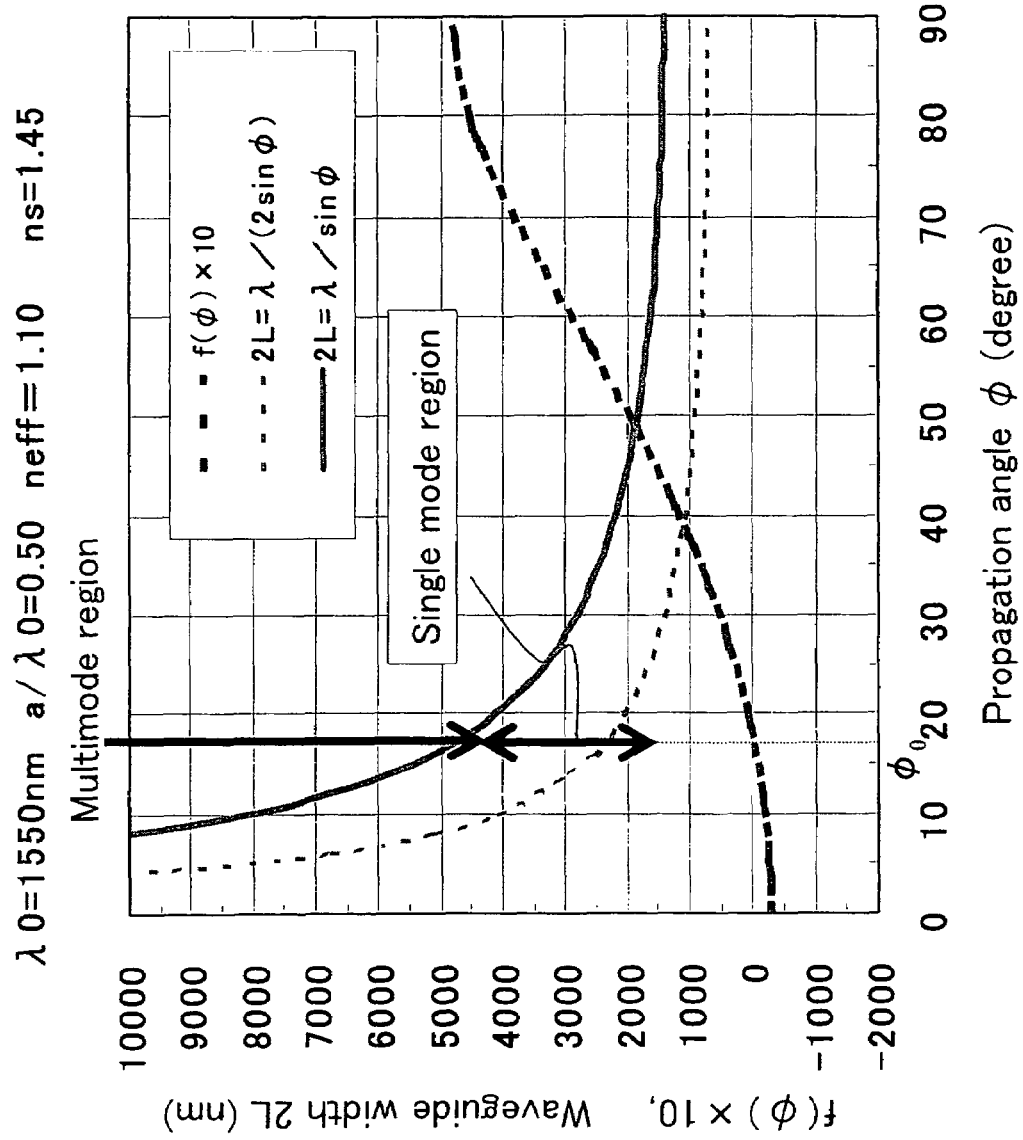
FIG. 34 is a graph similar to FIG. 33 under different conditions.

FIG. 34 is a graph when the conditions are:

$\lambda_0 = 1550$ nm $a/\lambda_0 = 0.50$ $\lambda_0/\lambda = n_{\text{eff}} = 1.1$ $n_s = 1.45$.

In FIG. 34, leakage of light occurs from the side face of the core 201 when φ is 17.3 degrees or greater. Accordingly, the region satisfying the single-mode condition (single mode region) is a region in which $\phi_0$ is 17.3 degrees. The value of $\phi_0$ defining the limit of the single-mode condition can be adjusted by varying the value of $n_s$.

Figure 35:
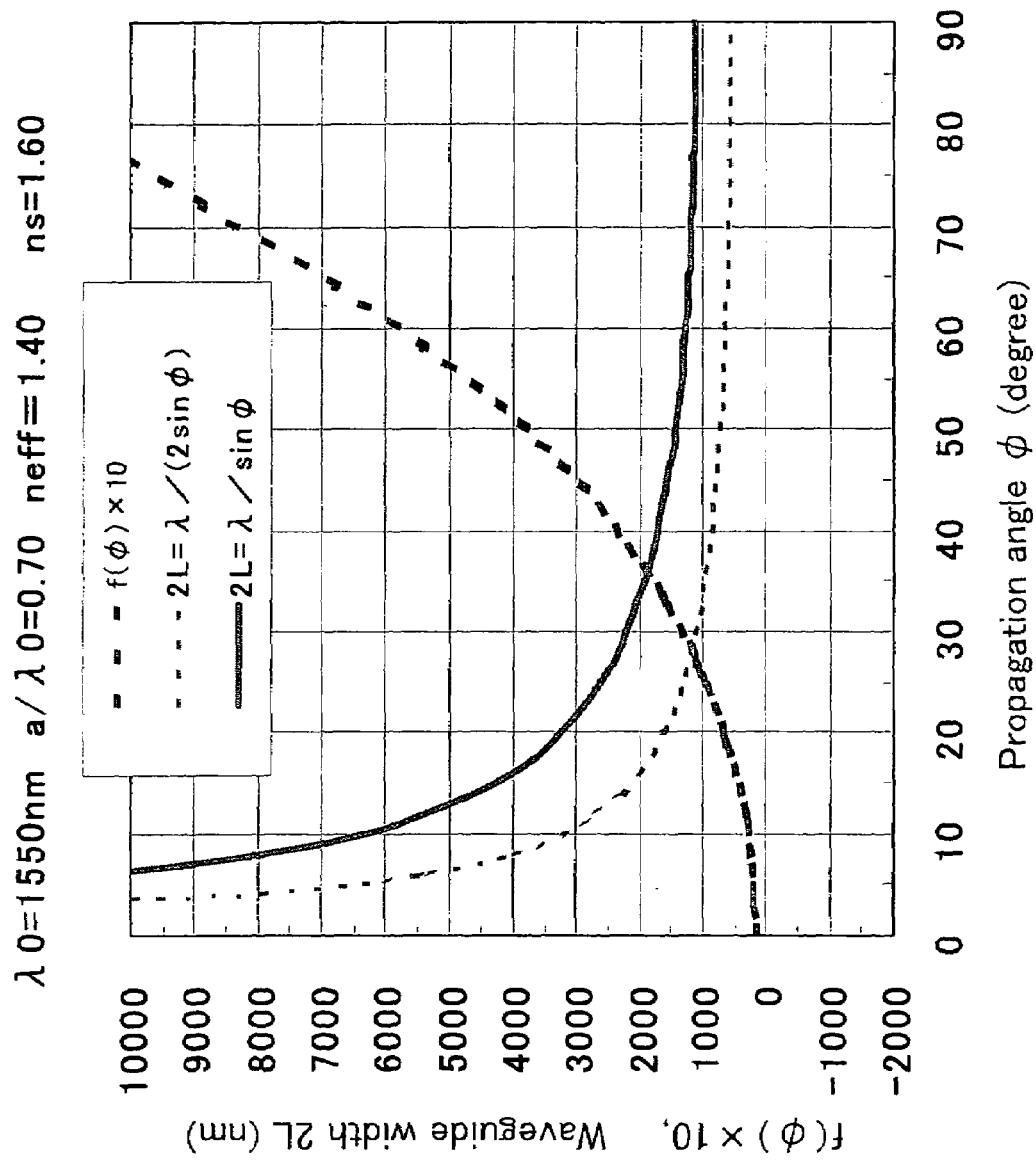
FIG. 35 is a graph similar to FIG. 33 under different conditions.

FIG. 35 is a graph when the conditions are:

$\lambda_0 = 1550$ nm $a/\lambda_0 = 0.70$ $\lambda_0/\lambda = n_{\text{eff}} = 1.40$ $n_s = 1.60$ In FIG. 35, since the value of f(φ) is always positive, all the modes including the zero-order mode cause leakage of light regardless of the value of 2 L, and hence light cannot be propagated for a long distance.

The first embodiment configured as described above has advantages as follows.

Summing up the findings described above, the photonic crystal waveguide 200 is able to provide several types of waveguides due to the intensity of confinement in the XZ-direction.

(1) "Perfect Confinement Single-Mode Waveguide"

The photonic crystal waveguide 200 is a "perfect confinement single-mode waveguide" when satisfying the requirement described below.

(Requirement)

The perfect confinement condition must be satisfied:

$$f(90°) = 2a - (\lambda_0/n_s) < 0$$

The waveguide width 2L is in the range:

$$s\lambda/2 \leq 2L < (s+1)\lambda/2$$

wherein, only the zero-order mode (N=0) exits in the phase matching conditions (Formula 7) when the propagation angle φ is 90 degrees. The phase shift amount is sπ when waves propagated through the core 201 are reflected by the side face of the core 201 at the maximum value $\phi_0$ of 90 degrees of the propagation angle φ that causes the confinement at the side face, and s is in the range 0≦s≦1.

The "perfect confinement single-mode waveguide" described above provides advantages as follows.

A steep bend is possible without changing the single-mode propagation, and the waveguide width is small. Therefore, the device can be made extremely compact.

Perfect confinement can be obtained in a region where $a/\lambda_0$ is a small value less than 0.5, $n_{\text{eff}}$ is relatively small, and dispersion and group velocity anomaly are large. Accordingly, this type of waveguide is suitable for a functional waveguide in which characteristics such as dispersion and group velocity anomaly are desirably large. The nonlinear effect will be enhanced in a region where the group velocity is low (dispersion is large). Therefore, it is possible to increase the characteristics of an optical device utilizing the nonlinear effect, or to reduce the optical path length.

(2) "Perfect Confinement Multimode Waveguide"

The photonic crystal waveguide 200 is a "perfect confinement multimode waveguide" when satisfying the requirement described below.

(Requirement)

The perfect confinement condition must be satisfied:

$$f(90°)=2a-(\lambda_0/n_s)<0$$

The waveguide width 2L is in the range:

$$(s+1)\lambda/2 \leq 2L$$

wherein first-order or higher-order mode exist in the phase matching conditions (Formula 7) when the propagation angle $\phi$ is 90 degrees. The phase shift amount is $s\pi$ when waves propagated through the core 201 are reflected by the side face of the core 201 at the maximum value $\phi_0$ of 90 degrees of the propagation angle $\phi$ that causes the confinement at the side face, and s is in the range $0 \leq s \leq 1$.

The "perfect confinement multimode waveguide" provides advantages as described below.

Light can be confined in the core 201 regardless of the propagation angle $\phi$. Thus, the waveguide is suitable for a resonator or the like.

The waveguide width need not be fixed and has no upper limit. Therefore, the resonator can be formed in a desirable shape.

The nonlinear effect will be enhanced in a region where the group velocity is low (dispersion is large). Therefore, it is possible to increase the characteristics of an optical device utilizing the nonlinear effect. It is also possible to used in combination with a resonator to perform laser oscillation or the like.

(3) "Imperfect Confinement Single-Mode Waveguide"

The photonic crystal waveguide 200 is an "imperfect confinement single-mode waveguide" when satisfying the requirement described below.

(Requirement)

A maximum value $\phi_0$ ($0<\phi_0<90°$) of the propagation angle must exist satisfying:

$$f(\phi)=a(\lambda/\cos\phi)/\{(\lambda/2\cos\phi)^2+a^2\}^{0.5}-(\lambda_0/n_s)=0$$

The waveguide width 2L is in the range:

$$s\lambda/2\cos\phi_0 \leq 2L < (s+1)\lambda/2\cos\phi_0$$

wherein, only the zero-order mode (N=0) exists in the phase matching condition (Formula 7) when the propagation angle $\phi$ is $\phi_0$ ($0<\phi_0<90°$). The phase shift amount is $s\pi$ when waves propagated through the core 201 are reflected by the side face of the core 201 at the maximum value $\phi_0$ of 90 degrees of the propagation angle $\phi$ that causes the confinement at the side face, and s is in the range $0 \leq s \leq 1$.

The "imperfect confinement single-mode waveguide" provides advantages as described below.

Although the condition may cause leakage of light depending on a propagation angle $\phi$, the single-mode condition is established because the waveguide width 2L is sufficiently small.

A steep bend is not possible because leakage of light occurs if the propagation angle $\phi$ exceeds the maximum value $\phi_0$ ($0<\phi_0<90°$) of the propagation angle. Desirably, the structure of the waveguide should be designed after checking the minimum bend radius by means of electromagnetic wave simulation or the like.

Confinement becomes imperfect in a region where $a/\lambda_0$ is a value greater than the perfect confinement condition, $n_{\text{eff}}$ is relatively large, and dispersion and group velocity anomaly are small. Accordingly, this type of waveguide is suitable as a simple waveguide in which the characteristics such as dispersion and group velocity anomaly are desirably small.

(4) "Imperfect Confinement Multimode Waveguide"

The photonic crystal waveguide 200 is an "imperfect confinement multimode waveguide" when satisfying the requirement described below.

(Requirement)

There exists a $\phi_0$ ($0<\phi_0<90°$) that satisfies:

$$f(\phi)=a(\lambda/\cos\phi)/\{(\lambda/2\cos\phi)^2+a^2\}^{0.5}-(\lambda_0/n_s).$$

The waveguide width 2L is in the range:

$$(s+1)\lambda/2\cos\phi_0 < 2L$$

wherein, the first-order or higher-order mode exists in the phase matching condition (Formula 7) when the propagation angle $\phi$ is $\phi_0$ ($0<\phi_0<90°$). The phase shift amount is $s\pi$ when waves propagated through the core 201 are reflected by the side face of the core 201 at the maximum value $\phi_0$ of 90 degrees of the propagation angle $\phi$ that causes the confinement at the side face, and s is in the range $0 \leq s \leq 1$.

The "imperfect confinement multimode waveguide" has advantages as described below.

Although confinement is ensured if the propagation angle $\phi$ is $\phi_0$ ($0<\phi_0<90°$) or smaller, a plurality of modes can be propagated due to a large waveguide width 2L.

A steep bend is not possible since the propagation angle $\phi$ exceeding $\phi_0$ ($0<\phi_0<90°$) will cause leakage of light. Desirably, the structure of the waveguide should be designed after checking the minimum bend radius by means of electromagnetic wave simulation or the like.

Although single-mode propagation is not obtained, the large waveguide width facilitates the coupling to an external plane wave. This type of waveguide can be utilized as a waveguide for guiding light to a detector, for example, which does not require single-mode propagation in particular.

SECOND EMBODIMENT

A description will now be made of confinement conditions in various directions, for the photonic crystal waveguide 200 described in the first embodiment above and illustrated in FIGS. 21 and 22, in terms of propagated light utilizing a photonic band at the Brillouin zone center.

(Y-Direction Mode)

Unlike the propagation using the "band on the Brillouin zone boundary" described above, the propagation mode is the zero-order mode of N=0 on the second band shown in FIG. 26. The "zero-order mode on the first band" shown in FIG. 25 is not used, because the characteristics thereof are close to those of ordinary plane waves.

(Single-Mode Condition in Y-direction)

Figure 36:
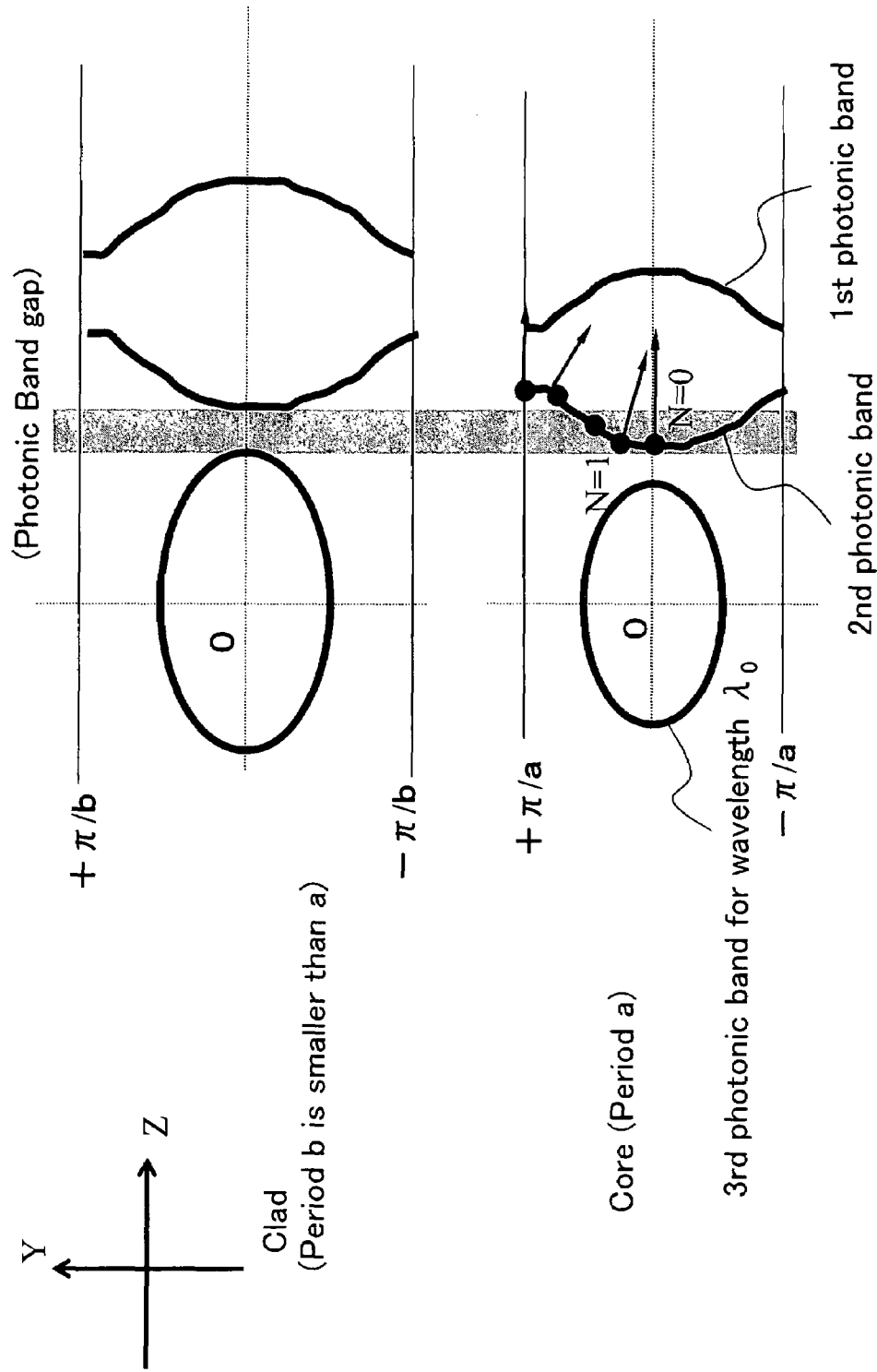
FIG. 36 is an explanatory diagram illustrating confinement by a PBG of the cladding.

Confinement is possible due to the difference in the refractive index if the effective refractive index of the propagation mode is greater than the refractive index of the upper and lower cladding medium. However, if the effective refractive index of the propagation mode is smaller, the cladding 202 need also to be formed of a photonic crystal, as in the photonic crystal waveguide 200 shown in FIG. 21, so that confinement is performed by the PBG (see FIG. 36). Specific conditions are the same as in the case of the "propagation on the Brillouin zone boundary". While the second band and the third band are in the relationship as shown in FIG. 36, the second band may overlap with the third band depending on the structure of the photonic crystal 50, and no PBG may exist.

(XZ-Direction Mode)

Figure 37:
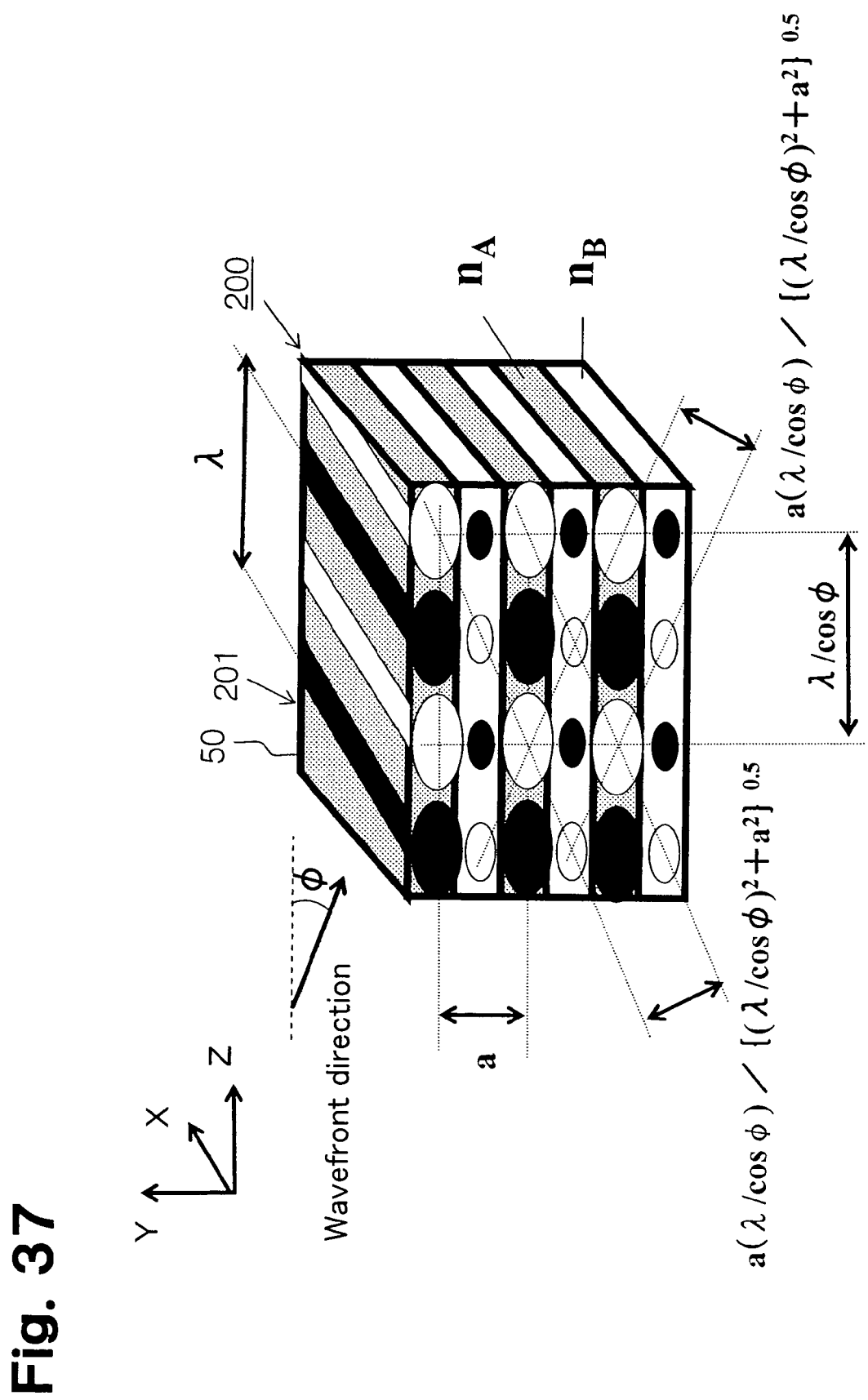
FIG. 37 is a diagram illustrating an electric field pattern that is exposed on a side face of the photonic crystal waveguide in the case of slant incidence in Brillouin zone central propagation according to a second embodiment of the present invention.

As shown in FIG. 37, a checkered electric field pattern is exposed on the side face (parallel to the YZ-plane) of the core 201 of the photonic crystal waveguide 200, in the same manner as the propagation on the Brillouin zone boundary. However, the period in the Y-direction is a, and the electric field of a high refractive index layer and the electric field of a low refractive index layer are asymmetrical and have different intensities. The side face is in contact with a homogeneous medium having refractive index $n_s$, and thus if the propagated light is inclined to the Z-direction by a propagation angle $\phi$, wavefronts corresponding to:

(a) period a
(b) period $\lambda/\cos \phi$
(c) period $a(\lambda/\cos \phi)/\{(\lambda/\cos \phi)^2+a^2\}^{0.5}$ may occur on the homogeneous medium side to cause leakage of light. While (a) will be cancelled by each other, (b) generates wavefronts due to asymmetry. Therefore, (b) and (c) may cause leakage of current, and leakage of current occurs when any of the conditions:

$\lambda_0/n_s < \lambda/\cos \phi$, and $\lambda_0/n_s < a(\lambda/\cos \phi)/\{(\lambda/\cos \phi)^2+a^2\}^{0.5}$ are satisfied. However, if the latter condition is satisfied, the former is always satisfied. Therefore, in practice, leakage of light can be determined based only on the former condition.

Confinement of waves having a propagation angle $\phi$ can be determined, based on the function:

$g(\phi)=\lambda/\cos \phi-(\lambda_0/n_s)$

If $g(\phi)$ is negative, the waves will be confined in the core 201 of the photonic crystal waveguide 200. In contrast, if $g(\phi)$ is positive, the waves will be leaked from the side face of the core 201. The function $g(\phi)$ is always positive when the propagation angle $\phi$ approaches 90 degrees (dispersed in $+\infty$). Thus, it is apparent that perfect confinement that does not depend on $\phi$ is impossible.

The mode in the XZ-plane can be defined similarly to the case of the "propagation on the Brillouin zone boundary".

Figure 38:
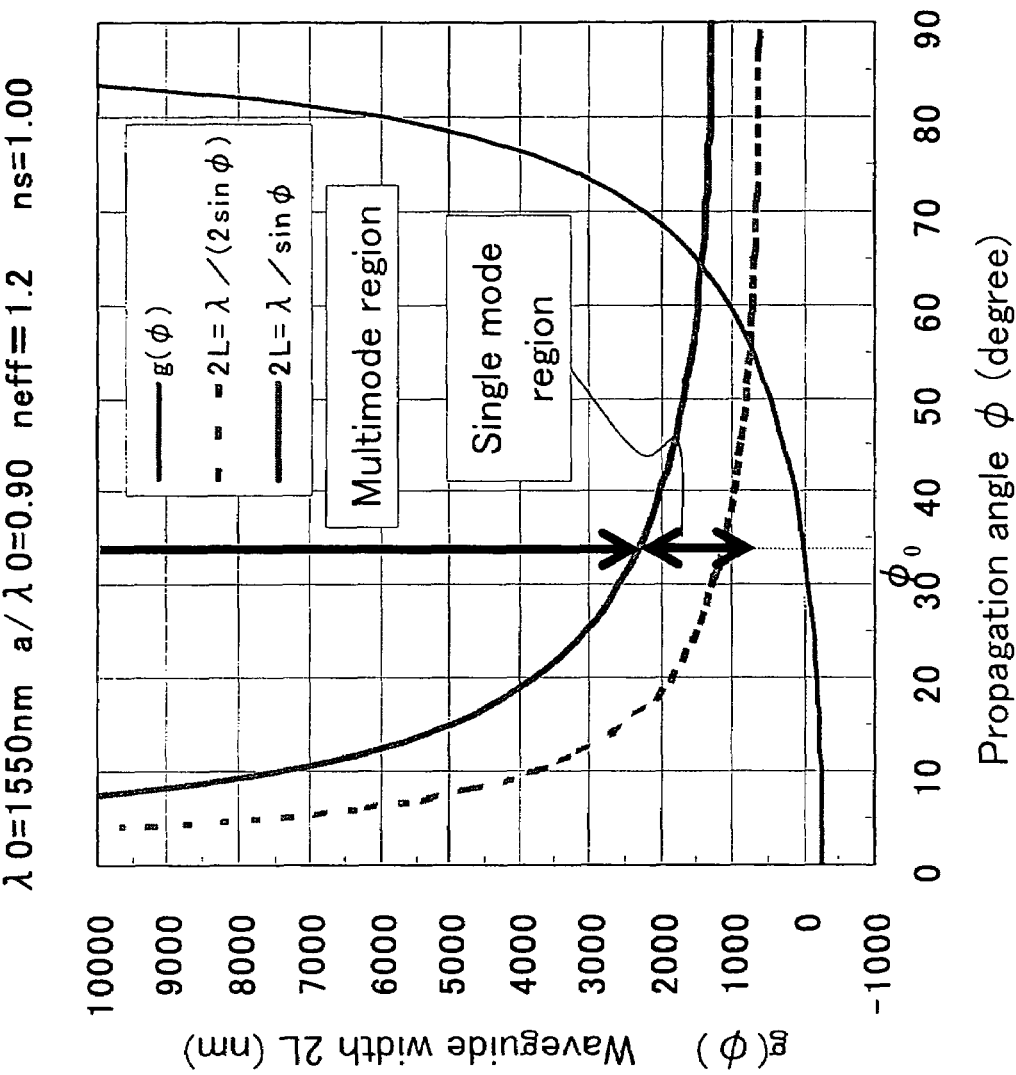
FIG. 38 is a graph schematically illustrating the range of 2 L satisfying a confinement condition in the Brillouin zone central propagation and a single-mode condition in relation to the propagation angle $\phi$.

FIG. 38 shows the case in which:

$\lambda_0=1550$ nm $a/\lambda_0=0.90$ $\lambda_0/\lambda=n_{eff}=1.2$ and $n_s=1.00$ In FIG. 38, light leaks from the side face of the core 201 when the propagation angle $\phi$ is 34 degrees or more. Accordingly, the region to satisfy the single-mode condition (single mode region) is in the range where the propagation angle $\phi$ is 34 degrees or less. The value of propagation angle $\phi$ that defines the limit of the single-mode condition can be adjusted by changing the value of $n_s$.

Figure 39:
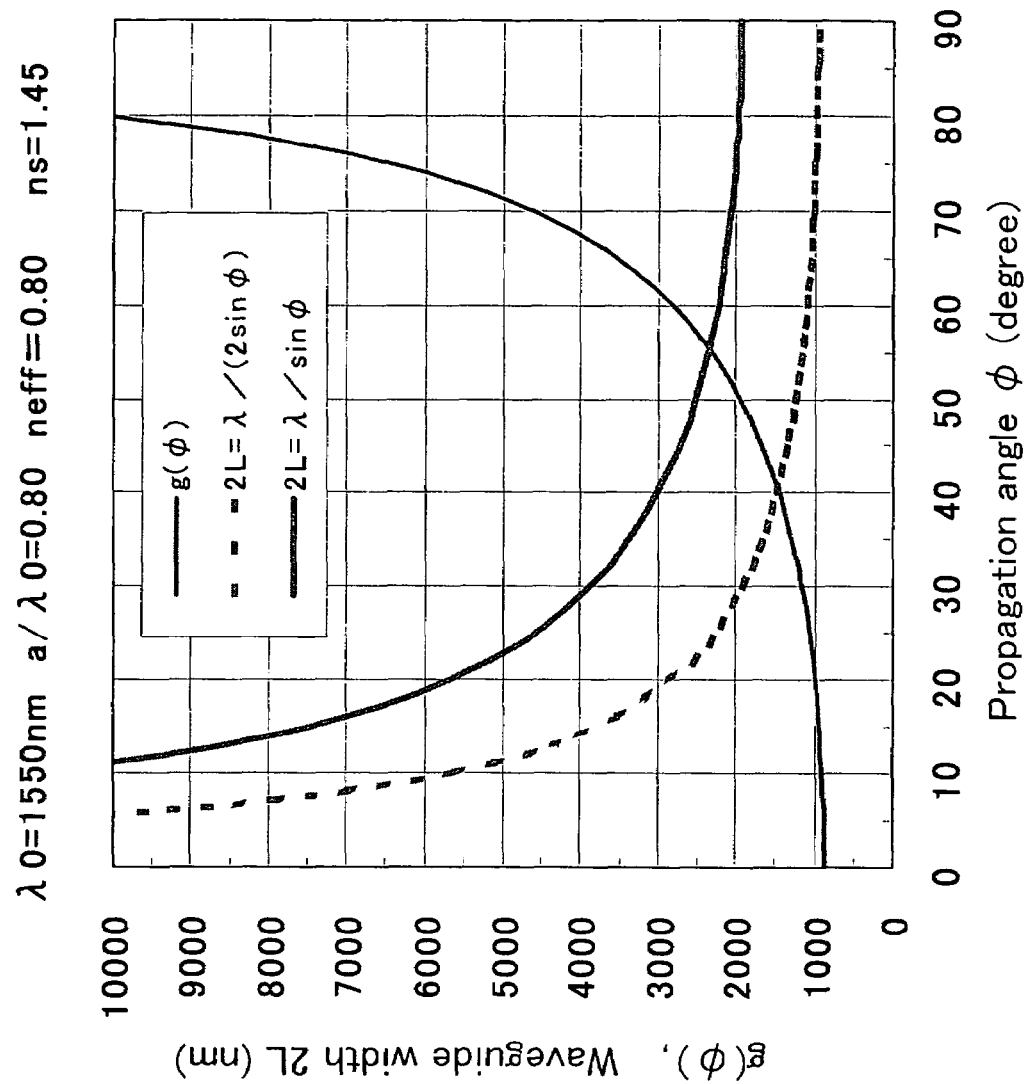
FIG. 39 is a similar graph to FIG. 38 under different conditions.

FIG. 39 shows the case in which:

$\lambda_0=1550$ nm $a/\lambda_0=0.80$ $\lambda_0/\lambda=n_{eff}=0.80$ and $n_s=1.45$ In FIG. 39, since $g(\phi)$ is always a positive value, all the modes including the zero-order mode causes leakage of light regardless of the value of 2 L, and light cannot be propagated for a long distance.

The second embodiment configured as described above has advantages as follows.

Summing up the findings described above, the photonic crystal waveguide 200 produces the following types of waveguide depending on the intensity of confinement in the XZ-direction.

(1) "Imperfect Confinement Single-Mode Waveguide"

The photonic crystal waveguide 200 can be an "imperfect confinement single-mode waveguide" by satisfying the following requirement.

(Requirement)

A maximum value $\phi_0(0<\phi_0<90°)$ of the propagation angle must exist establishing the equation:

$g(\phi)=\lambda/\cos \phi-(\lambda_0/n_s)=0$

The waveguide width 2L exists in the range:

$s\lambda/2 \cos \phi_0 \leq 2 L<(s+1)/2 \cos \phi_0$ wherein, only the zero-order mode (N=0) in the phase matching condition (Formula 7) exists when the propagation angle $\phi$ is $\phi=\phi_0(0<\phi_0<90°)$. However, the phase shift amount is $s\pi$ when waves propagated through the core 201 are reflected by the side face of the core 201 at the maximum value $\phi_0(0<\phi_0<90°)$ of the propagation angle, and s is in the range $0 \leq s \leq 1$.

The "imperfect confinement single-mode waveguide" configured in this manner provides advantages as described below.

Although leakage of light may occur depending on a propagation angle $\phi$, the single-mode condition is established since the waveguide width 2L is set sufficiently small.

A steep bend is not possible since leakage of light occurs when the propagation angle $\phi$ exceeds the maximum value $\phi_0$ $(0<\phi_0<90°)$. Desirably, the structure of the waveguide should be designed after checking the minimum bend radius by means of electromagnetic wave simulation or the like.

Reduction of $a/\lambda_0$ will produce a region where dispersion and group velocity anomaly are large. Accordingly, this type of waveguide is suitable for a functional device.

(2) "Imperfect Confinement Multimode Waveguide"

The photonic crystal waveguide 200 is an "imperfect confinement multimode waveguide" when satisfying the following requirement.

(Requirement)

A maximum value $\phi_0$ $(0<\phi_0<90°)$ of the propagation angle must exist establishing the equation:

$g(\phi)=\lambda/\cos \phi-(\lambda_0/n_s)=0$

The waveguide width 2L exists in the range:

$(s+1)\lambda/2 \cos \phi_0 \leq 2 L$ wherein, the first-order or higher-order mode in the phase matching condition (Formula 7) exits when the propagation angle $\phi$ is $\phi=\phi_0(0<\phi_0<90°)$. However, the phase shift amount is $s\pi$ when waves propagated through the core 201 are reflected by the side face at the maximum value $\phi_0$ ($0<\phi_0<90°$) of the propagation angle, and s is in the range $0 \leq s \leq 1$.

The "imperfect confinement multimode waveguide" configured in this manner provides effects as described below.

The waveguide width 2L is of a magnitude enabling existence of the first-order or higher-order mode.

A steep bend is not possible since leakage of light occurs when the propagation angle $\phi$ exceeds the maximum value $\phi_0$($0<\phi_0<90°$). Desirably, the structure of the waveguide should be designed after checking the minimum bend radius by means of electromagnetic wave simulation or the like.

Although single-mode propagation is not obtained, the wide waveguide width facilitates the coupling to an external plane wave. This type of waveguide can be used as a waveguide for guiding light to a detector for example in which single-mode propagation is not necessarily required.

THIRD EMBODIMENT

Figure 40:
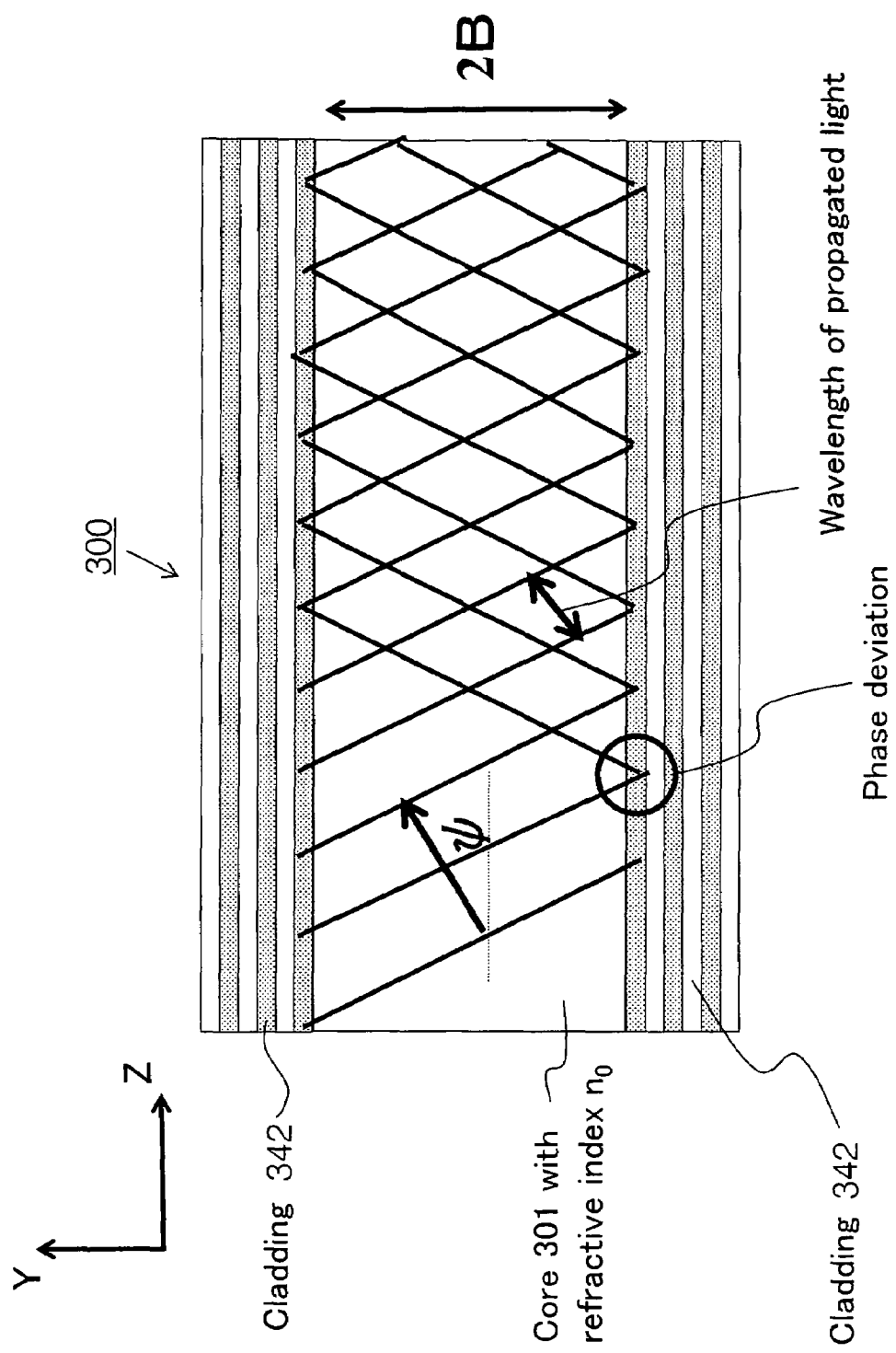
FIG. 40 is a schematic diagram illustrating propagation of light in a waveguide according to a third embodiment of the present invention.

A description will now be made of a third embodiment in which the present invention is applied to a waveguide the core of which is formed of a homogeneous material. As shown in FIG. 40, a homogeneous medium waveguide 300 according to this embodiment is formed of a homogeneous material of refractive index $n_0$ having a limited thickness in one direction (Y-direction), and includes a core 301 which propagates electromagnetic waves in a direction perpendicular to the one direction (XZ-plane direction), and a cladding 342.

The cladding 342 is formed by a one-dimensional photonic crystal having periodically in the Y-direction (the one direction), on the opposite surfaces of the of core 301 perpendicular to the Y-direction. The cladding 342 is a confinement cladding which prevents electromagnetic waves propagated through the core 301 from leaking outside from the surfaces perpendicular to the Y-direction (the upper and lower surfaces).

Confinement of light in the vertical direction (Y-direction) and lateral direction (X-direction) is also necessary in the configuration of such homogeneous medium waveguide 300.

The following description will be made of the confinement conditions in the respective directions for the homogeneous medium waveguide 300, in terms of propagated light utilizing a high-order mode in the Y-direction.

The core 301 formed of a homogeneous material with a refractive index $n_0$ has a thickness 2B in the Y-direction and has the cladding 342 formed on the opposite side faces. The propagation angle of a wavefront in the core 301 is represented by $\psi$ (see FIG. 40). The phase matching condition for waves propagated through the core 301 is represented by:

$$2B(2\pi n_0/\lambda_0)\sin \psi = \phi + \pi N (N=0, 1, 2, 3 \ldots).$$

The phase shift amount $\phi$ is between zero and $\pi$. Therefore, if and $\phi=\pi s$, and $0 \leq s \leq 1$, the propagation angle $\psi$ of the mode is represented by:

$$\sin \psi = \lambda_0(s+N)/4Bn_0$$

Figure 41:
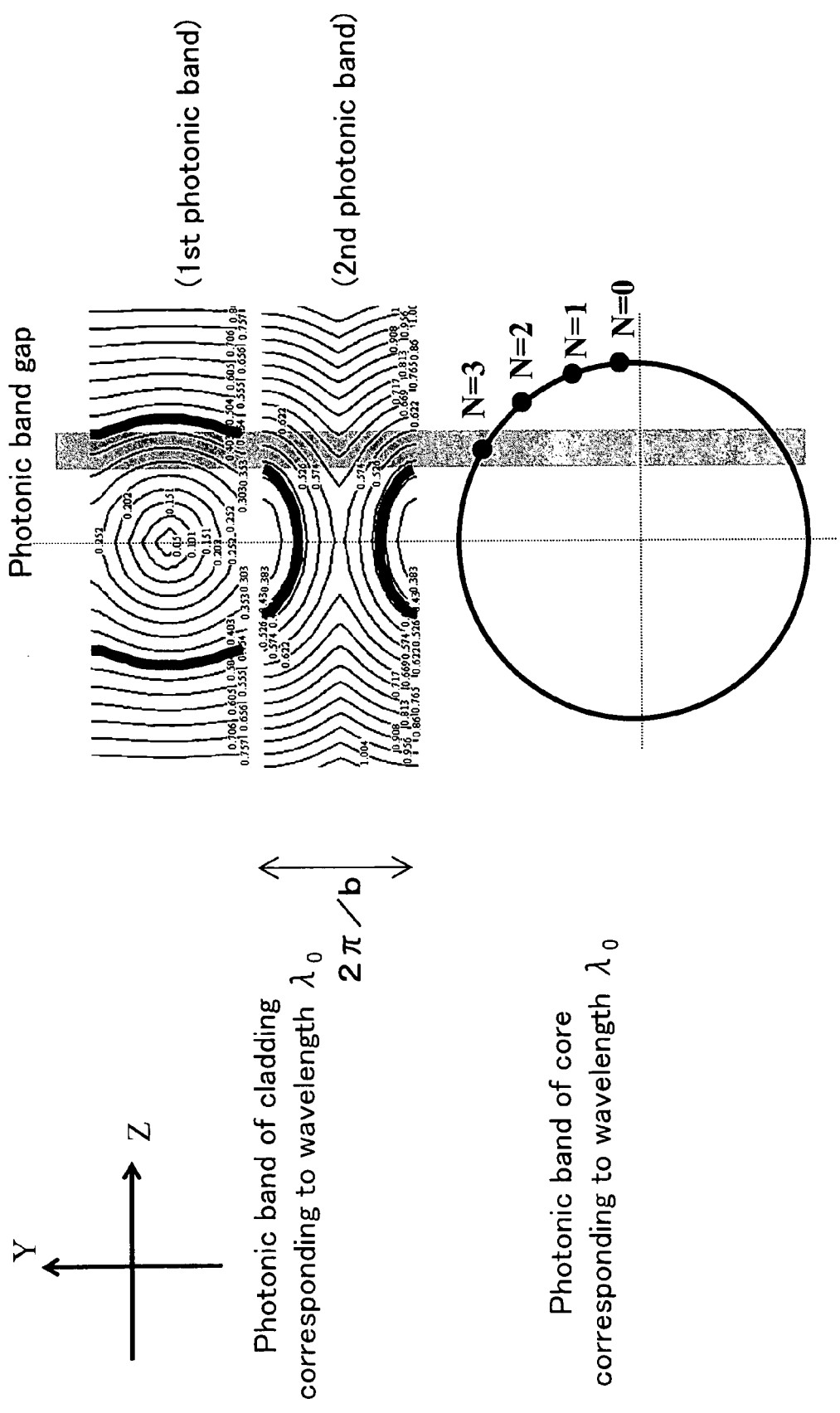
FIG. 41 is an explanatory diagram illustrating a mode in the band diagram of the core shown in FIG. 40.

The modes are distributed in the photonic band diagram (assumes the shape of a simple circle) of the core as shown in FIG. 41. FIG. 41 shows the case in which four modes exist. As the thickness 2B of the core is increased, the number of modes is increased.

If formed of a homogeneous material having a refractive index lower than $n_0$, the cladding 342 is only possible to confine lower-order modes. In contrast, when the cladding 342 is formed of the above-mentioned one-dimensional photonic crystal to use its photonic bandgap for confinement, it becomes possible to confine only specific high-order modes as shown in FIG. 41.

(XZ-Direction Mode)

Figure 42:
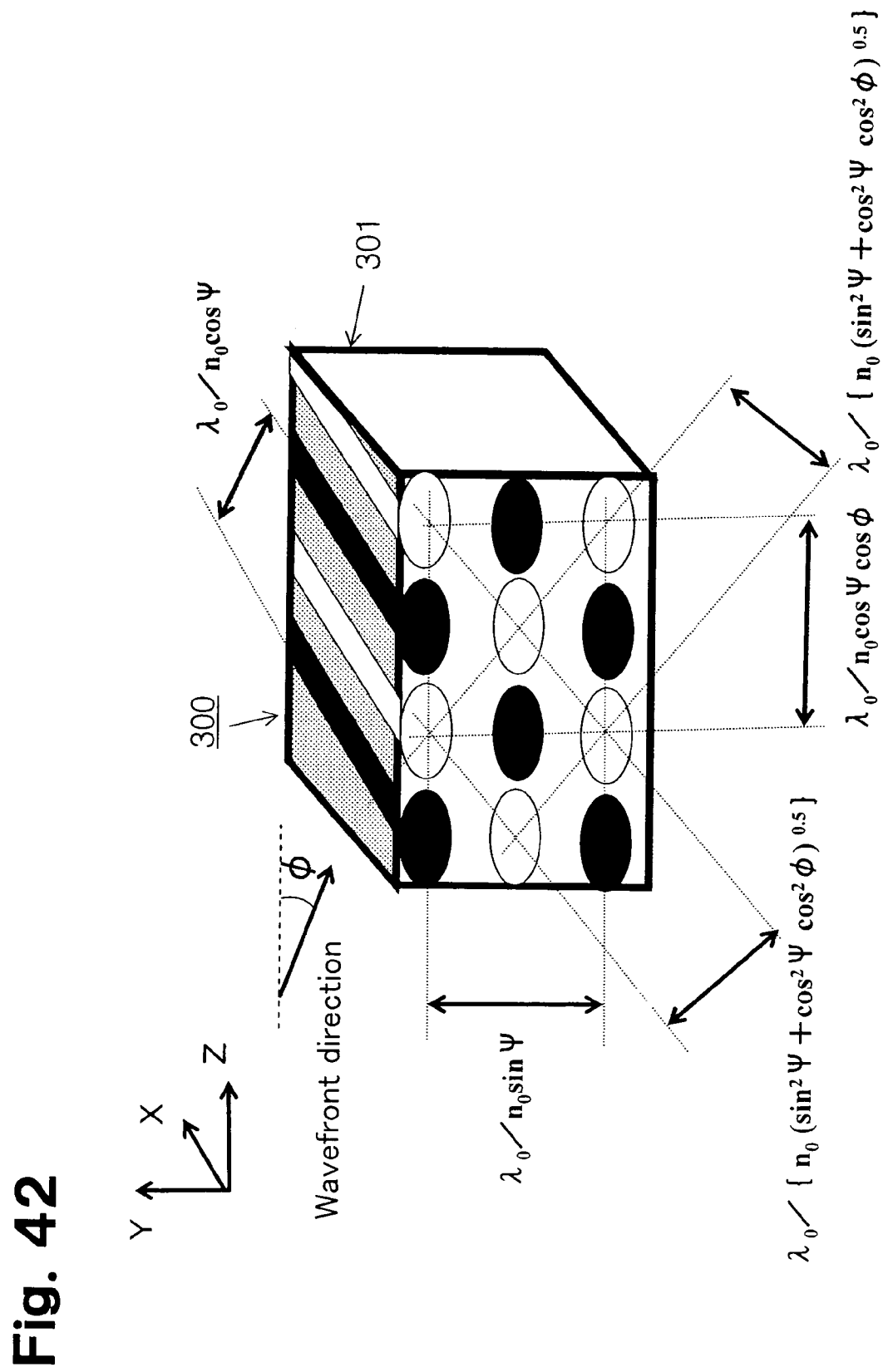
FIG. 42 is an explanatory diagram illustrating an electric field pattern that is exposed on a side face of the core when high-order mode propagated light travels inclined at a propagation angle $\phi$ in the XZ-plane.

As for the Y-direction, consideration is given to confinement in the XZ-plane of light propagated through the core 301 based on the single-mode condition in which there exists in the core 301 only a single high-order mode (a propagation angle $\psi$ in the Y-direction mode, and a wavelength in the XZ-plane $\lambda=\lambda_0/n_0 \cos \psi$) that is present on the Brillouin zone boundary. Similarly to the core of the photonic crystal according to the first and second embodiments described above, an electric field in checkered pattern is exposed when viewing the high-order mode propagated light traveling in the Z-direction through the core 301 in a cross-section parallel to the Y-direction (see FIG. 42). When the high-order mode propagated light travels inclined at a propagation angle $\phi$ with respect to the longitudinal direction of the waveguide, wavefronts corresponding to:

(a) period $\lambda_0/(n_0 \sin \psi)$ (b) period $\lambda_0/(n_0 \cos \psi \cos \psi)$ and (c) period $\lambda_0/\{n_0(\sin^2 \psi + \cos^2 \psi \cos^2 \phi)\}^{0.5}$ may occur on the homogeneous medium side to cause leakage of light. However, the leakage of light occurs only when the wavefront of (c) satisfies the condition:

$$n_s > n_0(\sin^2 \psi + \cos^2 \psi \cos^2 \phi)^{0.5} \qquad \text{(Formula 9)},$$

which is obtained by modifying the formula:

$$\lambda_0/n_s < \lambda_0/\{n_0(\sin^2 \psi + \cos^2 \psi \cos^2 \phi)\}^{0.5}$$

Next, consideration is given to the modes in the XZ-plane. When the waveguide width in the X-direction of the core 301 shown in FIG. 40 is represented by 2 L, the phase matching condition can be represented by (see FIG. 31):

$$2 L(2\pi/\lambda)\sin \phi = \phi + \pi N (N=0, 1, 2, 3 \ldots)$$

Since the phase shift amount $\phi$ is between zero and $\pi$, the above equation can be modified, by setting $\phi=\pi s$ and $0 \leq s \leq 1$, to obtain:

$$2 L=(s+N)\lambda/(2 \sin \phi)$$

As described above, the region where only the zero-order mode exists, or the range of 2 L satisfying the single-mode condition for a specific $\phi_0$ is schematically illustrated as in FIG. 32. It is apparent from FIG. 32 that the requirement for the waveguide width 2L to satisfy the single-mode condition is:

$$0 < 2 L < \lambda/\sin \phi$$

and the sufficient condition is:

$$2 L=\lambda/2 \sin \phi$$

On the basis of Formula 9, the confinement of waves with a propagation angle $\phi$ can be determined based on the function:

$$h(\phi)=n_s - n_0(\sin^2 \psi + \cos^2 \psi \cos^2 \phi)^{0.5}.$$

If the function $h(\phi)$ is negative, waves propagated through the core 301 are confined in the core 301. If $h(\phi)$ is positive, the waves will leak from the side faces of the core 301.

Figure 43:
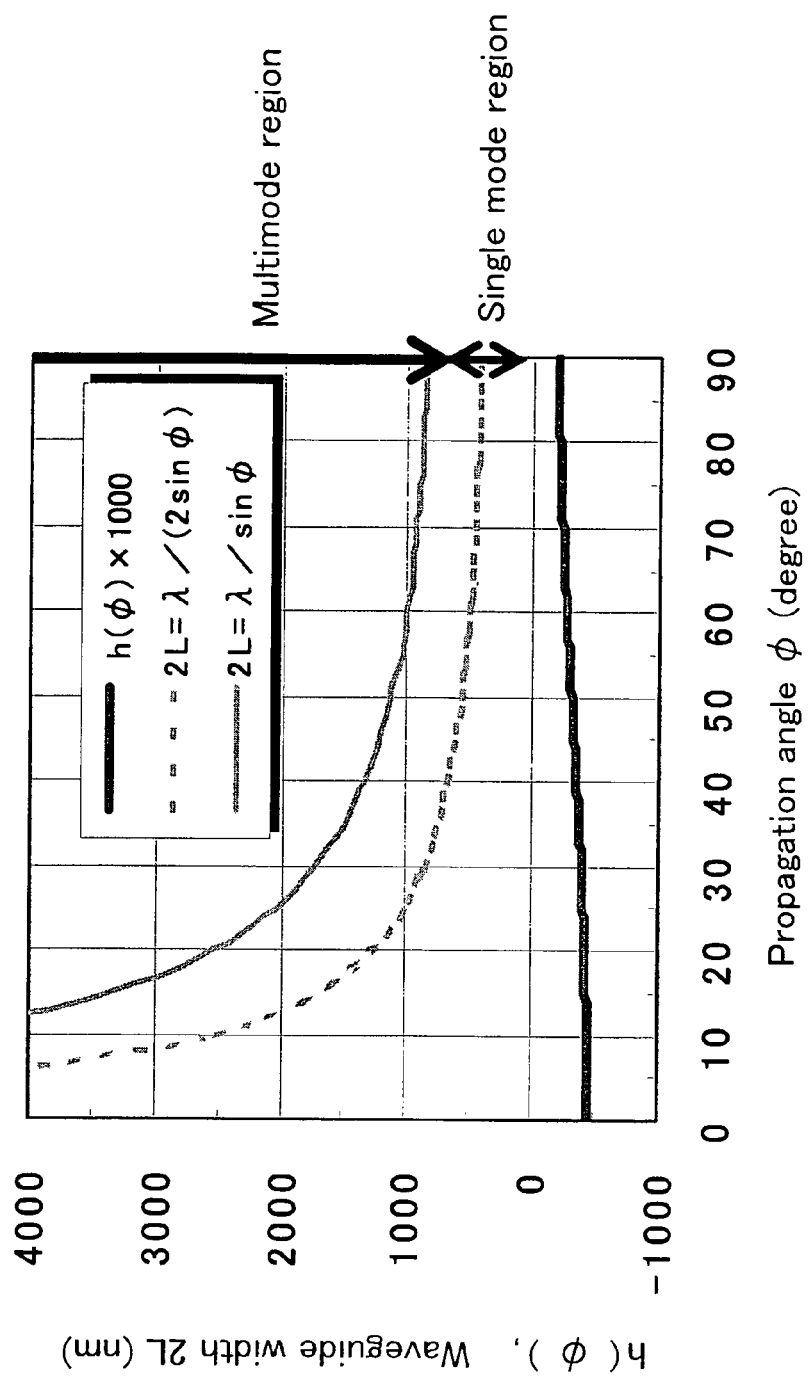
FIG. 43 is a graph schematically illustrating the range of 2 L satisfying the confinement condition of the core shown in FIG. 40 and the single-mode condition in relation to the propagation angle $\phi$.

FIG. 43 is a graph in which the propagation angle $\phi_0$ is plotted along the horizontal axis and $h(\phi)$, $2L=\lambda/(2\sin\phi)$ and $2L=\lambda/\sin\phi$ are plotted along the vertical axis under the conditions:

$$\lambda_0 = 1550 \text{ nm}$$

$$\psi = 56°$$

$$n_s = 1.45 \text{ and}$$

$$n_0 = 1.00$$

As for $h(\phi)$, it only matters whether it is positive or negative. Therefore, $h(\phi)$ is magnified 1000 times in the graph.

In FIG. 43, $h(\phi)$ is always negative. Therefore, the propagated light is never able to go out from the side faces regardless of the value of $\phi$, and hence a perfect confinement state is established. In this case, the maximum value $\phi_0$ of $\phi$ at which confinement is obtained is 90 degrees, and hence the range of 2 L satisfying the single-mode condition (single mode region) is on the line of $\phi=90$ degrees (see FIG. 43). Additionally, although the number of propagation modes is increased if 2 L becomes greater than the range for the single-mode condition, no light will leak from the side faces.

Figure 44:
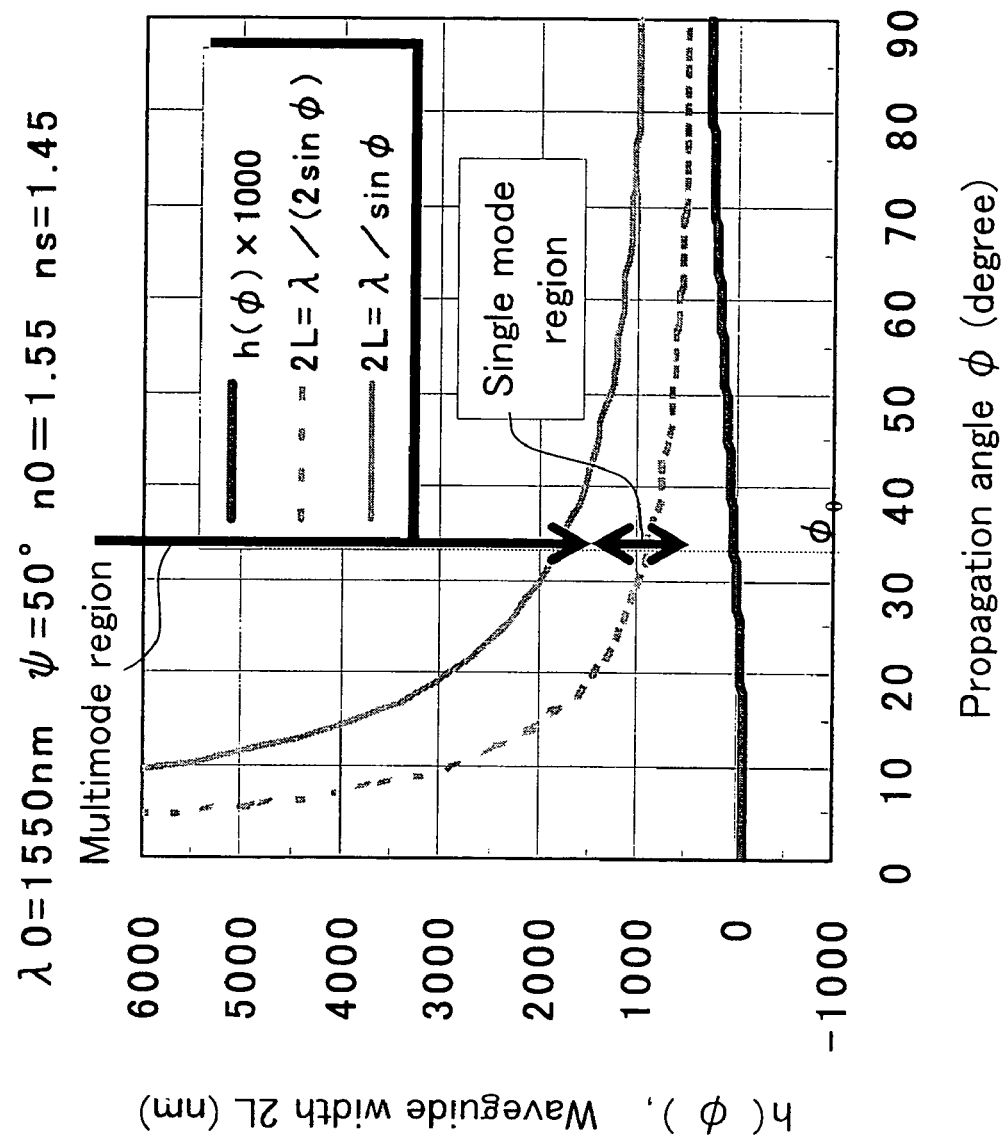
FIG. 44 is a graph similar to FIG. 43 under different conditions.

FIG. 44 shows the case in which:

$$\lambda = 1550 \text{ nm}$$

$$\psi = 50°$$

$$n_s = 1.55 \text{ and}$$

$$n_0 = 1.45.$$

In FIG. 44, leakage of light occurs if the propagation angle $\phi$ is 33.4 degrees or greater. Accordingly, the region satisfying the single-mode condition (single mode region) is a region where the maximum value $\phi_0$ of the propagation angle corresponds to $\phi_0=33.4°$. The value of the maximum value $\phi_0$ of the propagation angle that defines the limit of the single-mode condition can be adjusted by changing the value of $n_s$.

Further, the value of the maximum value $\phi_0$ of the propagation angle always exists so far as $n_s > n_0$ is satisfied. If $n_s < n_0$ is satisfied, the propagation angle $\phi$ always takes a positive value. Therefore, all the modes including the zero-order mode will be leaked regardless of the value of 2 L, and propagation for a long distance is not possible.

Figure 45:
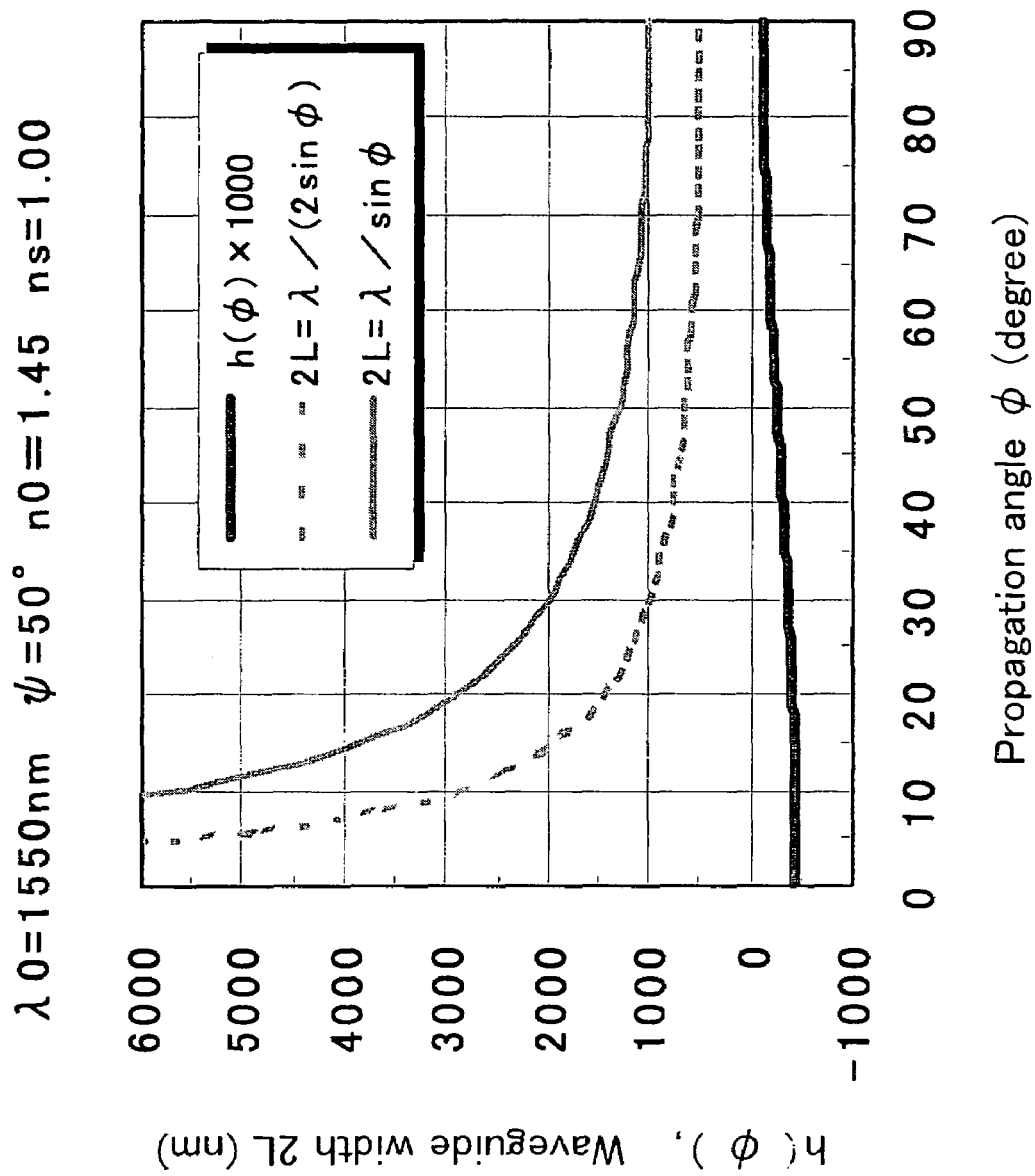
FIG. 45 is a graph similar to FIG. 43 under different conditions.

FIG. 45 shows the case in which:

$$\lambda_0 = 1550 \text{ nm}$$

$$\psi = 50°$$

$$n_s = 1.00 \text{ and}$$

$$n_0 = 1.45$$

In FIG. 45, since $h(\phi)$ is always negative, the propagated light is never able to go out of the side faces regardless of the value of $\phi$, and a perfect confinement state is established. In this case, since the maximum value $\phi_0$ of the propagation angle is 90 degrees ($\phi_0=90°$), the range of 2 L satisfying the single-mode condition is present on the line of $\phi=90°$ (see FIG. 43). Although the number of propagation modes is increased when the 2 L becomes greater than the range of the single-mode condition, no light will leak from the side faces.

The third embodiment configured in this manner has advantages as described below.

Summing up the findings as described above, the homogeneous medium waveguide 300 shown in FIG. 40 is able to be formed as various kinds of waveguides as described below, depending on the intensity of confinement in the XZ-direction.

(1) "Perfect Confinement Single-Mode Waveguide"

The photonic crystal waveguide 200 can be a "perfect confinement single-mode waveguide" by satisfying the requirement described below.

(Requirement)

The perfect confinement condition must be satisfied:

$$h(90°) = n_s - n_0 \sin\psi < 0$$

The waveguide width 2L is in the range:

$$s\lambda/2 \leq 2L < (s+1)\lambda/2$$

wherein, only the zero-order mode (N=0) in the phase matching condition (Formula 7) exists when the propagation angle $\phi$ is 90 degrees. However, the phase shift amount is $s\pi$ when waves propagated through the core 301 are reflected by the side face of the core 301 at the maximum value $\phi_0$ ($0<\phi_0<90°$) of the propagation angle, and s is in the range $0 \leq s \leq 1$.

The "perfect confinement single-mode waveguide" has an advantage as described below.

A steep bend is possible without changing the single-mode propagation. Since the waveguide width is small, the device can be made extremely compact.

(2) "Perfect Confinement Multimode Waveguide"

(Requirement)

The perfect confinement condition must be satisfied:

$$h(90°) = n_s - n_0 \sin\psi < 0$$

The waveguide width 2L is in the range:

$$s\lambda/2 \leq 2L$$

wherein, only the zero-order mode (N=0) in the phase matching conditions (Formula 7) exists when the propagation angle $\phi$ is 90 degrees. However, the phase shift amount is $s\pi$ when waves propagated through the core 201 are reflected by the side face of the core 201 at the maximum value $\phi_0$ ($0<\phi_0<90°$) of the propagation angle, and s is in the range $0 \leq s \leq 1$.

The "perfect confinement multimode waveguide" provides advantages as described below.

Since light can be confined regardless of the propagation angle $\phi$, the waveguide is suitable for a resonator or the like. The waveguide width need not be fixed, and has no upper limit. Therefore, the resonator can be formed in any desired shape.

(3) "Imperfect Confinement Single-Mode Waveguide"

(Requirement)

The maximum value $\phi_0$ ($0<\phi_0<90°$) of the propagation angle satisfying the condition must exist:

$$h(\phi) = n_s - n_0(\sin^2\psi + \cos^2\psi\cos2\phi)^{0.5}$$

The waveguide width 2L is in the range:

$$s\lambda/2\cos\phi_0 \leq 2L < (s+1)/2\cos\phi_0$$

wherein, only the zero-order mode (N=0) in the phase matching conditions (Formula 7) exists when the propagation angle $\phi$ is 90 degrees. However, the phase shift amount is $s\pi$ when waves propagated through the core 201 are reflected by the side face of the core 201 at the maximum value $\phi_0$ ($0<\phi_0<90°$) of the propagation angle, and s is in the range $0 \leq s \leq 1$.

The "imperfect confinement single-mode waveguide" provides advantages as described below.

Although the condition may cause leakage of current depending on a propagation angle $\phi$, the single-mode condition can be established since the waveguide width 2L is set sufficiently small.

A steep bend is not possible since the propagation angle $\phi$ exceeding $\phi_0 (0<\phi_0<90°)$ will cause leakage of light. The waveguide structure should preferably be designed by carefully studying a minimum bend radius through electromagnetic waves simulations or the like.

(4) "Imperfect Confinement Multimode Waveguide" (Requirement)

The maximum value $\phi_0$ $(0<\phi_0<90°)$ of the propagation angle satisfying the condition must exist:

$$h(\phi)=n_s-n_0\{\sin^2 \psi+\cos^2 \psi \cos^2 \phi\}^{0.5}$$

The waveguide width 2L exists in the range:

$$(s+1)\lambda/2 \cos \phi_0 < 2L$$

wherein, the first-order or higher-order mode in the phase matching condition (Formula 7) is present when the propagation angle $\phi$ is $\phi_0 (0<\phi_0<90°)$. However, the phase shift amount is $s\pi$ when waves propagated through the core 201 are reflected by the side face of the core 201 at the maximum value $\phi_0 (0<\phi_0<90°)$ of the propagation angle, and s is in the range $0 \leq s \leq 1$.

The "imperfect confinement multimode waveguide" provides advantages as described below.

Although confinement is obtained when the propagation angle $\phi$ is $\phi_0 (0<\phi_0<90°)$ or less, a plurality of modes can be propagated since the waveguide width 2L is large.

A steep bend is not possible since the propagation angle $\phi_0$ exceeding $\phi_0 (0<\phi_0<90°)$ will cause leakage of light. Preferably, the waveguide structure should be designed by carefully studying a minimum bend radius through electromagnetic waves simulations or the like.

Although single-mode propagation is not provided, the large waveguide width facilitates the coupling to an external plane wave. This type of waveguide can be used as a waveguide for guiding light to a detector which does not particularly require the single-mode propagation.

FOURTH EMBODIMENT

Figure 46:
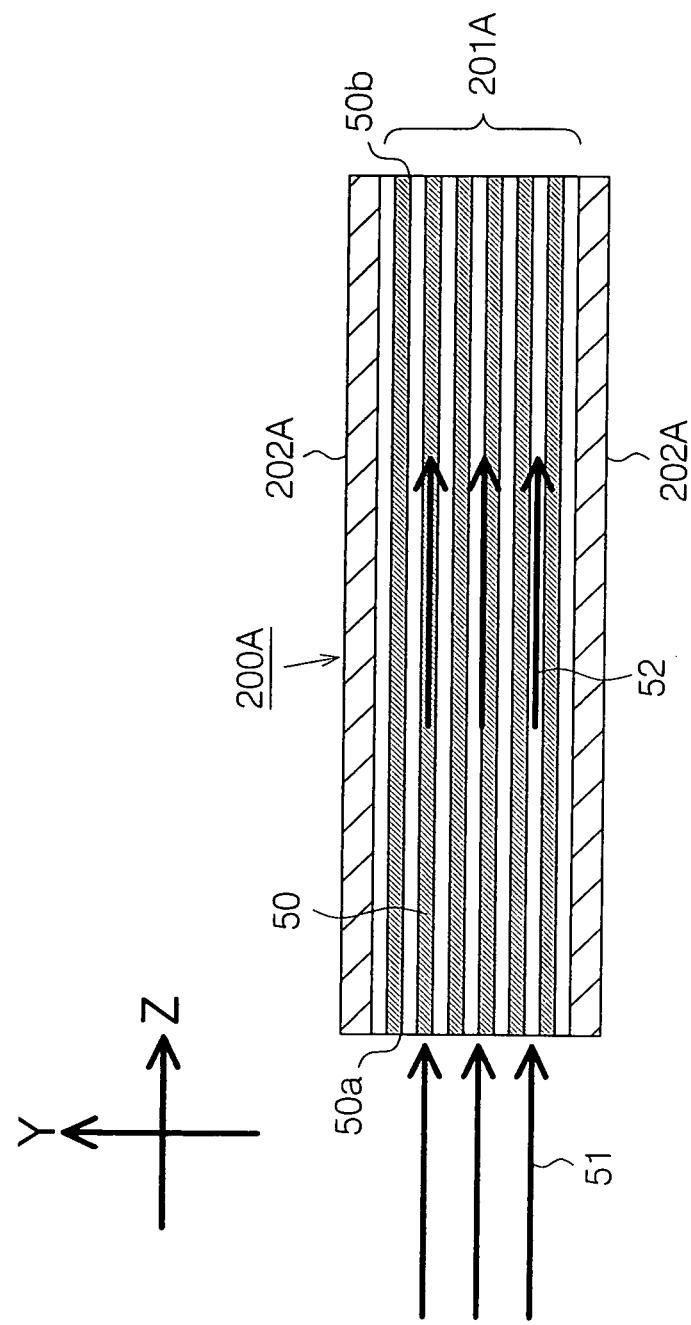
FIG. 46 is a schematic diagram illustrating propagation of light in a photonic crystal waveguide according to a fourth embodiment of the present invention.

FIG. 46 shows a photonic crystal waveguide 200A according to a fourth embodiment.

The photonic crystal waveguide 200A is formed of a one-dimensional photonic crystal 50 having periodically only in one direction (Y-direction as the periodic direction), and includes a core 201A which propagates electromagnetic waves (propagated light 52) in a direction perpendicular to the one direction (XZ-plane direction), and a cladding 202A.

The core 201A has the same structure as the core 201 of the photonic crystal waveguide 200 shown in FIG. 21. The cladding 202A is a reflection layer formed by a metal film or the like formed on the opposite faces perpendicular to the periodic direction (the one direction) of the core 201A, and is a confinement cladding which prevents electromagnetic waves propagated through the core 201 from leaking in the cyclic direction outside from the opposite faces (upper and lower surfaces).

The photonic crystal waveguide 200A configured in this manner is also able to realize a "perfect confinement multimode waveguide" and an "imperfect confinement multimode waveguide" described in the first embodiment, and an "imperfect confinement multimode waveguide" as described in the second embodiment. However, since the cladding, such as a metal film, has a low reflectance, it is difficult to provide a waveguide to cover a very long distance.

FIFTH EMBODIMENT

Figure 47:
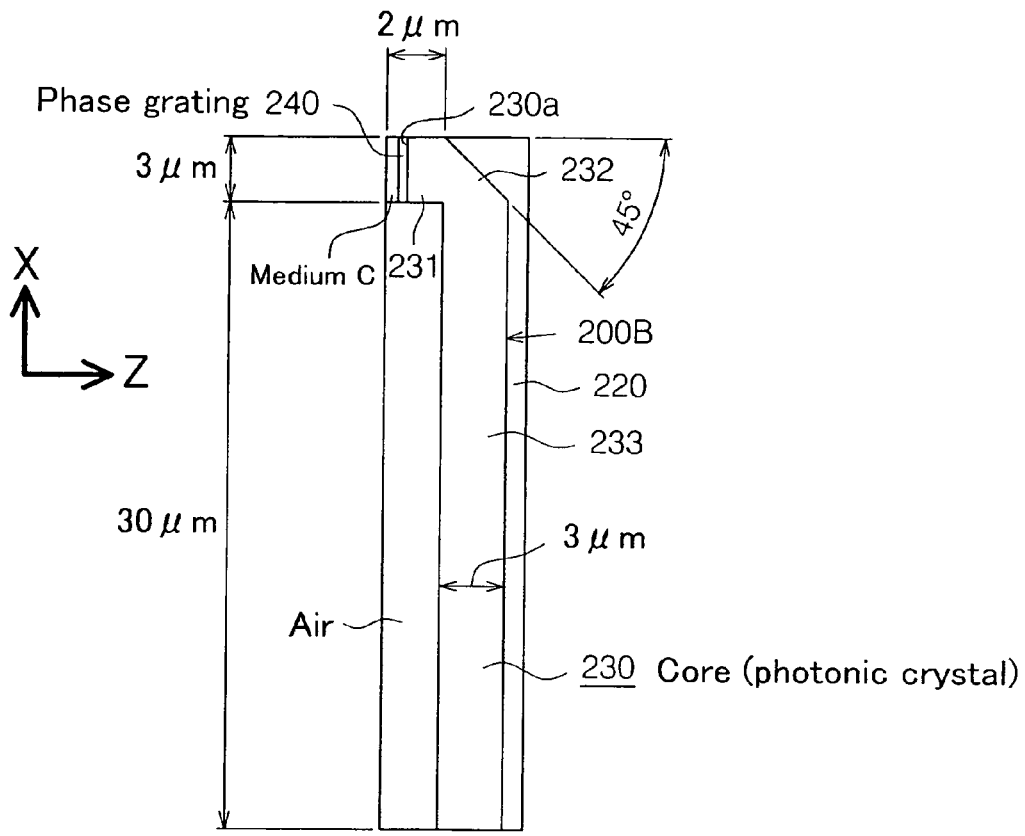
FIG. 47 is a plan view illustrating a photonic crystal waveguide according to a fifth embodiment of the present invention.
Figure 48:
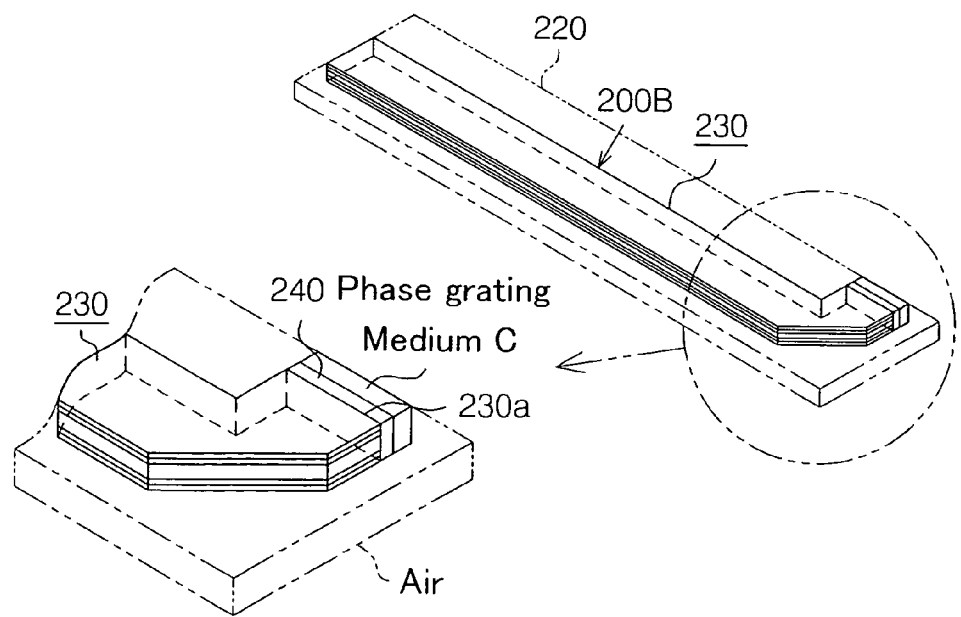
FIG. 48 is a perspective view illustrating the photonic crystal waveguide of FIG. 47.

A description will now be made of a photonic crystal waveguide 200B according to a fifth embodiment. As shown in FIGS. 47 and 48, the photonic crystal waveguide 200B is formed of a one-dimensional photonic crystal (periodic multilayer film) similar to the photonic crystal 50 shown in FIG. 21, and has a core 230 having a waveguide structure that is orthogonally bent on a substrate 220. A phase grating 240 similar to the phase grating 70 shown in FIG. 15 is arranged on an incident end face 230a of the core 230.

Electromagnetic wave simulations were conducted (by the finite difference time domain method (FDTD)) on the photonic crystal waveguide 200B, in terms of the case in which plane waves are input perpendicularly to the incident end face 230a, under the following conditions. The periodic boundary was employed as the boundary condition in the multilayer film laminating direction (Y-direction) of the photonic crystal forming the core 230, and calculation was performed by extracting four periods of the periodic multilayer film structure.

(1) Structure of Periodic Multilayer Film

A medium A and a medium B as follows are laminated alternately for two periods.

Medium A with thickness $t_A=0.30a$, and refractive index $n_A=2.1011$;

Medium B with thickness $t_B=0.70a$, and refractive index $n_B=1.4578$

The period a was set to 430 nm for the convenience of calculation.

(2) Structure of Core (Waveguide) 230

The core 230 used in the simulations includes a linear waveguide portion 231 having a length from the incident end face 230a in the Z-direction of 2 μm, a right-angle bent portion 232 with an isosceles triangular shape, the inner side wall of which is bent at a right angle and the outer side wall of which is bent at 45 degrees, and a linear waveguide portion 233 having a length in the X-direction of 30 μm. In the XZ-plane direction, the outside of the core 230 is a homogeneous medium with a refractive index of 1, and the linear waveguide portions 231 and 233 of the core 230 have a width of 3 μm.

(3) Incident Light

Wavelength in vacuum $\lambda_0=1540$ nm $(a/\lambda_0=0.2792)$

Polarization: TE polarization (orientation of electric field of incident light is X-direction)

(4) Structure of Incident End Face 230a and Phase Grating 240

Figure 49:
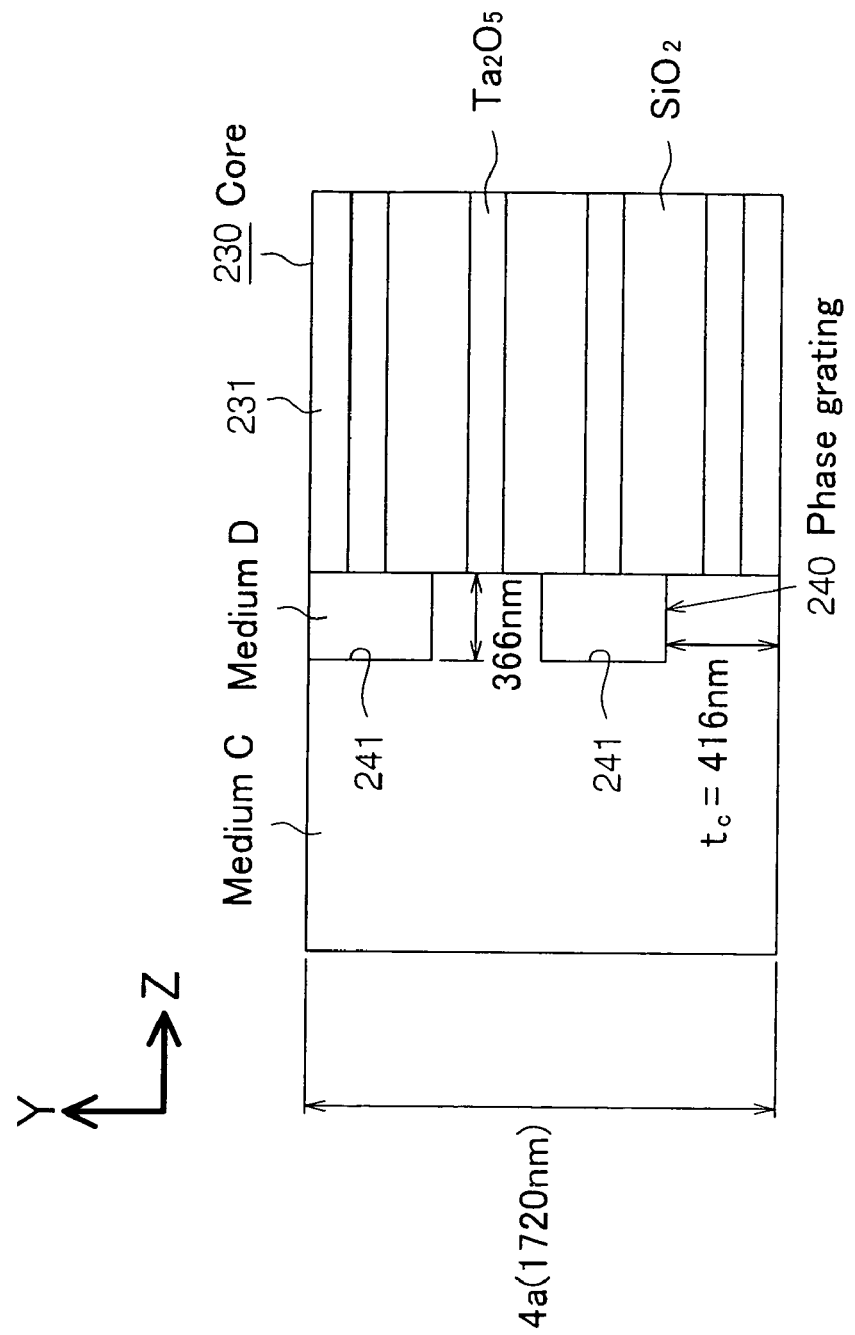
FIG. 49 is a plan view illustrating the incoming side of the photonic crystal waveguide of FIG. 47.

FIG. 49 shows arrangement of the phase grating 240 and the linear waveguide portion 231 of the core 230. Incident light is introduced into the linear waveguide portion 231 through a free space (medium C) with a refractive index of 3.48. Periodic rectangular grooves 241 are formed in the medium C at the boundary, and the grooves 241 are filled with a medium D to form a phase grating 240. The shape of the phase grating 240 is optimized so as to enhance +1 order and −1 order diffractions. The phase grating 240 is arranged in contact with the core 230 such that the projected portion thereof, or the center of the medium C layer matches the center of the high refractive index layer of the core 230 (periodic multilayer film).

Figure 50:
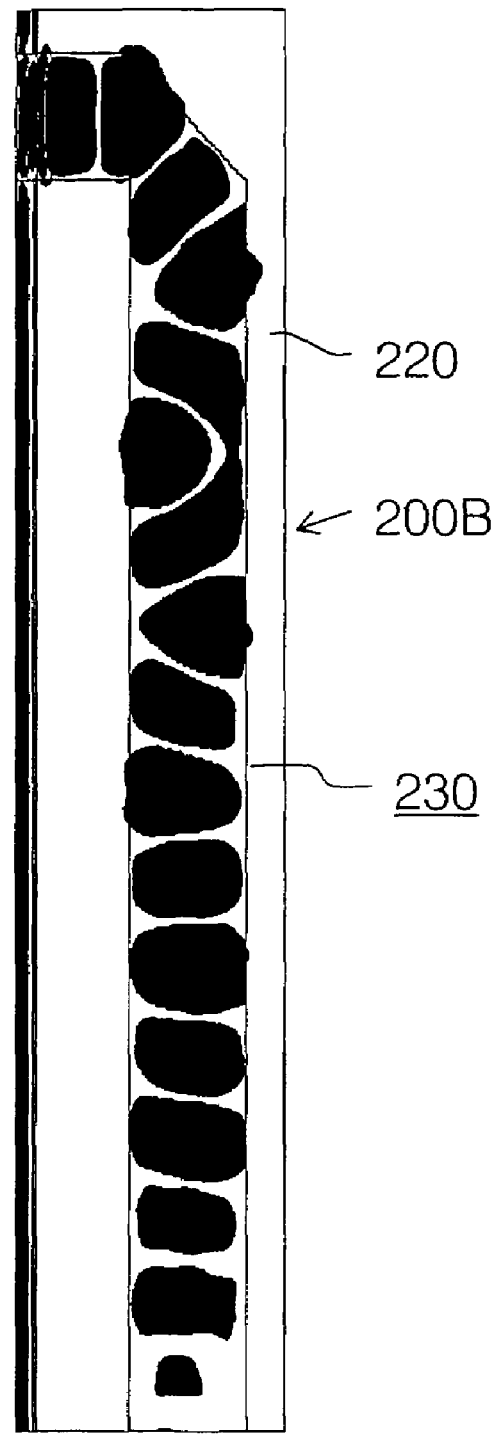
FIG. 50 is an explanatory diagram illustrating a simulation result of the photonic crystal waveguide of FIG. 47.

Medium C: Refractive index $n_C$=3.48
Medium D: Refractive index $n_D$=1.50
Y-direction cycle $2a$ of the phase grating 240: 860 nm As the results of the simulation, FIG. 50 shows intensity distribution of electric field at the center of the high refractive index layer of the core 230. The propagated light is in a mode by the first band on the Brillouin zone boundary, and the wavelength $\lambda$ in the propagation direction is 4400 nm.

On the basis of the various conditions of this calculation example:

$$a=430 \text{ nm}$$

$$\lambda_0=1540 \text{ nm}$$

$$\lambda=4400 \text{ nm}$$

$$n=1.00$$

$$n_{eff}=\lambda/\lambda_0=0.348$$

The value of:

$$f(\phi)=a(\lambda/\cos\phi)/\{(\lambda/2\cos\phi)^2+a^2\}^{0.5}-(\lambda_0/n_s)$$

is always negative regardless of the value of $\phi$, and thus the perfect confinement condition is satisfied. Accordingly, in the simulation as well, there occurs almost no leakage of light due to the right-angle bend.

Although the wavefront direction is inclined in the bent portion of the core 230, the wavefront becomes perpendicular to the propagation direction again in the subsequent propagation. Accordingly, it can be concluded that the photonic crystal waveguide 200B satisfies the single-mode condition.

As for the range of the single-mode condition, the requirement is represented by $0 \leq 2L \leq 4400$ nm (4400 nm=$\lambda$), and the sufficient condition is represented by $2L=2200$ nm (2200 nm=$\lambda/2$). Additionally, there is almost no leakage of the electric field to the air layer. Therefore, the phase shift amount $\phi$ by interface reflection takes a value close to $\pi$. Consequently, the waveguide width 2L of 3 μm is a value that is able to satisfy the single-mode condition.

The fifth embodiment configured in this manner has advantages as described below.

In the photonic crystal waveguide 200B, a steep bend is possible without changing the single-mode propagation and the waveguide width is small. This enables the device to be formed in an extremely compact size. Further, $n_{eff}$ is as small as 0.348 to provide a region where dispersion and group velocity anomaly are large. Therefore, the waveguide is suitable as a functional waveguide as well.

SIXTH EMBODIMENT

Figure 51:
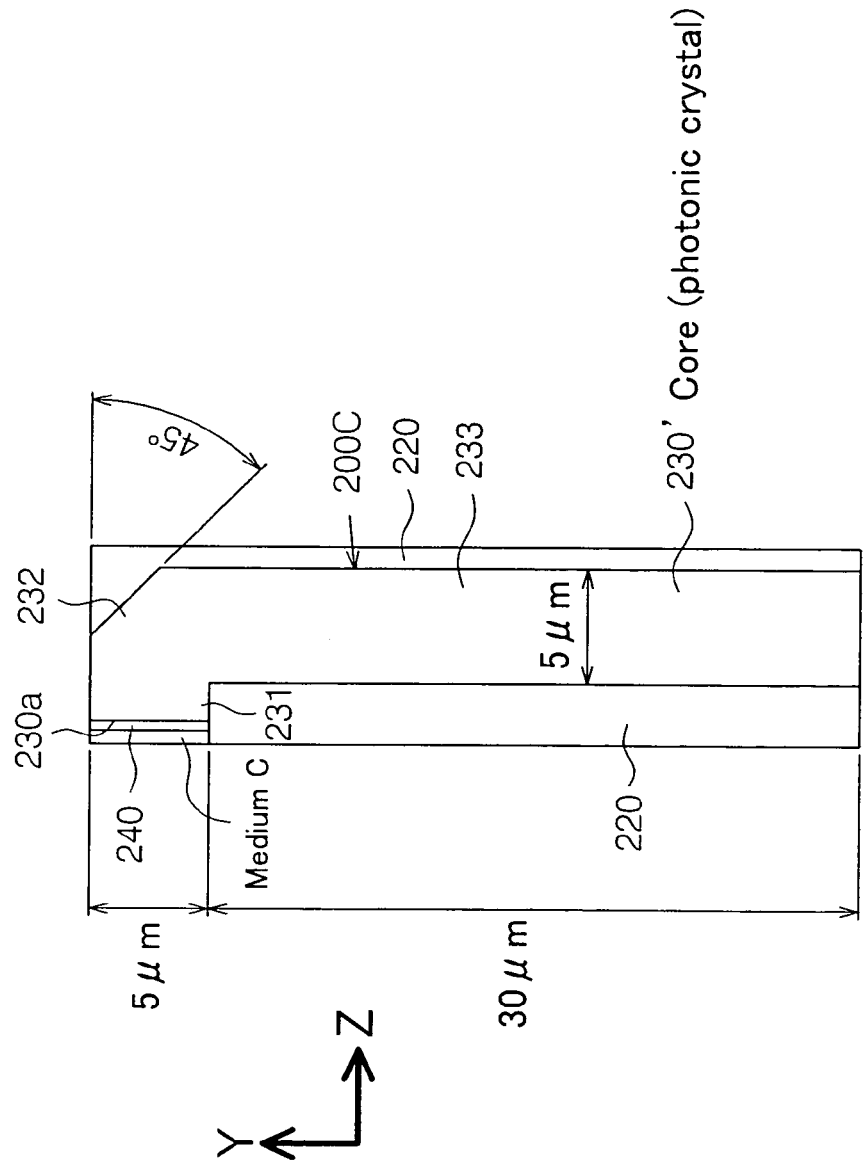
FIG. 51 is a plan view illustrating a photonic crystal waveguide according to a sixth embodiment of the present invention.

FIG. 51 shows a photonic crystal waveguide 200C according to a sixth embodiment.

This photonic crystal waveguide 200C is similar to the photonic crystal waveguide 200B shown in FIG. 47 except that the waveguide width thereof is 5 μm instead of 3 μm of the photonic crystal waveguide 200B. Therefore, the same reference numerals are assigned except for 230' for the core.

In the photonic crystal waveguide 200C of the sixth embodiment as well, the perfect confinement condition, which is the same as with the photonic crystal waveguide 200B, is satisfied. However, the waveguide width 2L of 5 μm does not satisfy the requirement for single-mode propagation:

$$0 \leq 2L \leq 4400 \text{ nm } (4400 \text{ nm}=\lambda)$$

as described in relation to the photonic crystal waveguide 200B, and hence a multimode propagation may be produced.

Figure 52:
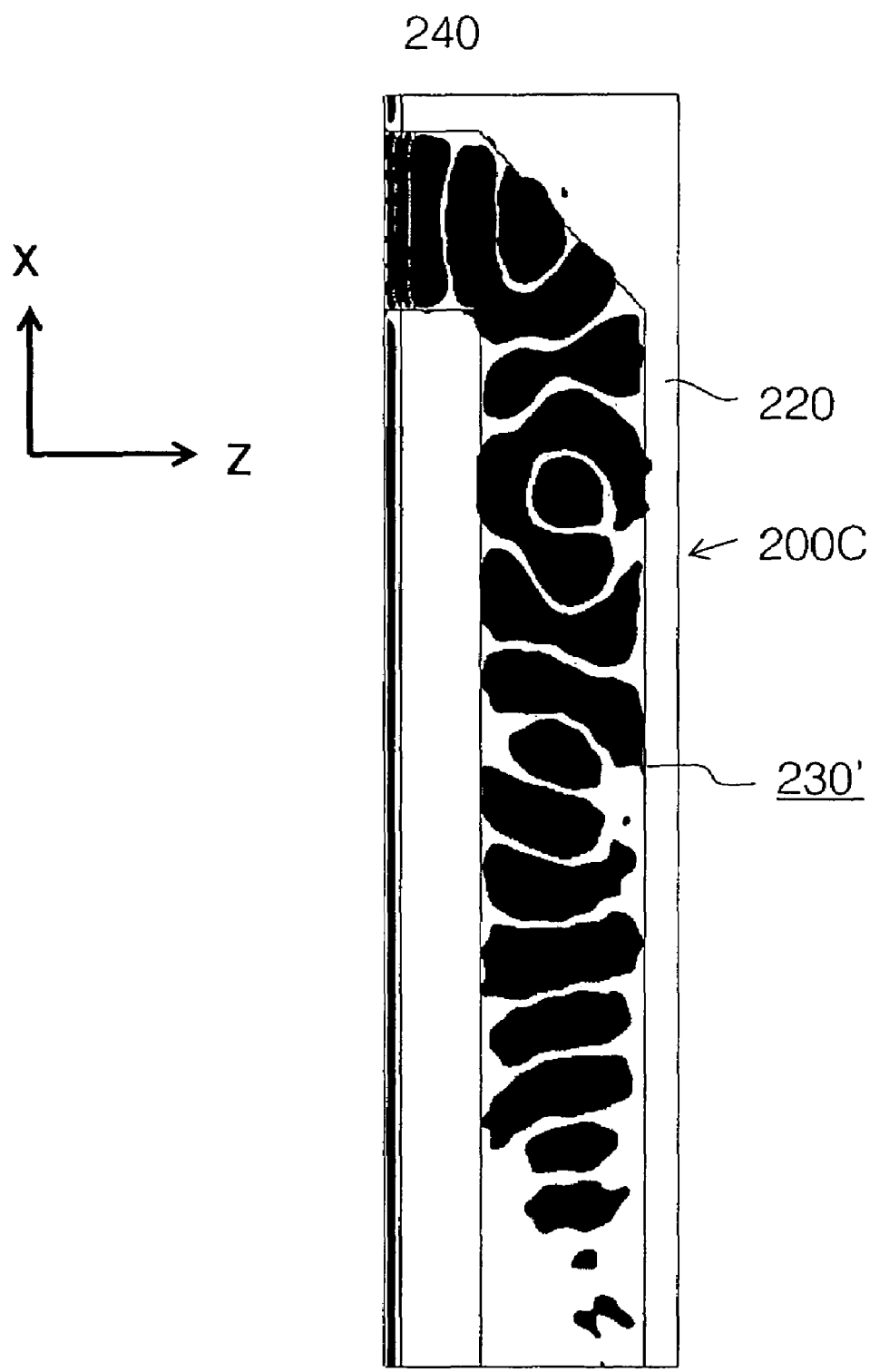
FIG. 52 is an explanatory diagram illustrating a simulation result of the photonic crystal waveguide of FIG. 51.

As the results of simulation, FIG. 52 shows the intensity distribution of electric field at the center of a high refractive index layer of the one-dimensional photonic crystal (periodic multilayer film) forming the core 230'. The pattern of the electric field downstream of the right-angle bend is more complicated than that of the photonic crystal waveguide 200B shown in FIG. 47, and zero-order mode and primary mode are mixed. However, there is almost no leakage of light to the air layer.

The sixth embodiment configured in this manner has advantages as described above.

It is apparent that, even in multimode propagation, there is no leakage of light as long as the confinement condition is satisfied. Accordingly, this type of waveguide can be easily formed as a resonator by changing the width or shape of the waveguide.

SEVENTH EMBODIMENT

Figure 53:
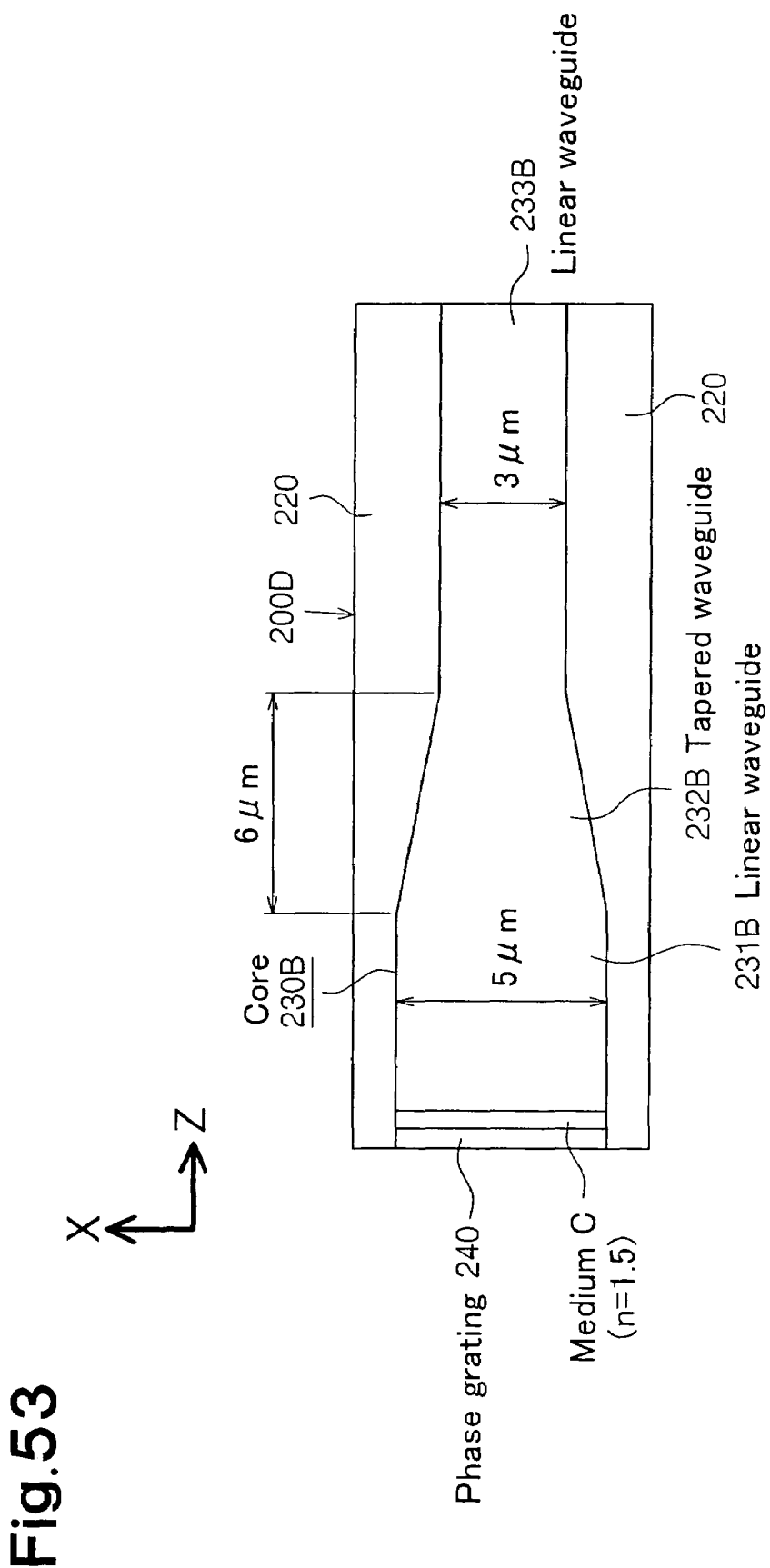
FIG. 53 is a plan view illustrating a photonic crystal waveguide according to a seventh embodiment of the present invention.
Figure 54:
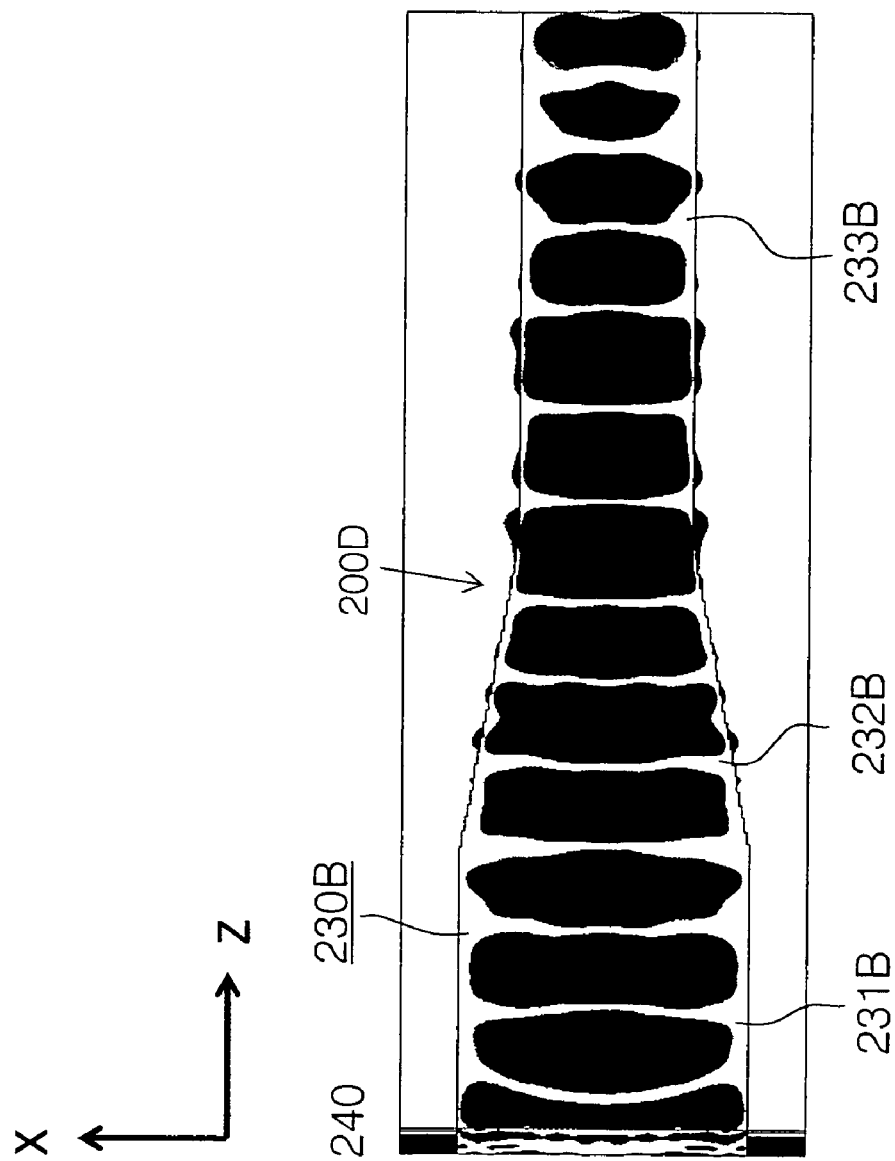
FIG. 54 is an explanatory diagram illustrating a simulation result of the photonic crystal waveguide of FIG. 53.

FIG. 53 shows a photonic crystal waveguide 200D according to a seventh embodiment.

The photonic crystal waveguide 200D is formed as a "tapered waveguide" in which the waveguide width of an incident portion of a core 230B formed of a one-dimensional photonic crystal is set to a width that is large enough to satisfy the multimode propagation mode, and the waveguide width is reduced in midway in a tapered shape to convert the waveguide into a single-mode waveguide.

The waveguide width 2L of the core needs to be reduced in order to satisfy the single-mode condition. However, if the waveguide width 2L is as small as about 1 μm, it is difficult to couple the waveguide to a single-mode optical fiber having a core diameter of about 10 μm, and the coupling loss becomes large.

The connection efficiency with external elements may be improved by enlarging the waveguide width 2L of the core satisfying the single-mode condition in the vicinity of the incident surface or exit surface of the core. When designing the shape of the tapered portion of a core, it is desirable to confirm, by conducting electromagnetic waves simulation or the like, that the loss or the occurrence of a high-order mode at the tapered portion is reduced sufficiently.

(1) Structure of Periodic Multilayer Film:

The structure is the same as that of the photonic crystal waveguide 200B in FIG. 47.

(2) Structure of Core (Waveguide) 230B:

The waveguide structure of the core 230B downstream of the incident end face is a down-tapered structure including a linear waveguide 231B, a down-tapered waveguide 232B, and a linear waveguide 233B. The linear waveguide 231B has a width in the X-direction of 5 μm, and a length in the Z-direction of 5 μm. The width in the X-direction of the tapered waveguide 232B is varied from 5 μm to 3 μm, and the length in the Z-direction is 6 μm. The linear waveguide 233B has a width in the X-direction of 3 μm, and a length in the Z-direction of 10 μm.

(3) Incident Light:

Wavelength in vacuum: $\lambda_0$=1540 nm ($a/\lambda_0$=0.2792)

Polarization: TE polarization (the orientation of electric field is X-direction)

(4) Structure of Incident End Face of Photonic Crystal Waveguide 200D and Phase Grating 240:

The structure is the same as that of the photonic crystal waveguide 200B in FIG. 47.

As the results of simulation conducted on the photonic crystal waveguide 200D configured in this manner, FIG. 53 shows the intensity distribution of the electric field at the center of a high refractive index layer of the core 230B. It is apparent that propagated light with a waveguide width of 5 µm in the linear waveguide 231B is coupled to the linear waveguide 233B, which is a single-mode waveguide having a width of 3 µm without causing a turbulent wavefront, by means of the tapered waveguide 232B. There is little leakage in the tapered waveguide 232B.

The seventh embodiment configured as described above has advantages as follows.

In the core 230B of the photonic crystal waveguide 200D, the waveguide width of the incident portion thereof is set to a width that is large enough to satisfy the multimode propagation condition, and the waveguide width is reduced in midway by the tapered waveguide 232B to convert the waveguide into a single-mode waveguide. The use of such photonic crystal waveguide 200D makes it easy to connect, for example, the linear waveguide 233B (with a core width of 3 µm) as a single-mode waveguide to a single-mode optical fiber (with a core diameter of 10 µm).

A description will now be made of an optical device utilizing a photonic crystal waveguide or homogeneous medium waveguide described in relation to the above embodiments.

Waveguide-type optical devices are realized by using a homogeneous medium waveguide. Also, optical devices utilizing a two-dimensional photonic crystal defective waveguide or the like have been proposed and researched actively. Using the waveguide of the present invention, many of such optical devices can be replaced with the waveguide-type optical devices having characteristics as listed below.

A steep bend is possible and the waveguide or device can be arranged freely. Therefore, the miniaturization and integration are easy.

Propagated light with large dispersion or low group velocity can be obtained. This makes it possible to enhance the functions of the device, or to reduce the size of the device itself.

The basic structure is a simple multilayer film, and the refractive index difference of the photonic crystal can be small. Therefore, low-cost manufacture is possible.

Since perfect confinement is also possible, the device can be applied to a resonator or the like.

EIGHTH EMBODIMENT

Figure 55:
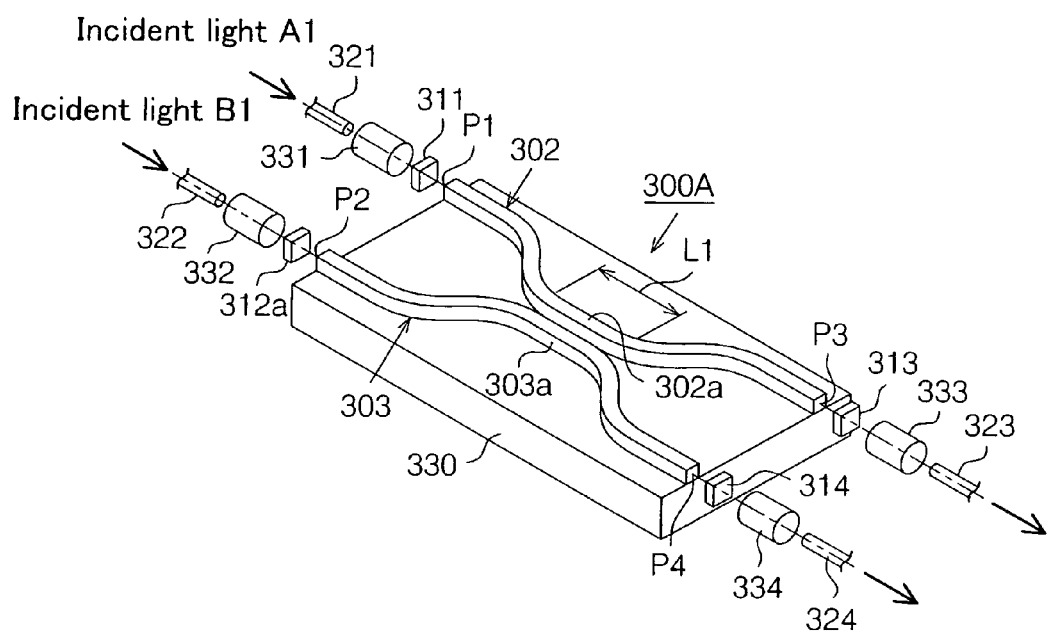
FIG. 55 is a perspective view illustrating a directional coupler as an optical device according to an eighth embodiment of the present invention.

FIG. 55 shows a directional coupler 300A as an optical device according to an eighth embodiment.

This directional coupler 300A has a substrate 330, and two waveguides 302 and 303 formed on the substrate 330. The waveguides 302 and 303 are bent so as to extend close to each other for a predetermined coupling length L1 at respective coupling regions 302a and 303a. The waveguides 302 and 303 are each formed of a photonic crystal waveguide as described above, for example, of the photonic crystal waveguide 200 shown in FIG. 22.

Ports P1 and P3 defining the opposite end faces of the waveguide 302 are provided with phase gratings 311 and 313, respectively. Also, ports P2 and P4 defining the opposite end faces of the waveguide 303 are provided with phase gratings 312a and 314, respectively. These four phase gratings 311, 312a, 313, and 314 have a similar function to that of the phase grating 64 shown in FIG. 10 or the phase grating 70 shown in FIG. 15.

In this directional coupler 300A, incident light (signal light) A1 transmitted by a single-mode optical fiber 321, for example, is introduced into the waveguide 302 through a rod lens 331 and the phase grating 311, and the light is branched into 50% light portions for example by coupling regions 302a and 303a in the waveguides 302 and 303. The branched signal light portions pass through the waveguides 302 and 303 to be coupled to single-mode optical fibers 323 and 324 via the phase gratings 313 and 314, and rod lenses 333 and 334, respectively.

When incident light (signal light) B1 transmitted by a single-mode optical fiber 322 is introduced into the waveguide 303 via a rod lens 332 and the phase grating 312a, the same is applied as the incident light A1.

The eighth embodiment thus configured has advantages as described below.

The waveguides 302 and 303 are each formed of the above photonic crystal waveguide 200. Therefore, a steep bend is possible in the waveguides 302 and 303, which increases the degree of freedom in arranging the waveguides on the substrate 330. Therefore, in comparison with the conventional techniques such as that described in Patent Publication 2, the size of the directional coupler itself may further be reduced, and it is made easier to integrate the same with other devices on the substrate to produce an optical module.

In particular, a steep bend is made possible at the bent portions upstream and downstream of the two coupling regions 302a and 303a of the waveguides 302 and 303. Therefore, the length of each of the waveguides 302 and 303 as a whole can be reduced substantially compared to the conventional techniques such as that described in Patent Publication 2.

According to the conventional techniques described above (defect waveguides utilizing two-dimensional photonic crystal), confinement in the plane direction (XZ-direction) is carried out by the PBG. According to this method, however, confinement in the vertical direction (Y-direction) is rather difficult, and the propagation loss is great. For a defect waveguide, a so-called "air-bridge structure" in which an air layer is provided both in the top and bottom of the waveguide is known. However, this poses a problem that both the structure and production processes are complicated, resulting in high production cost. Consequently, if a directional coupler is manufactured utilizing such conventional defective waveguide, the propagation loss will be great and the production cost will be high.

In contrast, by producing the photonic crystal waveguide forming the waveguides 302 and 303 so as to satisfy the perfect confinement conditions described above, a directional coupler with low propagation loss can be obtained at a low cost.

By producing the photonic crystal waveguide forming the waveguides 302 and 303 so as to satisfy the single-mode conditions described above, it is possible to couple the waveguide to an external single-mode optical fiber efficiently, and an optical system using the single-mode optical fiber can be obtained.

The waveguides 302 and 303 formed by the photonic crystal waveguide are possible to provide propagated light with large dispersion and low group velocity. Therefore, the coupling length L1 of the coupling regions 302a and 303a of the two waveguides 302 and 303 can be made much shorter than that of the waveguide of the conventional directional coupler, and thus the directional coupler can be produced in a reduced size and with improved functions.

Each of the two waveguides 302 and 303 has a basic structure of a one-dimensional photonic crystal that is formed by a simple periodic multilayer such as the photonic crystal 50 shown in FIG. 21, and the refractive index difference of the photonic crystal need not be large. Therefore, the directional coupler 300A including the two waveguides 302 and 303 may be manufactured at a low cost.

NINTH EMBODIMENT

Figure 56:
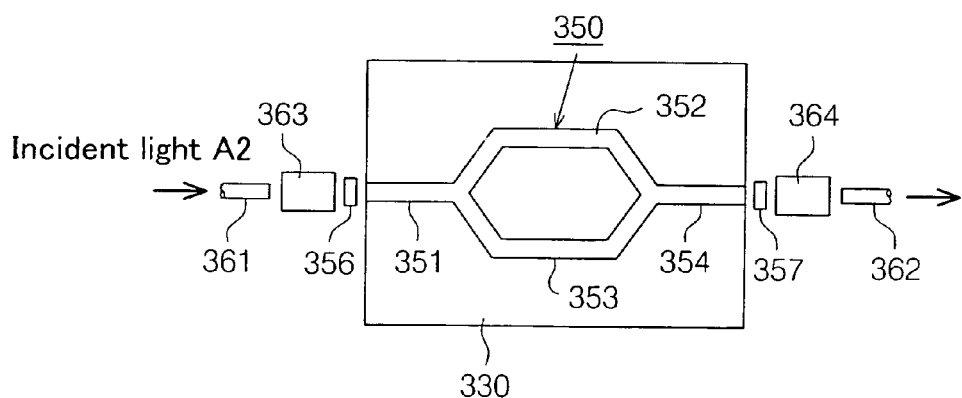
FIG. 56 is a plan view illustrating an optical switch as an optical device according to a ninth embodiment of the present invention.

FIG. 56 shows a Mach Zehnder optical switch 350 as an optical device according to a ninth embodiment.

The Mach Zehnder optical switch 350 includes a substrate 330, and a waveguide formed on the substrate 330. This waveguide is composed of one linear waveguide 351, two waveguides 352 and 353 branched from the waveguide 351, and one linear waveguide 354 formed by merging these two waveguides 352 and 353. Each of the waveguides 351 to 354 is formed by the above-mentioned photonic crystal waveguide, for example, by the photonic crystal waveguide 200 shown in FIG. 22. The end faces of the waveguides 351 and 354 are each provided with phase gratings 356 ad 357 having functions similar to those of the phase grating 64 shown in FIG. 10 and the phase grating 70 shown in FIG. 15.

In the Mach Zehnder optical switch 350, incident light (signal light) A2 transmitted by a single-mode optical fiber 361 is introduced into the waveguide 351 via a rod lens 363 and the phase grating 356, and is branched after passing through the waveguide 351. The branched signal light portions are merged together again after passing through the waveguides 352 and 353, respectively. The light is then coupled with an optical fiber 362 via the phase grating 357 and a rod lens 364 after passing through the wavelength 354.

When the light (signal light) propagated in the waveguide 351 is branched to the two waveguides 352 and 353 and then merged again at the waveguide 354, the optical signals respectively passing through the waveguides 352 and 353 will have a phase difference due to the difference in the optical path length. If the phase difference is an even multiple of $\pi$, the original signal light passes through the waveguide 354 to be output (ON state). In contrast, if the phase difference is an odd multiple, the merged propagated light portions are canceled by each other, and no signal light is output (OFF state).

In order to turn the Mach Zehnder optical switch 350 ON and OFF in this manner, at least one of the two waveguides 352 and 353 may be provided with means for the "electric current injection" or "irradiation of optical energy" to change the refractive index of the waveguide. Thus, the phase difference may be varied to turn the switch ON and OFF.

The ninth embodiment thus configured has advantages as described below.

The waveguides 351 to 354 of the Mach Zehnder optical switch 350 are formed of the photonic crystal waveguide 200 described above. Therefore, a steep bend is possible in the waveguides, and the degree of freedom is increased in arranging the waveguides on the substrate 330. This makes it possible to reduce the size of the optical switch itself and makes it easier to integrate the optical switch with other devices on the substrate to produce an optical module, compared to a conventional optical switch having a two-dimensional photonic crystal as described in Patent Publication 3 mentioned above.

According to the optical switch described in Patent Publication 3, confinement in the plane direction (XZ-direction) is carried out by the PBG. According to this method, however, confinement in the vertical direction (Y-direction) is more difficult, and the propagation loss is great. For a defective waveguide therefore, a so-called "air-bridge structure" in which an air layer is provided both in the top and bottom of the waveguide is known. However, this poses a problem that both the structure and production processes are complicated, resulting in high production cost. Consequently, if a Mach Zehnder optical switch is manufactured utilizing such conventional defect waveguide, the propagation loss will be great and the production cost will be high.

In contrast, by producing the photonic crystal waveguide forming the waveguides 351 to 354 so as to satisfy the perfect confinement conditions described above, a directional coupler with low propagation loss can be obtained at a low cost.

By producing the photonic crystal waveguide forming the waveguides 351 to 354 so as to satisfy the single-mode conditions described above, it is possible to couple the waveguide to an external single-mode optical fiber efficiently, and an optical system using the single-mode optical fiber can be obtained.

Each of the waveguides 351 to 354 has a basic structure of a one-dimensional photonic crystal such as the photonic crystal 50 described above, and the refractive index difference of the photonic crystal need not be large. Therefore, the Mach Zehnder optical switch 350 including the waveguides 351 to 354 can be manufactured at a low cost.

TENTH EMBODIMENT

Figure 57:
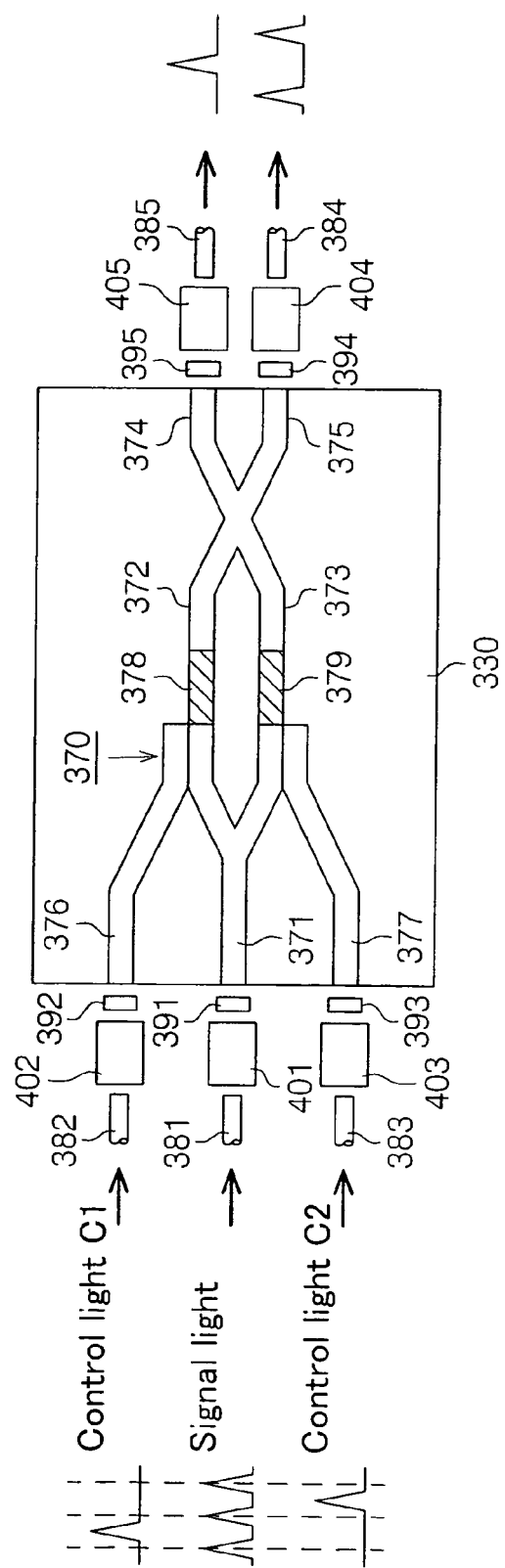
FIG. 57 is a plan view illustrating a symmetric Mach Zehnder all-optical switch as an optical device according to a tenth embodiment of the present invention.

FIG. 57 shows a symmetric Mach Zehnder optical switch 370 as an optical device according to a tenth embodiment.

The symmetric Mach Zehnder optical switch 370 has a substrate 330, and a waveguide formed on the substrate 330. This waveguide includes one linear waveguide 371, two waveguides 372 and 373 branched from the waveguide 371, two linear waveguides 374 and 375 branched from the merging portion of these two waveguides 372 and 373, and waveguides 376 and 377 for control light. These waveguides 371 to 377 are each formed of the above-described photonic crystal waveguide, for example, of the photonic crystal waveguide 200 shown in FIG. 22.

The end faces of the waveguides 371, 376, and 377 are respectively provided with phase gratings 391 to 393 having similar functions to those of the phase grating 64 or the phase grating 70. The end faces of the waveguides 374 and 375 are also provided with similar phase gratings 394 and 395, respectively. The waveguides 372 and 373 are provided with non-linear portions 378 and 379 containing a component having nonlinear optical activity.

In the symmetric Mach Zehnder optical switch 370, signal light transmitted by a single-mode optical fiber 381 is introduced into the waveguide 371 via a rod lens 401 and the phase grating 391, and is branched after passing through the waveguide 371. The branched signal light portions are merged again after passing through the waveguides 372 and 373, respectively. The merged light passes through one of the two waveguides 374 and 375 branched from the merging portion, and then coupled to an optical fiber 384 or 385 via a corresponding phase grating 394 or 395 and a rod lens 404 or 405.

Control light beams C1 and C2 are respectively introduced into the waveguide 376 and 377 via optical fibers 382 and 383, rod lenses 402 and 403, and the phase gratings 392 and 393 to excite the component in the non-linear portions 378 and 379 having nonlinear optical activity. When the component in the non-linear portions 378 and 379 is excited by the control light beam C1 to change the refractive index thereof, the signal light will be output through the waveguide 375 if the phases of the signal light portions match with each other at the merging portion of the waveguides 372 and 373. If the phases are deviated from each other by one half of a wavelength, the signal light will be output through the waveguide 374. Thus, the control light beam C1 can be used to change the refractive index of the non-linear portion 378 of the waveguide 372 to perform switching. Similarly, the control light beam C2 can be used to change the refractive index of the non-linear portion 379 of the waveguide 373 to perform switching.

Although the switching speed is restricted by relaxation time of the nonlinear effect, the relaxation process can be cancelled in midway by providing a slight time difference between the control light beams C1 and C2. Thus, quick switching can be realized.

The tenth embodiment thus configured has advantages as described below.

- It is possible to provide, at a low cost, a symmetric Mach Zehnder optical switch that is similar to the one of Non-Patent Publication 1, which utilizes a defective waveguide of a two-dimensional photonic crystal, by utilizing a photonic crystal waveguide of a one-dimensional photonic crystal.
- Since the waveguides 371 to 377 are each formed by the photonic crystal waveguide 200, a steep bend is possible in the waveguides. Therefore, the degree of freedom is increased in arranging the waveguides on the substrate 330. This makes it possible to reduce the size of the optical switch itself and makes it easier to integrate the optical switch with other devices on the substrate to produce an optical module, in comparison with the technique described in Non-Patent Publication 1.
- In the optical switch utilizing a defective waveguide of a two-dimensional photonic crystal as the one described in Non-Patent Publication 1, confinement in the plane direction (XZ-direction) is carried by a PBG. However, confinement in the vertical direction (Y-direction) is difficult by the PBG, and the propagation loss will be great. As a defect waveguide, a so-called "air-bridge structure" in which an air layer is provided both in the top and bottom of the waveguide is known. However, this poses a problem that both the structure and production processes are complicated, resulting in high production cost. In contrast, a low-cost directional coupler with low propagation loss can be provided by producing the photonic crystal waveguide forming the waveguides 302 and 303 so as to satisfy the perfect confinement conditions described above.
- By producing the photonic crystal waveguide forming the waveguides 371 to 377 so as to satisfy the single-mode conditions described above, it is possible to efficiently couple the waveguides to an external single-mode optical fiber, and to provide an optical system utilizing a single-mode optical fiber.

Each of the waveguides 371 to 377 has a basic structure of a one-dimensional photonic crystal that is formed by a simple periodic multilayer film such as the photonic crystal 50 shown in FIG. 21, and the refractive index difference of the photonic crystal need not be large. Therefore, the symmetric Mach Zehnder optical switch 370 including the waveguides 371 to 377 can be manufactured at a low cost.

ELEVENTH EMBODIMENT

Figure 58:
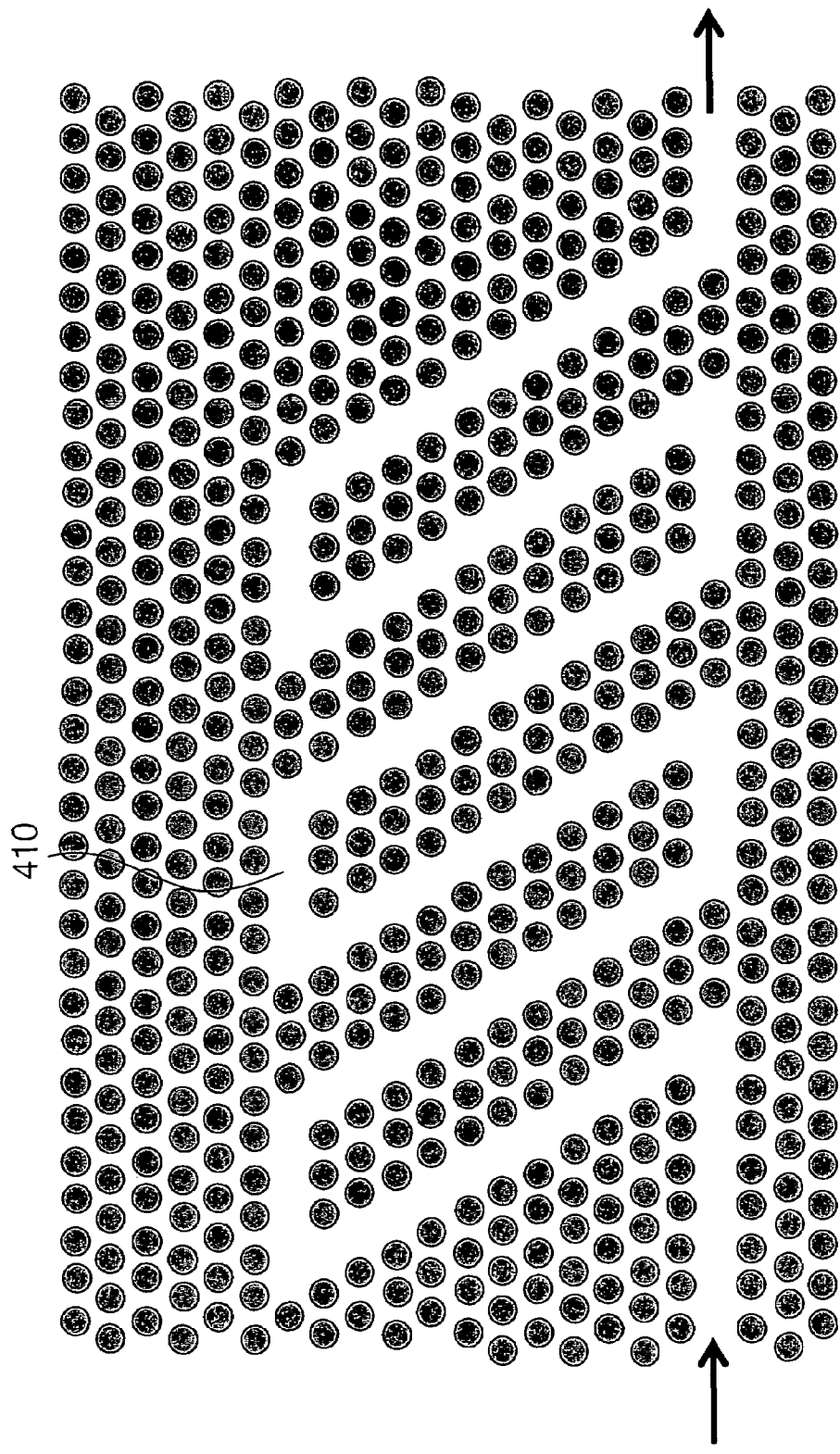
FIG. 58 is a plan view showing a conventional example of an optical delay line formed by a defective waveguide of two-dimensional photonic crystal.

One type of a waveguide-type optical circuit device is an optical delay line (see Non-Patent Publication 2 above, for example). The optical delay line is a device that can be built easily by increasing the optical length of the waveguide. However, if the waveguide is a homogeneous medium waveguide, the bend radius cannot be reduced much and thus a large area is required. In the case of a conventional optical delay line formed by a defect waveguide 410 utilizing two-dimensional photonic crystal as shown in FIG. 58, the optical delay line can be formed compact by steep bends, but it is not desirable for the device that the number of steep bends that are apt to cause bending loss or reflection of light is increased.

Figure 59:
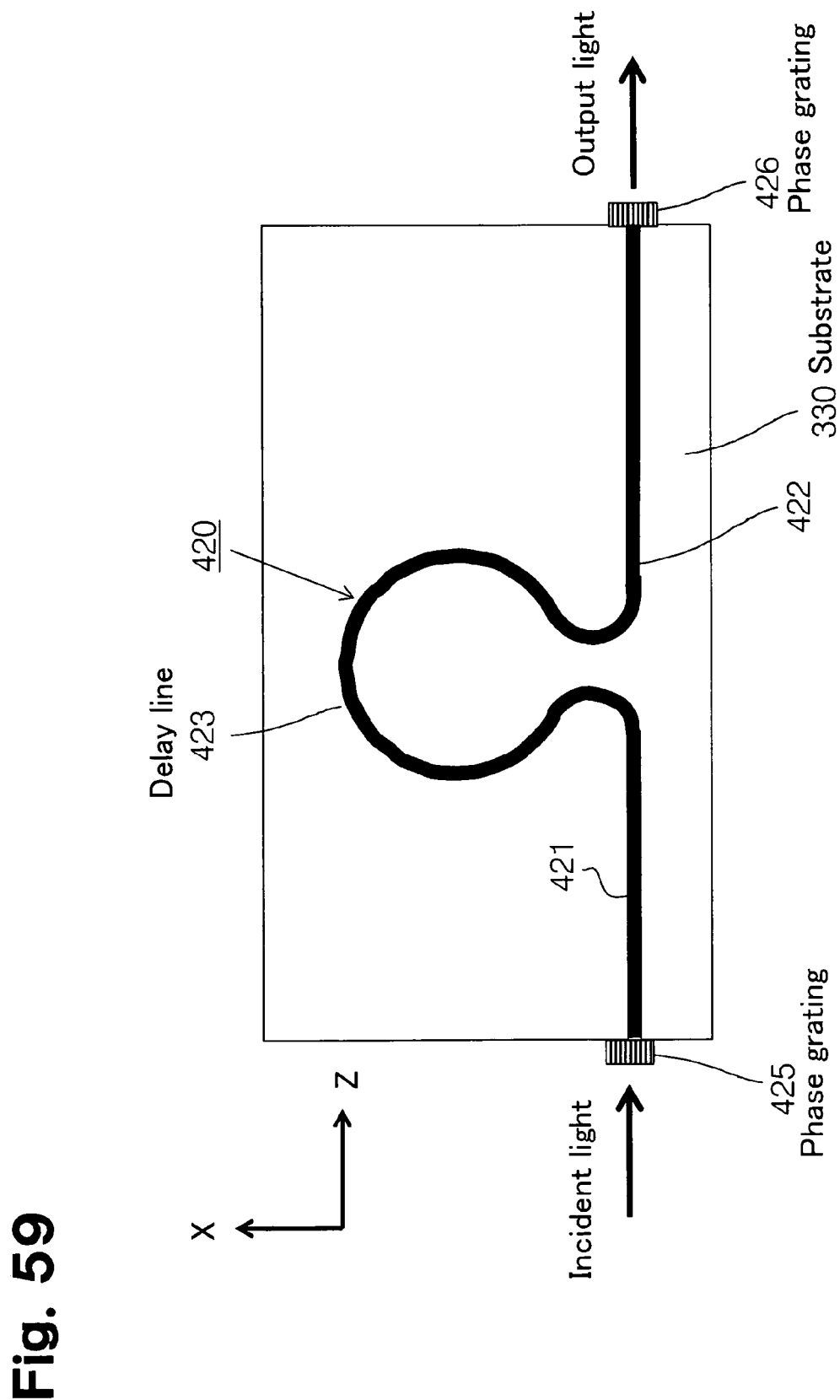
FIG. 59 is a plan view illustrating an optical delay line as an optical device according to an eleventh embodiment of the present invention.

FIG. 59 shows an optical delay line 420 as an optical device according to a twelfth embodiment. This optical delay line 420 includes a single continuous waveguide formed on a substrate 330. This single waveguide includes two linear waveguides 421 and 422 and a delay portion 423. The delay portion 423 extends in a circular shape between the waveguides 421 and 422. The single waveguide including the waveguides 421 and 422 and the delay portion 423 is formed by the above-described photonic crystal waveguide, for example, by the photonic crystal waveguide 200 shown in FIG. 22. The end faces of the waveguides 421 and 422 are provided with phase gratings 425 and 426, respectively.

The eleventh embodiment has advantages as described below.

- The single waveguide including the waveguides 421 and 422 and the delay portion 423 is formed by a photonic crystal waveguide capable of intense confinement formed of the one-dimensional photonic crystal described above. Therefore, the waveguide can be designed in any desirable shape as shown in FIG. 59. Thus, bending loss can be improved by providing the waveguide with a slight curvature radius instead of steep bends. The optical delay line 420 can be designed to realize both the miniaturization and the reduction of loss at the same time.
- The optical delay line 420 can be produced at a low cost by utilizing a photonic crystal waveguide of a one-dimensional photonic crystal.
- A steep bend is possible in the delay portion 423, which increases the degree of freedom in arranging the optical delay line 420 on the substrate 330. This makes it possible to reduce the size of the optical delay line 420 itself, and to makes it easy to integrate the optical delay line 420 with other devices on the substrate to produce an optical module.
- By producing the photonic crystal waveguide forming the single waveguide including the waveguides 421 and 422 and the delay portion 423 so as to satisfy the single-mode condition described above, it is possible to efficiently couple the waveguide to an external single-mode optical fiber, and an optical system using a single-mode optical fiber can be provided.

The single waveguide including the waveguides 421 and 422 and the delay portion 423 has a basic structure of a one-dimensional photonic crystal that is formed by a simple periodic multilayer such as the photonic crystal 50 as described above, and the refractive index difference of the photonic crystal need not to be large. Therefore, the optical delay line 420 can be manufactured at a low cost.

TWELFTH EMBODIMENT

Figure 60:
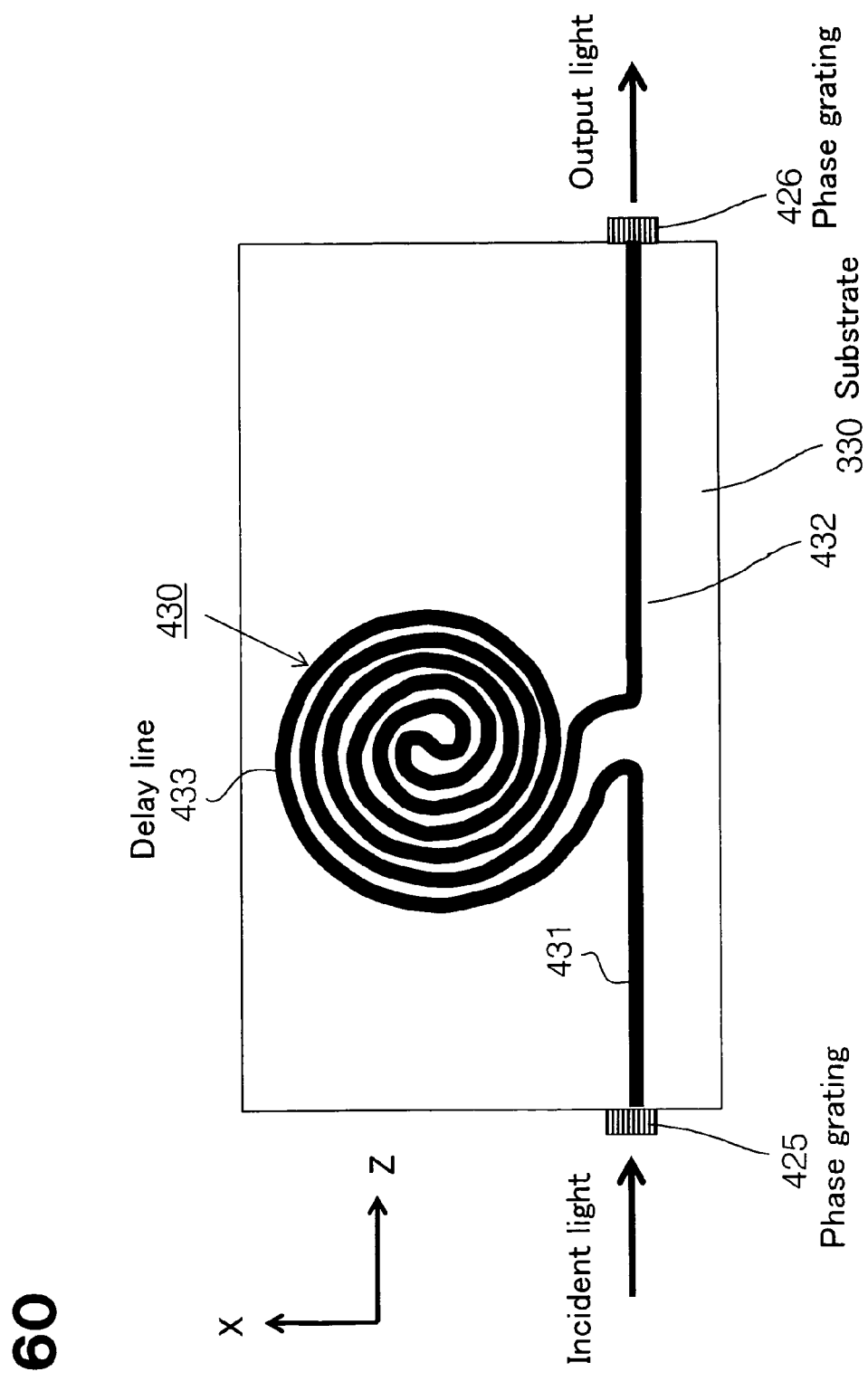
FIG. 60 is a plan view illustrating an optical delay line as an optical device according to a twelfth embodiment of the present invention.

FIG. 60 shows an optical delay line 430 as an optical device according to a twelfth embodiment. This optical delay line 430 includes a single continuous waveguide formed on a substrate 330, and this single waveguide is composed of two linear waveguides 431 and 432 and a delay portion 433. The delay portion 433 is winded to form a plurality of circles with gradually decreasing radii between the waveguides 431 and 432. The single waveguide including the waveguides 431 and 432 and the delay portion 433 is formed by the above-described photonic crystal waveguide, for example, of the photonic crystal waveguide 200 shown in FIG. 22. The end faces of the waveguides 421 and 422 are also provided with phase gratings 425 and 426, respectively.

The twelfth embodiment has the advantage as described below in addition to the advantages of the eleventh embodiment.

The delay portion 433 having a long path can be arranged in a small area on the substrate 330, which enables further miniaturization and integration.

THIRTEENTH EMBODIMENT

Conventionally, a wavelength filter that is designed to extract propagated light at a specific frequency by providing a point defect in the vicinity of a defective waveguide using two-dimensional photonic crystal so that the point defect captures the propagated light by the resonance is known in the prior art (see Patent Publication 4). A technique using a similar point-defect portion for switching by providing the same in the vicinity of a linear waveguide to produce a phase difference by the resonance with waves propagated through the waveguide is also known (see Patent Publication 5).

Figure 61:
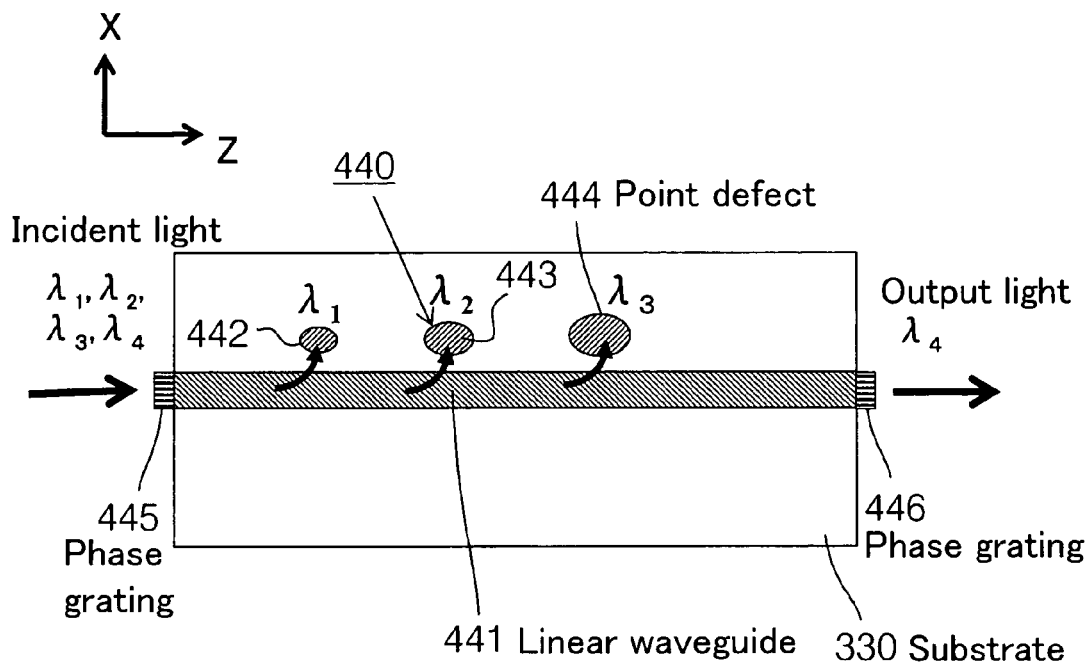
FIG. 61 is a plan view illustrating a point-defect resonator as an optical device according to a thirteenth embodiment of the present invention.

FIG. 61 shows a point-defect resonator 440 as an optical device according to a thirteenth embodiment. This point-defect resonator 440 includes a substrate 330, a linear waveguide 441 provided on the substrate, and three point defects 442 to 444 having different magnitudes and provided in the vicinity of the linear waveguide 441. The point defects may be formed of a one-dimensional photonic crystal with the same structure as the waveguide portion and formed in, for example, an elliptical shape. The linear waveguide 441 is formed by the above-described photonic crystal waveguide, for example, by the photonic crystal waveguide 200 shown in FIG. 22. The opposite end faces of the linear waveguide 441 are provided with phase gratings 445 and 446, respectively.

The thirteenth embodiment has advantages as described below.

By providing the point defects 442 to 444 in the vicinity of the linear waveguide 441 formed by the above-described photonic crystal waveguide, propagated light of a specific frequency can be extracted by using the resonance to cause the point defects 442 to 444 to capture the propagated light. It is also possible to introduce a signal at a wavelength applied to the point defects 442 to 444 into the waveguide by reversing the optical path. Accordingly, the photonic crystal waveguide can be used to form a wavelength selection filter or an optical switch.

FOURTEENTH EMBODIMENT

Figure 62:
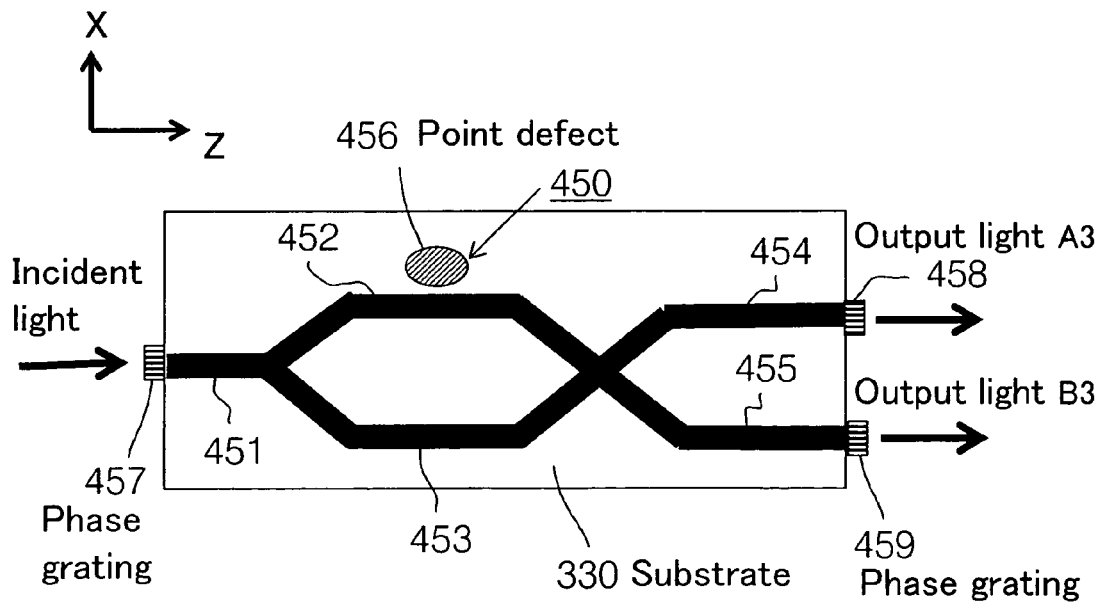
FIG. 62 is a plan view illustrating a point-defect resonator as an optical device according to a fourteenth embodiment of the present invention.

FIG. 62 shows a point-defect resonator 450 as an optical device according to a fourteenth embodiment. The point-defect resonator 450 includes a substrate 330, and a linear waveguide formed on the substrate by the photonic crystal waveguide 200 as shown in FIG. 22. The linear waveguide is composed of a single linear waveguide 451, two waveguides 452 and 453 branched from the waveguide 451, and two linear waveguides 454 and 455 branched from the merging portion of these two waveguides 452 and 453. A point defect 456 is provided in the vicinity of the waveguide 452. The end faces of the waveguides 451, 454, and 455 are provided with phase gratings 457, 458 and 459, respectively.

When the dielectric constant of the point defect 456 is changed by electrical or optical means, the resonance frequency with the linear waveguide 452 is also changed. Therefore, the phase of propagated light in the waveguide 452 can be changed to switch the ports for emitted light (output light A3 and B3).

The fourteenth embodiment has advantages as described below.

By changing the dielectric constant of the point defect 456 provided in the vicinity of the waveguide 452 formed by the above-described photonic crystal waveguide by the use of electrical or optical means, the resonance frequency with the linear waveguide 452 is changed, and thus the phase of propagated light in the waveguide 452 can be changed to switch the ports of the emitted light (output light A3 and B3). Accordingly, the resonator can be used for switching by producing a phase difference by the resonance with waves propagated through the waveguide.

It is possible to freely select the distance between the waveguide 452 and the point defect 456, and size and shape of the point defect 456. Therefore, the designing and manufacture are easy. In contrast, in the case of a conventional defect waveguide using two-dimensional photonic crystal as described in Patent Publications 4 and 5, there is a restriction that the condition is limited to an integral multiple of a two-dimensional period. Therefore, for building a wavelength demultiplexing filter, for example, it is required to change the two-dimensional period in a stepped manner or to take any other appropriate measure.

FIFTEENTH EMBODIMENT

A description will now be made of a dispersion control device as an optical device according to a fifteenth embodiment, with reference to FIGS. 63 to 67.

In an optical communication system, occurrence of dispersion in an optical fiber or optical device will broaden a pulse and thus a signal will be deteriorated. In particular, communication at a high speed such as 40 Gbps or DWDM (dense wavelength division multiplexing) communication is susceptible to the effect of broadened pulse. Therefore, it is crucial to reduce the dispersion in the whole system.

In order to reduce the dispersion in the whole system, it is an effective method to pass a signal that is dispersed in one device through a "dispersion compensation device" which generates dispersion opposite thereto. A dispersion compensation fiber is one of devices for compensating wavelength dispersion by a long-distance fiber. It is also well known that the pulse width can be compressed by passing a pulse with large red-shift chirping produced by a gain switching semiconductor laser or the like through an optical fiber having negative wavelength dispersion.

Figure 63:
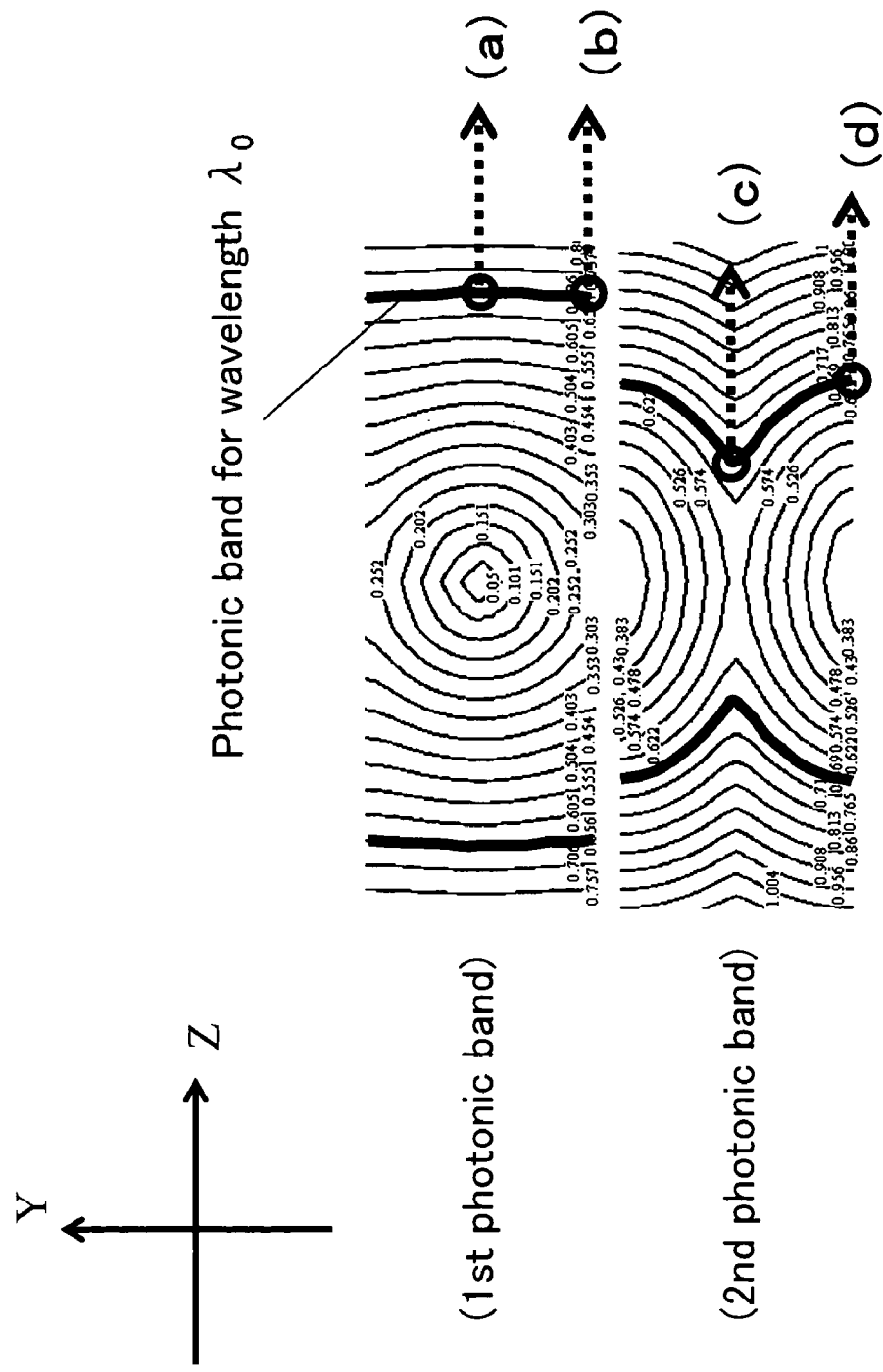
FIG. 63 is a band diagram used for explanation of a dispersion control device as an optical device according to a fifteenth embodiment of the present invention.

The device according to this embodiment can be directly used as a device for controlling dispersion, by utilizing the photonic crystal waveguide and propagated light having a condition of large dispersion. In terms of a one-dimensional photonic crystal with a period a that is formed by alternately stacking a medium A having a refractive index $n_A$ of 2.10 (thickness $t_A$ of 0.5a); and a medium B having a refractive index $n_B$ of 1.45 (thickness $t_B$ of 0.5a), consideration is given to propagated light traveling in the Z-direction by the following photonic bands:

(a) the first band on the Brillouin zone center line;
(b) the first band on the Brillouin zone boundary;
(c) the second band on the Brillouin zone center line; and
(d) the second band on the Brillouin zone boundary. The positions of the propagated light on the band diagram are shown in FIG. 63. FIGS. 64 to 67 are graphs in which the relation between the wavelengths of incident light (horizontal axis) and the dispersion (ordinate) obtained by the photonic band calculation for the propagated light (a) to (d), respectively. In the graphs of FIGS. 64 to 67, the unit of the horizontal axis is a, while the unit of the vertical axis is 1/ca (c denotes a velocity of light). If a is 1000 nm, for example, "1" on the horizontal axis corresponds to 1000 nm, and "1" on the vertical axis corresponds to about 3.3 ps/nm/m (dispersion of about 3.3 ps per wavelength difference of 1 nm for a waveguide with a length of 1 m). Although no consideration is given to material dispersion in this calculation, this will pose no problem since the absolute value and change of the dispersion is far greater than the material dispersion of quartz or the like.

The fifteenth embodiment has advantages as described below.

The use of propagation having large dispersion makes it possible to give the opposite dispersion to a signal that is dispersed in an optical communication system, and to compensate the wavelength dispersion caused by a long-distance optical fiber.

Taking as an example the case of the propagated light (d) illustrated in the graph of FIG. 66, it is apparent that the dispersion is varied in the following four regions as the wavelength of incident light is increased.

i) The dispersion is positive, and the graph inclines downward to the right to zero dispersion (region 461);
ii) The dispersion is negative, and the graph inclines downward to the right to the minimum value (region 462);
iii) The dispersion is negative, and the graph inclines upward to the right to zero dispersion (region 463); and
iv) The dispersion is positive, and the graph inclines upward to the right with the gradient being increased drastically (region 464).

Since the period of the above-described one-dimensional photonic crystal can be selected arbitrarily, the propagation can be used for dispersion control in any region according to the frequency range. For example, the dispersion in the region 462 is opposite to that of an ordinary single-mode optical fiber (SMF). Therefore, the propagation can be used for compensating dispersion of the SMF. Further, the positive dispersion is very large in the region 464, and hence pulse compression can be achieved even with a short waveguide. However, the pulse that can be compressed in this manner is limited to the pulse with blue-shift chirping.

Figure 66:
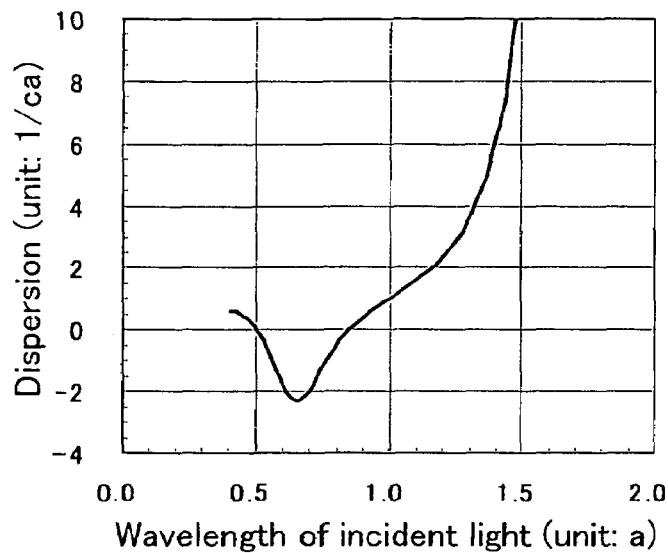
FIG. 66 is a graph illustrating the relation between dispersion and the wavelength of incident light obtained by calculation with the propagated light (c) in FIG. 63.
Figure 67:
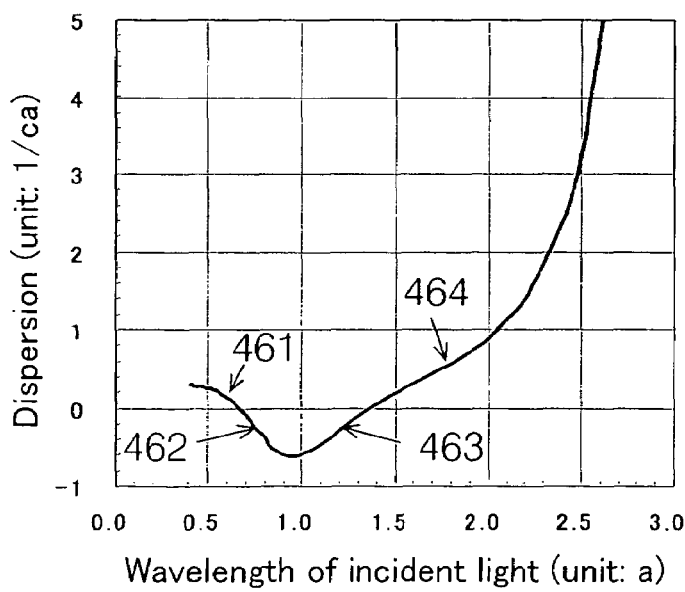
FIG. 67 is a graph illustrating the relation between dispersion and the wavelength of incident light obtained by calculation with the propagated light (d) in FIG. 63.

In the case of the propagation (c) illustrated in FIG. 66 as well, the dispersion exhibits a similar change to that of the propagation (d) illustrated in FIG. 67. Therefore, it is useful for control of dispersion.

Figure 64:
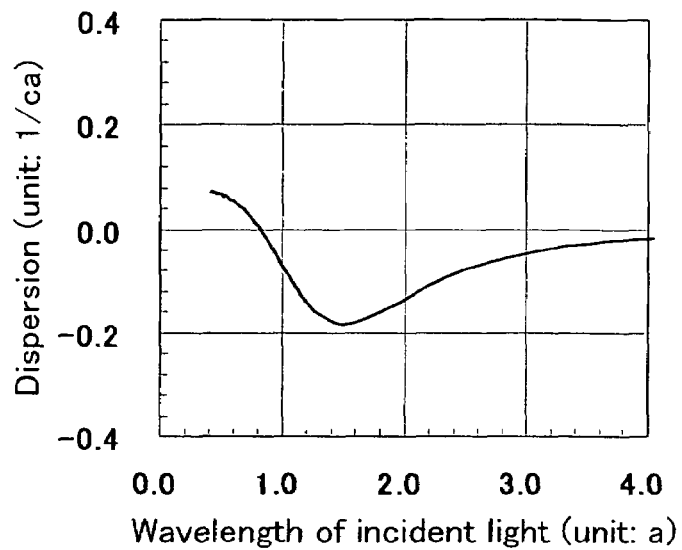
FIG. 64 is a graph illustrating the relation between dispersion and the wavelength of incident light obtained by calculation with the propagated light (a) in FIG. 63.
Figure 65:
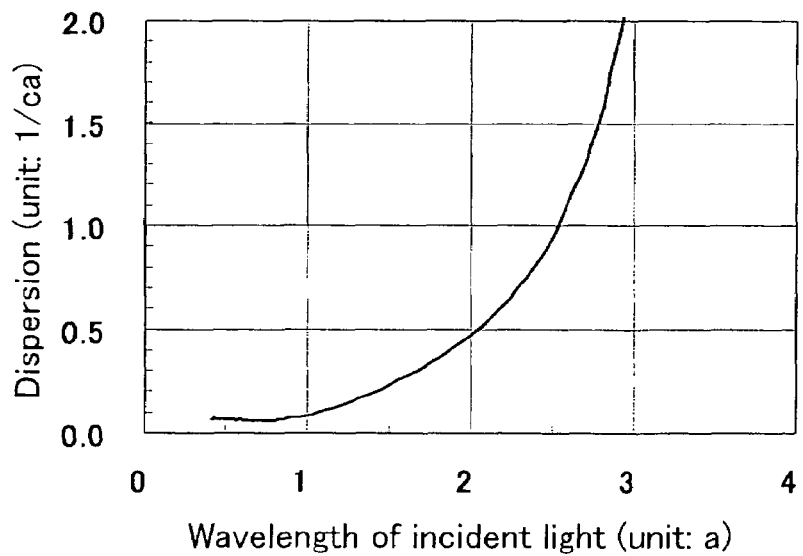
FIG. 65 is a graph illustrating the relation between dispersion and the wavelength of incident light obtained by calculation with the propagated light (b) in FIG. 63.

The propagation (a) shown in FIG. 64 and the propagation (b) shown in FIG. 65 can of course be used for control of dispersion. However, the propagation (c) and (d) are easier to use.

SIXTEENTH EMBODIMENT

A description will now be made on an optical amplifying device 500 as an optical device according to a sixteenth embodiment, with reference to FIG. 68.

The optical amplifying device 500 is formed by using a photonic crystal waveguide 510 similar to the photonic crystal waveguide 200 shown in FIG. 21 and having a core 511 and a cladding 512. The photonic crystal waveguide 510 of this embodiment, however, is different from the photonic crystal waveguide 200 in that the core 511 contains a light-emitting material such as erbium or bismuth. The photonic crystal waveguide 510 is formed on a substrate 330, one end face 511a and the other end face 511b of the core 511 are provided with phase gratings 513 and 514, respectively. These phase gratings 513 and 514 have functions similar to the phase grating 64 shown in FIG. 10 or the phase grating 70 shown in FIG. 15.

The core 511 may be made to contain a light-emitting material such as erbium or bismuth, for example by:

making the material of the core 511 of a periodic multilayer film structure to contain a light-emitting material; or using a light-emitting material itself as the material of the core 511.

The sixteenth embodiment has advantages as described below.

It is possible to amplify incident signal light 517 and to obtain signal light 518 thus amplified by irradiating the photonic crystal waveguide 510 of the optical amplifying device 500 with pump light 516 to excite the light-emitting material such as erbium or bismuth contained in the core 511.

It is possible to efficiently couple the photonic crystal waveguide 510 to an external single-mode optical fiber by producing the same so as to satisfy the perfect confinement conditions described above.

SEVENTEENTH EMBODIMENT

A description will now be made of a waveguide device with electrodes 600 as an optical device according to a seventeenth embodiment, with reference to FIG. 69. In the following description, the same reference numerals are given to those components that are similar to those of FIG. 68 and will not be described again.

Figure 68:
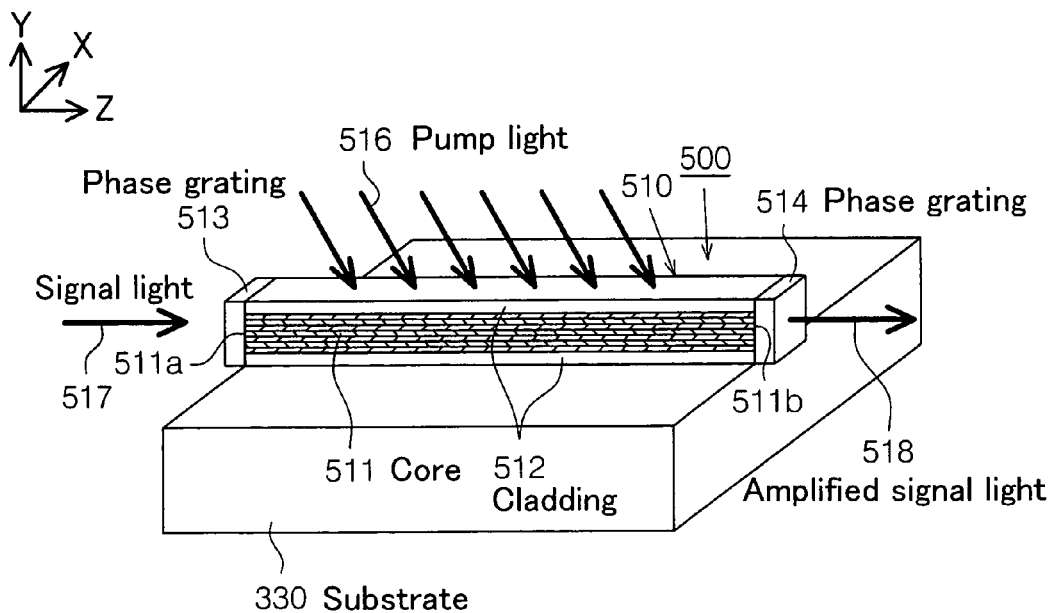
FIG. 68 is a perspective view illustrating an optical amplifying device as an optical device according to a sixteenth embodiment of the present invention.

The waveguide device with electrodes 600 is formed by a photonic crystal waveguide 610 similar to the photonic crystal waveguide 510 of FIG. 68. The photonic crystal waveguide 610 of this embodiment, however, is different from the photonic crystal waveguide 510 in that the core 611 thereof contains a material having nonlinear characteristics (hereafter, to be referred to as the "nonlinear material").

The waveguide device with electrodes 600 is provided with electrodes 520 and 521 so as to sandwich the entire cladding 512 formed on the top and bottom of the photonic crystal waveguide 610. These electrodes 520 and 521 are transparent electrodes formed of, for example, an indium tin oxide film. The both electrodes 520 and 521 are connected to a power supply 523 via a conductor wire 522. The nonlinear effect of the photonic crystal waveguide 610 (nonlinear material) is controlled by controlling the voltage or electric current applied to the electrodes 520 and 521.

The core 511 may be made to contain a nonlinear material, for example, by:

having the material of the core 611 of a periodic multilayer film structure contain a nonlinear material; or using a nonlinear material itself as the material of the core 611.

The seventeenth embodiment has advantages as described below.

It is possible to control the nonlinear effect of the nonlinear material contained in the core 611 of the photonic crystal waveguide 610 by controlling the voltage or electric current applied to the electrodes 520 and 521. This makes it possible to make the nonlinear effect caused by a group velocity anomaly variable, and to provide a nonlinear device with a strong nonlinear effect.

Figure 69:
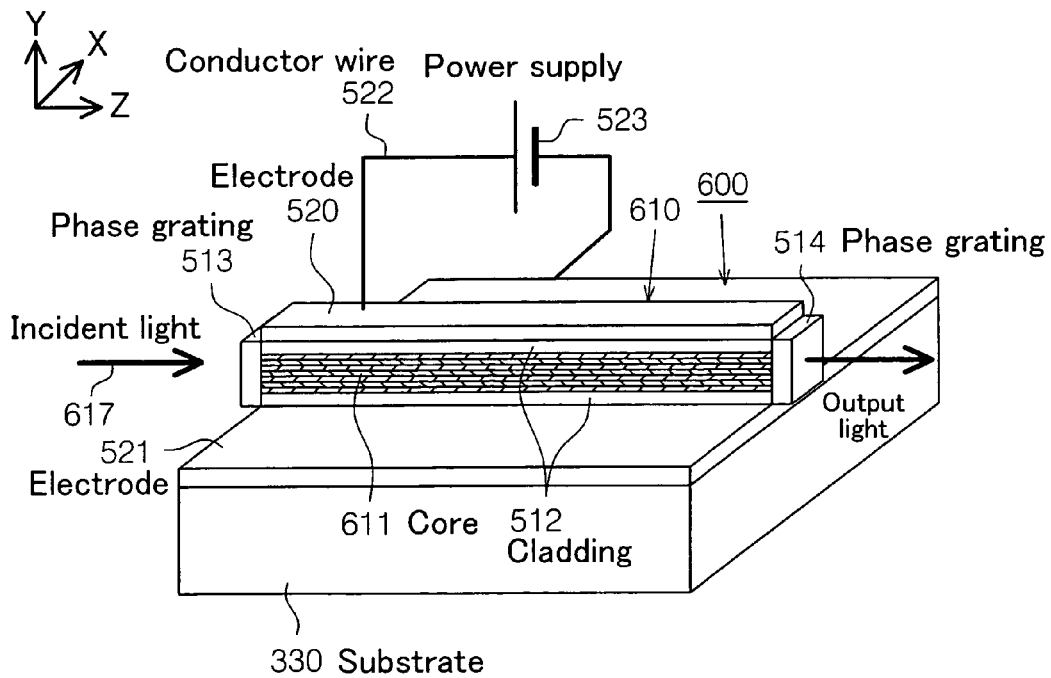
FIG. 69 is a perspective view illustrating a waveguide device with electrodes as an optical device according to a seventeenth embodiment of the present invention.

As an application of this embodiment, electrodes may be attached to the delay portion 423 of the optical delay line 420 shown in FIG. 59, or to the photonic crystal waveguide forming the delay portion 433 of the optical delay line 430 shown in FIG. 60, in a manner similar to FIG. 69. This configuration makes it possible to control the delay amount by the delay portion 423 of the optical delay line 420 or by the delay portion 433 of the optical delay line 430 by controlling the electric field (voltage) or electric current applied to the electrodes. It is possible to provide an optical switch or the like by using such optical delay line the delay amount of which is controllable.

EIGHTEENTH EMBODIMENT

A description will now be made on a waveguide device with electrodes 600A as an optical device according to an eighteenth embodiment with reference to FIG. 70.

This waveguide device with electrodes 600A has a similar structure to that of the waveguide device with electrodes 600 of the seventeenth embodiment shown in FIG. 69, while wavelength conversion of laser light is possible in this waveguide device with electrodes 600A.

Figure 70:
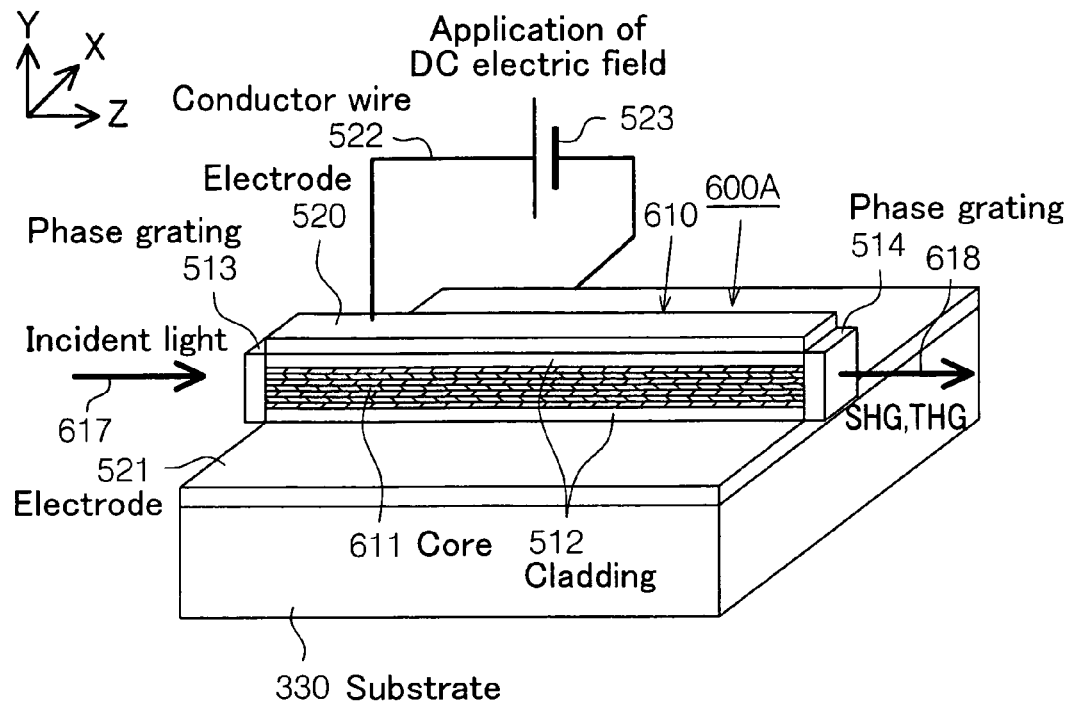
FIG. 70 is a perspective view illustrating a waveguide device with electrodes as an optical device according to an eighteenth embodiment of the present invention.

The waveguide device with electrodes 600A shown in FIG. 70 is placed in a high temperature condition, and then returned to a normal temperature with DC voltage applied thereto. This process is referred to as poling, and has an effect to enhance the characteristics of the nonlinear material contained in the core 611 of the photonic crystal waveguide 610.

The eighteenth embodiment has advantages as described below.

When incident light 617 that is laser light is introduced into the photonic crystal waveguide 610 of the waveguide device with electrodes 600A that has been subjected to the poling process, it is possible to produce emitted light 618 of, for example, strong second higher harmonic waves (SHG), or third higher harmonic waves (THG). Therefore, wavelength conversion of laser light is possible.

NINETEENTH EMBODIMENT

Figure 71:
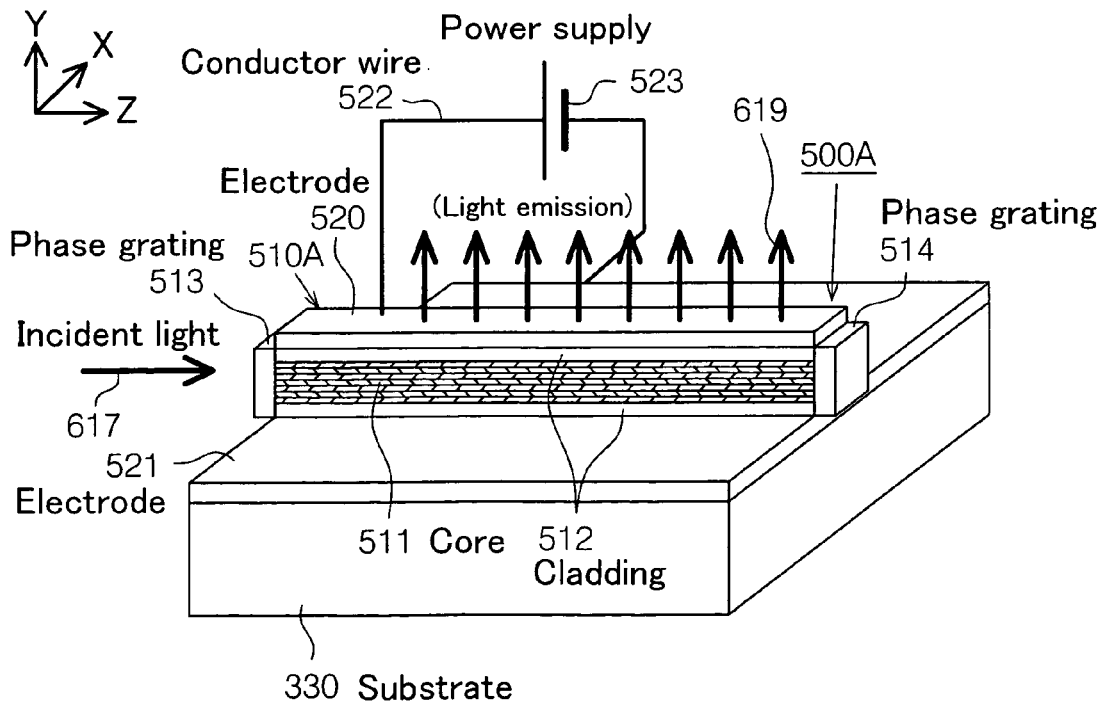
FIG. 71 is a perspective view illustrating a waveguide device with electrodes as an optical device according to a nineteenth embodiment of the present invention.

A description will now be made on a waveguide device with electrodes 500A as an optical device according to a nineteenth embodiment, with reference to FIG. 71. Like the photonic crystal waveguide 510 of the optical amplifying device 500 according to the sixteenth embodiment shown in FIG. 68, this waveguide device with electrodes 500A also has a photonic crystal waveguide 510A the core 511 of which contains a light-emitting material such as erbium or bismuth. Like the seventeenth embodiment shown in FIG. 69, the photonic crystal waveguide 510A is provided with electrodes 520 and 521 which are transparent electrodes. These electrodes 520 and 521 are connected to a power supply 523 via a conductor wire 522.

The nineteenth embodiment thus configured has advantages as described below.

It is possible to amplify incident light 617 by the light-emitting material and to emit the amplified light upwards through the electrode 520 by applying a voltage or electric current to both of the electrodes 520 and 521 with the incident light 617 being introduced into the photonic crystal waveguide 510A. Therefore, the waveguide device with electrodes 500A can be formed as a light-emitting device.

TWENTIETH EMBODIMENT

Figure 72:
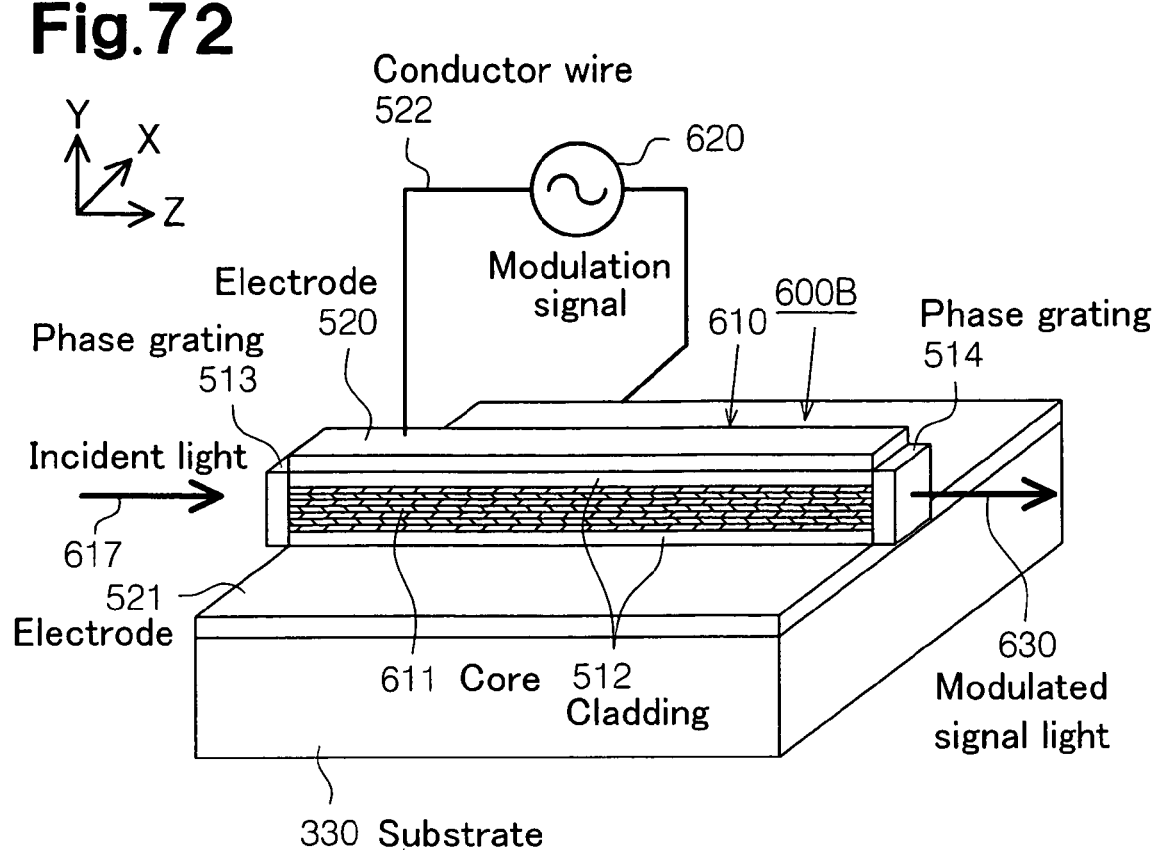
FIG. 72 is a perspective view illustrating a waveguide device with electrodes as an optical device according to a twentieth embodiment of the present invention.

A description will now be made of a waveguide device with electrodes 600B as an optical device according to a twentieth embodiment with reference to FIG. 72. This waveguide device with electrodes 600B utilizes a photonic crystal waveguide 610 that is similar to that of the eighteenth embodiment shown in FIG. 70, and is a modulating device provided with a modulator 620 for changing the voltage or electric current applied to electrode 520 and 521, which are arranged to sandwich the waveguide in the same manner as in the eighteenth embodiment.

The twentieth embodiment has advantages as described below.

By changing the voltage or electric current applied to the electrodes 520 and 521 of the photonic crystal waveguide 610 by the modulator 620, it is possible to modify the incident light 617 in terms of phase, amplitude, polarization plane, or frequency, and to obtain emission of modified signal light 630.

TWENTY-FIRST EMBODIMENT

A description will now be made of a beam-splitting device as an optical device according to a twenty-first embodiment, with reference to FIGS. 78 to 84.

Patent Publications 6 to 11 mentioned in the above describes a beam-splitting device which is designed to use "high-order band propagated light in the Brillouin zone center".

In contrast, according to this embodiment, the "slant end face incidence" described above is used to couple to the band on the Brillouin zone boundary, and thus to provide a highly efficient spectroscope.

FIG. 78(*a*) is a schematic diagram of a spectroscope according to this embodiment. The optical device 140 shown in FIG. 78 is formed of a one-dimensional photonic crystal having periodicity only in one direction (Y-direction), and includes a core 141 which propagates electromagnetic waves (propagated light) in a direction perpendicular to the one direction (XZ-plane direction), upper and lower claddings 142 and 143 as cladding layers, and a substrate 144. The cladding (multilayer cladding film) 142 is a cladding on the substrate side, while the cladding (multilayer cladding film) 143 is a cladding on the air side.

In the core 141, when incident light (plane waves) 145 is incident at a specific angle on a slant end face (end face inclination angle $\psi_1$) that is not parallel to the periodic direction of the one-dimensional photonic crystal, the first band propagation on the Brillouin zone boundary 146 (see FIG. 78(b)) travels in the Z-axis direction. However, if confinement in the Y-direction is weak, part of the propagated light will be refracted to the air side or the substrate side. The directions of the refracted light (angles $\theta1$ and $\theta2$) are fixed in relation to the wavelength in vacuum $\lambda_0$ of the incident light 145, and hence a pencil with a very high directivity can be obtained. The use of the band on the Brillouin zone boundary 146 largely changes the effective refractive index in response to the change in wavelength of the incident light 145, and hence the values of $\theta1$ and $\theta2$ vary largely with the change of $\lambda_0$. Accordingly, the device can be used as a demultiplexing device with a high resolution.

Referring to FIG. 7, the change of the effective refractive index is increased in relation to the change in frequency of incident light, in the region where the wave vector is close to "0" and the curve of the graph is close to a level line, or in the region where the effective refractive index is less than one. In such a case, leakage of refracted light cannot be prevented even if air is used as the media on the top and bottom of the photonic crystal. Therefore, confinement of light in the vertical direction is made possible even if the effective refractive index is less than one, by using the photonic crystal as the claddings 142 and 143, as described above. The upper and lower claddings 142 and 143 may be provided with mutually different confinement effects by differing the number of layers forming the claddings, so that refracted light can be obtained only from one surface.

Further, the widths W1 and W2 of pencils emitted from the surface can be changed by adjusting the intensity of the confinement effects by the claddings 142 and 143. For example, if the confinement effect is reduced (the number of periods of the cladding is reduced), energy of propagated light is rapidly changed to refracted light and thus the width of the pencil flux is reduced. If the confinement effect is enhanced (the number of periods of the claddings 142 and 143 is increased), the width of the pencil is increased. In the same manner as an ordinary prism or diffraction grating, the wavelength resolution is improved in proportion to width of the pencil in the spectroscope. Thus, the wavelength resolution can also be changed depending on the number of periods of the claddings 142 and 143. It is of course necessary to increase the size of the device as the pencil width is increased.

The present inventors actually produced spectroscopes based on the principles as described above to evaluate their demultiplexing characteristics and efficiency to use incident light. Specific contents will be described in detail below.

(Sample 1)

A demultiplexing device 140A as Sample 1 was formed on a substrate 144A of quartz by forming a multilayer film having a structure as shown in Table 1 below.

TABLE 1

| (Sample 1) Substrate | | |
|---|---|---|
| Substrate-Side Cladding | $Ta_2O_5$ 195 nm $SiO_2$ 455 nm . . . $Ta_2O_5$ 195 nm $SiO_2$ 455 nm | Period of Cladding 650 nm 10 Layers (5 Periods) Film Thickness Ratio 3:7 |

TABLE 1-continued

| (Sample 1) Substrate | | |
|---|---|---|
| Core | $Ta_2O_5$ 153 nm $SiO_2$ 357 nm . . . $Ta_2O_5$ 153 nm $SiO_2$ 357 nm | Period of Core 510 nm 40 Layers (20 Periods) Film Thickness Ratio 3:7 |
| Air-Side Cladding | $Ta_2O_5$ 195 nm $SiO_2$ 455 nm . . . $Ta_2O_5$ 195 nm $SiO_2$ 455 nm | Period of Cladding 650 nm 20 Layers (10 Periods) Film Thickness Ratio 3:7 |
| (Air Layer) | | |

FIGS. 79(a) and 79(b) illustrate the external shape of the demultiplexing device 140A and an angle of the slant incident surface. The emitting end face of the substrate 144A was also formed obliquely to reduce Fresnel reflection of emitted light.

Light emitted from a variable-wavelength laser (linear polarization) was transmitted by a polarization maintaining fiber, and the light emitted from the end of the fiber was converted into a parallel pencil by a collimator. This parallel pencil was focused by a plano-convex cylindrical lens to be used as incident light. The incident light spot is linear in shape with a numerical aperture (NA) of 0.1 and a length of 1 mm. The incident light spot was matched with the core portion of the slant end face of the multilayer film 141A to set the incident angle $\phi$ 1 to 15 degrees. The polarization direction of the incident light was TE polarization (the electric field was in the X-axis direction). As used herein, the "multilayer film 141A" includes the three portions together, namely, the core, the substrate-side cladding, and the air-side cladding.

Figure 80:
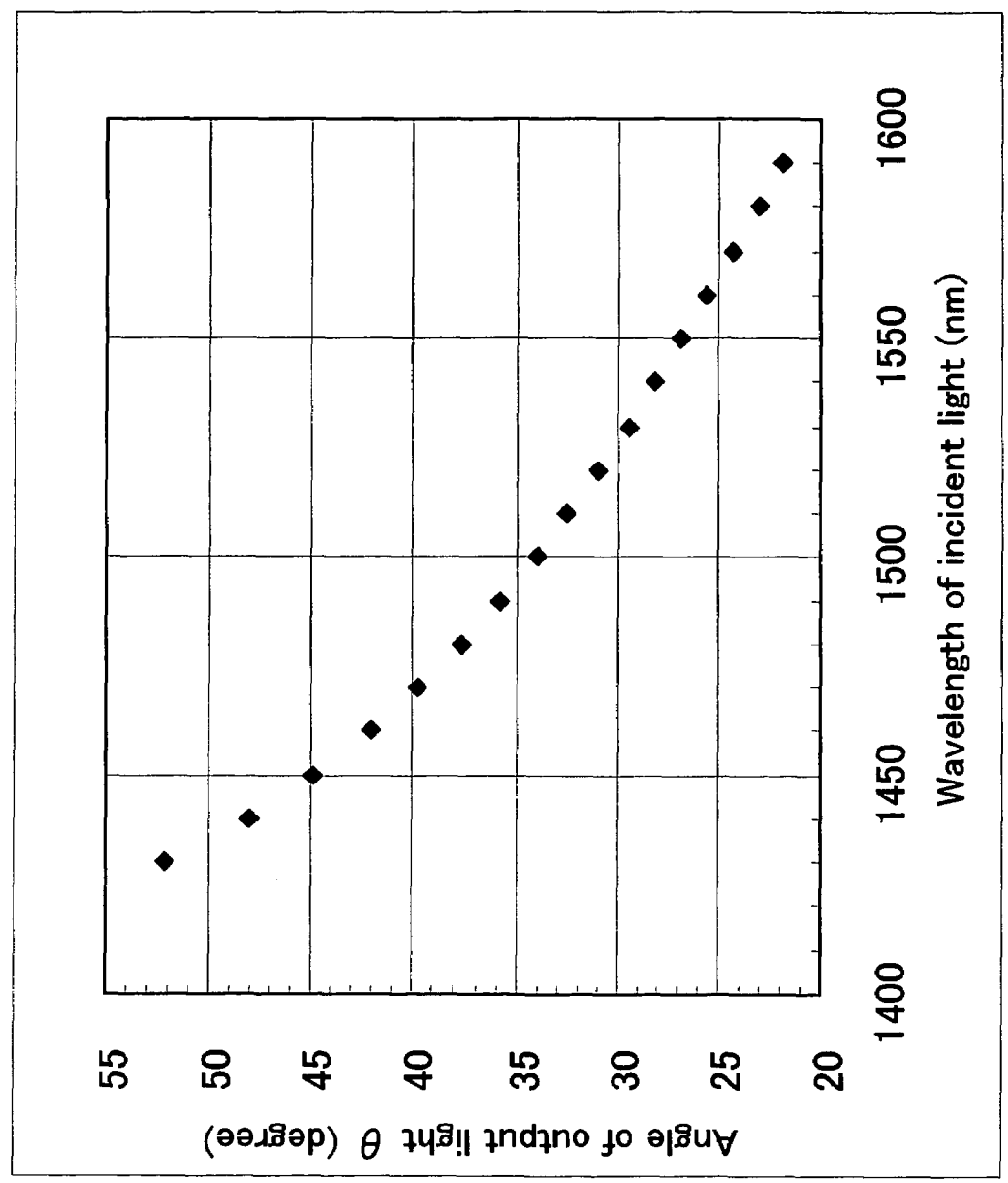
FIG. 80 is a graph illustrating angular dispersion of the optical device of the sample 1.

The direction of the emitted light from the slant end face of the multilayer film 141A was measured with an infrared CCD camera. The angle $\theta$ of the emitted light shown in FIG. 79(b) varied as shown in FIG. 80. The change in the exit angle $\theta$ was as large as 0.15 to 0.30 degrees with respect to 1 nm change of incident wavelength. It is apparent that this value is several times greater than that of an ordinary diffraction grating.

The efficiency obtained by dividing the intensity of the emitted pencil by the intensity of the incident pencil was 34% when the incident wavelength was 1550 nm.

(Sample 2)

A demultiplexing device 140B was produced as Sample 2 by forming on a substrate 144B of optical glass BK7 a multilayer film having a structure as shown in Table 2 below

TABLE 2

| (Sample 2) Substrate | | |
|---|---|---|
| Substrate-Side Cladding | $Ta_2O_5$ 172 nm $SiO_2$ 268 nm . . . $Ta_2O_5$ 172 nm $SiO_2$ 268 nm | Period of Cladding 440 nm 10 Layers (5 Periods) Film Thickness Ratio 3.9:6.1 |
| Core | $Ta_2O_5$ 132 nm $SiO_2$ 308 nm . . . $Ta_2O_5$ 132 nm $SiO_2$ 308 nm | Period of Core 440 nm 40 Layers (20 Periods) Film Thickness Ratio 3:7 |

TABLE 2-continued

| (Sample 2) Substrate | | |
|---|---|---|
| Air-Side Cladding | Ta$_2$O$_5$ 172 nm<br>SiO$_2$ 268 nm<br>. . .<br>Ta$_2$O$_5$ 172 nm<br>SiO$_2$ 268 nm | Period of Cladding<br>440 nm<br>20 Layers (10 Periods)<br>Film Thickness Ratio<br>3.9:6.1 |
| (Air Layer) | | |

FIGS. 81(a) and 81(b) illustrate the external shape of the demultiplexing device 140B and an angle of the slant incident surface. The "multilayer film 141B" shown in FIG. 81 includes three portions together, namely the core, the substrate-side cladding, and the air-side cladding.

Figure 82:
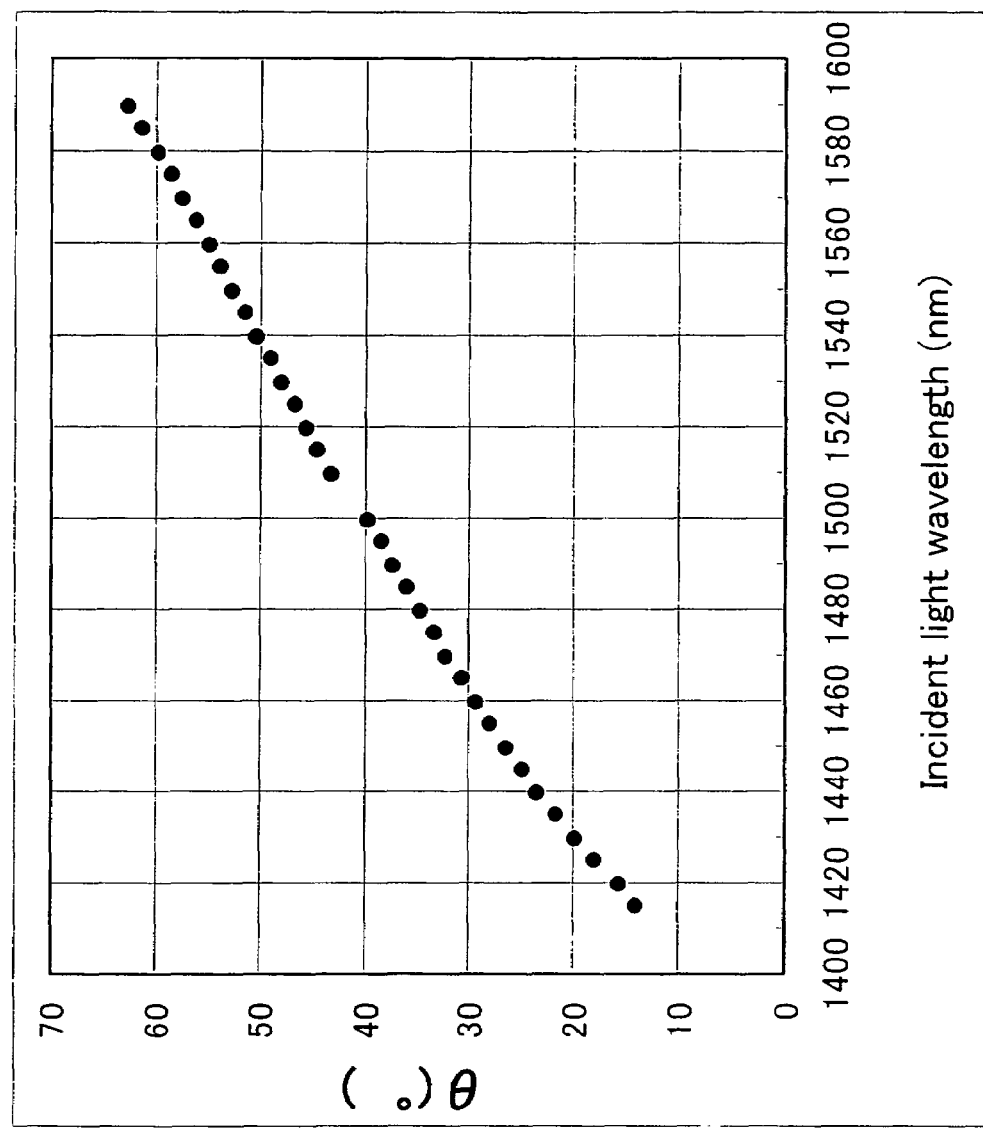
FIG. 82 is a graph illustrating angular dispersion of the optical devices of sample 2 and sample 3.

When incident light (TE polarization) similar to Sample 1 was incident with an incident angle $\phi_1$ set to 43 degrees, the angle θ of emitted light varied as shown in FIG. 82. The change in the exit angle θ was as large as 0.25 degrees with respect to 1 nm change of incident wavelength.

The efficiency obtained by dividing the intensity of the emitted pencil by the intensity of the incident pencil was 56% when the incident wavelength was 1550 nm.

(Sample 3)

A demultiplexing device (not shown) was produced as Sample 3 by forming on a substrate of optical glass BK7 a multilayer film having a structure as shown in Table 3 below

TABLE 3

| (Sample 2) Substrate | | |
|---|---|---|
| Substrate-Side Cladding | Ta$_2$O$_5$ 172 nm<br>SiO$_2$ 268 nm<br>. . .<br>Ta$_2$O$_5$ 172 nm<br>SiO$_2$ 268 nm | Period of Cladding<br>440 nm<br>20 Layers (10 Periods)<br>Film Thickness Ratio<br>3.9:6.1 |
| Core | Ta$_2$O$_5$ 132 nm SiO$_2$ 308 nm<br>. . .<br>Ta$_2$O$_5$ 132 nm<br>SiO$_2$ 308 nm | Period of Core<br>440 nm<br>40 Layers (20 Periods)<br>Film Thickness Ratio<br>3:7 |
| Air-Side Cladding | Ta$_2$O$_5$ 172 nm<br>SiO$_2$ 268 nm<br>. . .<br>Ta$_2$O$_5$ 172 nm<br>SiO$_2$ 268 nm | Period of Cladding<br>440 nm<br>20 Layers (10 Periods)<br>Film Thickness Ratio<br>3.9:6.1 |
| (Air Layer) | | |

The demultiplexing device 140C (not shown) of Sample 3 is substantially the same as the demultiplexing device 140B of Sample 2 described above, but they are different in the number of periods of the substrate-side cladding. The external shape of the demultiplexing device and the angle of the slant incident surface are similar to those of Sample 2 (FIG. 81). When incident light (TE polarization) similar to Sample 2 was incident with the incident angle $\phi_1$ set to 43 degrees, the change in angle θ of the emitted light was similar to that shown in FIG. 82. However, the efficiency obtained by dividing the intensity of the emitted pencil by the intensity of the incident pencil was 24% when the incident wavelength was 1550 nm.

In the demultiplexing device of Sample 3, the opposite (upper and lower) claddings had an identical number of periods, and thus the refracted light was split to the substrate-side and the air-side, which reduced the efficiency in comparison with Sample 2. At the same time, since the confinement was enhanced, the intensity of refracted light per propagation length was reduced, resulting in increase of the width of emitted pencil. Accordingly, the wavelength resolution as the demultiplexing device was improved.

(Sample 4)

Figure 83:
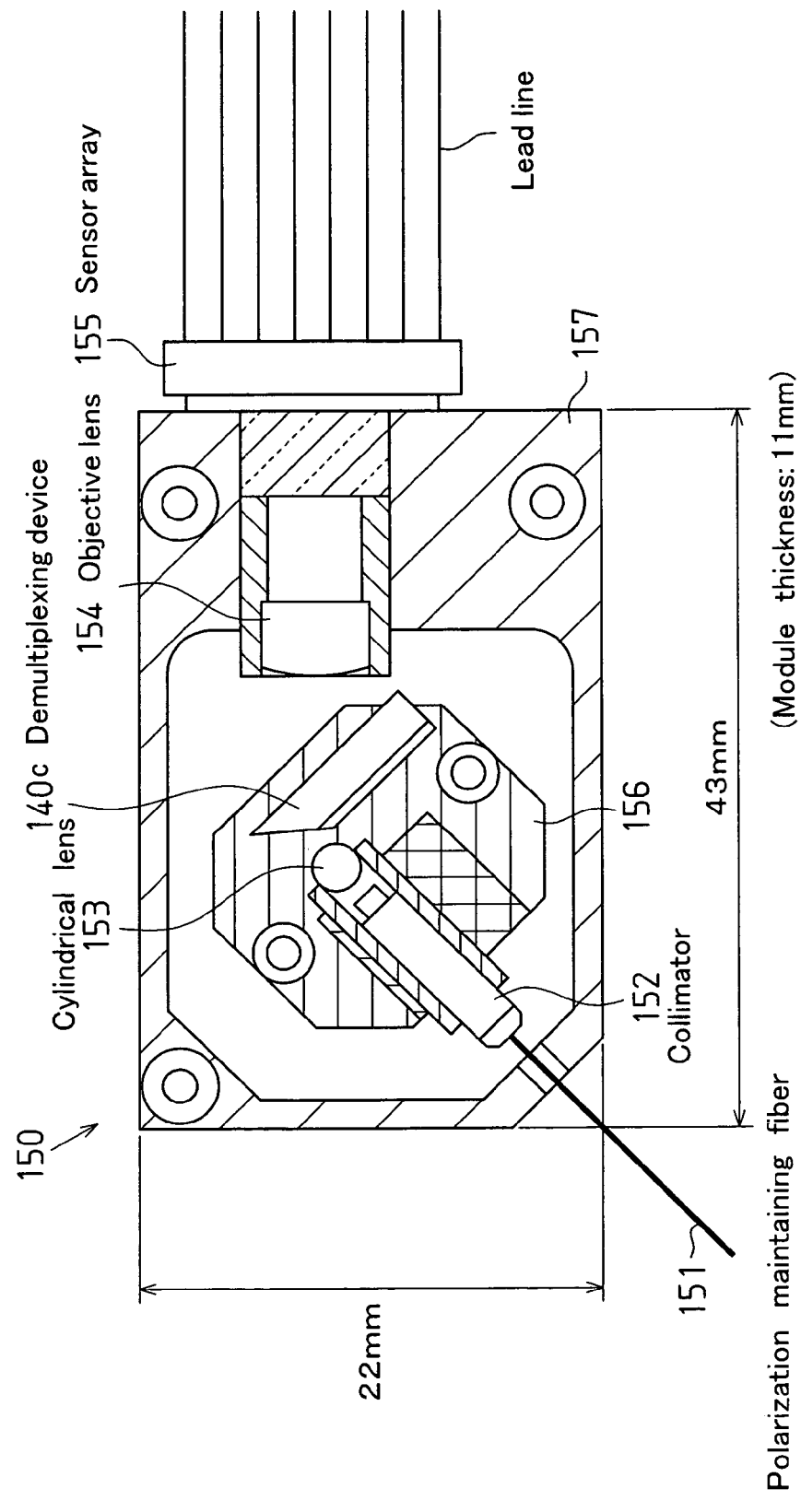
FIG. 83 is an explanatory diagram schematically illustrating configuration of a DWDM wavelength monitor module as sample 4 according to the twenty-first embodiment.

This sample was produced as a DWDM wavelength monitor module by incorporating the demultiplexing device 140C of Sample 3 in a housing as shown in FIG. 83.

The DWDM wavelength monitor module 150 shown in FIG. 83 is configured as described below.

A collimator 152 formed by a rod lens is arranged at the distal end of a polarization plane maintaining fiber 151 conveying incident light (TE polarization) to convert the light into a parallel pencil. Additionally, a cylindrical lens 153 (a cylinder with a diameter φ of 3 mm, made of an optical glass BK7) is provided to convert the pencil into an incident spot.

The demultiplexing device 140C of Sample 3 is attached to the incident spot with its slant end face adjusted, and the pencil emitted from the substrate-side surface is focused by an objective lens (condenser lens) 154 having a effective diameter φ of 6 mm, and a focal length of 15 mm.

A sensor array 155 having 22 photodetectors arranged at intervals of 50 μm is attached to the imaging plane.

The collimator 152, the cylindrical lens 153, and the demultiplexing device 140C are integrally held by a holder 156. This holder 156 and the objective lens 154 are fixed to the housing 157.

If the incident light has a wavelength of about 1550 nm, optical signal spots with a wavelength difference of 0.8 nm are focused on adjacent detectors, respectively. The wavelength difference of 0.8 nm corresponds to a frequency difference of 100 GHz. This is a wavelength difference that is used in so-called DWDM (dense wavelength division multiplexing) communication. The housing and main metal parts are formed of a non-expansion metal (invar) to minimize the deviation in wavelength caused by temperature variation.

Figure 84:
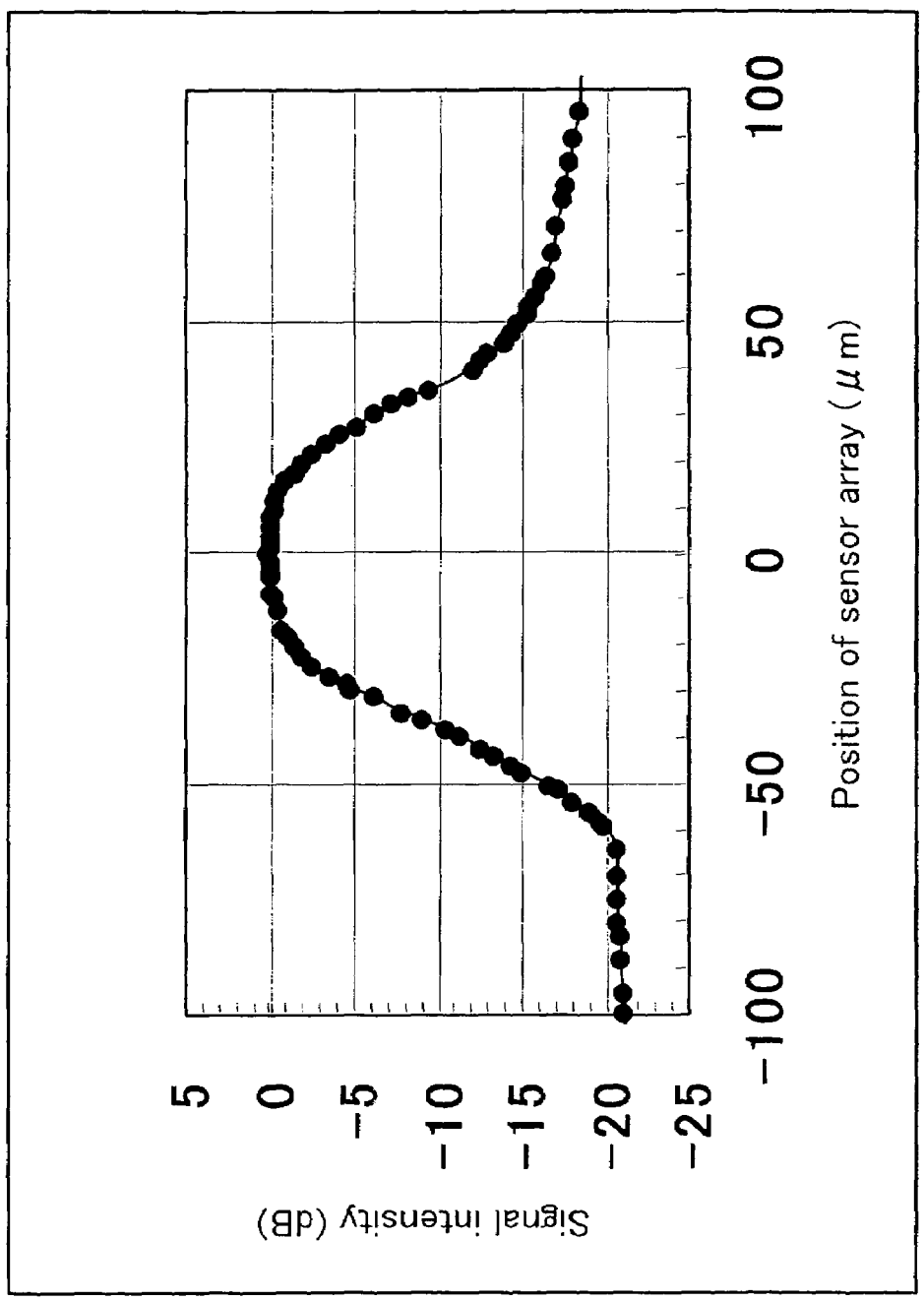
FIG. 84 is a graph illustrating wavelength separating characteristic of Sample 4.

FIG. 84 shows a graph obtained by plotting an output value of a singe sensor while fixing the wavelength of the incident light source to 1550 nm and changing the position of the sensor array 155 in the vertical direction, as viewed in FIG. 83. The cross-talk when the sensor was moved to the position of the adjacent one (±50 μm) was −15 dB. During actual use, the sensor array 155 is adhesively fixed to the housing 157.

The present invention may be otherwise embodied in modifications as described below.

The material of the photonic crystal used for the photonic crystal waveguide is not particularly restricted so far as it is able to ensure transparency in the frequency range to be used. Suitable materials are those commonly used for a multilayer film and are superior in terms of durability and film formation cost, such as silica, silicon, titanium oxide, tantalum oxide, niobium oxide, magnesium fluoride, and silicon nitride. These materials can be easily formed into a multilayer film by a well-known method such as sputtering, vacuum deposition, ion assisted deposition, and plasma CVD.

The wavelength dispersion or the like tends to be increased as the refractive index ratio between a plurality of materials forming the photonic crystal becomes greater. Therefore, it is desirable for a use requiring such characteristics to combine a material having a high refractive index and a material having a low refractive index. A refractive index ratio of 4 or more can be practically realized, for example, by using air (with a refractive index of 1) as the low refractive index material, and InSb (with a refractive index n of 4.21) as the high refractive index material (see "Micro-Optics Handbook", p. 224, Asakura-shoten, 1995).

The difference in characteristics depending on polarization directions tends to be decreased as the refractive index ratio of the materials forming the photonic crystal is decreased. Therefore, a combination of materials with a small refractive index ratio is also useful for realizing non-dependency on polarization. An appropriate selection of materials will enable the effects of the present invention to be exhibited in a typically used wavelength range from about 200 nm to 20 μm.

The above description of the embodiments has been made in terms of a photonic crystal waveguide utilizing a photonic crystal of a periodic multilayer film structure on a substrate and an optical device utilizing such photonic crystal waveguide. However, the photonic crystal waveguide may be formed as a so-called air-bridge structure, by forming the same only of the periodic multilayer film layer without using the substrate.

In the homogeneous medium waveguide 300 according to the third embodiment shown in FIG. 40, the cladding 342 formed of a one-dimensional photonic crystal having periodicity in the Y-direction is provided as a confinement cladding on the opposite surfaces of the core 301 formed of a homogeneous material perpendicular to the Y-direction. However, the present invention is not limited to this. In place of the cladding 342, the confinement cladding may be provided by a metal film or other reflection layer similarly to the cladding 202A shown in FIG. 46.

The "combination of a slant end face and a prism or mirror" and the "combination of a slant end face and a phase grating" described with regard to the photonic crystal waveguide of FIGS. 73 to 77 are also applicable to the homogeneous medium waveguide 300 shown in FIG. 40.

The invention claimed is:

1. A photonic crystal waveguide comprising:

a core formed of a photonic crystal having periodicity in a first direction and propagating an electromagnetic wave in a second direction perpendicular to the first direction, the core comprising a photonic band structure having a Brillouin zone boundary and a photonic band thereon comprising a propagation mode in which the electromagnetic wave is propagated a homogeneous medium cladding having a refractive index a $n_s$; and the core further comprising a side face parallel to the first direction, the side face in contact with the homogeneous medium cladding, the side face satisfying the condition:

$\lambda_0/n_s > a\lambda/(\lambda^2/4+a^2)^{0.5}$ where $\lambda_0$ denotes a wavelength of the electromagnetic wave in a vacuum, a denotes a period of the photonic crystal, and λ denotes a period of the wave propagated through the core in the second direction perpendicular to the first direction.

2. The photonic crystal waveguide according to claim 1, further comprising a confinement cladding formed of at least one of a homogeneous material or a photonic crystal having periodicity in at least the first direction and arranged on a surface of the core perpendicular to the first direction to prevent the electromagnetic wave propagated through the core from leaking out of the surface.

3. The photonic crystal waveguide according to claim 1 wherein a width 2L of the core in a direction perpendicular to a longitudinal direction of the waveguide is in a range of:

$s\lambda/2 \cos \phi_0 \leq 2L < (s+1)\lambda/2 \cos \phi_0$ when a propagation angle φ of the electromagnetic wave satisfying:

$\lambda_0/n_s - a(\lambda/\cos \phi)/\{(\lambda/2 \cos \phi)^2+a^2\}^{0.5}=0$ is in the range of 0<φ<90°, the value in the range defined as a maximum value $\phi_0$ of propagation angles at which the electromagnetic wave is confined by the side face, and a phase shift amount is sπ when the wave propagated through the core is reflected by the side face at the maximum value $\phi_0$ of the propagation angle, and s is in a range of $0 \leq s \leq 1$.

4. The photonic crystal waveguide according to claim 1 wherein a phase shift amount is sπ when the wave propagated through the core in the second direction perpendicular to the first direction is perpendicularly incident on the side face and reflected thereby, s is in the range $0 \leq s \leq 1$, and the conditions:

$\lambda_0/n_s - 2a > 0$ and $s\lambda/2 \leq 2L$ are satisfied.

5. The photonic crystal waveguide according to claim 4, wherein a width 2L of the core in a direction perpendicular a longitudinal direction of the wave guide is in a range of:

$s\lambda/2 \leq 2L < (s+1)\lambda/2$.

6. The photonic crystal waveguide according to claim 1 further comprising a confinement cladding layer formed of a photonic crystal having periodicity in at least the first direction and formed of the same materials as the core, arranged on a surface of the core, and wherein a photonic bandgap is formed by the confinement cladding layer in the first direction confining the propagation mode in the first direction of the core, while making radiation modes similar to the propagation mode.

7. The photonic crystal waveguide according to claim 1 further comprising a phase modulating device on an end face of the core, such that a periodic structure thereof is exposed, the phase modulating device operable for coupling the wave propagated through the core to an external plane wave.

8. The photonic crystal waveguide according to claim 7, wherein when n denotes a refractive index of an external medium and $\lambda_0$ denotes a wavelength of an external plane wave in a vacuum, the phase modulating device using the end face of the core parallel to the first direction as an external coupling face, such that the phase modulating device couples, in the coupling face, plane waves having an incident angle θ in the first direction represented by the formula:

$n \cdot \sin \theta \cdot (a/\lambda_0)=0.5$ to the end face.

9. The photonic crystal waveguide according to claim 7, wherein when n denotes a refractive index of an external medium and $\lambda_0$ denotes a wavelength of an external plane wave in a vacuum, the phase modulating device using the end face of the core parallel to the first direction as an external coupling face, and, in the coupling face, causes two planes having the same phase and having incident angles ±θ in the first direction represented by the formula:

$n \cdot \sin \theta \cdot (a/\lambda_0)=0.5$ to interfere with each other to couple them to the end face.

10. The photonic crystal waveguide according to claim 7, wherein the phase modulating device is a phase grating arranged proximate an incident surface, which is an end face of the core parallel to the one direction, and has a period in the same direction as the photonic crystal forming the core that is twice the period of the photonic crystal; and the phase grating couples the external plane wave to the electromagnetic wave propagated through the core.

11. The photonic crystal waveguide according to claim 7, wherein the phase modulating device is a phase grating arranged proximate the end face of the core parallel to the first direction, and has the same period in the same direction as the photonic crystal forming the core; and at least one of an incident angle or exit angle $\theta$ of an external plane wave coupled to the electromagnetic wave propagated through the core by the phase grating satisfies the formula:

$n \cdot \sin \theta \cdot (a/\lambda_0) = 0.5$ where n denotes a refractive index of an external medium, and $\lambda_0$ denotes a wavelength of the external plane wave in vacuum.

12. The photonic crystal waveguide according to claim 7, wherein the phase modulating device is a phase grating arranged proximate the end face of the core parallel to the first direction, and has a period in the same direction as the photonic crystal forming the core that is twice the period of the photonic crystal; and an incident angle or exit angle $\theta$ of the external plane wave coupled to the wave propagated through the core by the phase grating satisfies the formula:

$n \cdot \sin \theta \cdot (a/\lambda_0) = 0.5$ where n denotes a refractive index of an external medium, and $\lambda_0$ denotes a wavelength of the external plane wave in a vacuum.

13. The photonic crystal waveguide according to claim 7, wherein the core comprises a slant end face inclined with respect to the first direction and the phase modulating device directly couples the external plane wave to the slant end face of the core.

14. The photonic crystal waveguide according to claim 13, further comprising at least one of one of a prism or mirror arranged proximate the slant end face of the core to change an incoming direction or an outgoing direction of the external plane wave.

15. The photonic crystal waveguide according to claim 14, wherein the incoming direction or outgoing direction of the external plane wave is matched with a propagation direction in the core formed by the photonic crystal.

16. The photonic crystal waveguide according to claim 14, wherein the incoming direction or outgoing direction of the external plane wave is perpendicular to a propagation direction in the core formed by the photonic crystal.

17. The photonic crystal waveguide according to claim 14, comprising a prism having a refractive index of 3 or more.

18. The photonic crystal waveguide according to claim 14, further comprising a diffraction grating arranged proximate the slant end face.

19. The photonic crystal waveguide according to claim 18, wherein the incoming direction or the outgoing direction of the external plane wave coupled to the wave propagated through the core by the diffraction grating is matched with a propagation direction in the core formed of the photonic crystal.

20. The photonic crystal waveguide according to claim 1, wherein a width of the core perpendicular to a longitudinal direction of the waveguide is tapered.

21. A photonic crystal waveguide comprising:

a core formed of a photonic crystal having periodicity in a first direction and propagating an electromagnetic wave in a second direction perpendicular to the first direction, the core comprising a photonic band structure having a Brillouin zone center line and a high-order photonic band thereon comprising a propagation mode in which the electromagnetic wave is propagated a homogeneous medium cladding having a refractive index $n_s$; and the core comprising a side face parallel to the first direction in contact with the homogeneous medium cladding the side face satisfying the condition:

$\lambda_0/n_s - \lambda > 0$ where $\lambda_0$ denotes a wavelength of the electromagnetic wave in vacuum, a denotes a period of the photonic crystal, and $\lambda$ denotes a period of the wave propagated through the core in the second direction perpendicular to the first direction.

22. The photonic crystal waveguide according to claim 21, further comprising a confinement cladding, formed at least one of a homogeneous material or a photonic crystal having periodicity in at least the first direction, and arranged on a surface of the core perpendicular to the first direction for preventing the electromagnetic wave propagated through the core from leaking out of the surface.

23. The photonic crystal waveguide according to claim 21 wherein width 2L of the core in a direction perpendicular to a longitudinal direction of the waveguide is in a range of:

$s\lambda/2 \cos \phi_0$ 23 $2L < (s+1)\lambda/2 \cos \phi_0$ with a propagation angle $\phi$ of the electromagnetic wave satisfying:

$\lambda_0/n_s - \lambda/\cos \phi = 0$ and being in a range of $0 < \phi < 90°$, with a value in this range being defined as a maximum value $\phi_0$ of propagation angles at which the electromagnetic wave is confined by the side face; and wherein a phase shift amount is $s\pi$ when the wave propagated through the core is reflected by the side face at the maximum value $\phi_0$ of the propagation angle, and s being in the range $0 \leq s \leq 1$.

24. The photonic crystal waveguide according to claim 21 further comprising a confinement cladding layer, which is formed of a photonic crystal having a periodicity in at least the first direction, is formed of the same materials as the core and is arranged on a surface of the core, and a photonic bandgap formed by the confinement cladding layer confining the propagation mode in the first direction of the core, while making radiation modes similar to the propagation mode.

25. The photonic crystal waveguide according to claim 21 further comprising:

a phase modulating device on an end face of the core where a periodic structure thereof is exposed, the phase modulating device operable for coupling the electromagnetic wave propagated through the core to an external plane wave.

26. The photonic crystal waveguide according to claim 25, wherein when n denotes a refractive index of an external medium and $\lambda_0$ denotes a wavelength of the external plane wave in a vacuum, the phase modulating device using the end face of the core parallel to the first direction as an external coupling face, and, in the coupling face, causes two plane waves having the same phase and having an incident angle $\pm\theta$ in the first direction that is represented by the formula:

$$n \cdot \sin \theta \cdot (a/\lambda_0) = 1.0$$

to interfere with each other to couple them to the end face.

27. The photonic crystal waveguide according to claim 25, wherein when n denotes a refractive index of an external medium, and $\lambda_0$ denotes a wavelength of the external plane wave in a vacuum, the phase modulating device using the end face of the core parallel to the first direction as an external coupling face, and, in the coupling face, causes two plane waves having the same phase and having an incident angle $\pm\theta$ in the first direction that is represented by the formula:

$$n \cdot \sin \theta \cdot (a/\lambda_0) = 1.0$$

and the plane wave with $\theta=0$ to interfere simultaneously to couple them to the end face.

28. The photonic crystal waveguide according to claim 25, wherein:
the phase modulating device is a phase grating arranged proximate an incident surface, and has a same period in a same direction as the photonic crystal forming the core; and
the phase grating couples the external plane wave to the electromagnetic wave propagated through the core.

29. The photonic crystal waveguide according to claim 21 wherein a width of the core perpendicular to a longitudinal direction of the waveguide is tapered.

30. An optical device for use as a directional coupler, the optical device comprising two waveguides formed to be bent proximate each other in a coupling region having a predetermined coupling length, in which each of the two waveguides is formed of a photonic crystal waveguide, with each photonic crystal waveguide comprising:
a core formed of a photonic crystal having periodicity in a first direction and which propagates an electromagnetic wave in a second direction perpendicular to the first direction, the core comprising a photonic band structure having a Brillouin zone boundary and a photonic band present thereon comprising a propagation mode in which the electromagnetic wave is propagated;
a homogeneous medium cladding having a refractive index $n_s$; and
the core comprising a side face parallel to the first direction in contact with the homogeneous medium cladding, the side face satisfying the condition:

$$\lambda_0/n_s > a\lambda/(\lambda^2/4 + a^2)^{0.5}$$

where $\lambda_0$ denotes a wavelength of the electromagnetic wave in a vacuum, a denotes a period of the photonic crystal, and $\lambda$ denotes a period of the wave propagated trough the core in the second direction perpendicular to the first direction.

31. An optical device for use as a Mach Zehnder optical switch, the optical device comprising a first single linear waveguide, two branched waveguides branched from the first single liner waveguide, and a second single linear waveguide formed by merging the two branched waveguides, in which each of the waveguides is formed by a photonic crystal waveguide comprising:
a core formed of a photonic crystal having periodicity in a first direction and which propagates an electromagnetic wave in a second direction perpendicular to the first direction, the core comprising a photonic band structure having a Brillouin zone boundary and a photonic band present thereon comprising a propagation mode in which the electromagnetic wave is propagated;
a homogeneous medium cladding having a refractive index $n_s$; and
the core comprising a side face parallel to the first direction in contact with the homogeneous medium cladding, the side face satisfying the condition:

$$\lambda_0/n_s > a\lambda/(\lambda^2/4 + a^2)^{0.5}$$

where $\lambda_0$ denotes a wavelength of the electromagnetic wave in a vacuum, a denotes a period of the photonic crystal, and $\lambda$ denotes a period of the wave propagated through the core in the second direction perpendicular to the first direction.

32. An optical device for use as an optical delay line, the optical device comprising a linear waveguide and a single waveguide having a delay portion, wherein each of the waveguides and the delay portion are formed of a photonic crystal waveguide comprising:
a core formed of a photonic crystal having periodicity in a first direction and which propagates electromagnetic wave in a second direction perpendicular to the first direction, the core comprising a photonic band structure having a Brillouin zone boundary and a photonic band present thereon comprising a propagation mode in which the electromagnetic wave is propagated;
a homogeneous medium cladding having a refractive index $n_s$; and
the core comprising a side face parallel to the first direction in contact with the homogeneous medium cladding, the side face satisfying the condition:

$$\lambda_0/n_s > a\lambda/(\lambda^2/4 + a^2)^{0.5}$$

where $\lambda_0$ denotes wavelength of the electromagnetic wave in a vacuum, a denotes a period of the photonic crystal, and $\lambda$ denotes a period of the wave propagated through the core in the second direction perpendicular to the first direction.

33. An optical device for use as a dispersion control device, the optical device comprising a waveguide formed of a photonic crystal waveguide comprising:
a core formed of a photonic crystal having periodicity in a first direction and which propagates electromagnetic wave in a second direction perpendicular to the first direction, the core comprising a photonic band structure having a Brillouin zone boundary and a photonic band present thereon comprising a propagation mode in which the electromagnetic wave is propagated;
a homogeneous medium cladding having a refractive index $n_s$; and
the core comprising a side face parallel to the first direction in contact with the homogeneous medium cladding, the side face satisfying the condition:

$$\lambda_0/n_s > a\lambda/(\lambda^2/4 + a^2)^{0.5}$$

where $\lambda_0$ denotes a wavelength of the electromagnetic wave in a vacuum, a denotes a period of the photonic crystal, and $\lambda$ denotes a period of the wave propagated through the core in the second direction perpendicular to the first direction, wherein propagated light having a large dispersion condition is propagated through the waveguide.

34. An optical device comprising:

a photonic crystal waveguide comprising:

a core formed of a photonic crystal having periodicity in a first direction and which propagates electromagnetic wave in a second direction perpendicular to the first direction, the core comprising a photonic band structure having a Brillouin zone boundary and a photonic band present thereon comprising a propagation mode in which the electromagnetic wave is propagated;

a homogeneous medium cladding having a refractive index $n_s$; and the core comprising a side face parallel to the first direction in contact with the homogeneous medium cladding, the side face satisfying the condition:

$$\lambda_0/n_s > a\lambda/(\lambda^2/4+a^2)^{0.5}$$

where $\lambda_0$ denotes a wavelength of the electromagnetic wave in a vacuum, a denotes the period of a photonic crystal, and $\lambda$ denotes a period of the wave propagated through the core in the second direction perpendicular to the first direction, the core comprising a material having nonlinear characteristics; and the waveguide comprising two surfaces and the optical device further comprising two electrodes arranged on the two surfaces of the waveguide in the first direction.

35. The optical device of claim 34, further comprising a modulator for changing a voltage or an electric current applied to the two electrodes.

36. An optical device comprising:

a photonic crystal waveguide comprising:

a core formed of a photonic crystal having periodicity in a first direction and which propagates an electromagnetic wave in a second direction perpendicular to the first direction, the core comprising a photonic band structure having a Brillouin zone boundary and a photonic band present thereon comprising a propagation mode in which the electromagnetic wave is propagated;

a homogeneous medium cladding having a refractive index $n_s$; and the core comprising a side face parallel to the first direction in contact with the homogeneous medium cladding, the side face satisfying the condition:

$$\lambda_0/n_s > a\lambda/(\lambda^2/4+a^2)^{0.5}$$

where $\lambda_0$ denotes a wavelength of the electromagnetic wave in a vacuum, a denotes a period of the photonic crystal, and $\lambda$ denotes a period of the wave propagated through the core in the second direction perpendicular to the first direction, wherein the cladding is confined imperfectly to generate refracted light from the core.

* * * * *